(12) United States Patent
Hoyda

(10) Patent No.: US 11,518,309 B2
(45) Date of Patent: Dec. 6, 2022

(54) SYSTEM AND PROCESS FOR VIEWING IN BLIND SPOTS

(71) Applicant: Serge Hoyda LLC, Great Neck, NY (US)

(72) Inventor: Serge B. Hoyda, Great Neck, NY (US)

(73) Assignee: Serge Hoyda LLC, Great Neck, NY (US)

(*) Notice: Subject to any disclaimer, the term of this patent is extended or adjusted under 35 U.S.C. 154(b) by 0 days.

(21) Appl. No.: 17/150,653

(22) Filed: Jan. 15, 2021

(65) Prior Publication Data

US 2021/0213881 A1 Jul. 15, 2021

Related U.S. Application Data

(63) Continuation-in-part of application No. PCT/US2019/042698, filed on Jul. 19, 2019, which is (Continued)

(51) Int. Cl.
  *B60R 1/12* (2006.01)
  *B60R 1/00* (2022.01)
  *B60S 1/54* (2006.01)

(52) U.S. Cl.
  CPC .......... *B60R 1/12* (2013.01); *B60R 1/001* (2013.01); *B60S 1/542* (2013.01);
  (Continued)

(58) Field of Classification Search
  CPC ... B60R 1/00; B60R 11/04; B60R 2011/0022; B60R 2300/105; B60R 2300/8026;
  (Continued)

(56) References Cited

U.S. PATENT DOCUMENTS 3,625,562 A 12/1971 Barenyi et al.
4,892,386 A 1/1990 Suzuki et al.
(Continued)

FOREIGN PATENT DOCUMENTS

CN 1962315 A 5/2007
CN 101415110 A 4/2009
(Continued)

OTHER PUBLICATIONS

Final Office Action in U.S. Appl. No. 15/161,189 dated Mar. 9, 2017.
(Continued)

*Primary Examiner* — Allen C Wong
(74) *Attorney, Agent, or Firm* — Collard & Roe, P.C.

(57) ABSTRACT

There is disclosed a viewing system coupled to a motor vehicle having a frame having a roof, at least one support, and a body with the at least one support supporting the roof over the body. The system can comprise at least one camera, at least one screen coupled to the support. In addition each camera is coupled to the at least one support and wherein said at least one screen is in communication with the first set of cameras, wherein said at least one screen displays images presented by the first set of cameras. This device can provide additional view in the blind spot of the vehicle.

16 Claims, 99 Drawing Sheets

Related U.S. Application Data a continuation-in-part of application No. 16/101,474, filed on Aug. 12, 2018, now Pat. No. 11,124,116, and a continuation-in-part of application No. 16/040,359, filed on Jul. 19, 2018, now Pat. No. 10,967,791, application No. 17/150,653, filed on Jan. 15, 2021, which is a continuation-in-part of application No. 16/101,474, filed on Aug. 12, 2018, now Pat. No. 11,124,116, and a continuation-in-part of application No. 16/040,359, filed on Jul. 19, 2018, now Pat. No. 10,967,791, said application No. 16/101,474 is a continuation-in-part of application No. 14/898,129, filed on Dec. 12, 2015, now Pat. No. 10,046,703, said application No. 16/040,359 is a continuation-in-part of application No. 14/898,129, which is a continuation of application No. PCT/US2015/065255, filed on Dec. 11, 2015, now Pat. No. 10,046,703.

(60) Provisional application No. 63/029,371, filed on May 22, 2020, provisional application No. 62/872,416, filed on Jul. 10, 2019, provisional application No. 62/850,699, filed on May 21, 2019, provisional application No. 62/091,346, filed on Dec. 12, 2014, provisional application No. 62/181,170, filed on Jun. 17, 2015.

(52) U.S. Cl.
CPC . *B60R 2001/1253* (2013.01); *B60R 2300/105* (2013.01); *B60R 2300/107* (2013.01); *B60R 2300/202* (2013.01); *B60R 2300/205* (2013.01); *B60R 2300/8026* (2013.01); *B60R 2300/8066* (2013.01)

(58) Field of Classification Search
CPC ... B60R 1/12; B60R 1/001; B60R 2001/1253; B60R 2300/107; B60R 2300/202; B60R 2300/205; B60R 2300/8066; B60S 1/542
USPC .......................................................... 348/148
See application file for complete search history.

(56) References Cited

U.S. PATENT DOCUMENTS

| | | | |
|---|---|---|---|
| 5,096,287 A | 3/1992 | Kakinami et al. | |
| 5,221,068 A | 6/1993 | Varner et al. | |
| 5,281,985 A | 1/1994 | Chan | |
| 5,415,554 A | 5/1995 | Kempkers et al. | |
| 5,428,512 A | 6/1995 | Mouzas | |
| 5,727,960 A | 3/1998 | Zehrung | |
| 6,078,355 A | 6/2000 | Zengel | |
| 6,086,136 A | 7/2000 | Jambor et al. | |
| 6,115,651 A | 9/2000 | Cruz | |
| 6,122,865 A | 9/2000 | Branc et al. | |
| 6,281,804 B1 | 8/2001 | Haller et al. | |
| 6,476,855 B1* | 11/2002 | Yamamoto ............... G08G 1/04 348/E7.086 | |
| 6,758,510 B1 | 7/2004 | Starling | |
| 6,772,057 B2 | 8/2004 | Breed et al. | |
| 6,809,704 B2 | 10/2004 | Kulas | |
| 6,854,786 B2 | 2/2005 | Berglund et al. | |
| 6,856,873 B2 | 2/2005 | Breed et al. | |
| 6,859,148 B2 | 2/2005 | Miller et al. | |
| 6,954,152 B1 | 10/2005 | Matthews | |
| 7,049,945 B2 | 5/2006 | Breed et al. | |
| 7,520,616 B2 | 4/2009 | Ooba et al. | |
| 7,527,440 B1* | 5/2009 | White ................... G03B 17/00 396/419 | |
| 3,004,425 A1 | 8/2011 | Hoek et al. | |
| 8,179,435 B2 | 5/2012 | Akatsuka et al. | |
| 8,339,252 B2 | 12/2012 | Ozaki | |
| 8,345,095 B2 | 1/2013 | Oizumi et al. | |
| 8,480,315 B2 | 7/2013 | Nakamura et al. | |
| 8,624,716 B2 | 1/2014 | Englander | |
| 9,126,533 B2 | 9/2015 | Kubota et al. | |
| 9,654,687 B2 | 5/2017 | Varonos | |
| 9,686,876 B2 | 6/2017 | Saitou | |
| 9,845,053 B2 | 12/2017 | Ukeda | |
| 9,994,154 B1 | 6/2018 | Takagi et al. | |
| 10,026,910 B2 | 7/2018 | Ukeda | |
| 10,061,186 B2 | 8/2018 | Kong et al. | |
| 2002/0003571 A1* | 1/2002 | Schofield ............ B60R 11/0235 348/148 | |
| 2002/0124479 A1 | 9/2002 | Branc et al. | |
| 2003/0095185 A1 | 5/2003 | Naifeh | |
| 2003/0151563 A1 | 8/2003 | Kulas | |
| 2003/0214733 A1 | 11/2003 | Fujikawa et al. | |
| 2004/0211868 A1 | 10/2004 | Holmes et al. | |
| 2005/0206780 A1 | 9/2005 | Iwasaki et al. | |
| 2006/0119705 A1 | 6/2006 | Liao | |
| 2006/0197019 A1* | 9/2006 | Satou ..................... G01S 17/89 250/338.1 | |
| 2006/0221183 A1 | 10/2006 | Sham | |
| 2007/0035385 A1* | 2/2007 | Miyahara ............... G08G 1/166 340/435 | |
| 2007/0053551 A1 | 3/2007 | Kubo et al. | |
| 2007/0080267 A1 | 4/2007 | Richter | |
| 2007/0084500 A1 | 4/2007 | Chen | |
| 2007/0170321 A1 | 7/2007 | Smed | |
| 2008/0055411 A1 | 3/2008 | Lee | |
| 2008/0099655 A1 | 5/2008 | Goodman | |
| 2008/0117298 A1 | 5/2008 | Torres | |
| 2008/0136915 A1 | 6/2008 | Iwamura | |
| 2008/0203308 A1 | 8/2008 | Yoo | |
| 2009/0091618 A1 | 4/2009 | Anderson | |
| 2010/0231719 A1* | 9/2010 | Nakamura ............... B60R 11/04 348/148 | |
| 2010/0315507 A1* | 12/2010 | Chrobocinski .. G08B 13/19643 348/143 | |
| 2010/0321408 A1* | 12/2010 | Miceli .................... G09G 3/001 345/643 | |
| 2011/0090073 A1 | 4/2011 | Ozaki | |
| 2011/0233966 A1 | 9/2011 | Pellmann et al. | |
| 2011/0267466 A1 | 11/2011 | Brester | |
| 2012/0105638 A1* | 5/2012 | Englander ............. B60Q 5/006 348/148 | |
| 2012/0117745 A1* | 5/2012 | Hattori ..................... B60S 1/54 134/198 | |
| 2012/0314075 A1 | 12/2012 | Cho | |
| 2013/0096820 A1 | 4/2013 | Agnew | |
| 2013/0169469 A1 | 7/2013 | Mitsuta et al. | |
| 2013/0193173 A1* | 8/2013 | Bonito ................ B60R 11/0229 224/274 | |
| 2013/0274999 A1 | 10/2013 | Bengtsson et al. | |
| 2014/0285666 A1 | 9/2014 | O'Connell et al. | |
| 2014/0327776 A1* | 11/2014 | Michiguchi ............... B60R 1/00 348/148 | |
| 2015/0002633 A1 | 1/2015 | Hayashi et al. | |
| 2015/0002642 A1 | 1/2015 | Dressler | |
| 2015/0040953 A1 | 2/2015 | Kikuta et al. | |
| 2015/0042797 A1* | 2/2015 | Alam ........................ B60R 1/00 348/148 | |
| 2015/0241010 A1 | 8/2015 | Kitazawa | |
| 2015/0258937 A1 | 9/2015 | Wen | |
| 2015/0282346 A1* | 10/2015 | Ganim .................. H05K 5/0204 40/544 | |
| 2016/0050399 A1 | 2/2016 | Chuter et al. | |
| 2016/0062217 A1 | 3/2016 | Slater | |
| 2016/0134815 A1 | 5/2016 | Ishiguro et al. | |
| 2016/0159282 A1 | 6/2016 | Kurihara | |
| 2016/0264064 A1 | 9/2016 | Byrne et al. | |
| 2016/0272119 A1 | 9/2016 | Ishiguro | |
| 2016/0288713 A1 | 10/2016 | Hoyda et al. | |
| 2017/0026555 A1 | 1/2017 | Hoyda et al. | |
| 2017/0057430 A1 | 3/2017 | Kim | |
| 2017/0182943 A1 | 6/2017 | Hoenninger | |
| 2017/0313288 A1 | 11/2017 | Tippy et al. | |
| 2017/0318267 A1 | 11/2017 | Kim et al. | |
| 2018/0009393 A1 | 1/2018 | Nagashima | |

(56) References Cited

U.S. PATENT DOCUMENTS

| | | | |
|---|---|---|---|
| 2018/0072156 A1 | 3/2018 | Tae et al. | |
| 2018/0134217 A1 | 5/2018 | Peterson et al. | |
| 2018/0225972 A1 | 8/2018 | Shiohara | |

FOREIGN PATENT DOCUMENTS

| | | | |
|---|---|---|---|
| CN | 101428591 A | 5/2009 | |
| CN | 201736897 U | 2/2011 | |
| CN | 102887113 A | 1/2013 | |
| CN | 202935286 U | 5/2013 | |
| CN | 103129473 A | 6/2013 | |
| CN | 103358996 A | 10/2013 | |
| CN | 203358473 U | 12/2013 | |
| CN | 103481829 A | 1/2014 | |
| CN | 103863205 A | 6/2014 | |
| CN | 203739757 U | 7/2014 | |
| CN | 204807898 U | 11/2015 | |
| CN | 105172680 A | 12/2015 | |
| CN | 204821328 U | 12/2015 | |
| CN | 105253070 A | 1/2016 | |
| CN | 105329175 A | 2/2016 | |
| CN | 105564311 A | 5/2016 | |
| CN | 205239322 U | 5/2016 | |
| CN | 206644753 U | 11/2017 | |
| DE | 20 2010 002 887 U1 | 7/2010 | |
| EP | 0 990 834 A1 | 4/2000 | |
| EP | 1 378 395 A1 | 1/2004 | |
| EP | 1 770 002 A1 | 4/2007 | |
| GB | 2 397 189 A | 7/2004 | |
| JP | 2005-204132 A | 7/2005 | |
| TW | M487864 U | 10/2014 | |
| WO | 2005/028256 A2 | 3/2005 | |
| WO | 2006/027563 A1 | 3/2006 | |
| WO | 2007/081894 A2 | 7/2007 | |
| WO | 2013/055513 A1 | 4/2013 | |
| WO | 2014/162260 A1 | 10/2014 | |
| WO | 2016/094801 A1 | 6/2016 | |
| WO | 2016/094882 A1 | 6/2016 | |

OTHER PUBLICATIONS

Final Office Action in U.S. Appl. No. 15/161,173 dated Apr. 24, 2017.
Final Office Action in U.S. Appl. No. 15/161,173 dated Nov. 13, 2017.
Final Office Action in U.S. Appl. No. 14/898,129 dated Mar. 27, 2018.
Final Office Action in U.S. Appl. No. 14/898,130 dated Nov. 15, 2017.
International Preliminary Report on Patentability and Written Opinion of the International Searching Authority of PCT/US2015/065255 dated Jun. 22, 2017.
International Preliminary Report on Patentability and Written Opinion of the International Searching Authority of PCT/US2015/065407 dated Jun. 22, 2017.
International Search Report of PCT/US2015/065255, dated Mar. 29, 2016.
International Search Report of PCT/US2015/065407, dated Feb. 25, 2016.
International Search Report and Written Opinion of the International Searching Authority with Notice of Transmittal of the International Search Report and Written Opinion of PCT/US2017/027972, dated Jun. 29, 2017.
International Search Report of PCT/US2019/042698, dated Nov. 25, 2019.
Non-Final Office Action in U.S. Appl. No. 14/898,129 dated Oct. 12, 2017.
Non-Final Office Action in U.S. Appl. No. 15/161,189 dated Nov. 3, 2016.
Non-Final Office Action in U.S. Appl. No. 15/161,173 dated Jan. 30, 2017.
Non-Final Office Action in U.S. Appl. No. 14/898,130 dated Jul. 31, 2017.
Non-Final Office Action in U.S. Appl. No. 15/161,173 dated Sep. 6, 2017.
Notice of Allowance in U.S. Appl. No. 14/898,129 dated Jun. 27, 2018 with Corrected Notice of Allowability dated Jul. 11, 2018.
Notice of Allowance in U.S. Appl. No. 14/898,130 dated Aug. 10, 2018.
Notice of Allowance in U.S. Appl. No. 15/161,173 dated Sep. 13, 2018 with Corrected Notice of Allowability dated Sep. 14, 2018.
Notice of Allowance in U.S. Appl. No. 15/161,189 dated Aug. 7, 2017 with Corrected Notice of Allowability dated Aug. 16, 2017.
Chinese Office Action in Chinese Patent Application No. 201780043676.0, dated Apr. 17, 2020 with English translation.
English translation of Extended European Search Report in EP Application No. 17800141.8 dated Jan. 23, 2020.
International Preliminary Report on Patentability for PCT/US2019/042698 with the Notification Concerning Transmittal of Copy of International Preliminary Report on Patentability, dated Jan. 19, 2021.
Chinese Office Action in Chinese Patent Application No. 201780043676.0, dated Mar. 4, 2021 with English translation.

* cited by examiner

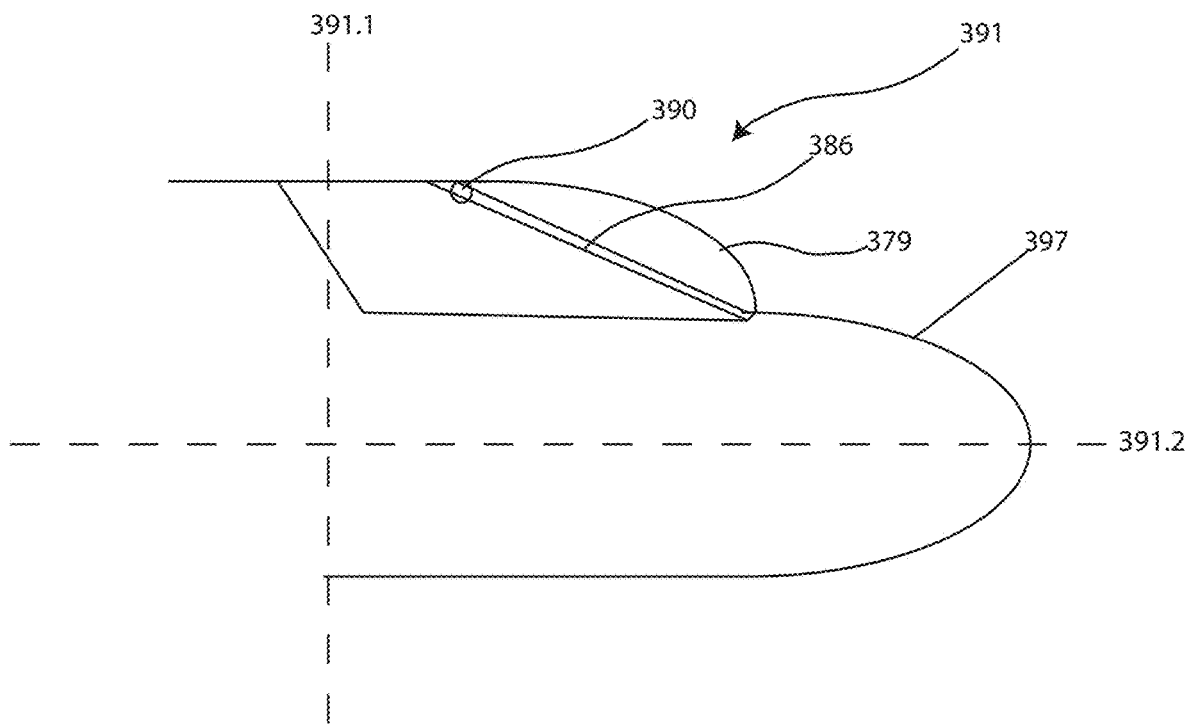

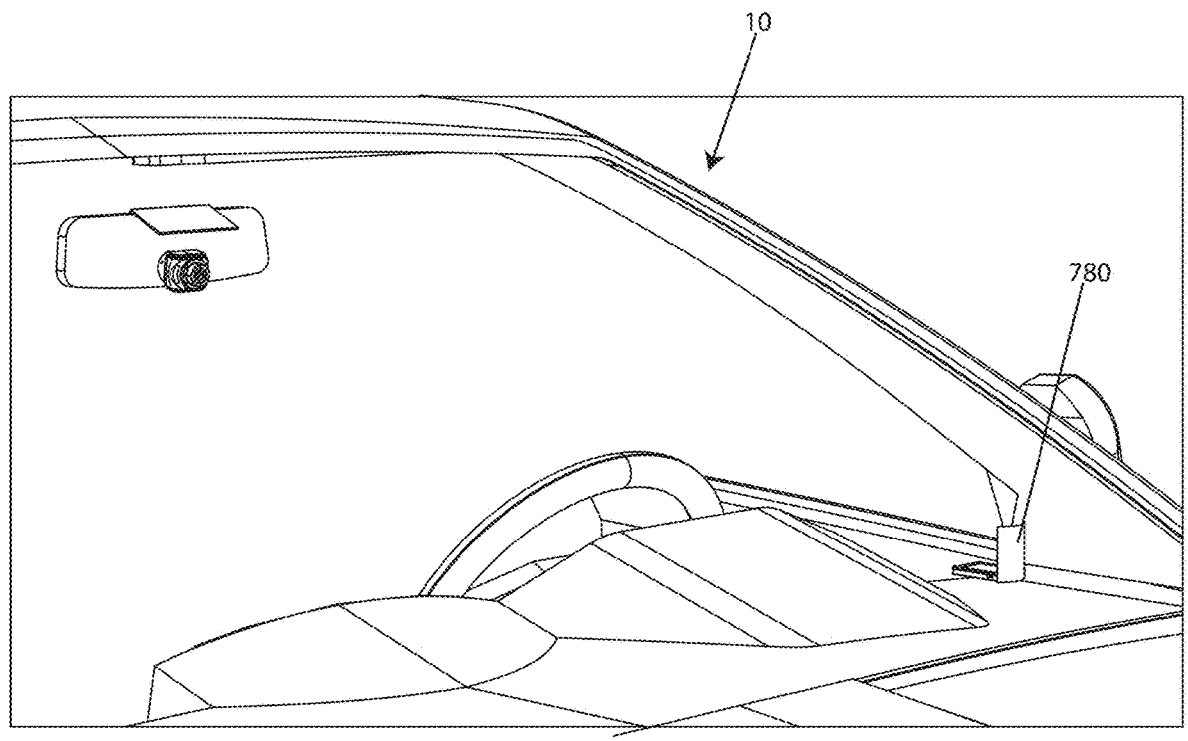
FIG. 54A
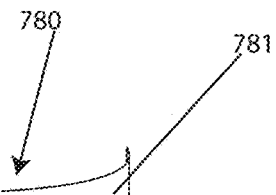
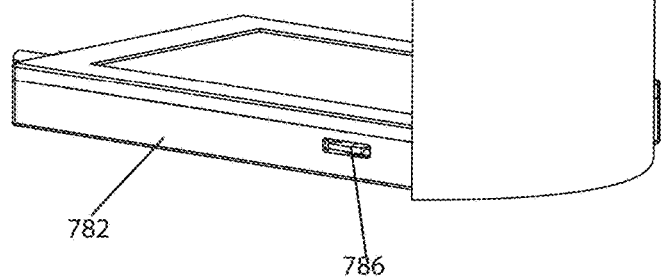
FIG. 54B

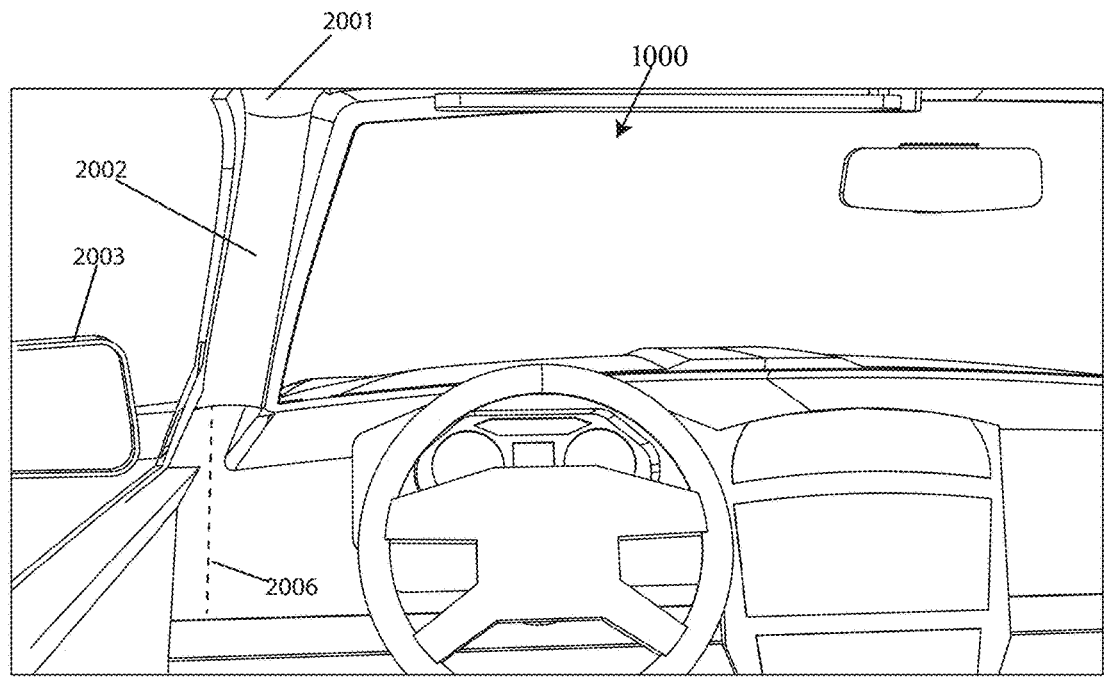
FIG. 58A
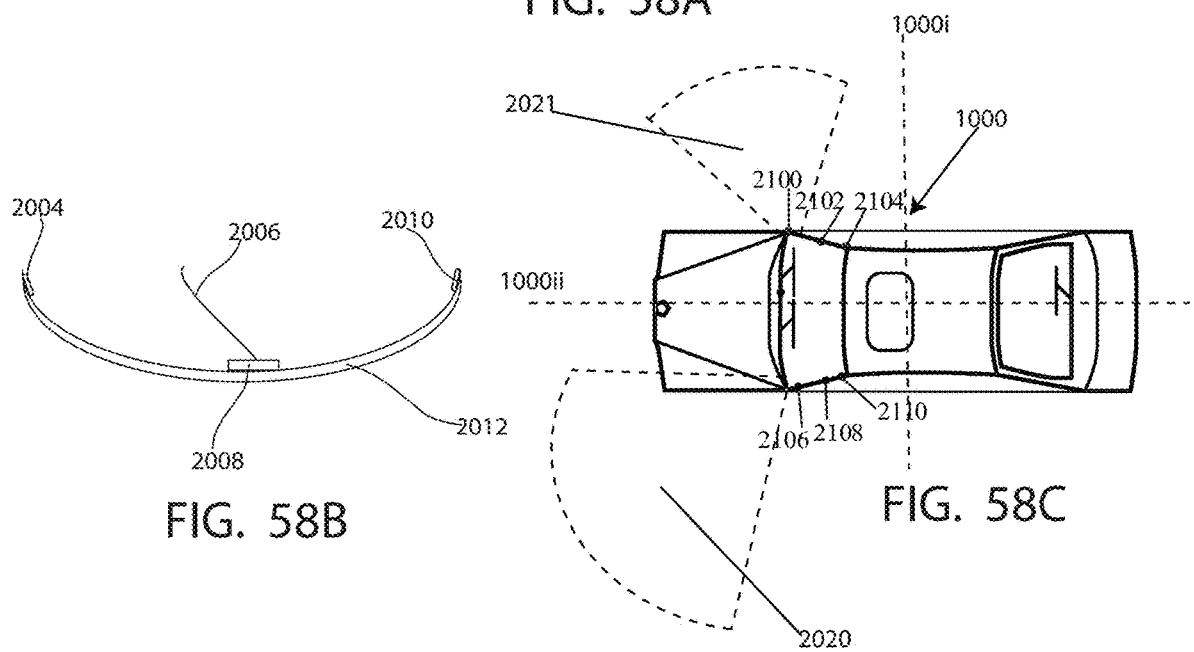
FIG. 58B
FIG. 58C

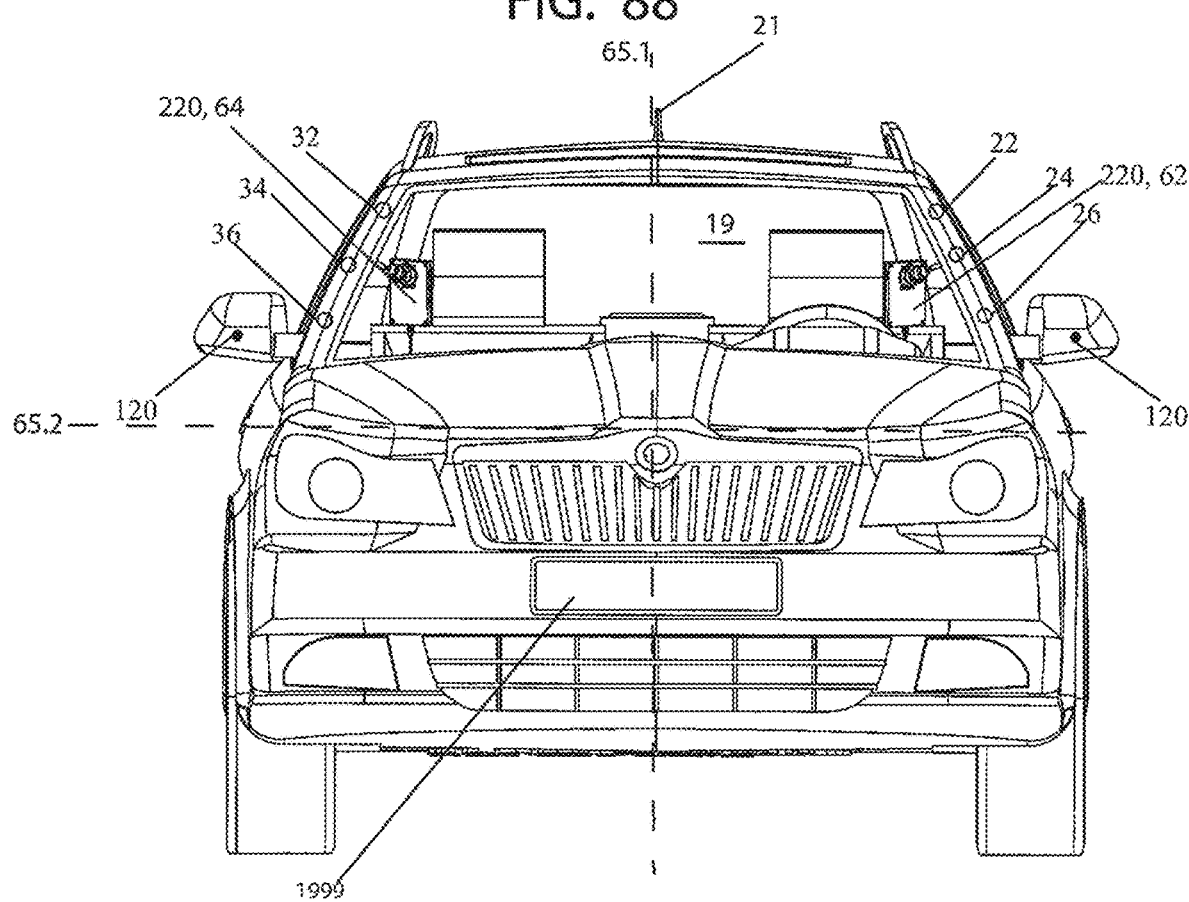

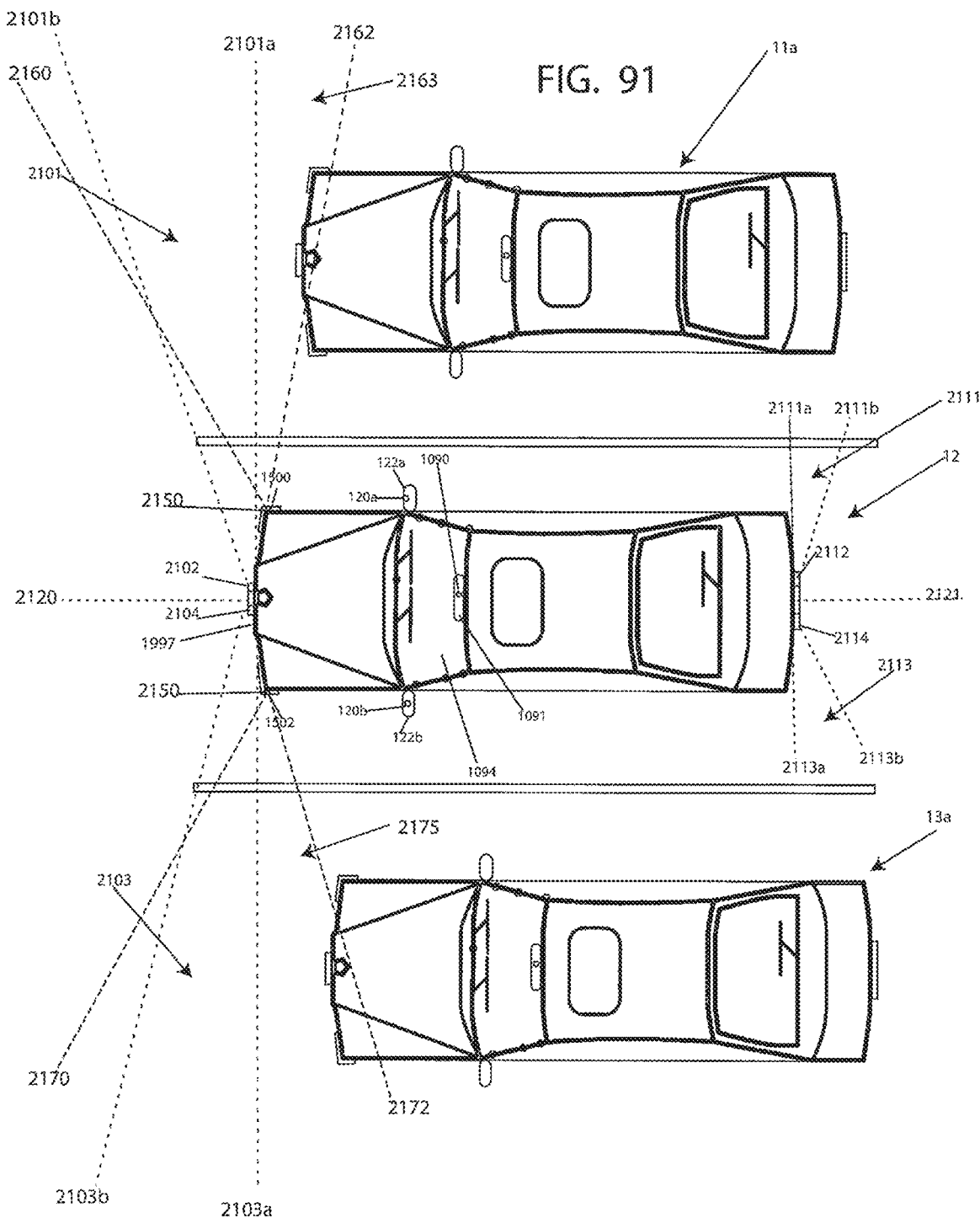

SYSTEM AND PROCESS FOR VIEWING IN BLIND SPOTS

CROSS REFERENCE TO RELATED APPLICATIONS

This application is a continuation in part application of international application PCT/US19/42698 filed on Jul. 19, 2019. The international application claimed priority to provisional application Ser. No. 62/872,416 filed on Jul. 10, 2019, and provisional application Ser. No. 62/850,699 filed on May 21, 2019. as well as U.S. patent application Ser. No. 16/101,474, filed on Aug. 12, 2018, and U.S. patent application Ser. No. 16/040,359, filed on Jul. 19, 2018. This application is also a continuation in part application of Ser. No. 16/040,359 filed on Jul. 19, 2018, and is also a continuation in part of Ser. No. 16/101,474 filed on Aug. 12, 2018. These applications are continuation in part applications of Ser. No. 14/898,129 (hereinafter the '129 application) filed on Dec. 12, 2015. The '129 application is a national stage application of International Application Serial No. PCT/US15/65255 filed on Dec. 11, 2015. Both the '129 application, and the international application PCT/US15/65255 claim priority from two provisional applications including Ser. No. 62/091,346 filed on Dec. 12, 2014 and Ser. No. 62/181,170 filed on Jun. 17, 2015.

This application is also a non-provisional application that hereby claims priority from provisional application Ser. No. 63/029,371 filed on May 22, 2020. The disclosures of all of the above applications are hereby incorporated by reference in their entirety.

BACKGROUND

One embodiment relates to a display and video system for viewing blind spots which is configured to expand the viewing area for operators of autos, or motor vehicles, planes, or boats. Sometimes viewers encounter blind spots and cannot see around obstructions limiting the visibility required for the operation of the vehicle. Therefore, there is a need to have additional viewing areas for users so that people can see in the blind spots.

SUMMARY

In one embodiment, there is disclosed a viewing system coupled to a device such as a motor vehicle, a plane, or a boat having a frame, having a roof, at least one support, and a body with the at least one support supporting the roof over the body. The system can comprise a first set of cameras at least one screen coupled to the support. In addition, the first set of cameras are also coupled to the at least one support and wherein said at least one screen is in communication with the first set of cameras, wherein said at least one screen displays images presented by the first set of cameras.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 24B is a side view of a cockpit of an airplane or boat.

FIG. 54A is a view of the embodiment shown in FIGS. 53A and 53B

FIG. 54B is a view of the component shown in FIGS. 53A, 53B, and 54A;

FIG. 58A is a view of another embodiment;

FIG. 58B is a top view of a screen;

FIG. 58C is a top view of an auto of the embodiment of FIG. 58A;

FIG. 88 is a front view of the auto of the embodiment of either FIG. 86A or 87A;

FIG. 91 shows an embodiment of the invention in use.

DETAILED DESCRIPTION

Figure 1A:
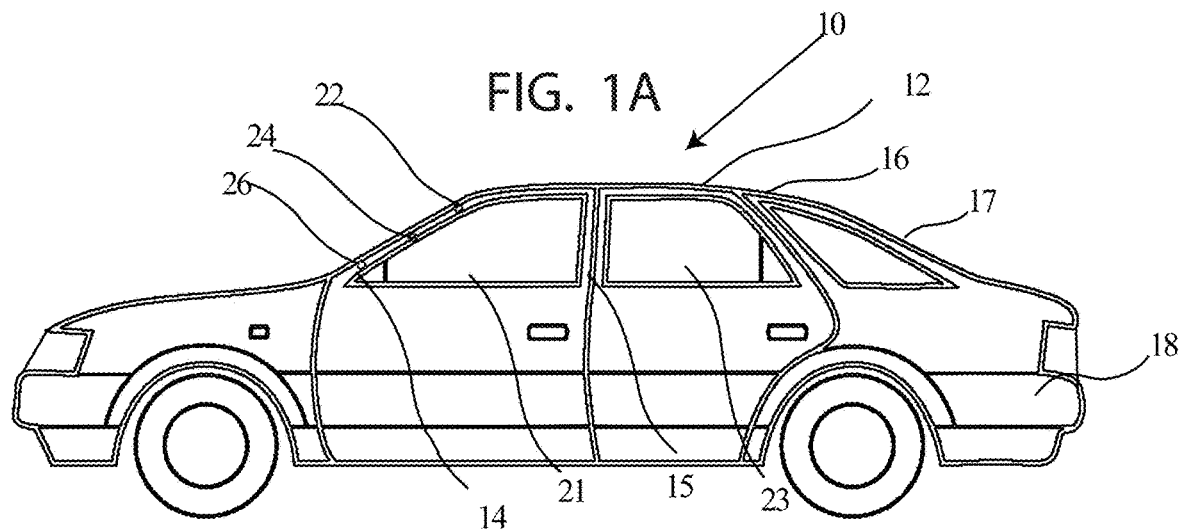
FIG. 1A is a side view of one embodiment.

FIG. 1A is a side view of one embodiment. This embodiment 10 shows an automobile 12 having a frame comprising a body 18, a roof 16, and supports 14 and 15. Supports 14 and 15 support the roof over the body. Windows such as front windshield 19 are positioned between supports 14.1 and 14.2. Support 14 comprises both supports 14.1 and 14.2. Support 15 comprises both supports 15.1 and 15.2. There is also a rear support 17 which is also useful in supporting roof 16 over body 18. Side windows 21 and 23 are interspersed between roof 16 and body 18 as well.

Figure 1B:
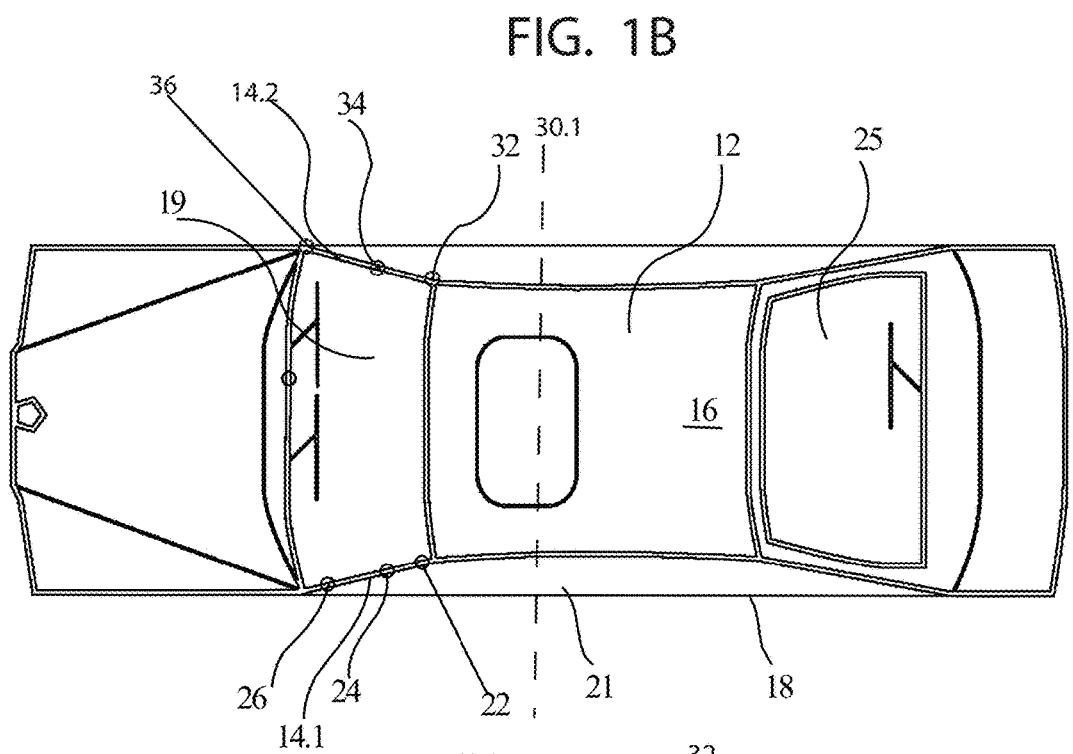
FIG. 1B is a top view of the embodiment shown in FIG. 1A.

FIG. 1B is a top view of the embodiment shown in FIG. 1A. In this view there is windshield 19 as well as back windshield 25. The top of roof 16 is also shown. In addition, there is shown the two sides of the auto with supports 14.1 and 14.2 each having multiple cameras such as at least one camera. There are for example, three cameras 22, 24, and 26 in the first side support 14.1. In addition, there is an additional support 14.2 which has additional cameras 32, 34, and 36 as well. There is also a dashed dotted line 30.1 which bisects the auto wherein in this view a front end of the auto is to the left side of the line and back end of the auto is to the right side of the line. Supports 14.1 and 14.2 sit at the front end of the auto.

Figure 1C:
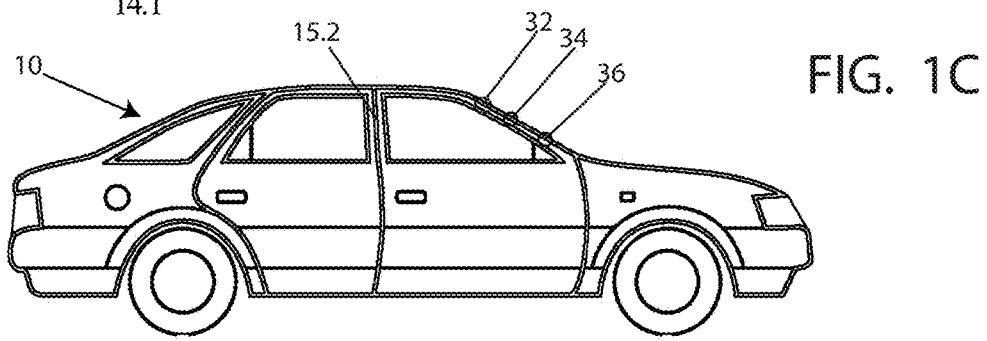
FIG. 1C shows an opposite side view of the embodiment shown in FIG. 1A.

FIG. 1C shows the opposite side from FIG. 1A showing cameras 32, 34, 36 and support 15.2 as well. Thus, there could be at least one, but in this embodiment there are at least three cameras on each side of the supports 14.1 and 14.2 respectively. Because there are a plurality of cameras, on each side, each of these cameras provide additional depth perceptions because these cameras are positioned at different heights and different depths from the front of an automobile. These cameras 22, 24, 26, and 32, 34 and 36 are positioned between a front windshield of the auto 12.

Figure 2A:
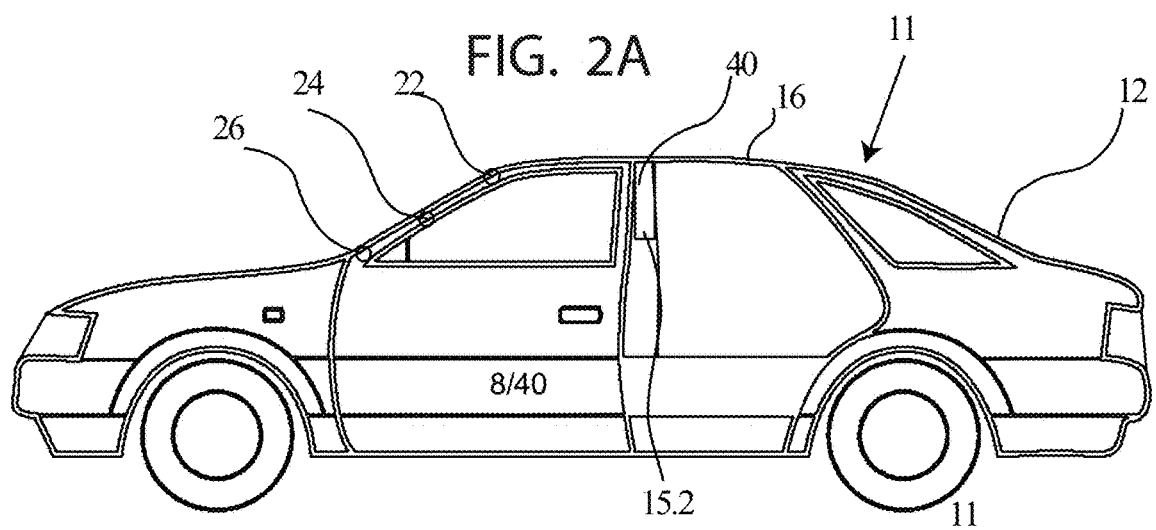
FIG. 2A is a side cut-away view of another embodiment.

FIG. 2A shows a side view of an automobile wherein this design shows another embodiment 11 which shows a screen 40 which shows the images or view inside of an automobile. This view also shows cameras 22, 24, and 26 coupled to supports 14. This view is a cut-away side view showing the interior of the vehicle. The positioning of this screen is in a middle section of the automobile on the support frame between the front seat of the auto and the back seat. The screen or display 40 is coupled to the frame section using a support structure such as that shown in FIG. 2A.

Figure 2B:
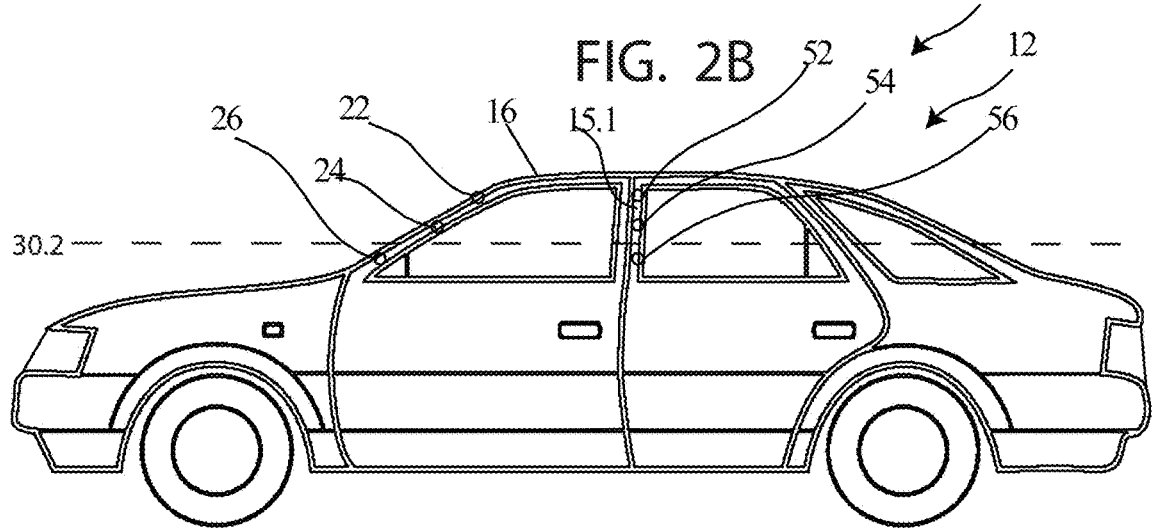
FIG. 2B is a side view of the embodiment shown in FIG. 2A.

FIG. 2B is a side view of the embodiment shown in FIG. 2A. This view shows the exterior view. This exterior view shows additional cameras 52, 54, and 56 which are coupled to support 15.1 while as shown screen or display 40 is coupled to support 15.2. Cameras 52, 54, and 56 are in communication with an associated screen such as screen 40 shown on an associated support such as support 15.1. Thus, the screen is located just inside of the cameras. This view also shows a bisecting line 30.2 on FIG. 2B which extends substantially horizontally and which forms a bisecting line bisecting the auto so that a bottom half is shown below the bisecting line and a top half is shown above the bisecting line. Thus, the cameras and associated displays are shown in a top half of the auto. For example, cameras 22, 24, and 26 and the associated display are shown in the top front section of the auto to cover blind spots in the top front viewing region of the auto.

Figure 2C:
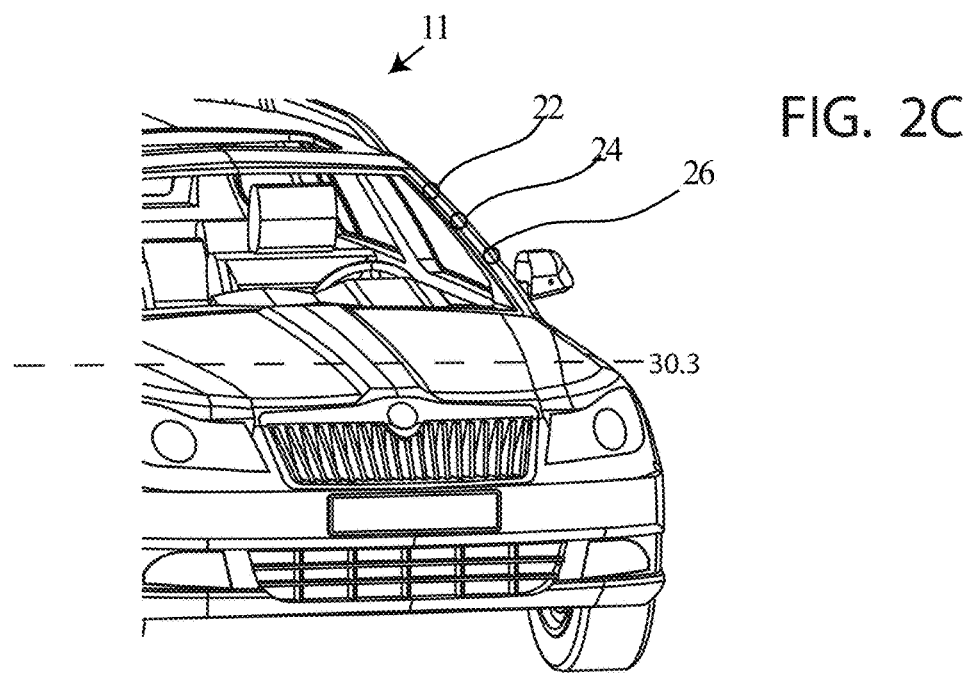
FIG. 2C is a front view of the embodiment shown in FIG. 2A.

FIG. 2C shows a front view of the auto of the embodiment 11 which shows cameras 22, 24, and 26 on support 14.1 while cameras 32, 34, and 36 are positioned on support 14.2. This view shows a bisecting line 30.3 which bisects the auto and extends in a substantially horizontal plane. Thus above this line 30.3 is a top half of the auto and below this line is a bottom half of the auto.

Figure 3A:
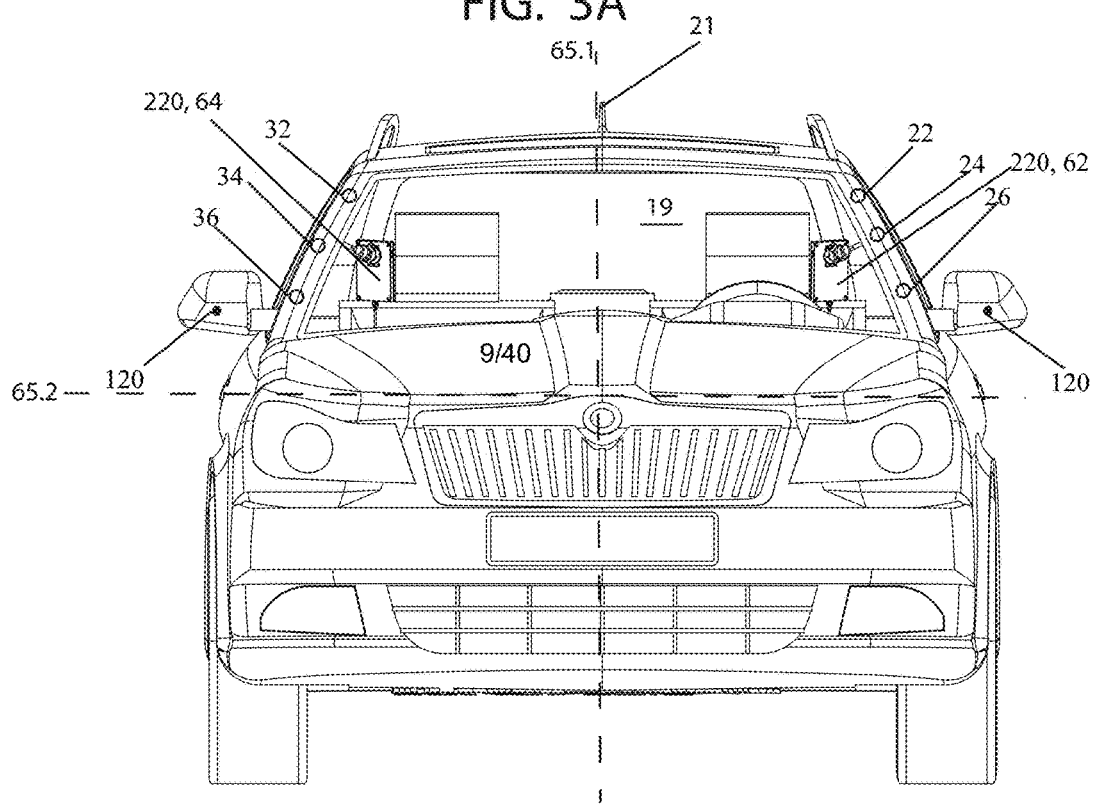
FIG. 3A is a front view of an auto of the embodiment of either FIG. 1A or FIG. 2A.

FIG. 3A is an inside view of an auto of the embodiment of either FIG. 1A or FIG. 2A. In this view, it shows a video screen 62, or screen 220 (See FIG. 22) positioned on the inside surface of support 14.1 (See FIG. 1B). This screen is in communication with associated cameras 22, 24, and 26 as well as camera 120 positioned on the side view mirror on that side of the car. Screen 64, or 220 is coupled to support 14.2. Screen 64 is associated with cameras 32, 34, and 36 as well as camera 120 on the side view mirror of that side of the car. In this view there is shown dashed dotted lines 65.1 and 65.2. Dashed line 65.1 bisects the auto in the middle with a vertical line and divides the auto into a right half and a left half from this perspective. Thus, the screens 62 and 64 are positioned on both the right half and the left half of the auto and generally or substantially on the top half of the auto along the supports 14.1 and 14.2 and adjacent to the windshield 19.

Figure 3B:
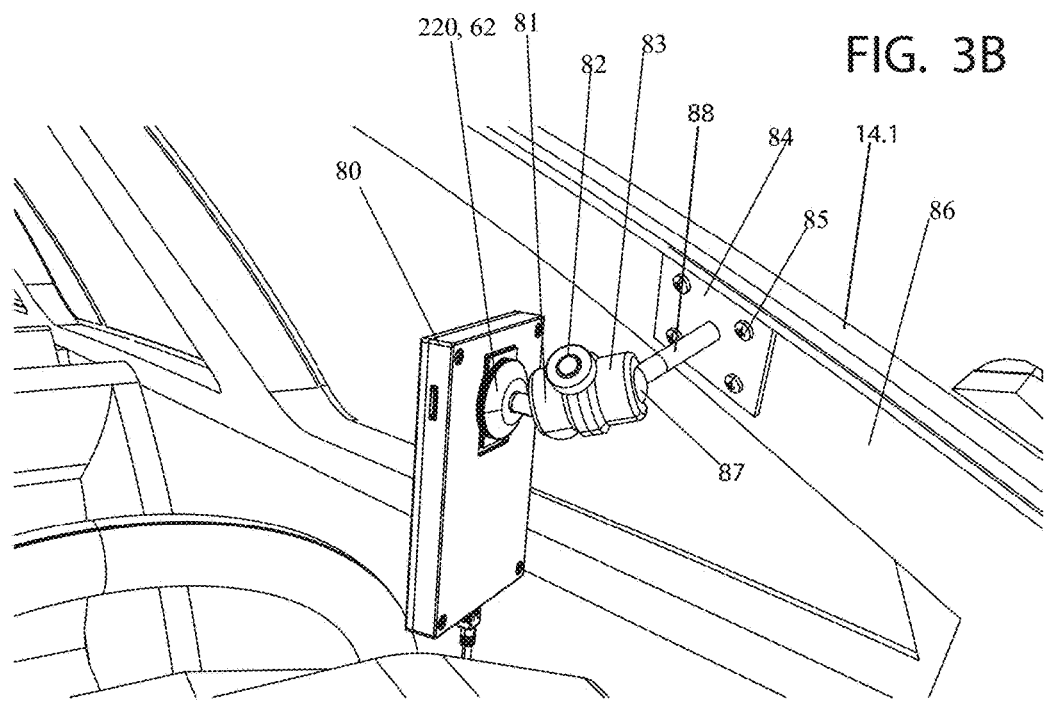
FIG. 3B is a front inside view of another embodiment.

FIG. 3B shows a front inside view of at least one screen 62, or 220, with a housing 80. There is also at least one first adjustment mechanism 81, a turn screw 82 for tightening and fixing the screen in place. The turn screw 82 fixes the housing section 83 around ball joint 87. Ball joint 87 is coupled to shaft 88. Shaft 88 is coupled to plate 84. Plate 84 is coupled to inside frame 86 via screws. Thus, with this embodiment, the screen system is coupled to inside section 86 of frame 14.1 so that this adjustable section makes the screen 62 adjustable in movement. This adjustable omnidirectional system is similar to that shown in FIGS. 11-13 as well.

Figure 4A:
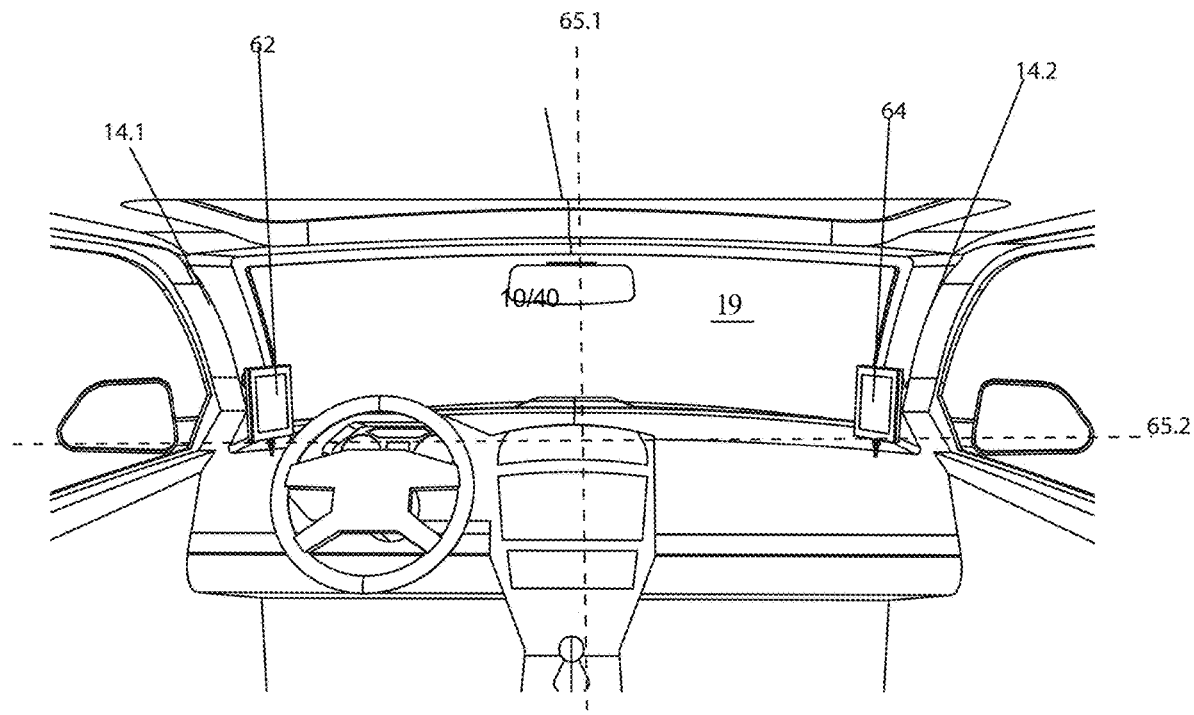
FIG. 4A is an inside view of an auto of the embodiment of either FIG. 1A or FIG. 2A.

FIG. 4A is an inside view of an auto of the embodiment of either FIG. 1A or FIG. 2A. This view shows screens 62 and 64 associated with respective cameras 22, 24, and 26, or cameras 32, 34, and 36. Screens 62 and 64 are similar to screens 220 and are coupled to the auto adjacent to supports 14.1 and 14.2. This view also shows the screens positioned on either side of bisecting line 65.1 in generally the top half of the auto.

Figure 4B:
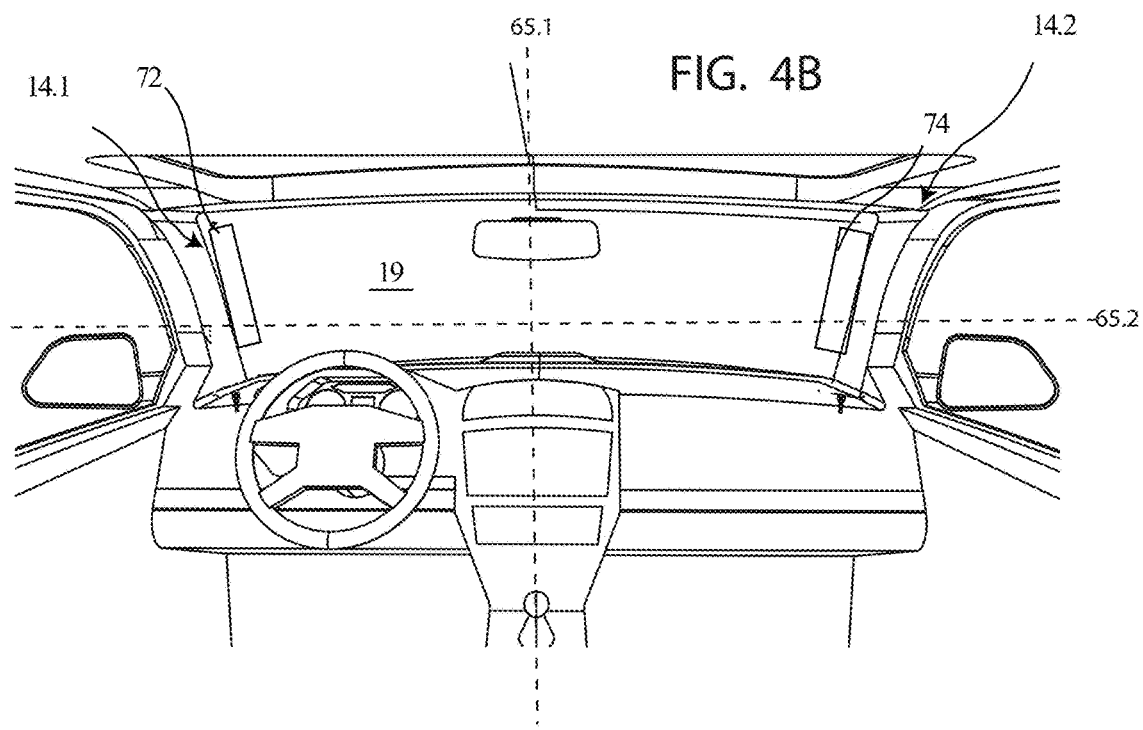
FIG. 4B is another view of the inside of the automobile.

FIG. 4B shows an inside view of an auto of the embodiment of FIG. 1A or FIG. 2A. In this view, there is bisecting line 65.1 as well as bisecting line 65.2. Bisecting line 65.1. Bisecting line 65.1 is substantially vertical while bisecting line 65.2 is substantially horizontal. On either side of bisecting line 65.1 are screens such as screens 72 or 74 which can be positioned inside of frames 14.1 and 14.2 and be used to display images from a camera. These images can be even three dimensional images created by multiple cameras such as cameras 22, 24, 26, 32, 34, 36, or cameras 100 or 120 which can be used to present an image that has depth and also be used to provide the user with an ability to judge the distance that a pedestrian or an automobile may be positioned from the automobile.

Figure 5:
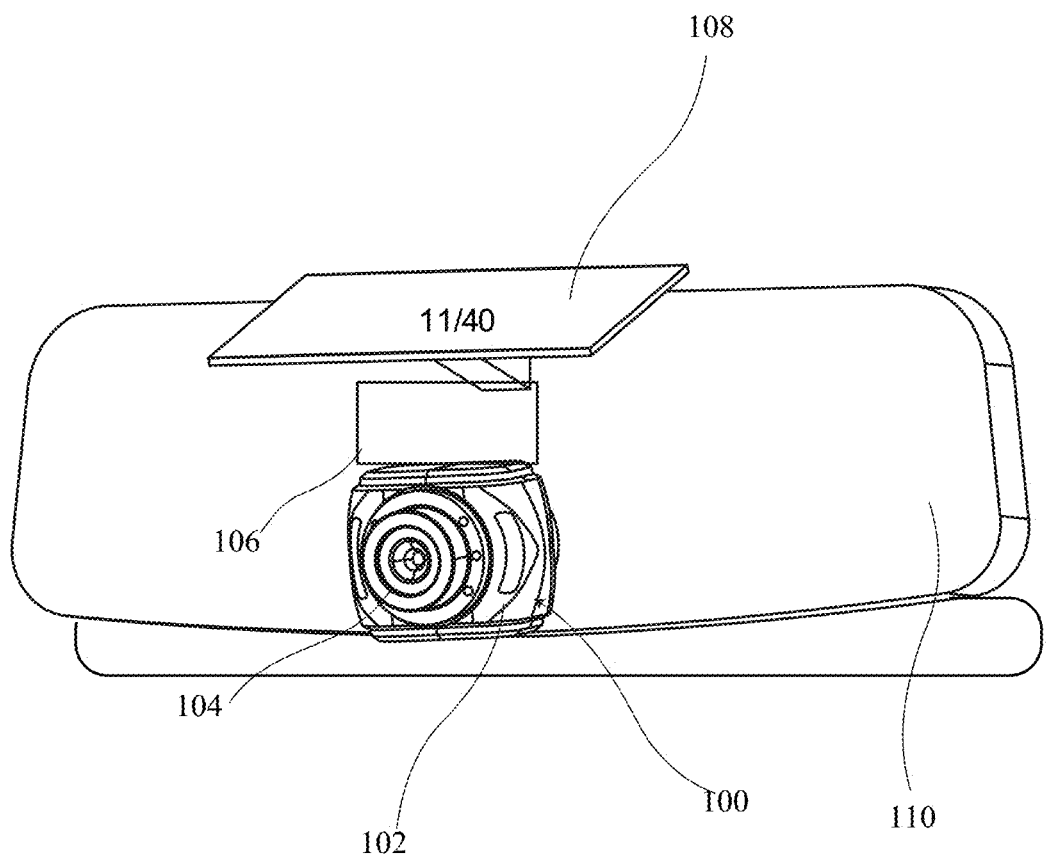
FIG. 5 is a view of an embodiment coupled to a rear view mirror.
Figure 6:
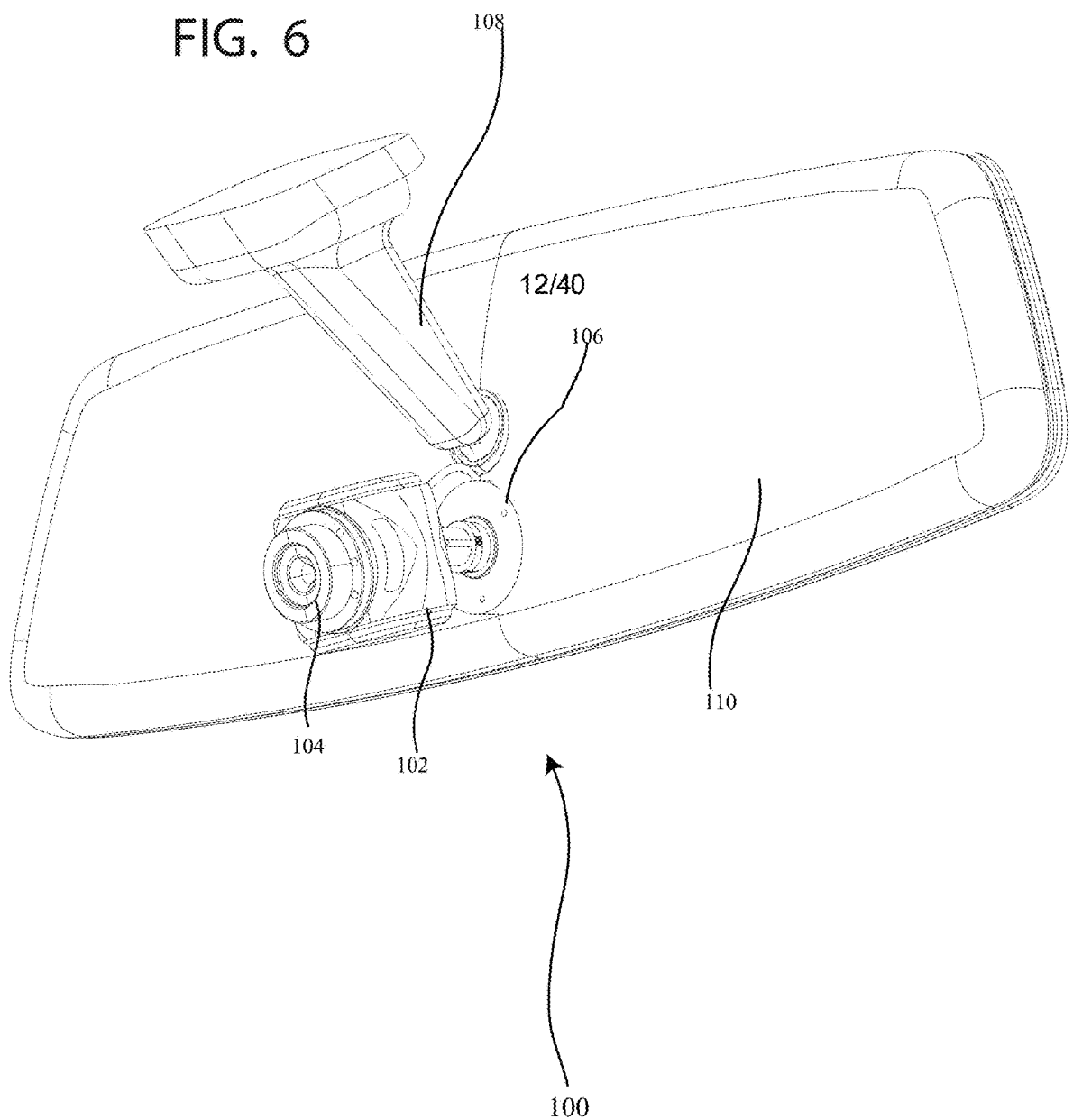
FIG. 6 is another view of the embodiment coupled to the rear view mirror.
Figure 7:
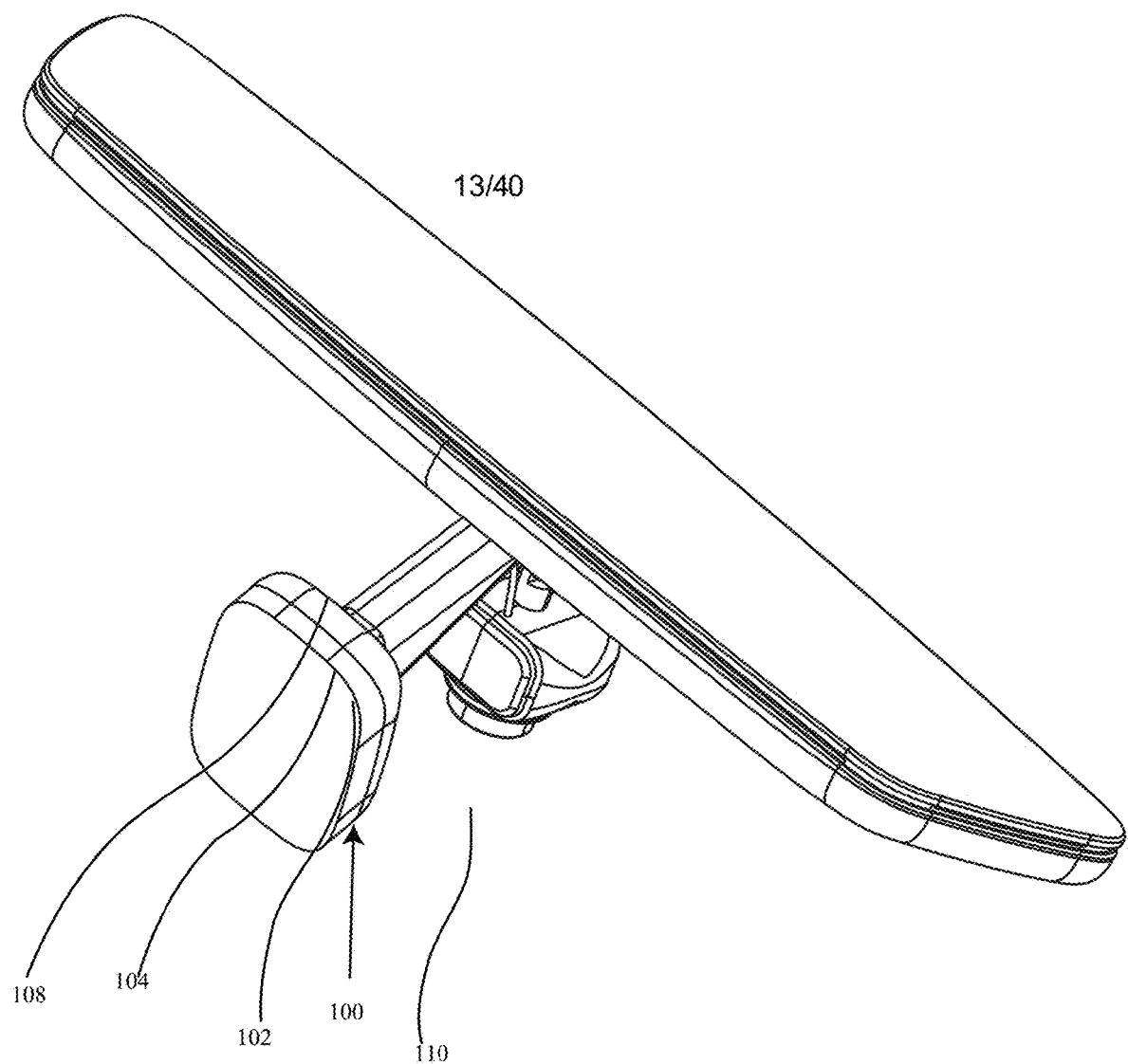
FIG. 7 is a side view of the embodiment of FIG. 5.

FIG. 5 is a side perspective view of a camera mounted on a rearview mirror. For example, there is a camera system 100, which includes a camera body 102, and a lens section 104 the camera body 102 is coupled to a bracket such as a support bracket 106. Bracket 106 is coupled to a mounting body 108. Body 108 is coupled to rearview mirror 110. Mounting body 108 can be coupled to a windshield or windscreen. In this way, camera 100, including camera body 102 can be positioned in front of rearview mirror 110 so that the user has blind spot recordability and visibility of this rearview mirror. FIGS. 6 and 7 show alternate views as well.

Figure 8:
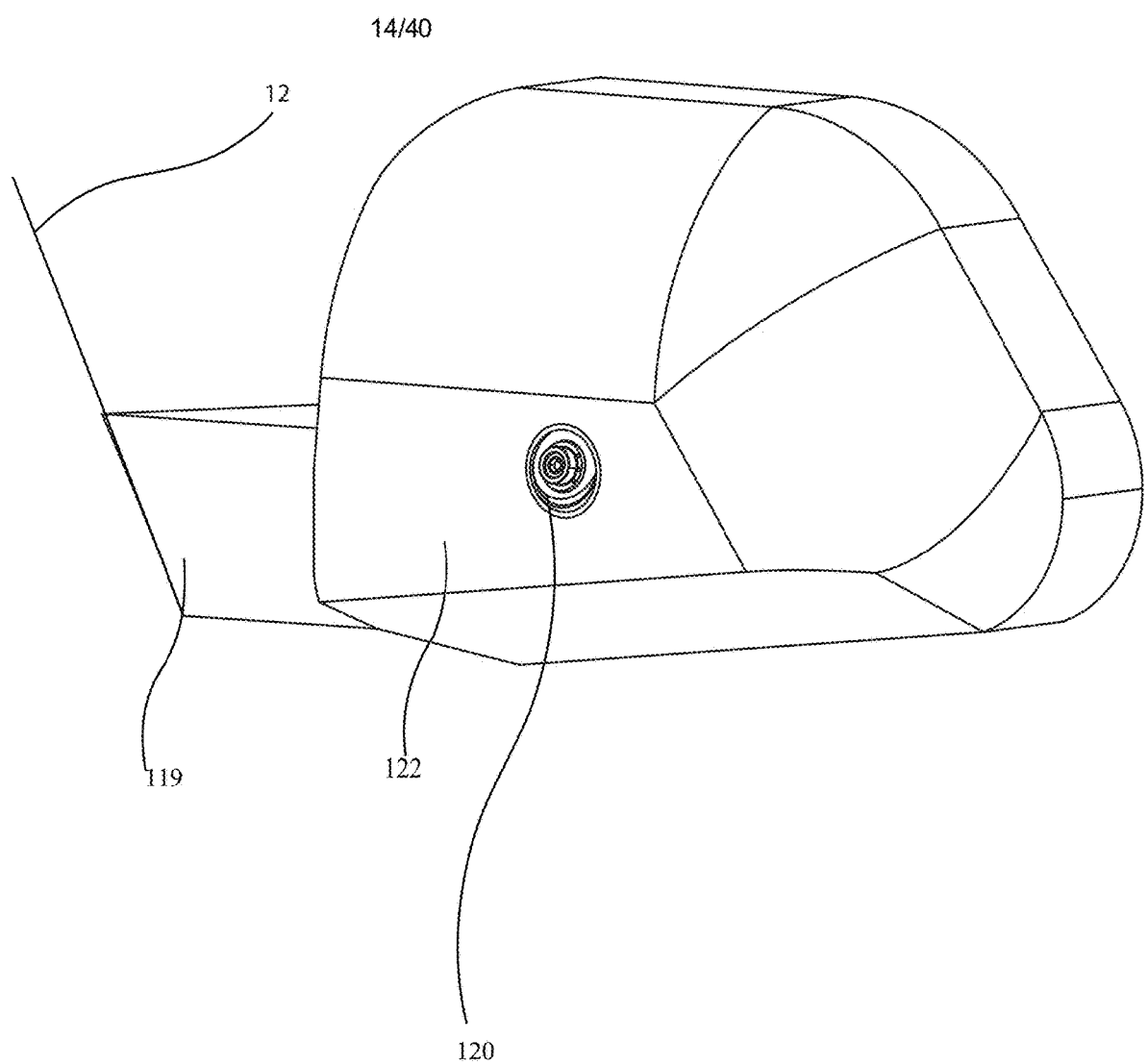
FIG. 8 is a view of a side view mirror with a camera on it.

FIG. 8 is a front view of a side view mirror 122 side view mirror 122 includes a camera 120. A cable such as cable or line 254 (See FIG. 19) can be fed along arm 119 into the body of the automobile 12. The cable can then be coupled into the vehicle's electrical system as well as into the screens such as screens 62, 64, 72, 74,220, or 249.

Figure 9:
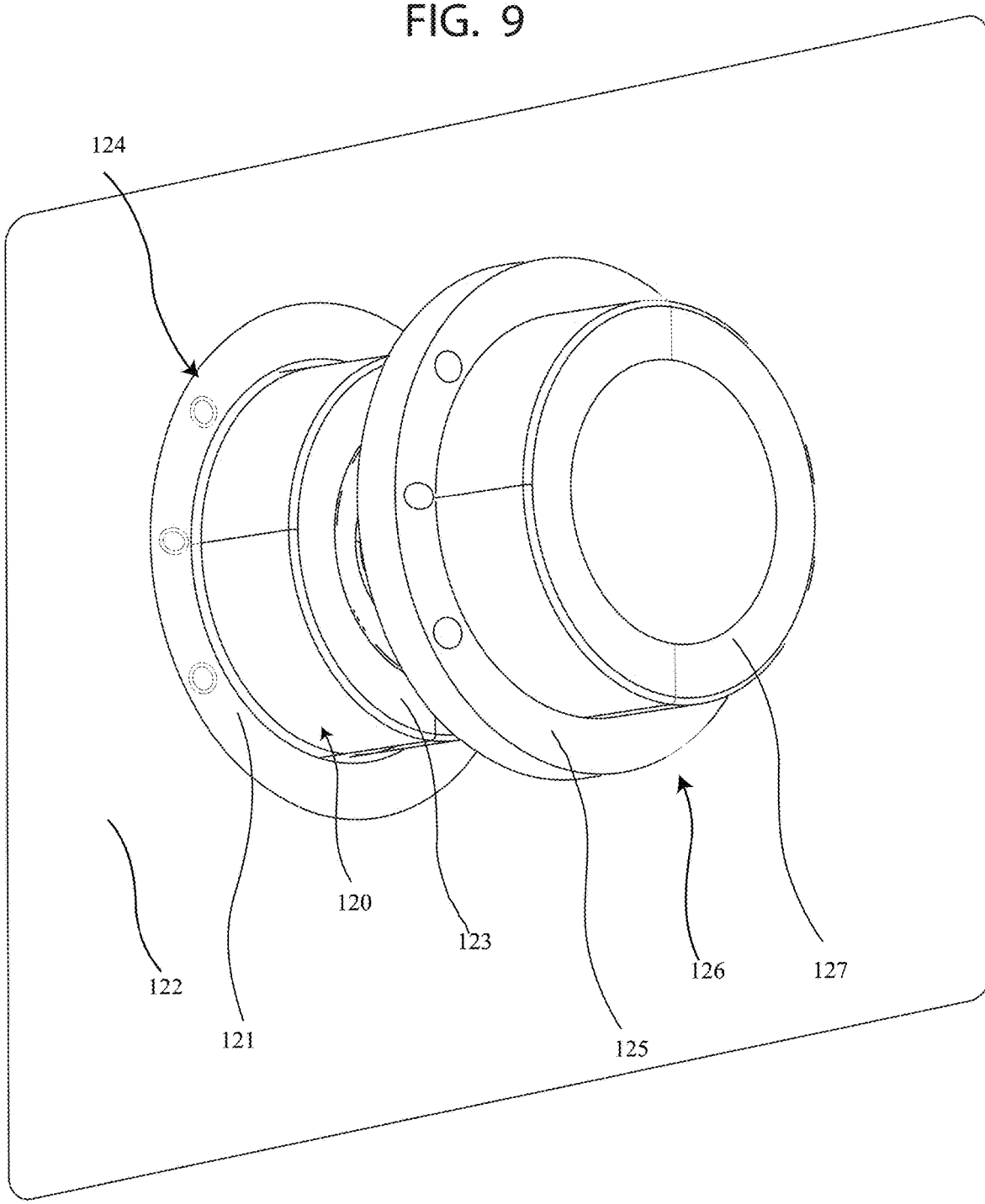
FIG. 9 is a side view of the side view mirror with the camera on it.

FIG. 9 shows a side exploded view of this camera 120. Cameras such as camera 120 can be placed in any region. For example, side view mirror 122 includes a mounting surface which is configured to receive mounting flange 121. This camera 120 can be positioned so that it is adjustable in angle and orientation. Coupled to mounting flange 121 is a lens body 123. A lens cover 126 is configured to cover over lens body 123. Lens cover 126 includes a lens flange 125, and lens cover section 127. Lens cover 126 is configured to cover over the camera, and protect it from the environment.

Figure 10A:
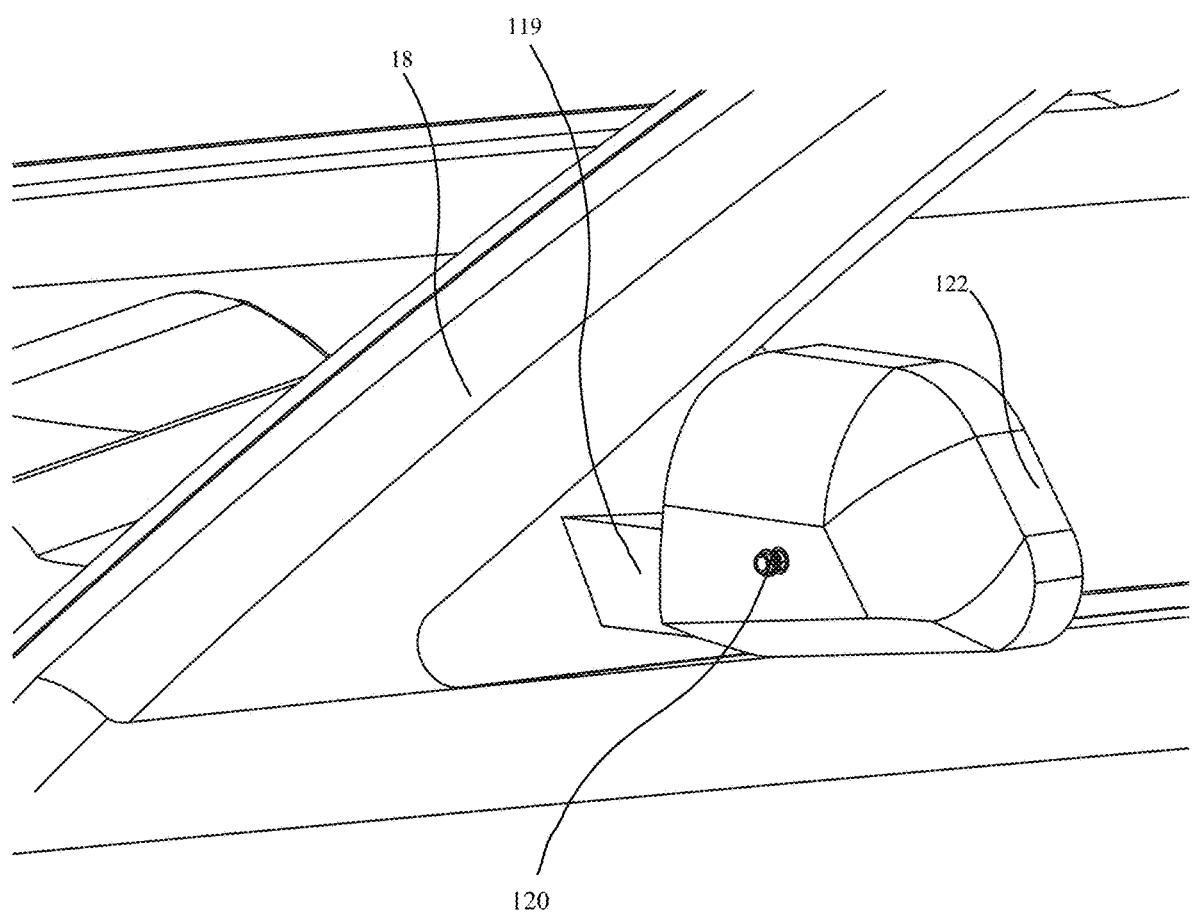
FIG. 10A is a front perspective view of a side view mirror with a camera on it.

FIG. 10A shows an alternate view of the side view mirror. For example, side view mirror 122 includes camera 120, wherein side view mirror 122 is coupled to arm 119, which is coupled to automobile body 18. A cable or line can feed from body 18 through arm 119 to camera 120 from the electrical and communications system of the auto.

Figure 10B:
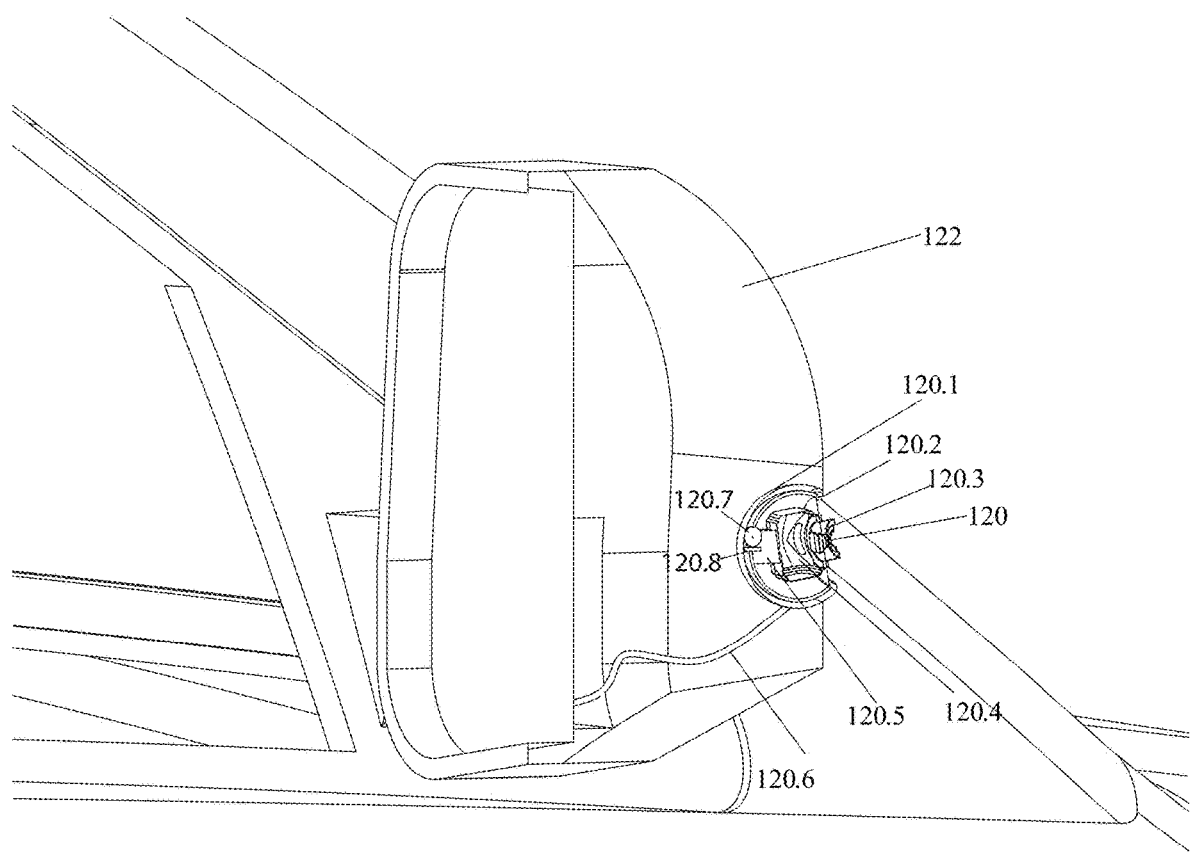
FIG. 10B is a side cross-sectional view of a mirror.

FIG. 10B shows a side cross-sectional view of a camera system for a side view mirror 122. This view shows an inner shell 120.2 disposed inside of an outer shell 120.1. Inner shell 120.2 rotates within outer shell 120.1. There is a camera body 120.4 coupled to a lens section 120.3. A drive motor 120.5 is coupled to the camera body 120.4. Wheels 120.7 and 120.8 are coupled to drive motor 120.5 and are used to selectively drive the angle of vision or attack, i.e. the direction of the camera lens 120.3 to a particular direction. Drive motor 120.5 is driven by cable 120.6. Cable 120.6 is powered by a battery or electrical system within the automobile.

Figure 11:
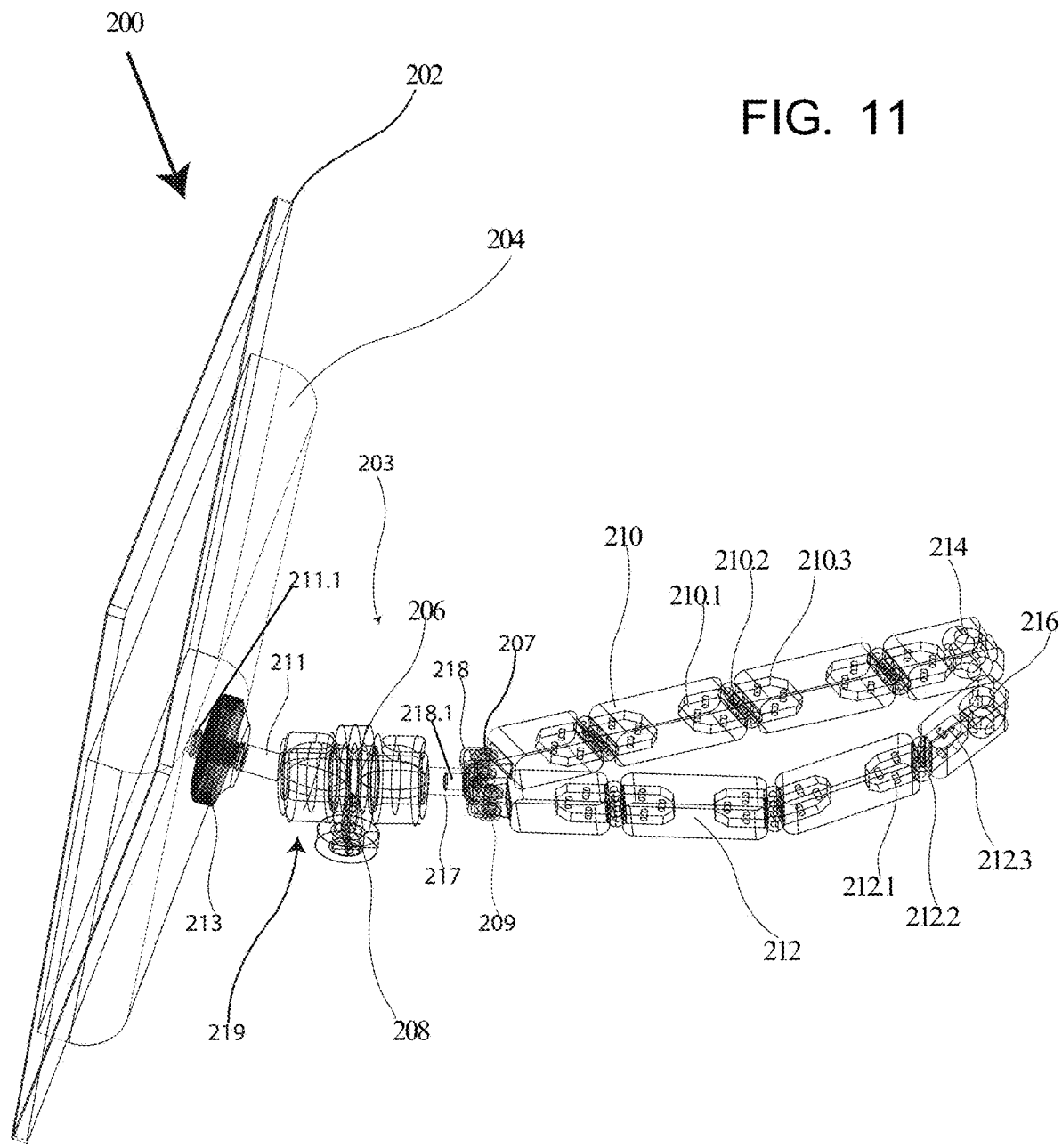
FIG. 11 is a side view of the screen with arms.

FIG. 11 is a side perspective view of a screen system 200. Screen system 200 includes a front screen 202, a screen body 204 coupled to the front screen 202. Coupled to screen body 204 is a bracket such as a support bracket comprising of at least a screw adjuster 213. Screw adjuster 213 is configured to be screwed into the backend of screen body 204. Screen body 204 is configured to hold the electronic components of the screen.

Screw adjuster 213 includes is threaded screw end 211.1. Coupled to screw adjuster 213 is an adjustable mounting arm 203. Adjustable mounting arm 203 includes an adjustable section 219, which includes a clamp body section 206, a clamp arm 208.1, a first end 211, and a second end 217. Second end 217 extends towards arms 210 and 212. Coupled between arms 210 and 212 and second end 217 is rotatable T connection 218. Rotatable T connection 218 includes screws or couplings 207 and 209. Arm, 210 is coupled to rotatable T connection 218 via screws or couplings 207. Arm 212 is coupled to rotatable T connection 218 via screw or coupling 209. Rotatable T connection 218 can be selectively secured via a screw such the T clamp screw 218.1. This screen system can be used in place of any of the screen systems mentioned herein such that these arms can wrap around supports 14.1 or 14.2 or 15.1 or 15.1. The screen can then be selectively coupled to a camera such as any one of the cameras mentioned herein such as cameras 22, 24, 26, 32, 34, 36, 52, 54, 56, 100,120, 250, 390, 580.

Arm 210 includes a plurality of different sections, wherein each section is coupled together via a hinge. For example, there are hinge flanges 210.1 and 210.3 coupled to each other via an intermediate hinge section 210.2. These hinges allow for a flexible rotatable multidimensional arm which can then be wrapped around a column, a post or any other body support section of an automobile. In addition, arm 212 includes hinge connectors 212.1, and 212.3, which comprise flanges, and a hinge section 212.2. Positioned at the end of arm 212 are openings 216. In addition, position at the end of arm 210 is opening 214. Openings 216 and 214 are configured to be wrapped around and coupled to a post or body section of a moving vehicle such as an airplane a boat, a motor vehicle or any other device. These openings allow the screws to be screwed into a column or body of an automobile.

Figure 12:
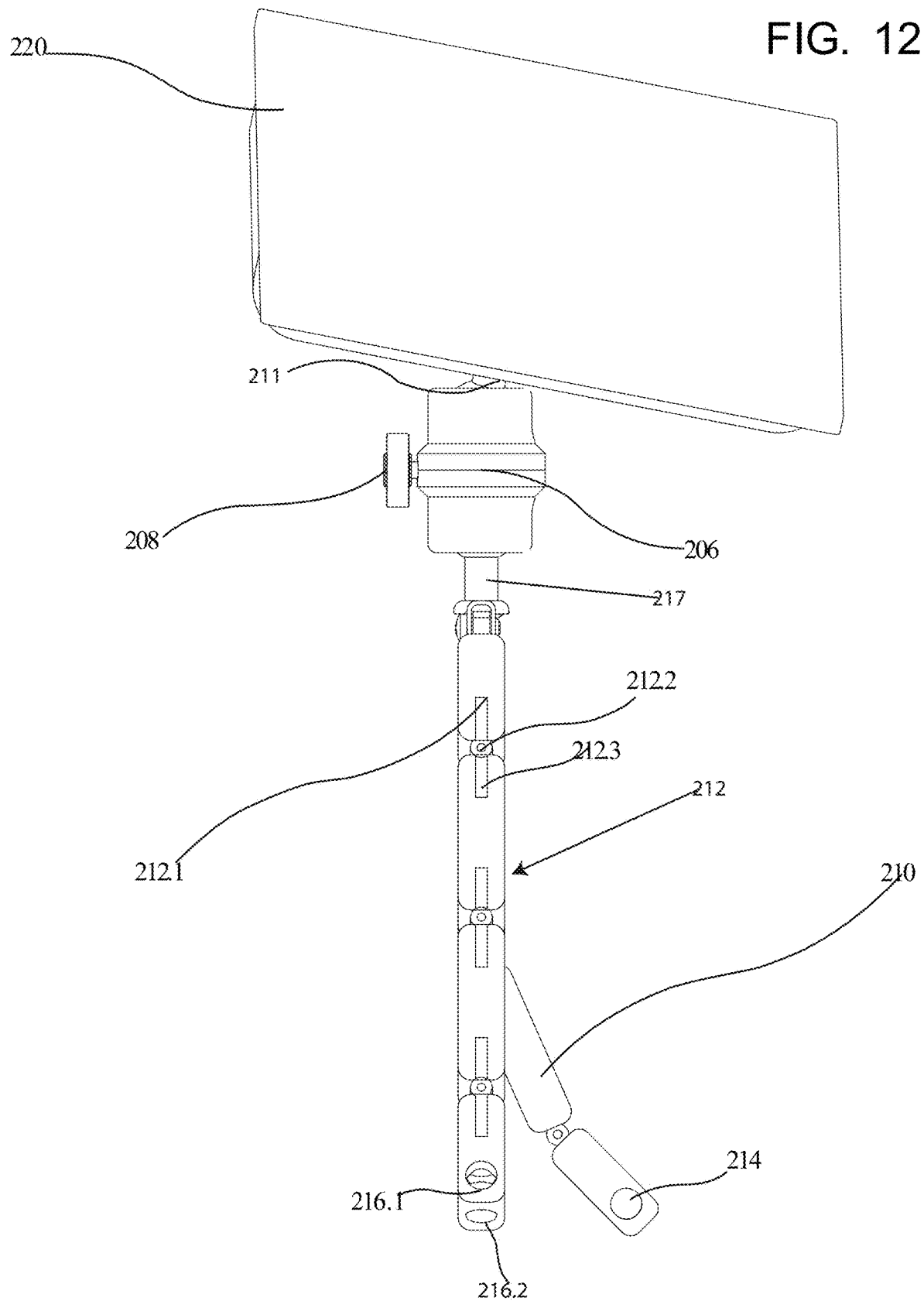
FIG. 12 is a front perspective view of the screen of FIG. 11.

FIG. 12 shows the upright view of this device showing a front view of screen 200 as well as openings 216.1 and 216.2 which are configured to receive a fastener. In addition, opening 214 can be inserted between openings 216.1 and 216.2 to tie the ends together.

Figure 13:
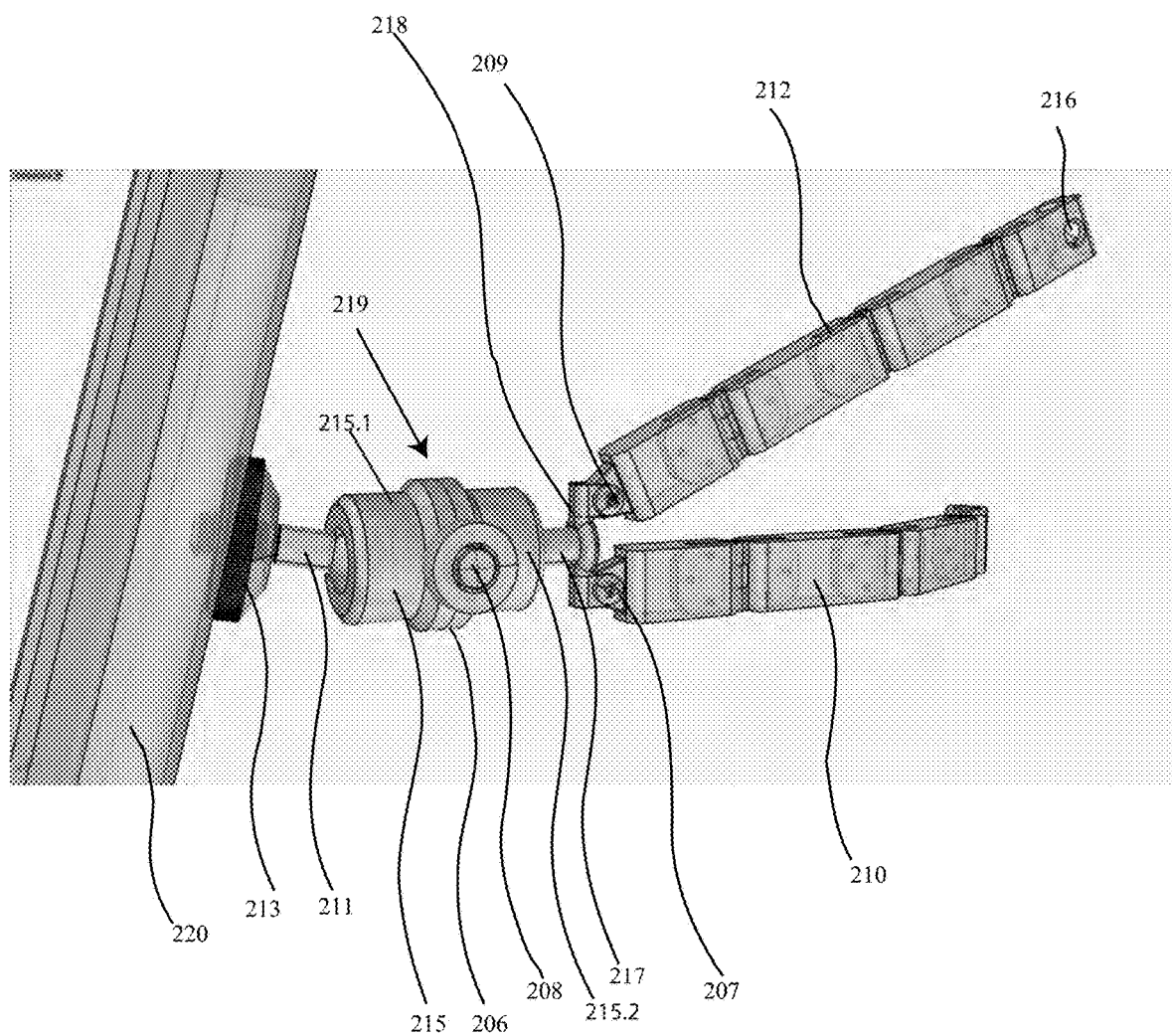
FIG. 13 is a side view of the screen of FIG. 11.

FIG. 13 shows the adjustable section 219. Adjustable section 219 includes a body 215 which includes a first body part 215.1 and second body part 215.2. In addition, there is also a clamp body section 206 and clamp arm 208.

Figure 14:
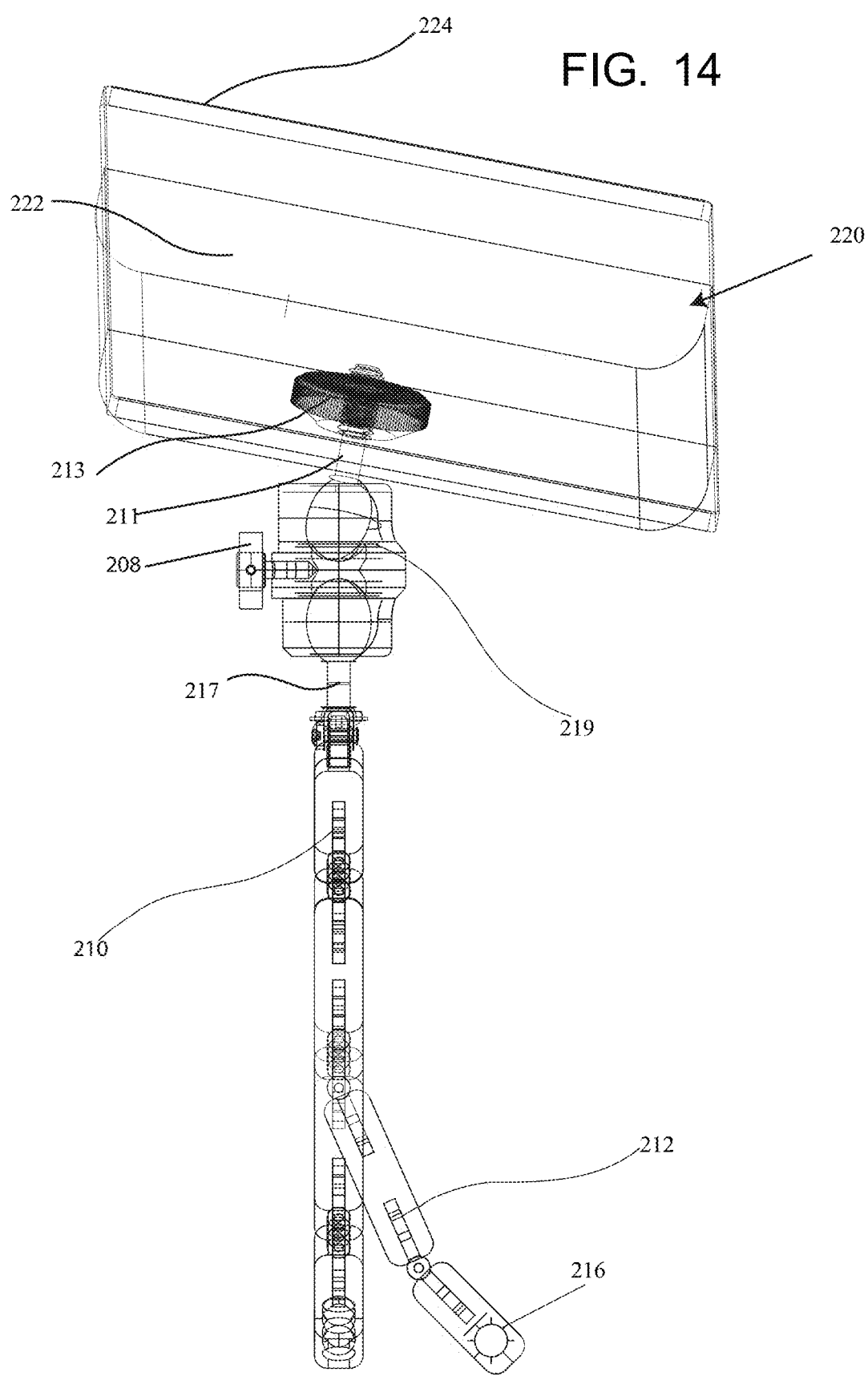
FIG. 14 is a back view of the screen of FIG. 11.
Figure 15:
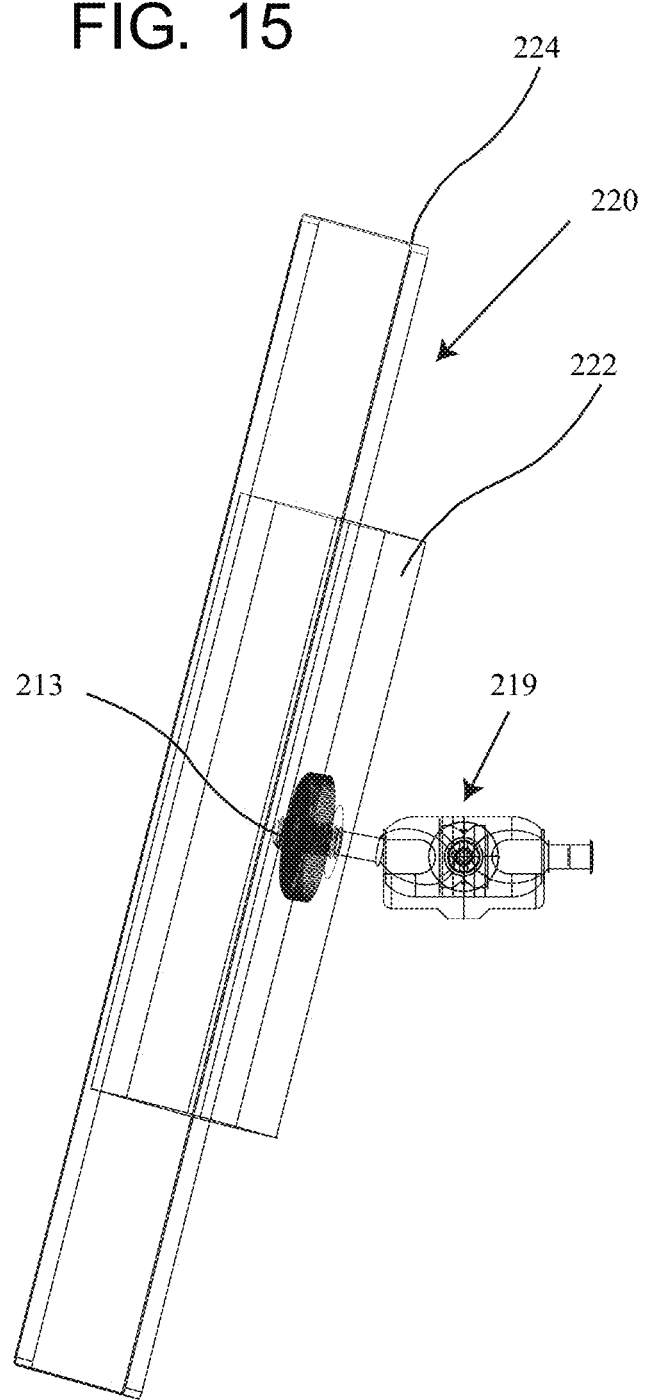
FIG. 15 is a side view of a portion of the device of FIG. 11.
Figure 16A:
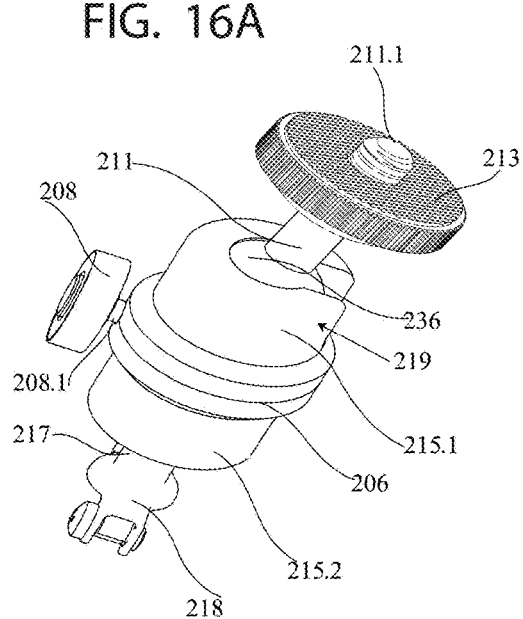
FIG. 16A is a side view of the adjustable connection of FIG. 15.
Figure 16B:
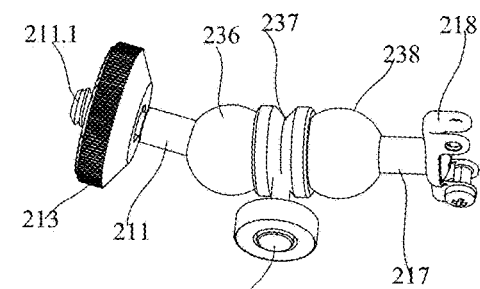
FIG. 16B is a side perspective view of a portion of the adjustable connection of FIG. 15.
Figure 16C:
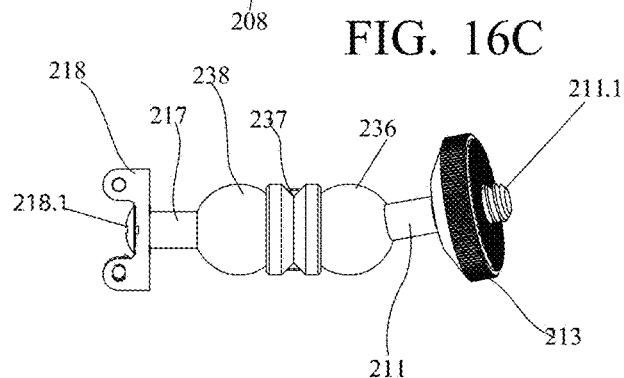
FIG. 16C is a side view of a portion of the adjustable connection of FIG. 15.
Figure 16D:
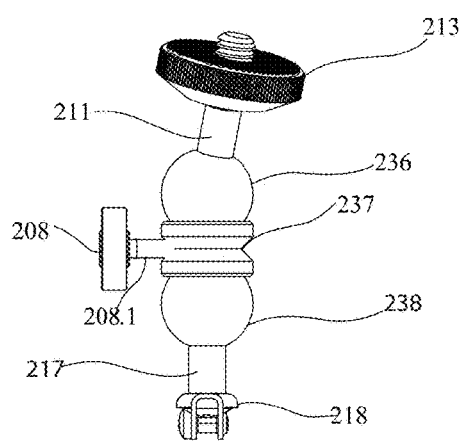
FIG. 16D is a side view of the adjustable connector of FIG. 16A.
Figure 16F:
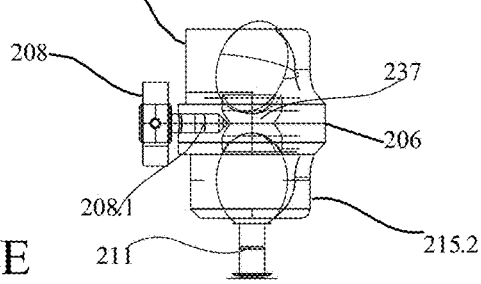
FIG. 16F shows a side see-thru view of the embodiment shown in FIG. 16A.
Figure 16E:
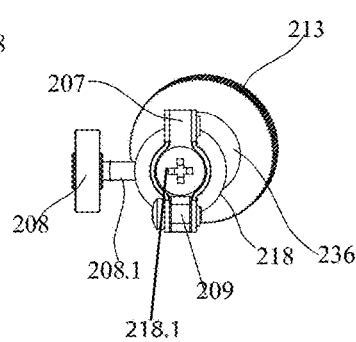
FIG. 16E shows an end view of the adjustable connector of FIG. 16A.

FIG. 14 shows a side transparent view of this adjustable section 219. FIG. 15 also shows the side transparent view as well.

FIGS. 16A-16F show adjustable body section 219, which includes clamp 208, and clamp arm 208.1. When clamp 208 is rotated in a predetermined manner it drives clamp arm 208.1 into clamp body section 206. FIGS. 16B through 16E show different views of adjustable section 219 with first body part 215.1 and second body part 215.2 removed. As shown in these views, there are a plurality of ball joints 236, and 238, positioned within a clamp seat 237. As clamp arm 208.1 is driven into clamp seat, 237, it exerts pressure on ball joints 238, and or 236 which one position within first body part 215.1, and second body part 215.2, respectively. This clamps the ball joint in a fixed position. Essentially, because there are two ball joints which are movable within the ball seat 237 creating a multidimensional, easily adjustable device which allows for positioning of the screen to almost any angle and in nearly any position. This omnidirectional double ball joint system is similar to that shown in FIG. 3B.

Figure 17:
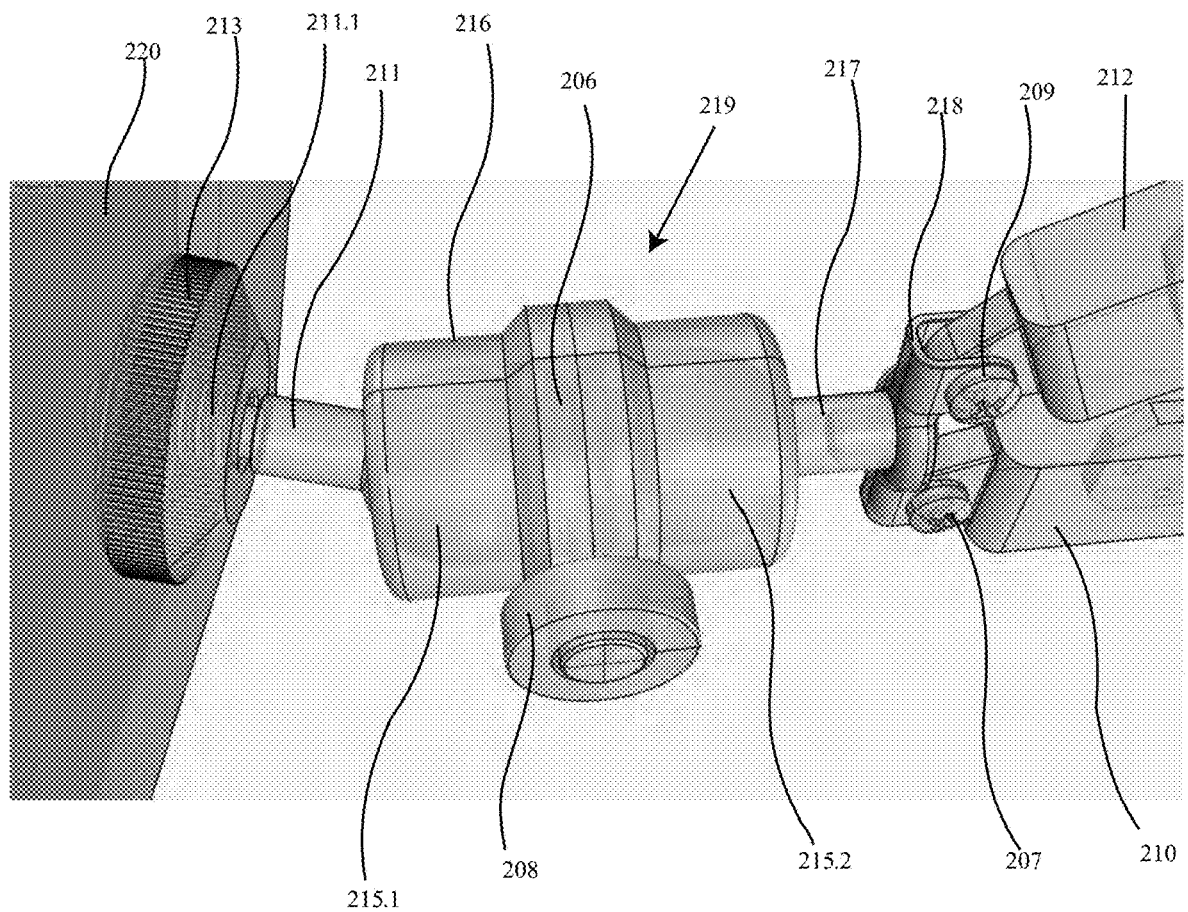
FIG. 17 shows a side view of the adjustable connector in a see-thru view.
Figure 18A:
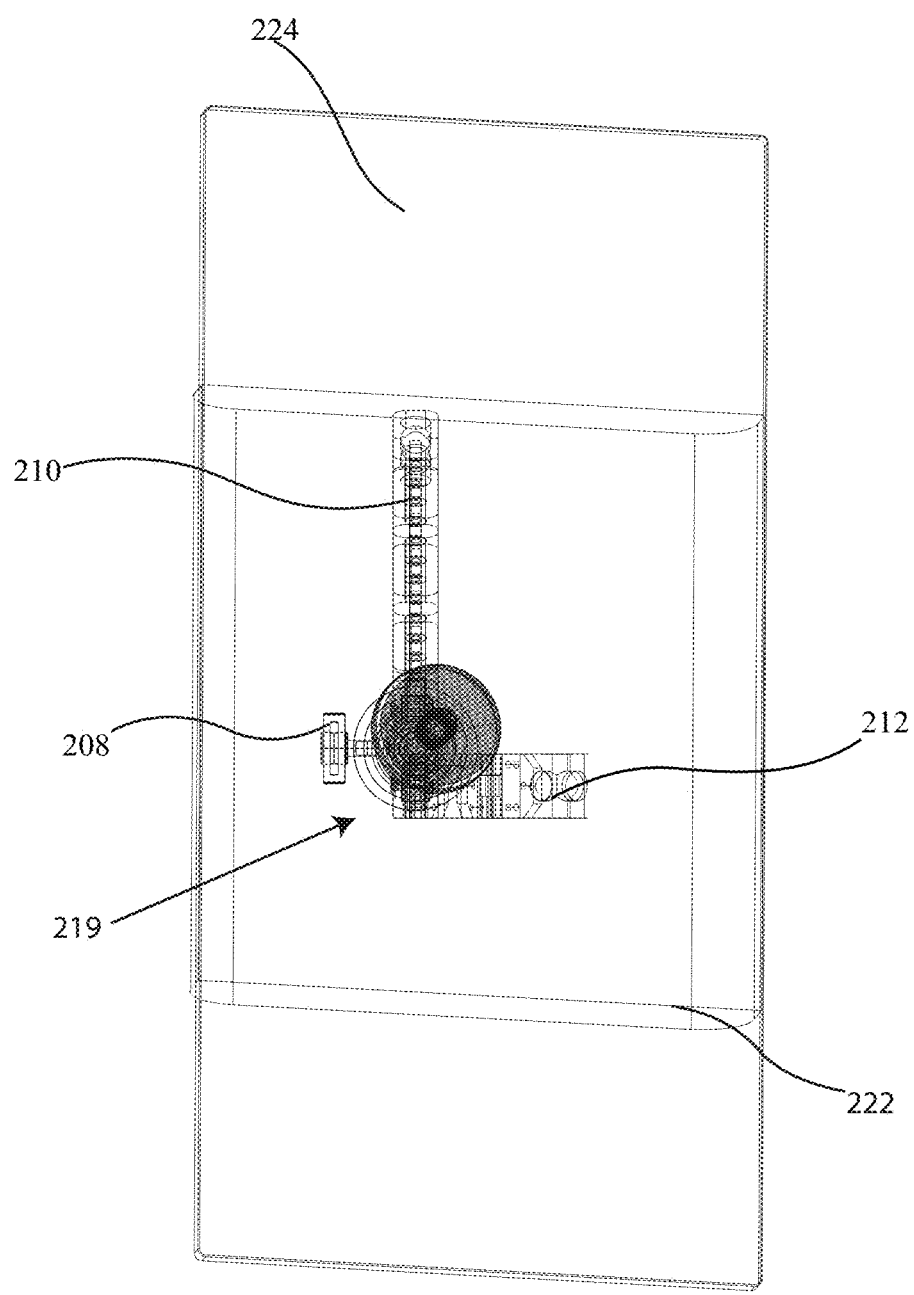
FIG. 18A is a back view of the screen.

FIG. 17 also shows a view of this adjustable section 219 in a substantially transparent view. This view shows arms 210 and 212 coupled to T connection 218. FIG. 18A discloses arms 210 and 212 which are coupled to adjustable section 219, in which are selectively fixed in place via clamp 208. In addition, as shown in this view, there is also screen body 222, and screen display 224. This view, of course, is as a back view of screen display 224.

Figure 18B:
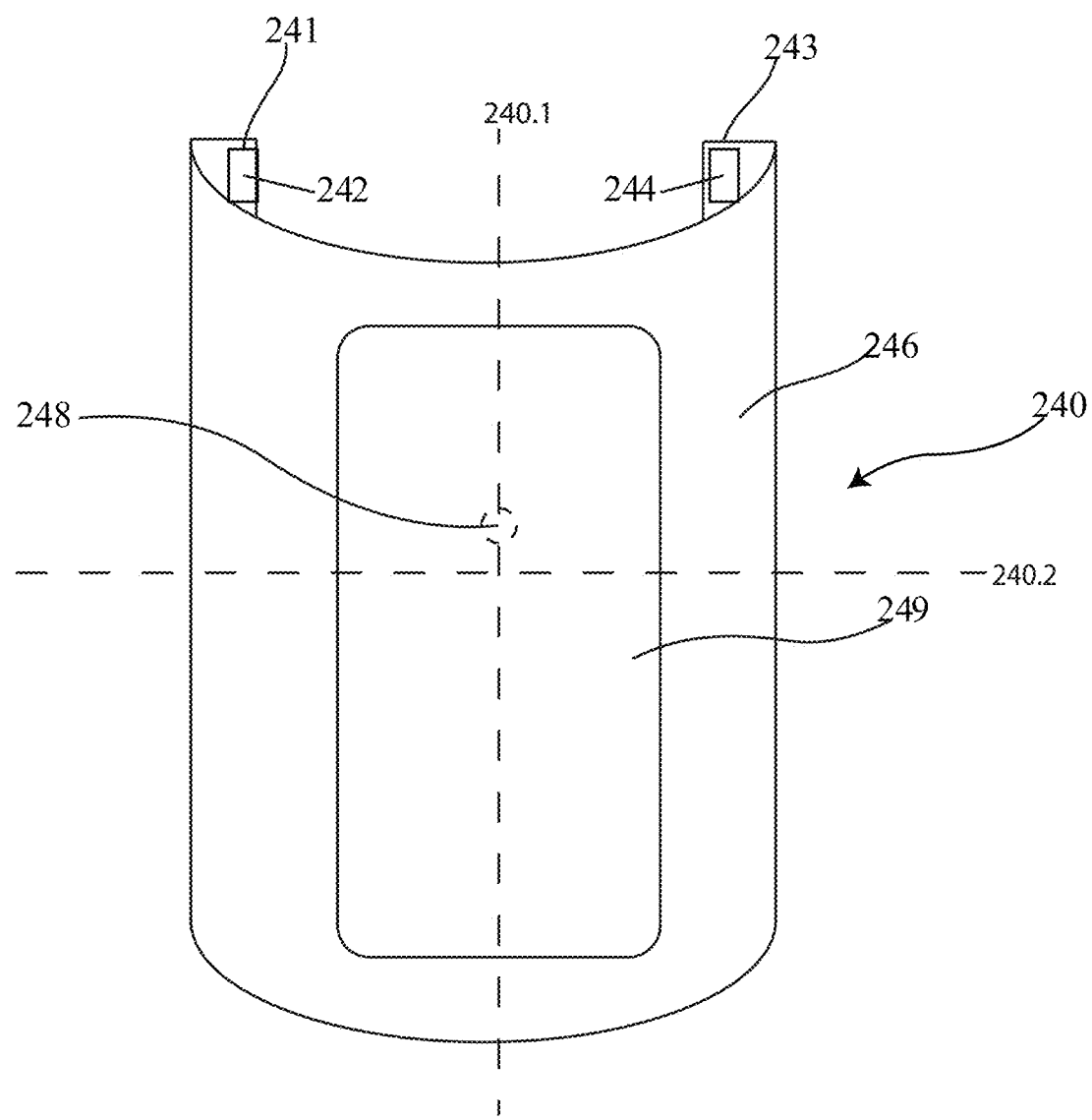
FIG. 18B is a front view of the cuff type connection of a screen.

FIG. 18B is a view of a frame type attachment for a screen. This cuff type attachment includes a body section 246 which is formed from any suitable material such as metal or plastic. The body can be made so that it is at least partially or substantially flexible so that it can be expanded and then selectively snap around a semi-circular or circular column such as a support or frame in a car or plane cockpit such as supports 14.1, 14.2, 15.1 or 15.2. The body section 246 is coupled to flanges 242 and 244 which have attachment elements 242 and 244. Attachment elements or flanges 242 and 244 comprise at least one of the following: screws, fasteners, hook and loop fastener, clips, etc. Screen 249 is coupled to body section 246. In addition, a camera 248 is disposed on an opposite side of screen 249. This body section 246 is bisected via a first axis 240.1 which comprises a longitudinal axis. Longitudinal axis 240.1 bisects this body section such that screen 249 is positioned in a substantially central region. In addition, this body section is substantially C-shaped or rounded so that it can fit around vertical columns or posts. Axis 240.2 is a latitudinal axis and bisects body section 246 as well. In at least one embodiment, the extension of body section 246 is longer than the extension along the latitudinal axis. Screen 249 can be used in place of any of the other screens mentioned herein and in combination with any of the other cameras mentioned herein. When the body section 246 which is made from flexible material snaps around a column or post the flanges 241, and 243 hold the body section in place.

Figure 19:
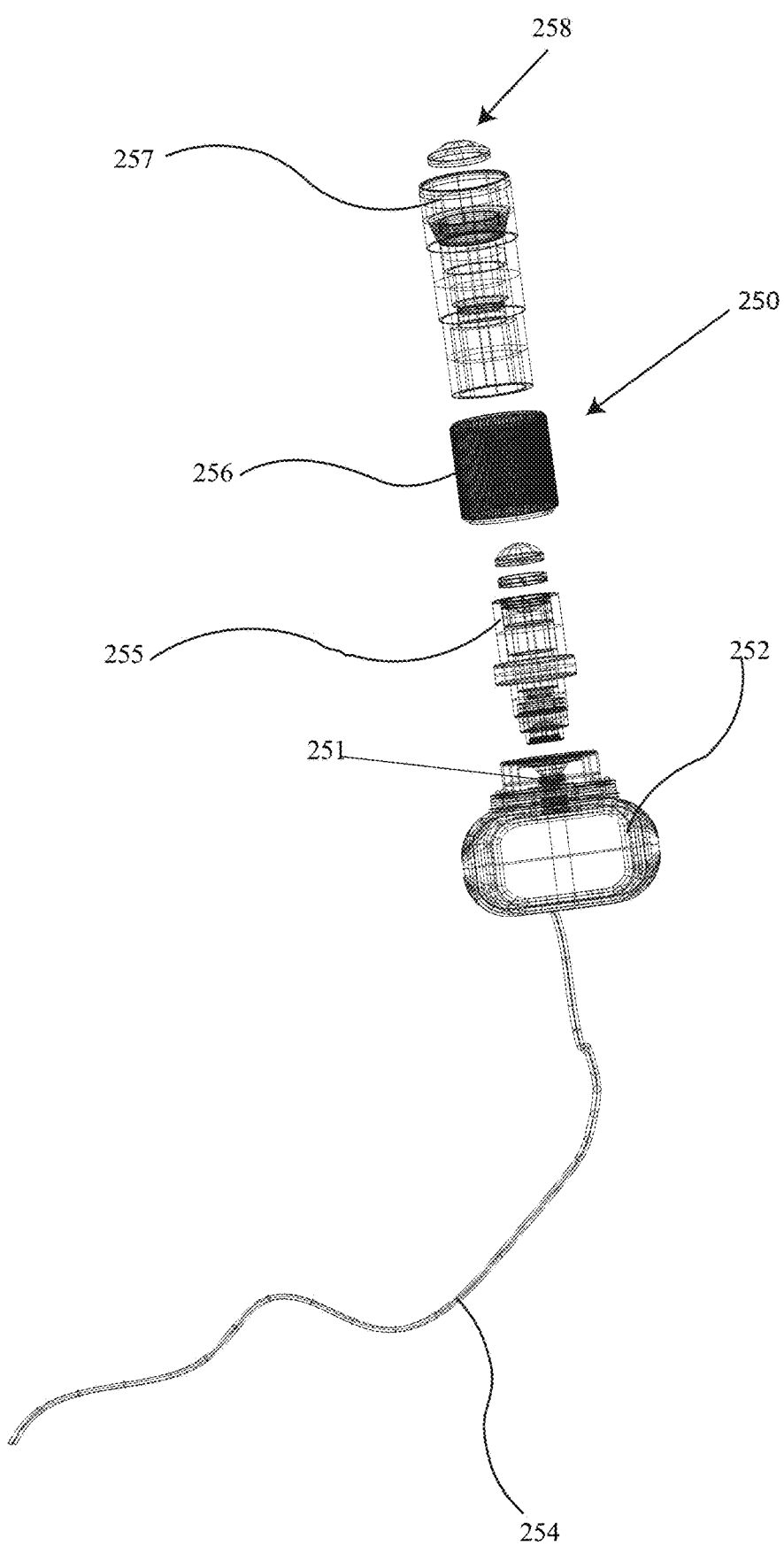
FIG. 19 is a side exploded view of a camera for use with a motor vehicle and with the screens described below.

FIG. 19 is an exploded view of a camera system 250. Camera system 250 can be coupled selectively to screen display 220. For example, in this view, there is a lens front 258, which is coupled to a second lens section 257 second lens section 257 is coupled to focal adjuster 256. Focal adjuster 256 is configured to be rotated to selectively focus the camera. In addition, there is also a first lens section 255. First lens section 255, sits in lens seat, 251. Lens seat 251 is coupled to camera body 252. Coupled to a backend of camera body is cable 254. In short, this camera system 250 includes multileveled lens sections 255 and 257. In addition, with focal adjuster 256 the camera can be focused selectively in a number of different ways. This camera can be positioned inside of the car on the rearview mirror or outside the car on the supports or on the side view mirror. Cable 254 can extend through the arm of a side view mirror. As indicated above to connect into the system components of an automobile and also to a screen such as screen 220.

Figure 20:
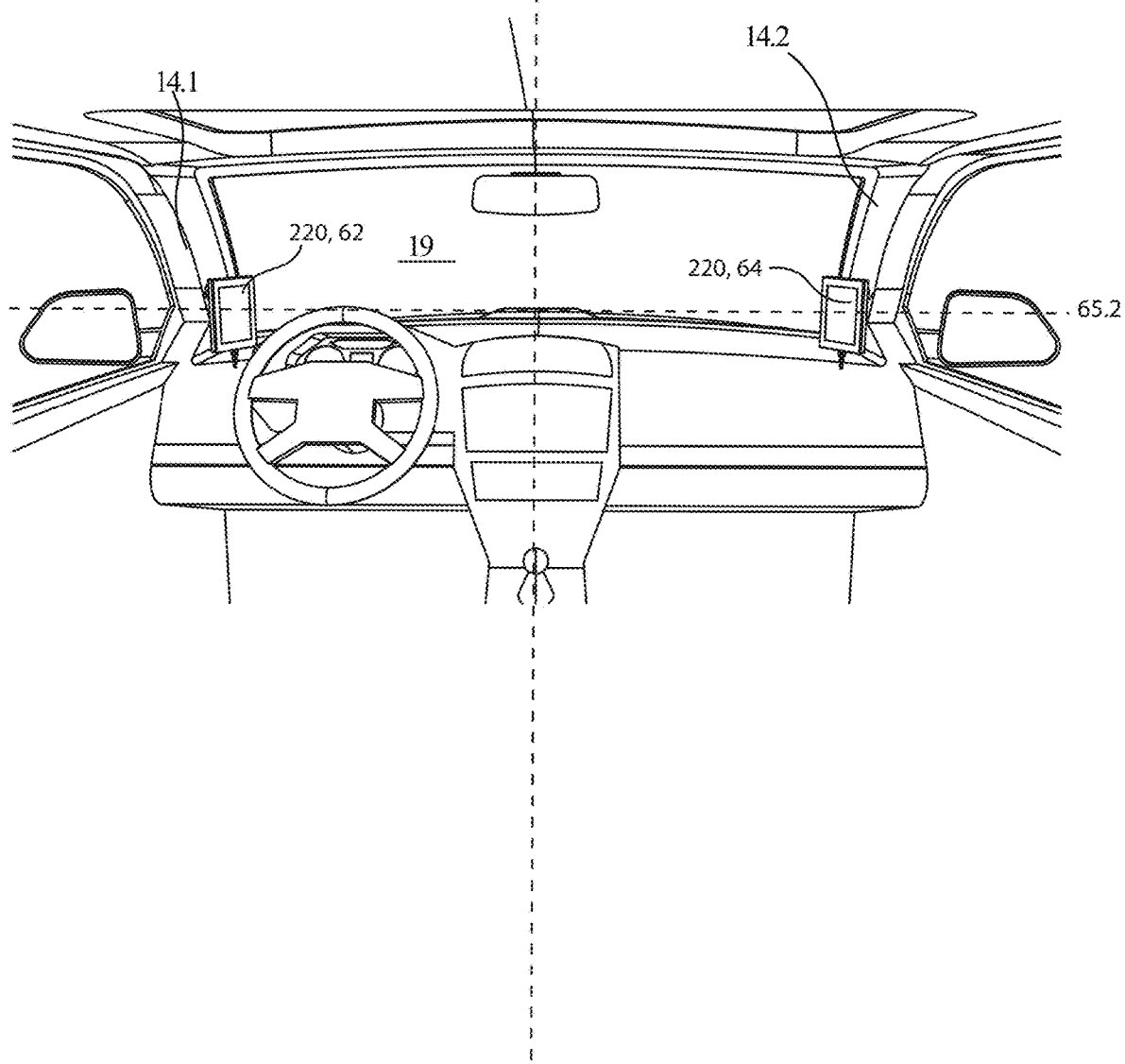
FIG. 20 is a view of an interior of an automobile having the screens installed.

FIG. 20 shows the inside of an automobile. For example, there are columns 14.1 and 14.2. Positioned along columns 14.1, 14.2 are screens 220. Screens 220 or screen 62 or 64 can be coupled to camera system 250. Alternatively, the screens can be coupled to camera 120 shown in FIG. 8.

Figure 21:
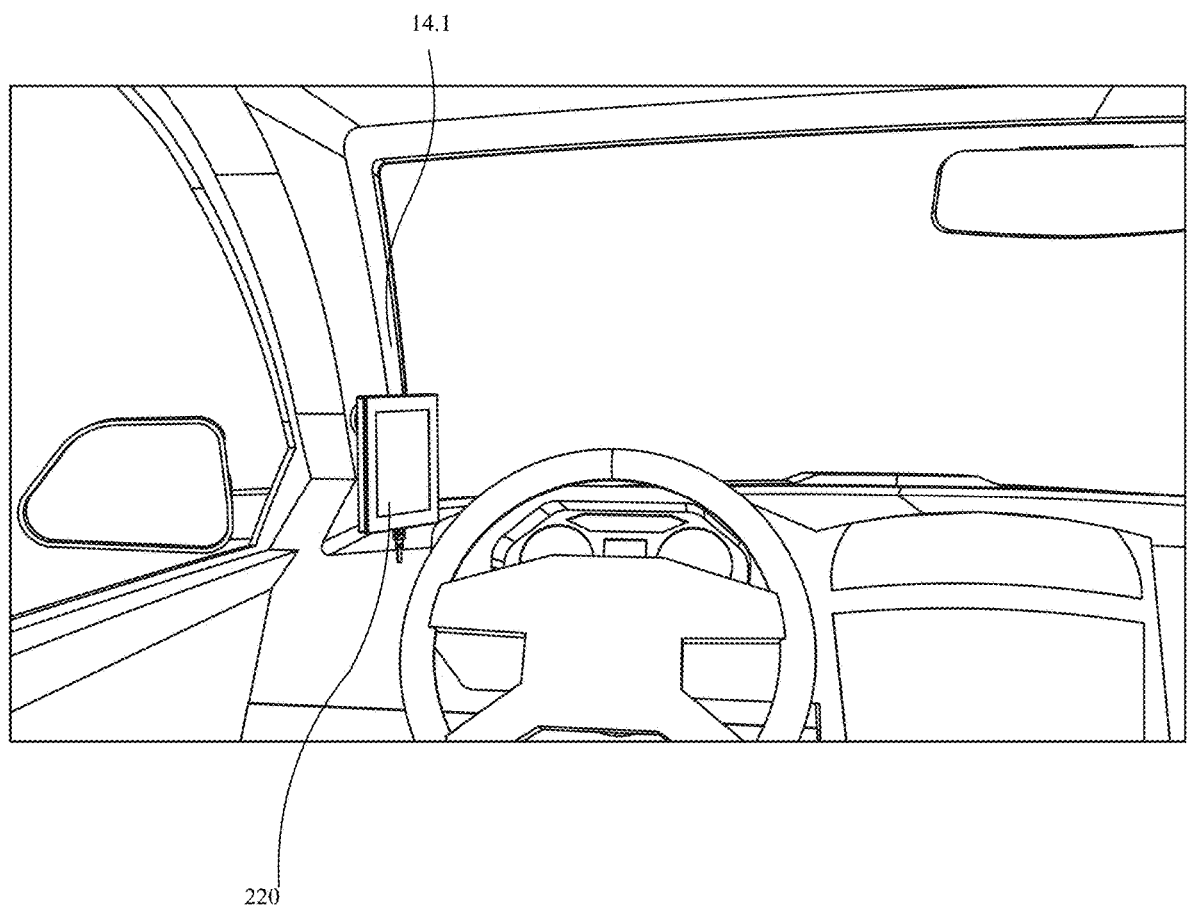
FIG. 21 is an inside view of an auto having the screens installed inside.

FIG. 21 shows the inside of an automobile which shows screen 220 positioned inside of column 14.1.

Figure 22:
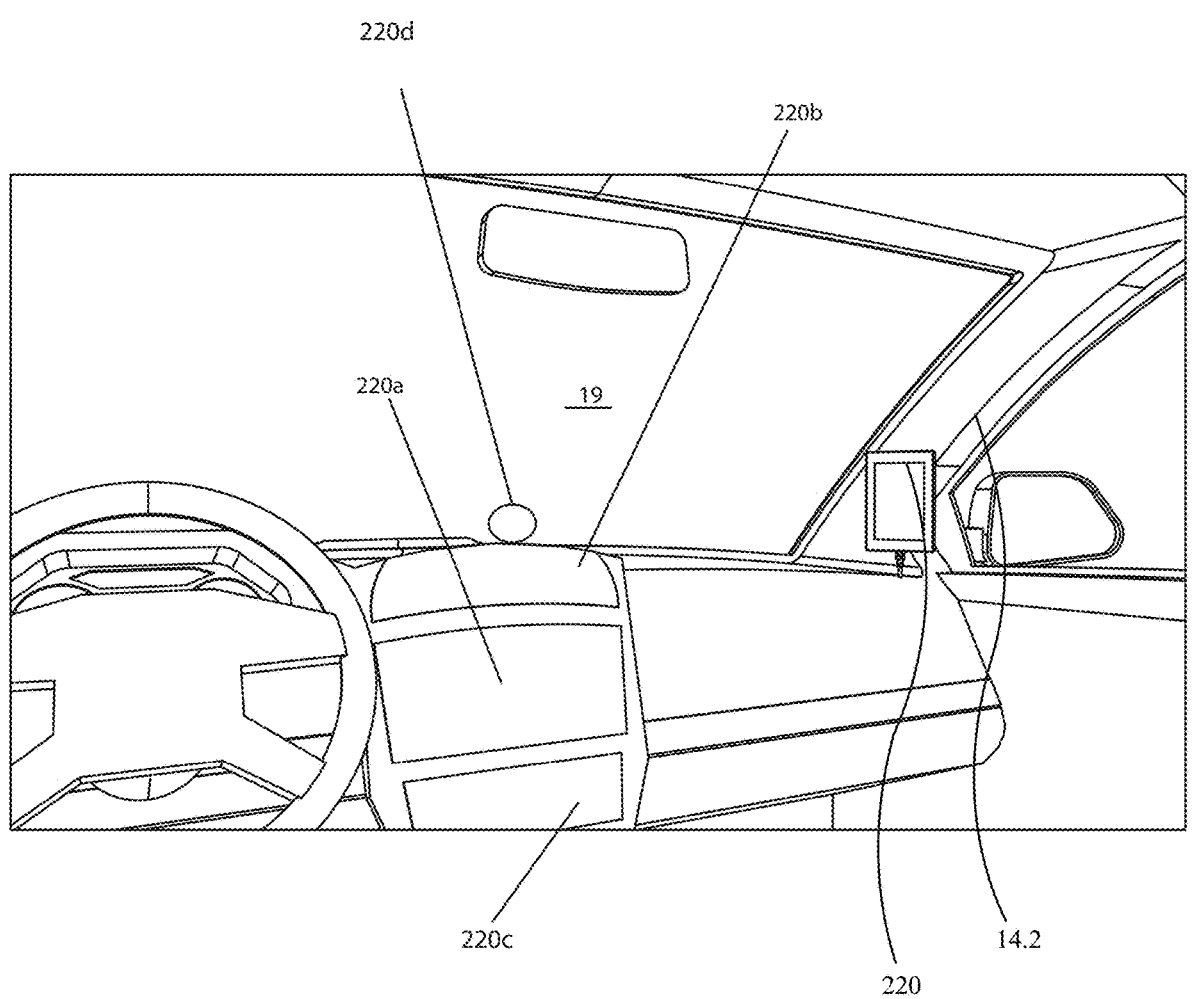
FIG. 22 is another view of an interior of an auto with the screens installed inside.

FIG. 22 shows screen 220 positioned along column 14.2. FIG. 22 also shows a screen 220a which can be used to display one of the fields of the cameras as well. Other screens 220b or 220c can also be used. Alternatively, a projector 220d can sit on the dashboard and project an image of the view of the camera onto the windshield 19 as well.

Figure 23A:
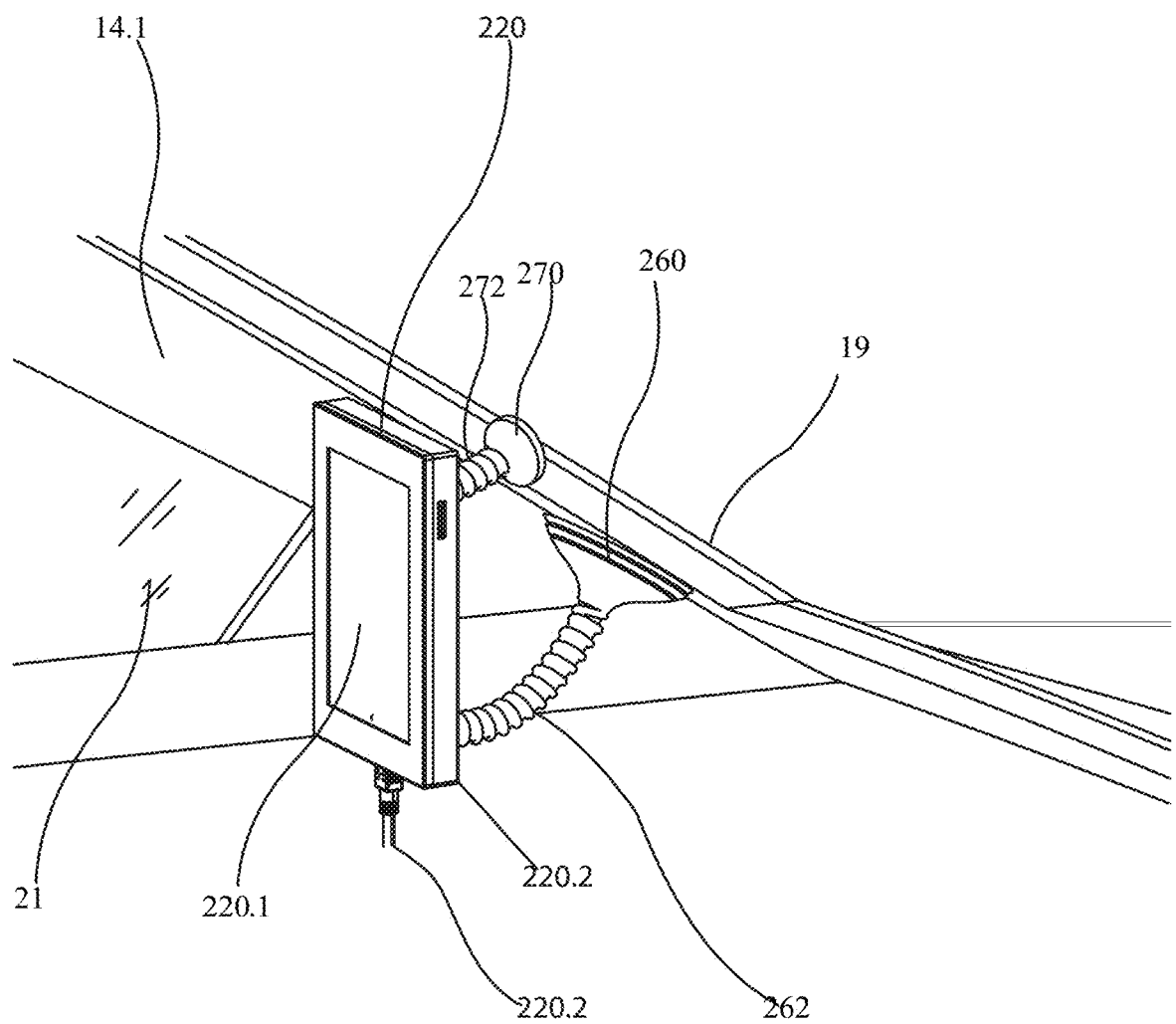
FIG. 23A is a side interior view of another embodiment.

FIG. 23A shows an inside view of another embodiment. In this view there is a screen or screen unit 220, which has a screen face 220.1. Coupled to the screen face is an arm 272 and a camera head 270. Inside of the camera head 270 is a camera which is electronically coupled to screen unit 220. In addition, coupled to the screen unit body 220.2 is an anchor 260 which is configured to anchor the screen to an auto such as to a windshield 19. Anchor 260 comprises a suction head which can be adhered to windshield 19 via a suction force.

Arm 262 as well as arm 272 are both bendable and adjustable in an accordion-like manner by using sufficient force but are otherwise substantially rigid.

Figure 23B:
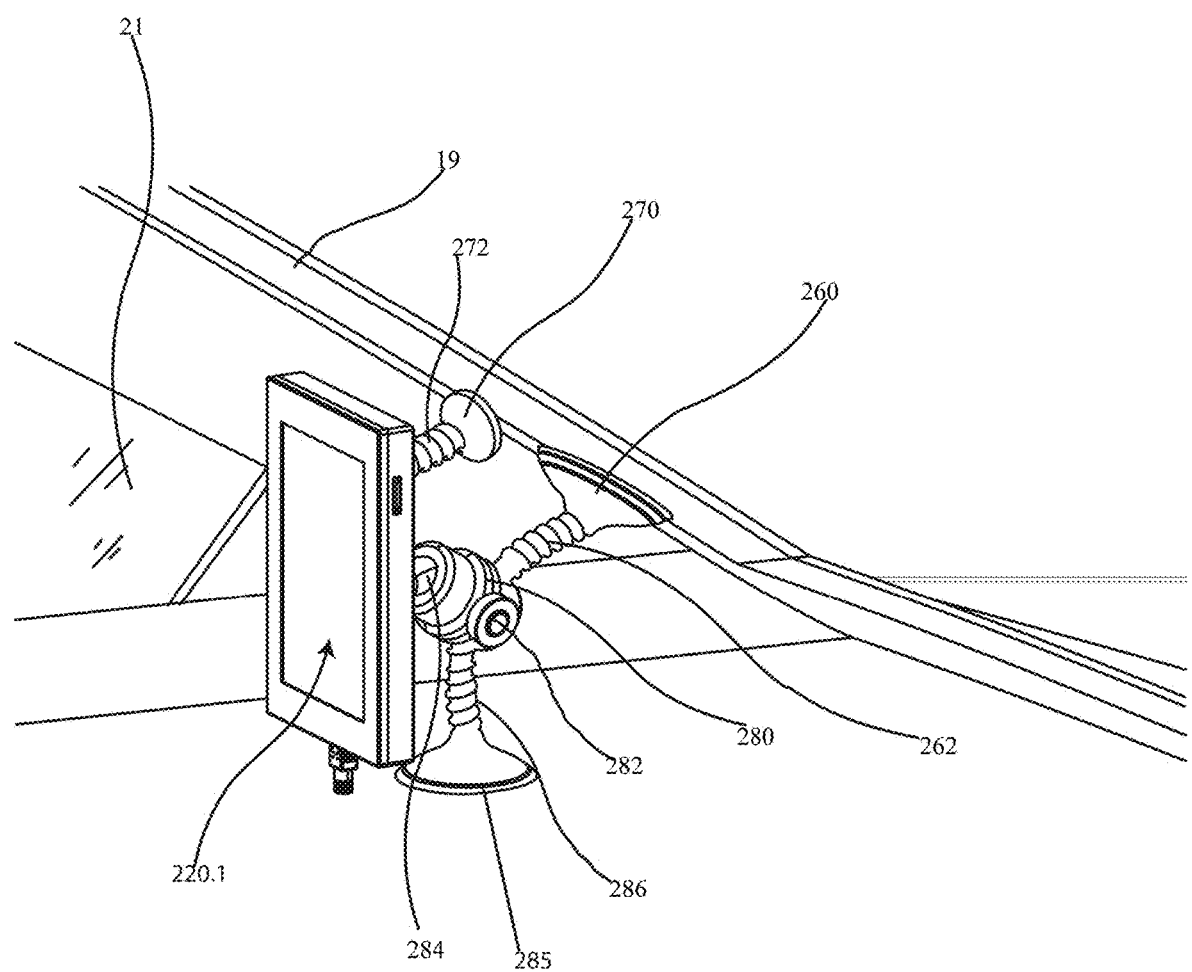
FIG. 23B is a side interior view of another embodiment.

FIG. 23B is an inside view of another embodiment which also discloses the anchor 260, the arm 262, the camera head 270, and the camera arm 272. However, in this embodiment there is an adjustment body 280 which includes a ball joint 284 disposed inside of the body 280. There is also a lock 282 which can comprise a screw lock which when loosened allows for the ball in the ball joint 284 to move and to be adjusted. When the lock 282 is tightened it locks the ball in the ball joint in place.

Figure 23C:
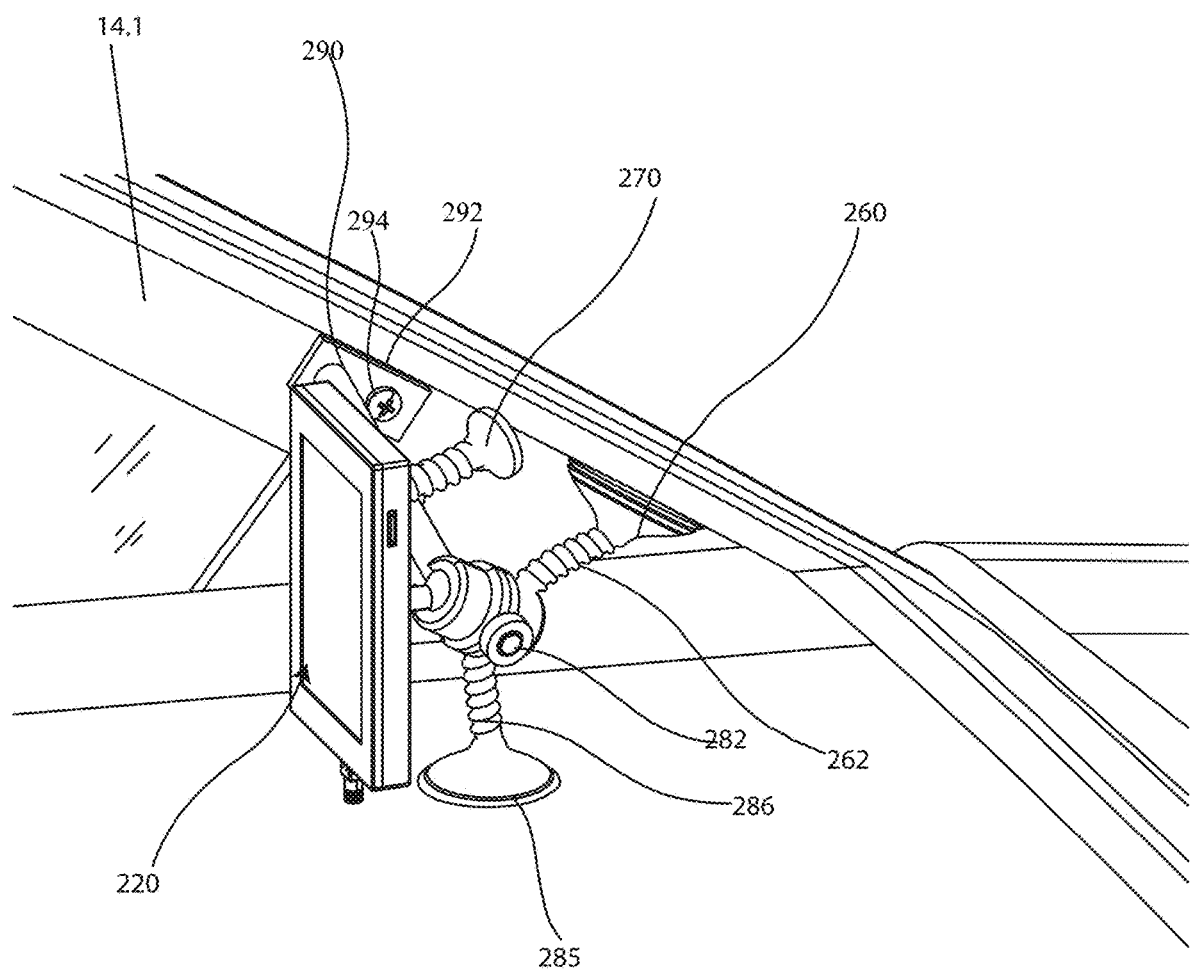
FIG. 23C is a side interior view of another embodiment.

FIG. 23C shows another embodiment which includes the features of FIG. 23B but also includes the following additional features, a post 290 and a mounting plate 292. Mounting plate 292 is configured to be mounted to a support such as support 14.1.

Figure 23D:
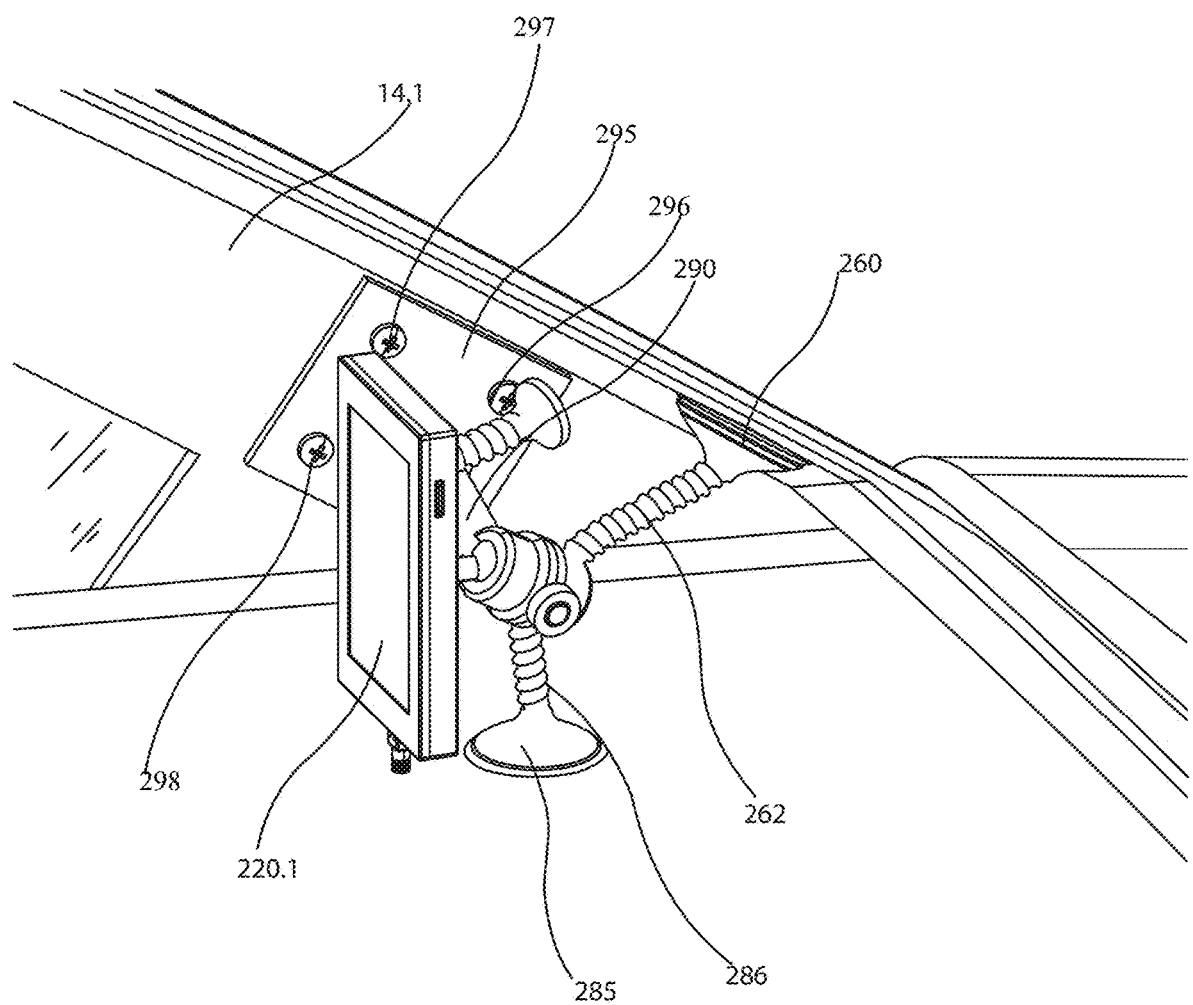
FIG. 23D is a side interior view of another embodiment.

FIG. 23D shows another embodiment which shows a mounting plate 295 which is different than mounting plate 292 in that mounting plate 295 is configured to have multiple screws such as four screws. In this view there are three screws 296, 297, and 298 shown. The mounting plate such as mounting plate 292 or 295 are configured to semi-permanently mount the screen to a car.

Anchors 285 and 260 are configured to also mount the screen and the camera to the car but in a non-destructive manner. In the embodiment shown in FIG. 23A there is only one mounting point via anchor 260. In the embodiment shown in FIG. 23B there are two mounting points shown by anchors 260 and 280. These two mounting points allow for a compressive fit for the screen mounting system between the windshield 19 and the dashboard. The embodiments 23C and 23D allow for three mounting points allowing for the compression coming from three different angles and allowing further security in mounting the screen. Thus, with these embodiments, the screen can be mounted to a car or auto in a safe and reliable manner.

Figure 24A:
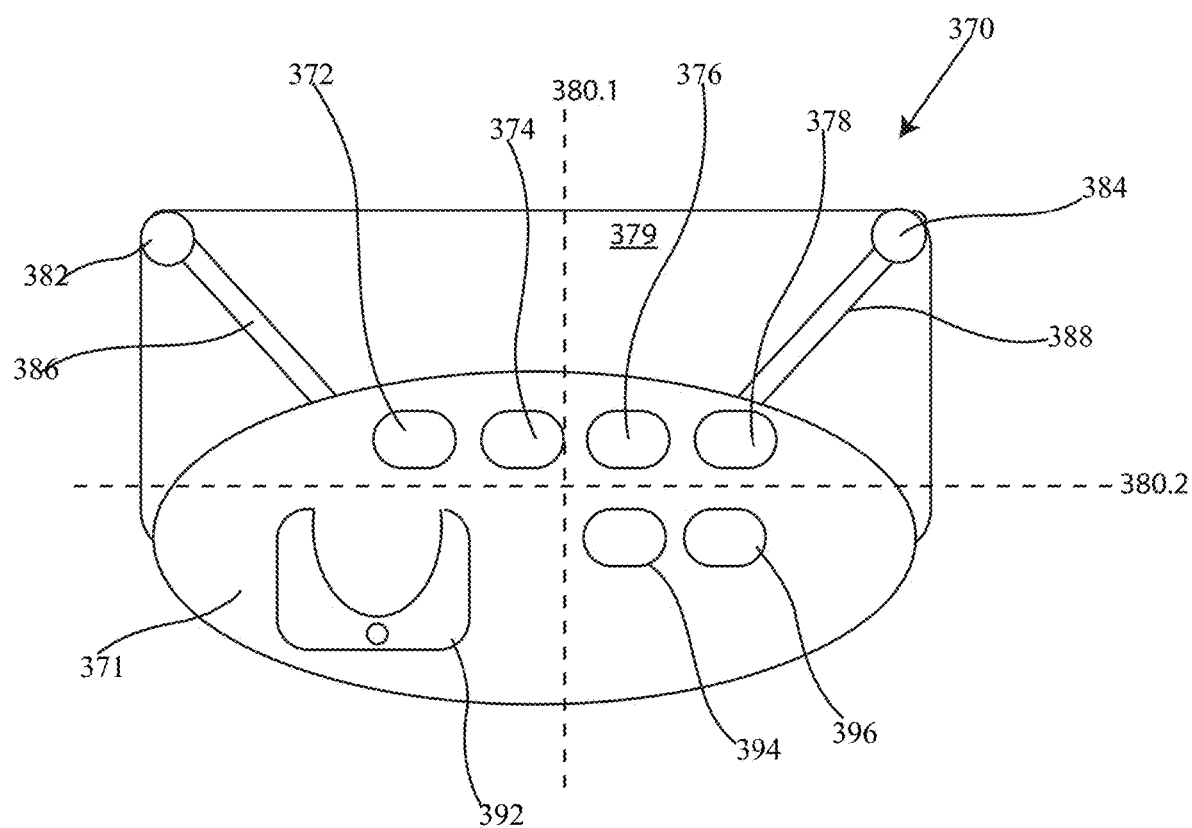
FIG. 24A is a view of a cockpit of an airplane or boat.

FIG. 24A is a view of a cockpit for a boat or a plane. In this view the cockpit design 370 includes a windshield 379, as well as screens or displays 382 and 384 mounted on supports 386 and 388 respectively. In addition, there is a front panel of a cockpit dashboard which has a steering wheel as well as a plurality of screens 372, 374, 376, 378, 394, and 396. Any one of these screens 372, 374, 378, 394, and 396 can display the information associated with cameras. In this view, there is a bisecting line 380.1 which divides the cockpit substantially longitudinally in half. Thus, on either side of the bisecting line there are screens or displays 382 and 384 coupled to these supports 386 and 388. In addition, these displays 382 and 384 are positioned in a top half of the cockpit as shown by the bisecting line 380.2 which divides the cockpit laterally into two sections.

FIG. 24B is a view of an outer portion of the plane 391 which has the cockpit shown in FIG. 24A. In this view there is a body 397 with a windshield 379. The body of the plane is bisected latitudinally by dashed line 391.2. This view shows that camera 390 is positioned in the top half of the plane along support 386. Another opposite camera is positioned on the other support 388. While bisecting line 391.2 bisects the plane along a substantially horizontal axis, bisecting line 391.1 extends vertically and starts at the beginning region of a plane cabin which is positioned towards a front end of a plane. In this implementation all of the screens, adjusting mechanisms such as that shown in FIGS. 11-17.

Figure 25:
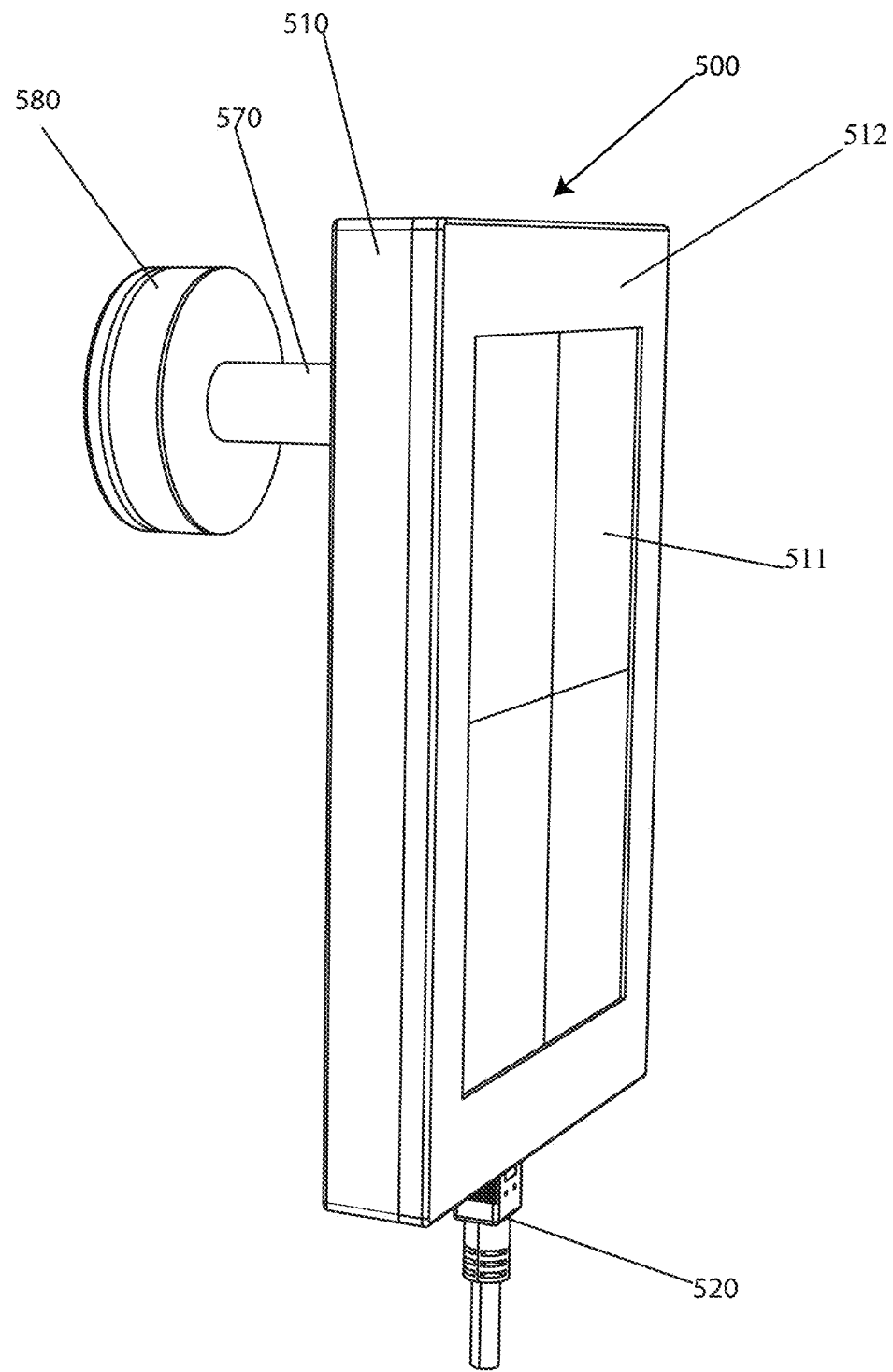
FIG. 25 is a view of a new embodiment which discloses a screen and camera combination.

FIG. 25 discloses another new embodiment 500 which includes a screen assembly 510, a camera assembly 580, and a channel 570 connecting the camera assembly 580 with the screen assembly 510. Screen assembly 510 includes at least a screen body or housing 512, and a screen itself 511. Screen 511, is housed inside of screen body 512. Behind screen 511, are electronic components shown in FIG. 36. A cable 520 can be coupled to screen assembly 510 through a port not shown herein.

Thus, with this design, camera assembly 580 can be positioned on one side of a support such as supports 14.1 14.2, 15.1, 15.2 while the screen assembly 510 can be positioned on the opposite side of the support 14.1 14.2, 15.1, 15.2. Channel 570 then extends through the door to bridge between the two assemblies.

Figure 26:
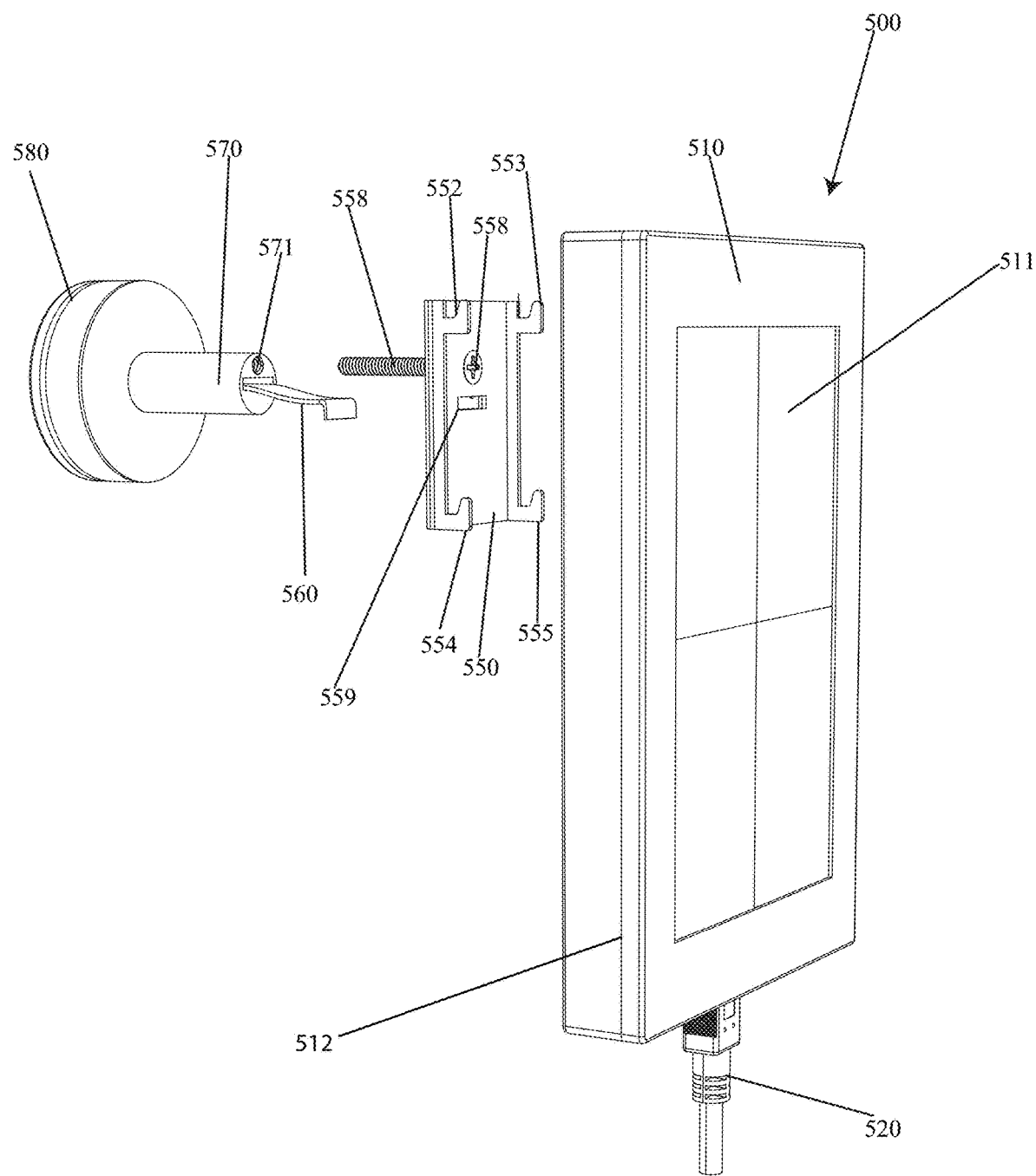
FIG. 26 shows a side exploded view of the screen and camera combination.

FIG. 26 shows a side perspective exploded view of the device shown in FIG. 25. For example, in with this embodiment 500, there is shown screen assembly 510 with screen 511 disposed inside of screen housing 512. As with FIG. 25, there is a cable 520 coupled to a bottom section of the screen. A coupling or support bracket 550 includes a bracket body, as well as at least four different bracket prongs 552, 553, 554, and 555. These bracket prongs extend out from the bracket body that are formed as substantially L-shaped hooks.

Figure 31:
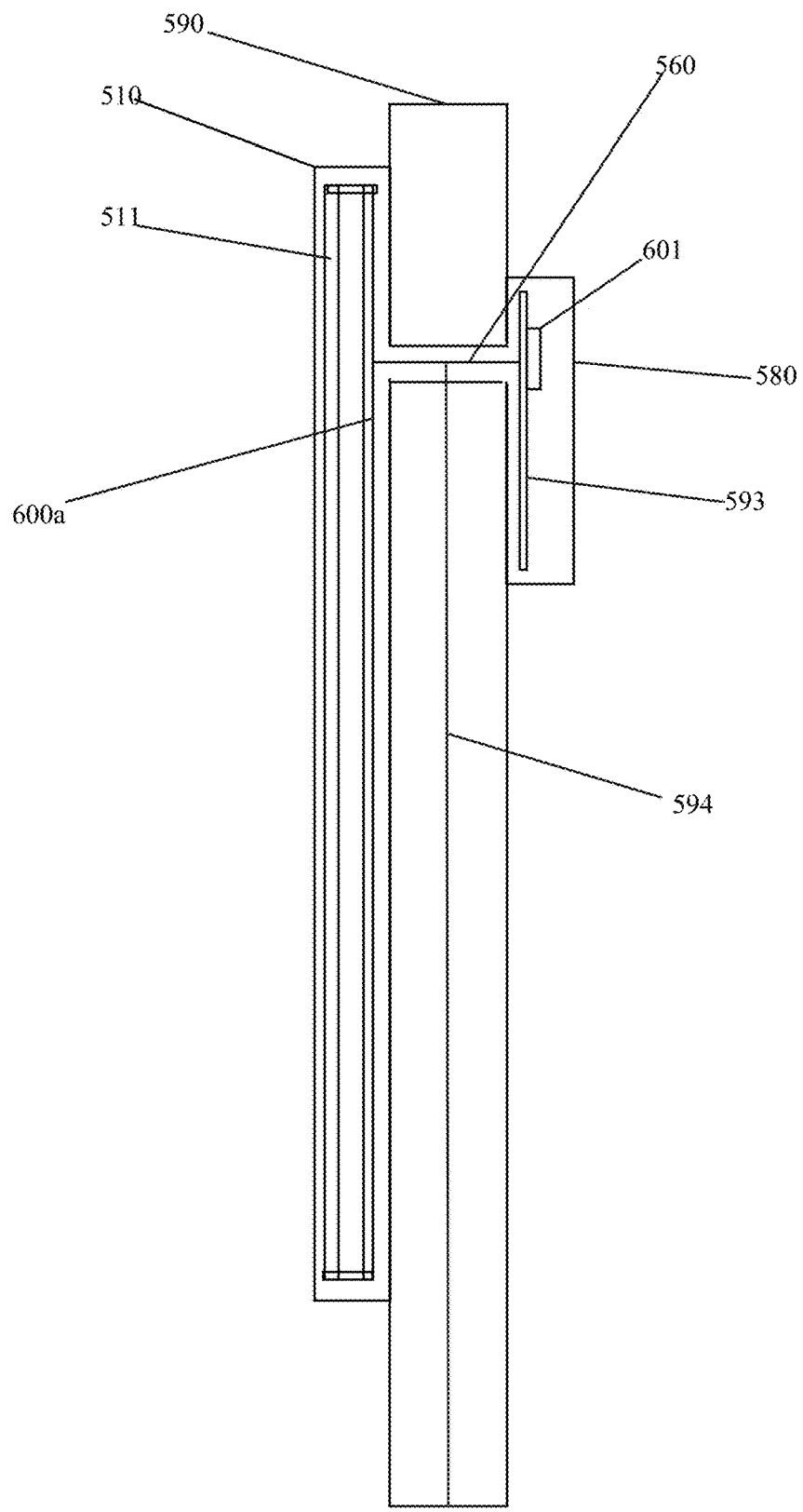
FIG. 31 shows a side cross-sectional view of a screen and camera combination with internal wiring.

These substantially L-shaped hooks are configured to hook inside of a back face of the screen body. In addition, a screw 558 is coupled to coupling bracket 550. In addition, disposed inside of coupling bracket 550 is a cable slot 559. Cable slot 559 is configured to receive a cable 560. Cable 560 is configured to be coupled to the electronic components shown in greater detail in FIG. 36. Cable 560 extends inside of channel 570 all the way to camera assembly 580. A screw hole 571 in channel 570 is configured to receive screw 558. Thus, cable 560 can slide through cable slot 559, wherein cable 560 is then connected to the electronic components inside of the screen body 512 of screen assembly 510. In addition, screw 558 can be screwed into screwhole 571 to secure camera assembly 580 to connection bracket 550. Connection bracket 550, can then be coupled to screen body 512 as shown in FIG. 31.

Figure 27:
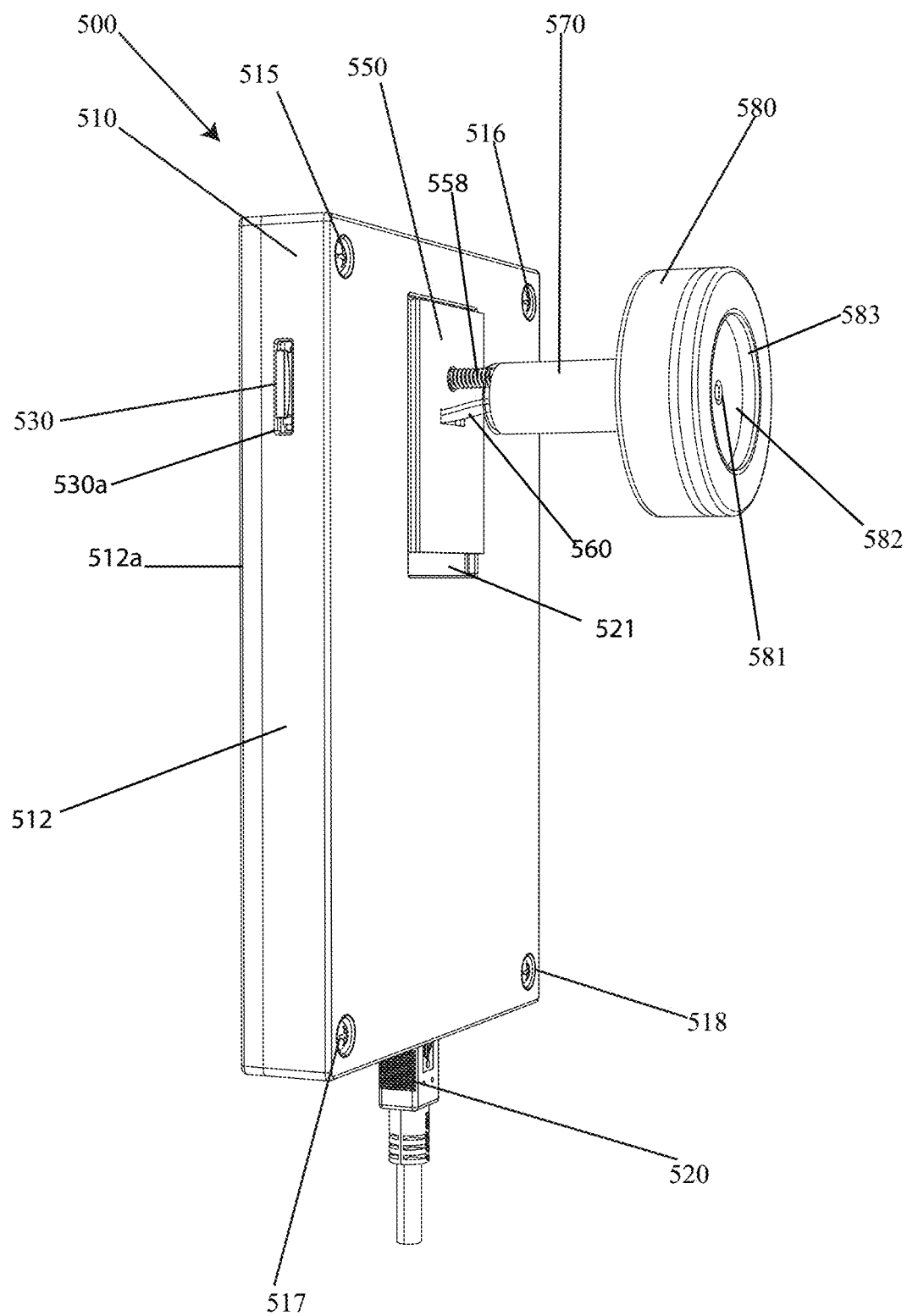
FIG. 27 shows a back perspective view of a screen and camera combination.

FIG. 27 shows a side-back perspective view of the embodiment shown in FIG. 25. In this view, connection bracket 550 is shown fitting into slot or recessed receptacle 521. As shown in this view, channel 570 is shown extending from camera assembly 580. Camera assembly 580 includes a camera 581, a camera face 582 and side walls 583. Camera assembly 580 can also include a covering such as a glass or transparent covering. As shown, there is also a screw 558 that connects channel 570 to bracket 550. In addition, as shown, there are also backing screws 515, 516, 517, and 518 which connect the body or housing 512 to a front plate 512a. In addition, as shown, there is a card 530 which extends into an opening 530a which connects card 530 to the motherboard which is housed inside of housing 512. The connection bracket 550 is fit snugly inside of recessed receptacle 521.

Figure 28:
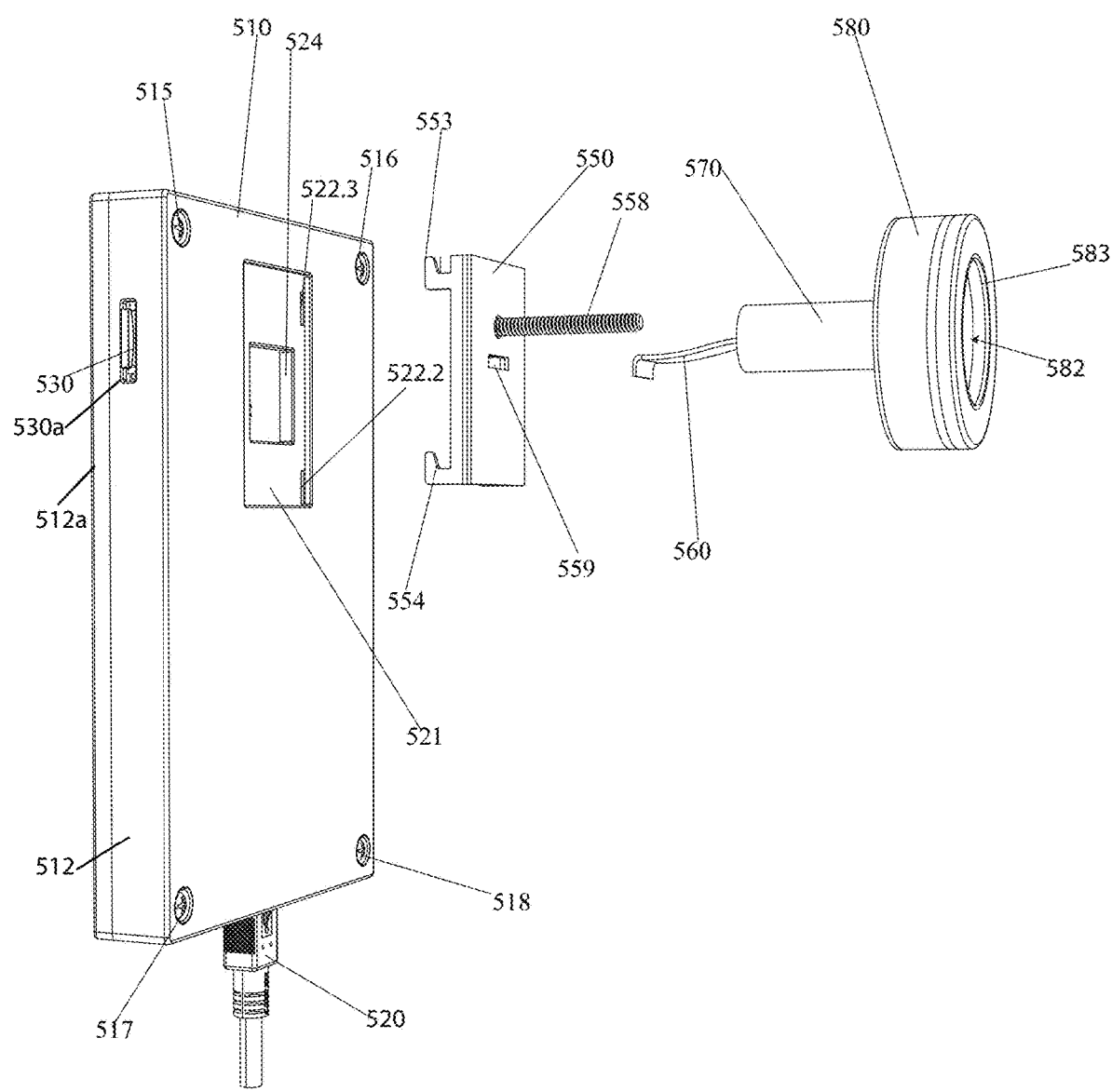
FIG. 28 shows a back perspective view of a screen and camera combination in an exploded view.

FIG. 28 is a side exploded view which is similar structure shown in FIG. 27. In this view there is shown bracket 550 is shown removed from screen body 512. Prongs 554, and 553 are shown extending out from bracket 550 wherein these prongs 551, 552, 553, and 554 can be configured to extend into prong openings such as prong openings 522.1, 522.2, 522.3, and 522.4. Cable 560 can extend in through slot 559 and then extend through opening 524.

Figure 29:
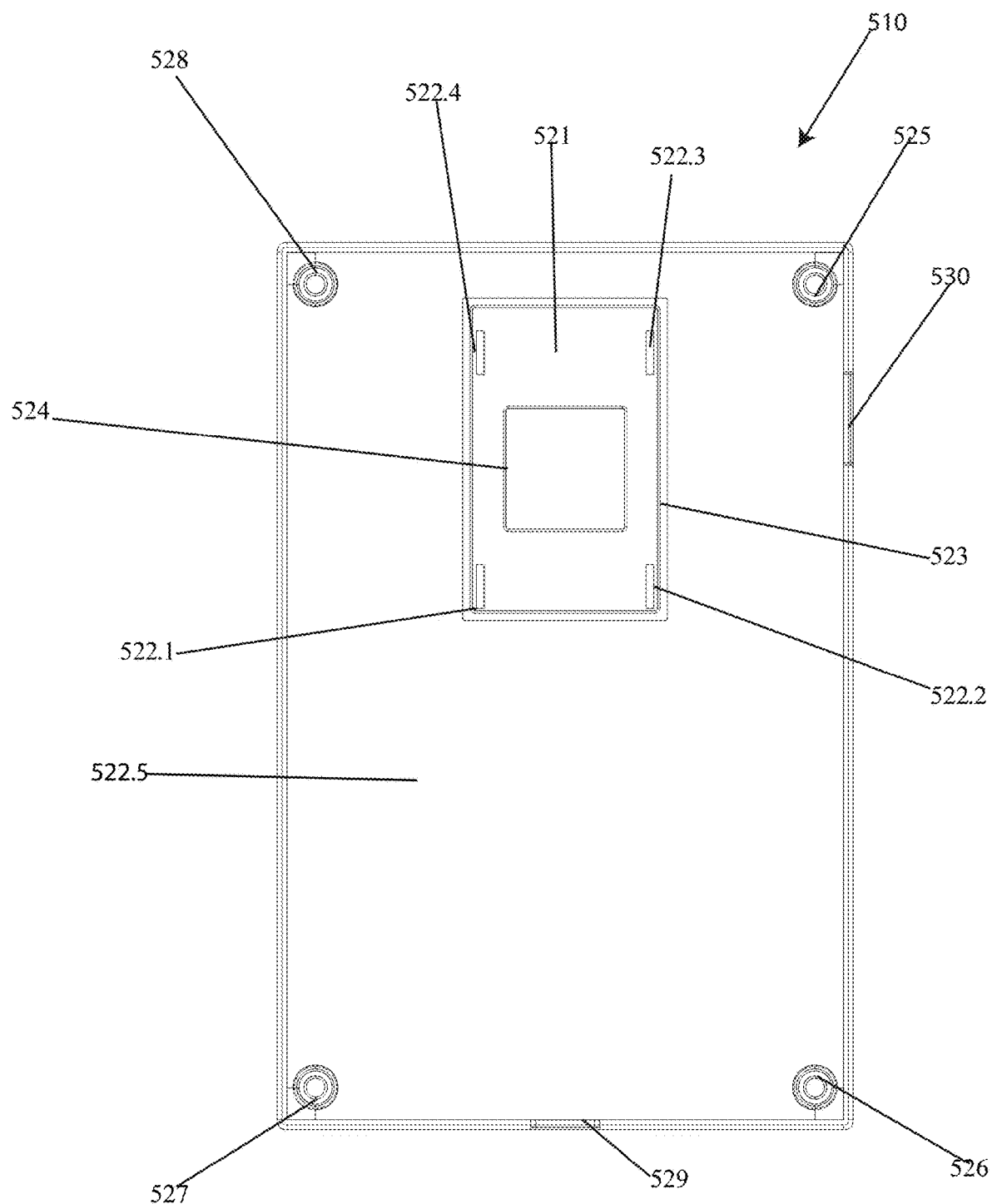
FIG. 29 shows a back view of the screen.

FIG. 29 is a back view of the screen assembly 510. In this view, there are screw holes 525, 526, 527, and 528. There are prong openings 522.1, 522.2, 522.3 and 522.4 which are configured to receive prongs. In addition, opening 524 is also shown. Furthermore, opening 529 is also configured to receive a cable 520. Cable 520 can be in the form of a power and communications cable such as a power over Ethernet cable (POE) which can supply both power and communications to and from a screen/camera and back to a central on board computer such as that shown in FIG. 38.

Figure 30:
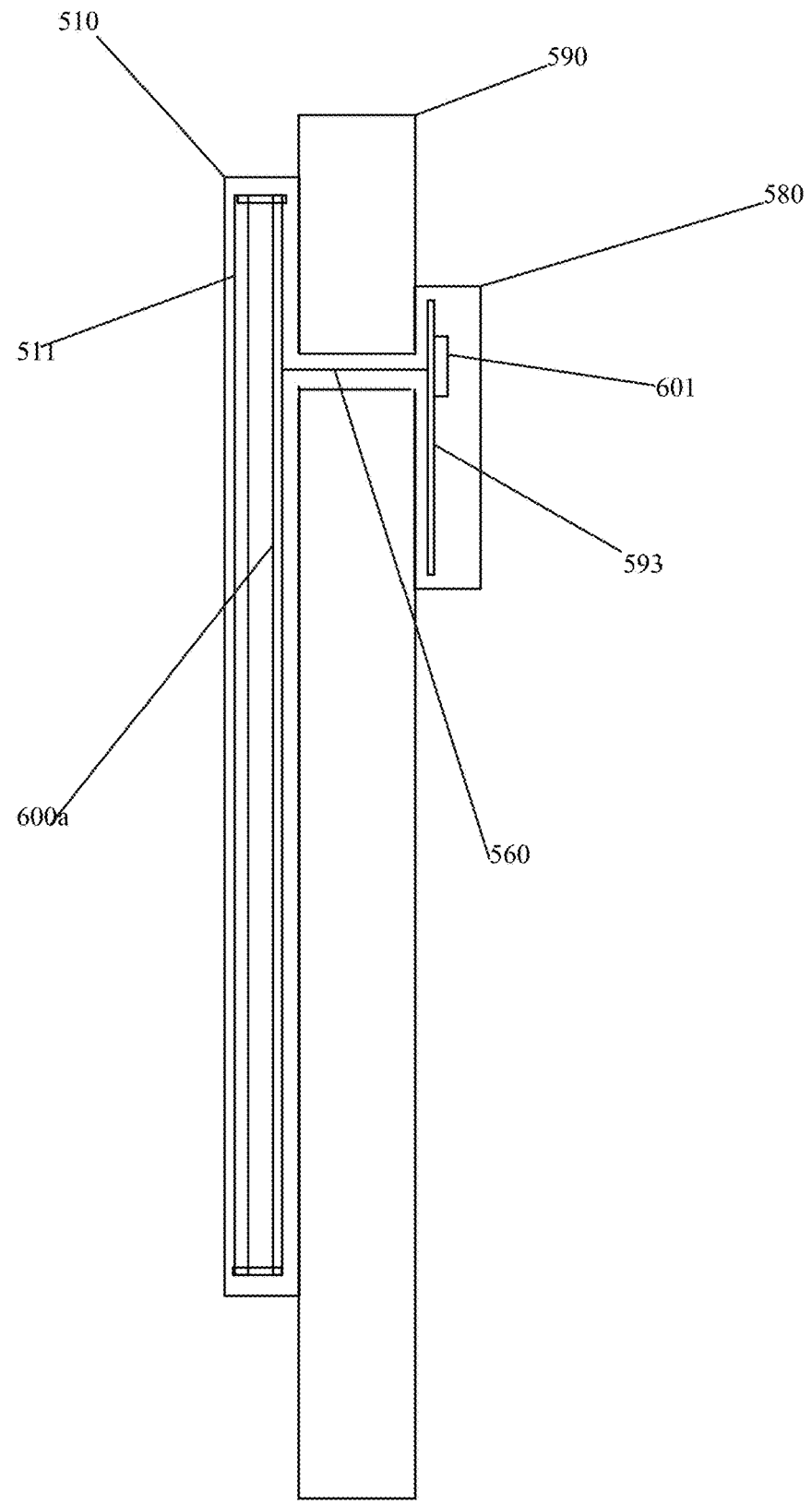
FIG. 30 shows a side cross-sectional view of a screen and camera combination.

FIG. 30 shows a side cross-sectional view of the system as it is coupled to a post in a car frame such as post 14, 15 or post 590. Post 590 can be any type of post similar to the posts 14.1, 14.2, 15.1 and 15.2. In addition, post 590 can also represent the surface of a rear view mirror or side view mirror as well. In this view there is a screen 511 disposed inside of a screen housing 510. In addition, there is a motherboard 600a which is in communication with screen 511. A cable or line 560 is in communication with motherboard 600a and extends to camera motherboard 593 disposed inside of a camera 580. There is also a camera chip 601 disposed inside of camera housing 580.

FIG. 31 shows another embodiment which shows the same components of FIG. 30 however it includes an additional line 594 forming a power line for powering the components. This power line can be used as a feed for feeding the power from the auto such as through an automobile electrical system.

Figure 32:
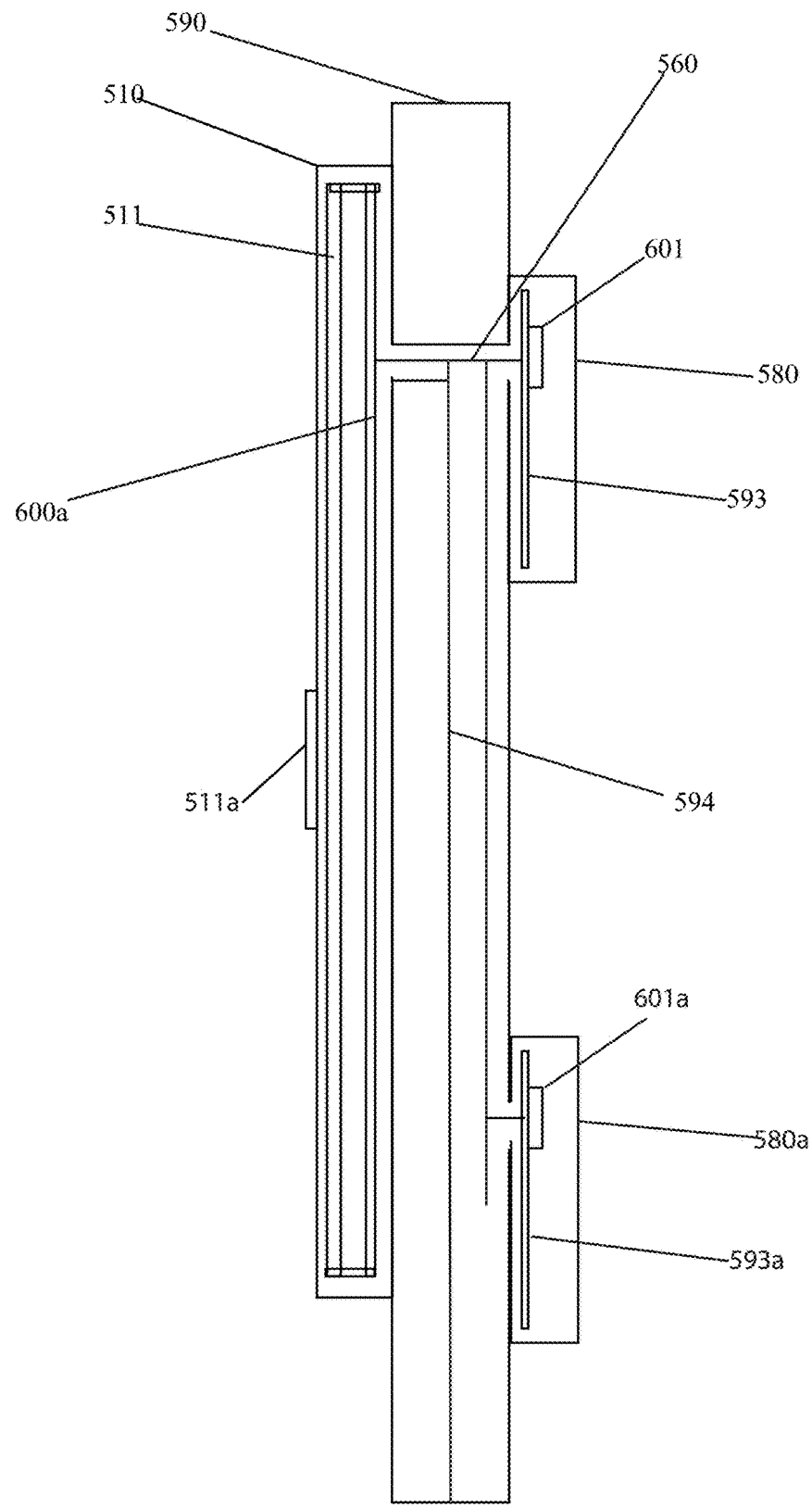
FIG. 32 shows a side view of a screen and camera combination with multiple cameras for a single screen.

FIG. 32 shows a side view of a multiple camera installation which is similar to FIG. 31, however this embodiment includes an additional line 594, an additional camera housing 580a, a base motherboard 593a, and an additional camera chip 601a. Thus, with this design multiple cameras can be associated with a single screen. The single screen can include at least one button, either included in a touch screen or an additional button 511a which can serve as a toggle button for the device toggling between different cameras. Alternatively, the two or more cameras can serve as a means for creating a three dimensional view on the screen 510. In addition, these buttons or virtual buttons as part of the screen software which are presented on the screen itself can be used to point and aim the cameras such as cameras 580, 580a, 580b, 580c (See FIG. 33), which are all cameras configured to be electronically driven, as well as at least cameras 22, 24, 26, and 32, 34, 36, 100, 120 by any suitable means such as through the drive system shown in FIG. 10B.

Figure 33:
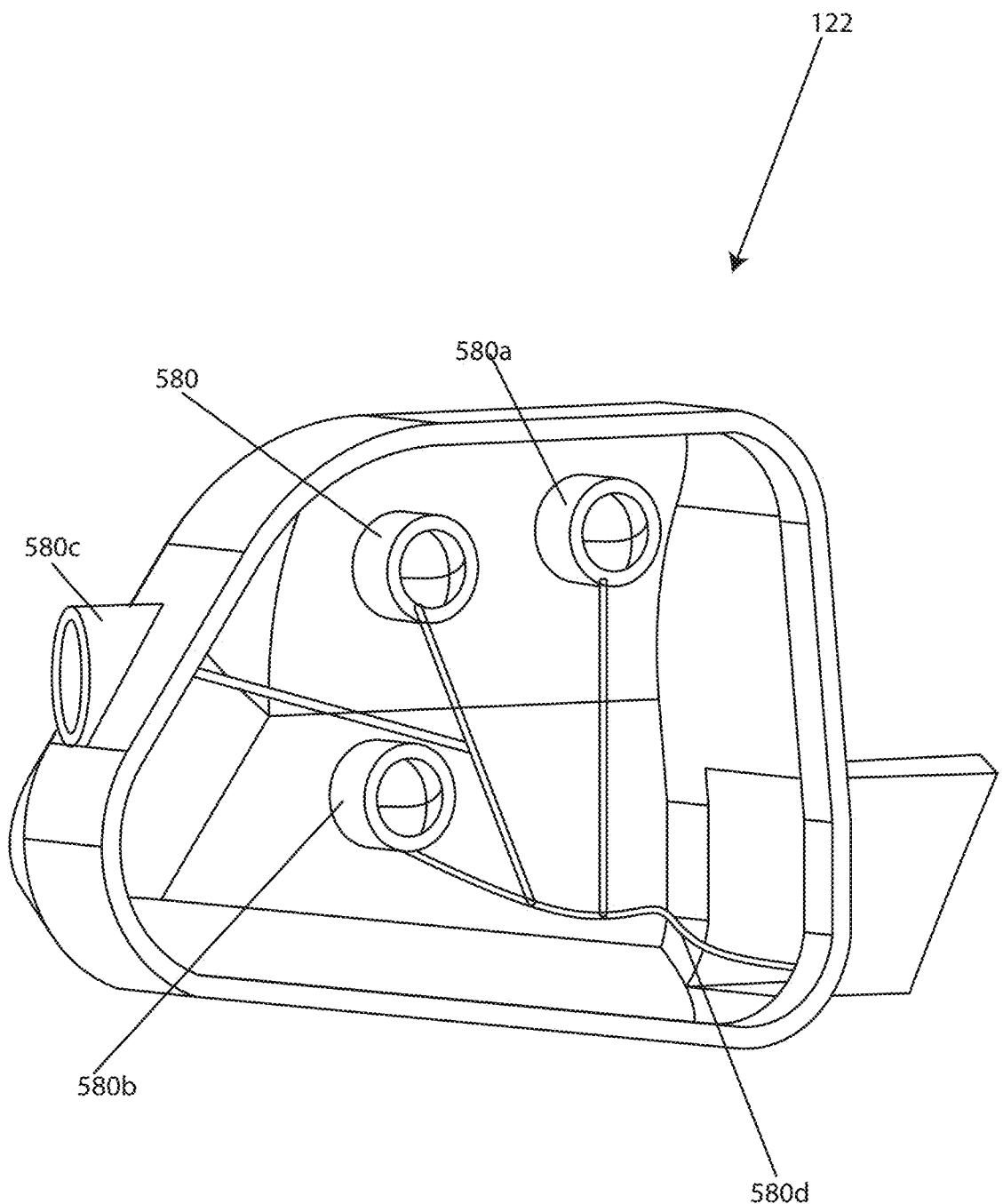
FIG. 33 is a front view of a camera and mirror combination with multiple cameras installed on a side mirror of an automobile.

FIG. 33 shows the different cameras which can be installed for example on a side view mirror 122 (See FIG. 10B). There can be for example a first camera or camera body 580, a second camera or camera body 580a, a third camera or camera body 580b, and a fourth camera or camera body 580c. While the cameras can be in the form of multiple different cameras feeding into a single screen, at least one of the cameras such as camera 580c can be positioned at a side position on mirror 122 so that it extends the viewing out laterally for users to see to the side of the car and even into blindspots of a rear view mirror. These cameras can also be driven such as via the drive system shown in FIG. 10B.

Figure 34:
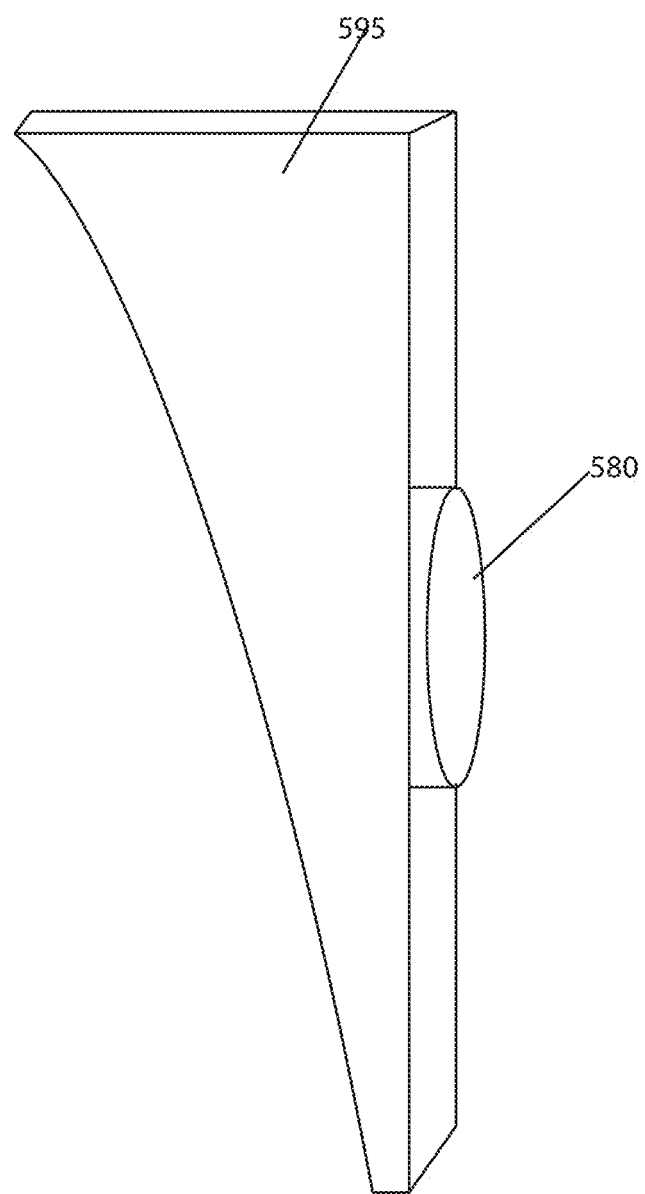
FIG. 34 is a side view of an adapter which can be placed on a side of a support for an auto or on a mirror.

FIG. 34 is a side perspective view of an adapter which includes a block adapter forming a mounting bracket 595 which can be pre-molded and pre-formed into a particular shape or structure which then allows the existing curvature of a structure of the automobile to be compensated for via this structure. Coupled to this block adapter 595 is a camera body 580 which is seated inside of this adapter structure. Any type of combination of camera and screen system can be used herein with this adapter.

Figure 35:
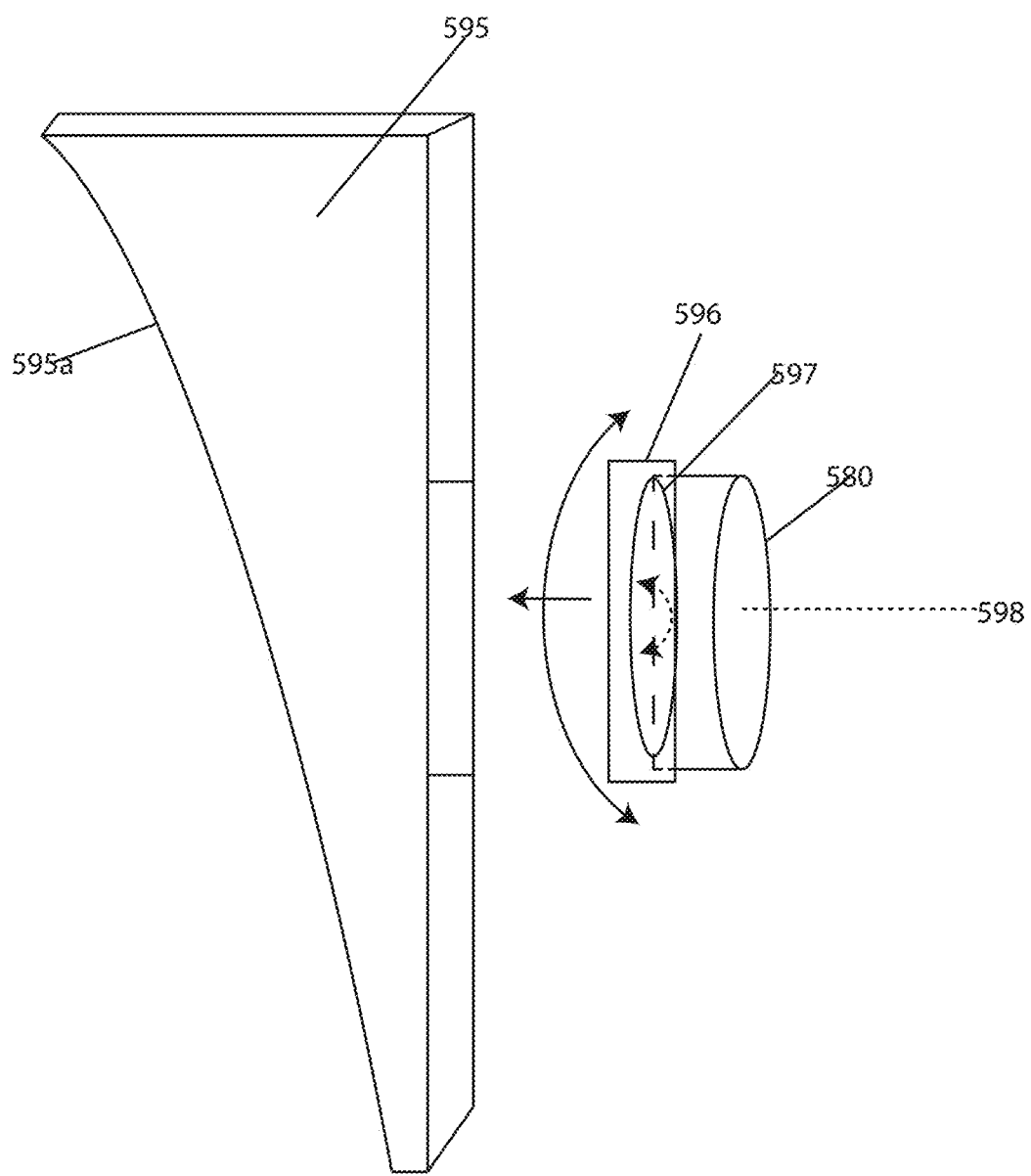
FIG. 35 shows a side support which allows for a camera with an adjustable angle seat being insertable therein.

FIG. 35 is a side perspective view of the block 595 which is configured to receive the camera body 580. With this embodiment, there is a camera seat 596 which includes an adapter device 597 which allows the camera to be rotated relative to a horizontal axis 598 to position and point the camera inside of the camera body. The camera seat 596 can be adjusted or rotated to either loosen or tighten the adapter device 597 to allow for the camera to be selectively positioned at a particular angle. With this design there is at least one curved surface 595a positioned substantially opposite a surface supporting the camera 580. Alternatively, the drive mechanism shown in FIG. 10B can be used with this type camera as well.

Figure 36:
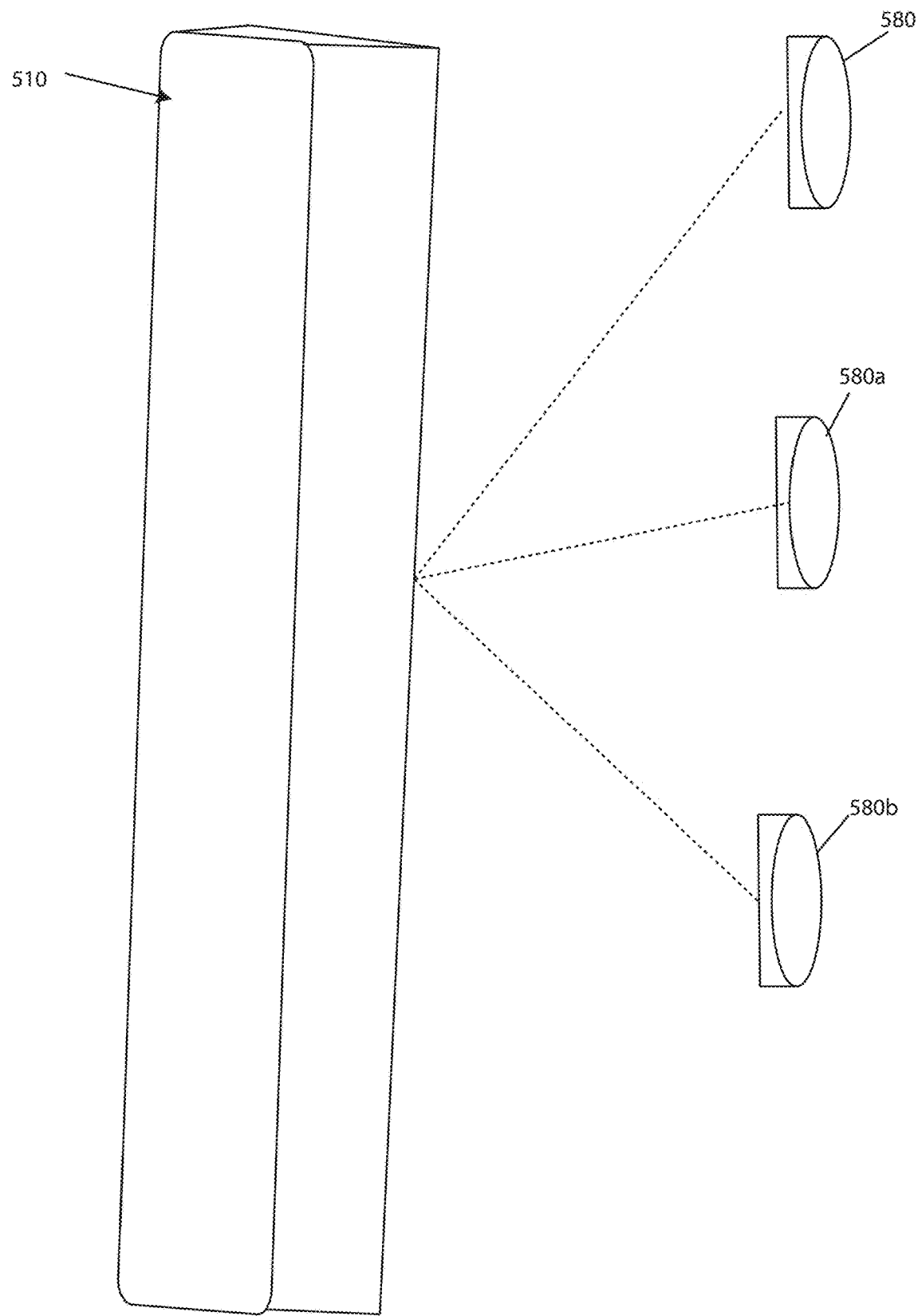
FIG. 36 shows a screen and multi-camera installation.

FIG. 36 shows a screen 510 which can be connected to any one of cameras 580, 580*a*, and 580*b* through a wireless connection.

Figure 37:
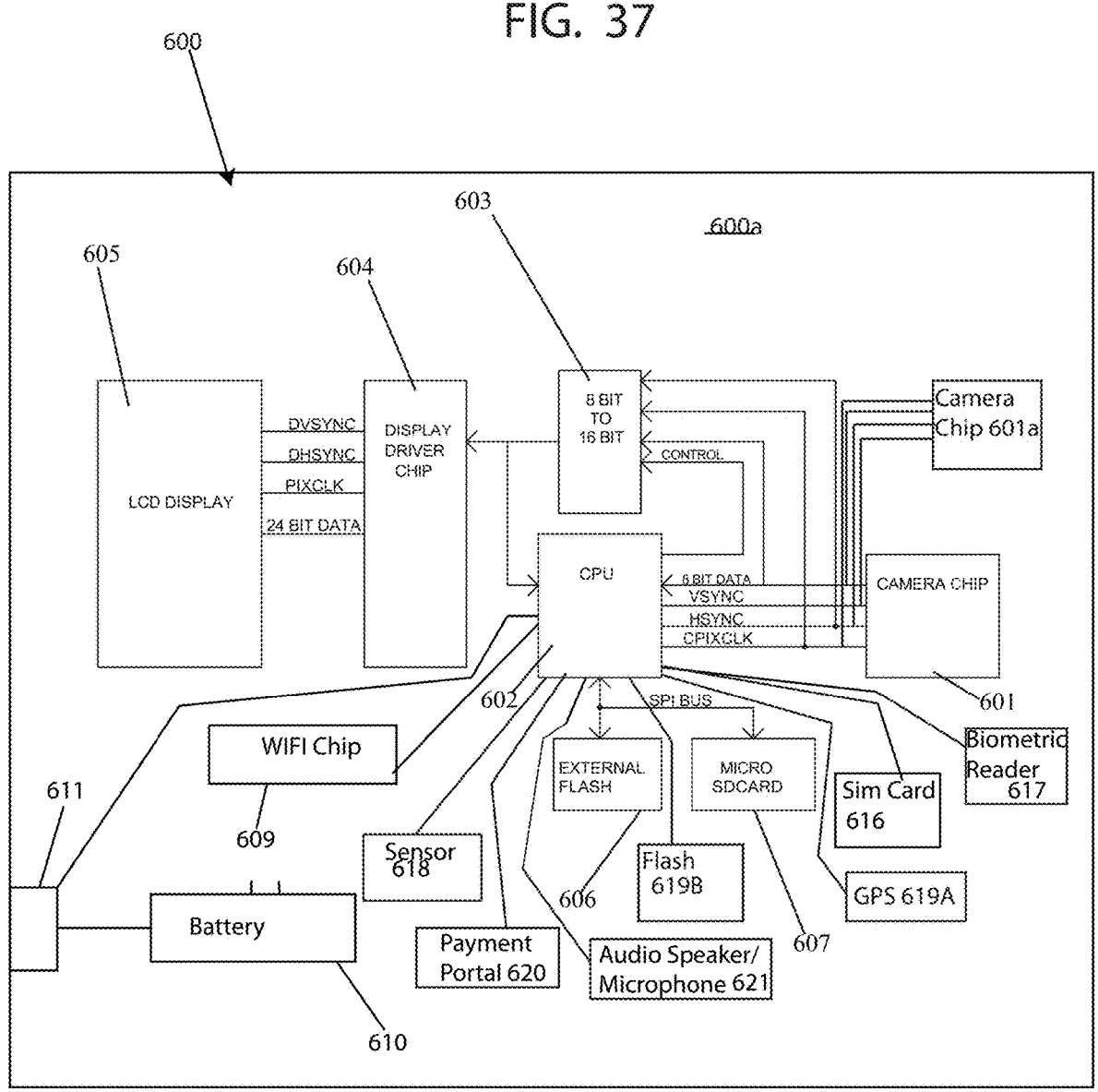
FIG. 37 is a schematic block diagram of the electronic components for the screen and camera combination.

FIG. 37 shows the preferred embodiment of the apparatus. This embodiment of electronic components 600 includes camera chip 601, CPU 602, data converter 603, display driver chip 604, LCD display 605, flash chip 606 and micro SDCard 607 which can include 530 shown in FIG. 31.

Camera chip 601 is one of several types. In the current embodiment, the chip provides an integrated lens, 640×480 full color pixel array sensor or any other suitable resolution, control electronics, an 8 bit data output bus and a control bus. CPU 602 sends commands to the camera chip to initialize it and to control the capture and format of data.

Typically, one of several formats can be chosen for the representation of full color images. CPU 602 selects a format that is compatible with display driver 604 to reduce the amount and convolution of data required to display a good image.

Data from the camera chip is ported to both CPU 602 and to the display driver chip 604, via data converter 603. The display driver 604 can accept data in several widths (8 bit, 16 bit, 24 bit) and formats (RGB656, RGB888, etc). The current embodiment programs camera chip 601 to send image data in the RGB656 format, which consists of 2 bytes containing 5 bits of red color information, 6 bits of green color information and 5 bits of blue color information. Display driver 604 can accept this data in 16 bit format; since the camera chip outputs the data in 8 bit widths, data converter 603 is used to convert the 8 bit data into 16 bit RGB656 format data. Display driver 604 contains sufficient memory to store at least one frame of display data.

The display driver 604 has many registers to control the appearance of the LCD display 605, so it is connected to CPU 602 using the same bus as data converter 603. CPU 602 programs these registers before beginning the image display and also writes a command to display driver 604 at the start of every display frame to describe where the forthcoming data from data converter 603 is to be displayed on LCD display 605.

A frame of data is defined by signals VSYNC and HSYNC and CPIXCLK. VSYNC is set high when an image frame is to be output from camera chip 601. Each line of the image is qualified by HSYNC which goes high when valid pixel data is available on the data outputs of camera chip 601. HSYNC goes low when the line of data ends and signals that a new line of data is about to begin. CPIXCLK pulse high frq each byte of data sent by camera chip 601. CPU 602 can either accept this data (to save frame(s) to micro SDCard 607, or can send this data to display driver chip 604 via data converter 603.

The sequence of events required to capture and display an image frame is this: CPU 602 monitors signal VSYNC from camera chip 601. When VSYNC is detected high by CPU 602, CPU 602 programs display driver 604 with the addresses of the data that is to be written to the LCD display. Once this is programmed CPU 602 activates data converter 603. Data converter 603 accepts HSYNC and CPIXCLK and uses these signals, along with the data signals from the camera chip to assemble a 16 bit wide RGB656 word and subsequently write that word to display driver chip 604. Display driver chip 604 takes these RGB656 and stores them sequentially into its internal frame memory. Display driver chip 604 uses the frame memory to generate the signals DVSYNC, DHSYNC, PIXCLK and the 24 bit data (8 bits each of red, green and blue) for display on LCD display 605. CPU 602 continues to monitor signal VSYNC from camera chip 601. When VSYNC goes low, the frame has been completed and CPU 602 turns the data converter off and begins looking for a new frame of data. When CPU 602 sees VSYNC go high again it starts the display sequence again. This provides full motion data from the camera to be displayed on the LCD display 605.

LCD Display 605 incorporates a touch screen interface for the apparatus. This interface permits the user to capture an image or a video from the camera chip to micro SDCard 607. This image can be used for identification or verification of events. Flash chip 606 holds images that can be displayed on a portion of LCD display 605 and includes virtual buttons, help instructions, or general information for the operation of the apparatus. CPU 602 can generate information that can be displayed on LCD screen 605 instead of video or as an adjunct to the video display. In addition, coupled to CPU are other optional components.

For example, the optional components include a WIFI chip 609 which can be used to allow the camera and CPU 602 communicate with another computer network. In addition, there can be a battery 610. There is also an Ethernet connection port 611 which is coupled to CPU 602. Other optional components can include a sensor 618. Sensor 618 can be any one of the following sensors: RFID sensor, a motion sensor, a door ajar sensor, a fingerprint scanner, a thermal sensor, and a proximity sensor alarm. In addition, there is also shown a sim card 616, and a biometric reader 617. There can also be an audio speaker or a microphone 621 wherein the users can communicate between each other by communicating using the audio speaker and a corresponding microphone. This audio speaker and microphone can be embedded into the screen assembly 510. There can also be a GPS system 619A which can be used to receive and communicate with GPS systems to provide a location for the automobile or moving vehicle. The electronics shown in FIG. 37 can be used in any one of the camera and screen combinations disclosed herein.

Figure 38:
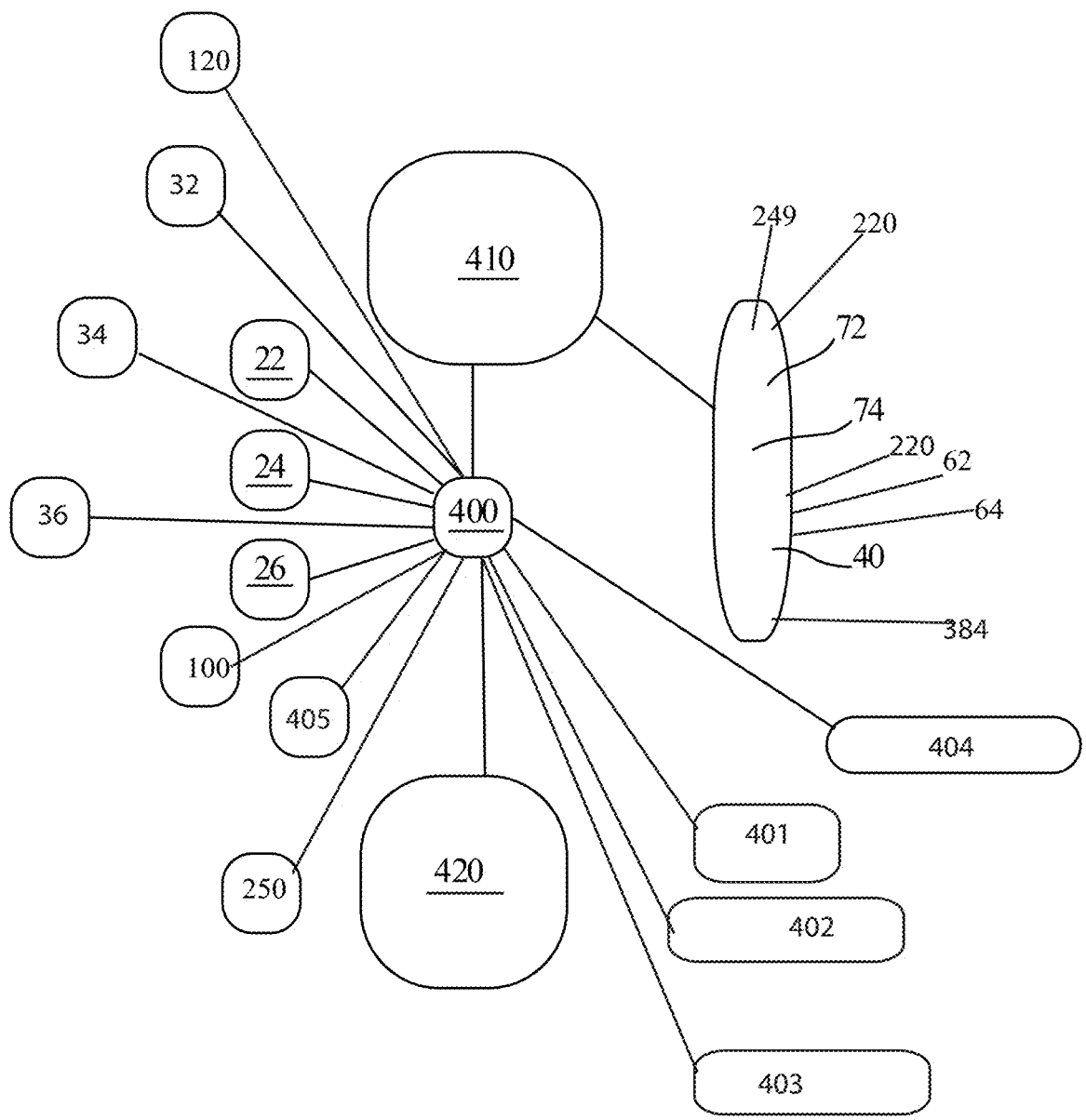
FIG. 38 is a schematic block diagram of the electronic components in communication with a central device such as a server.

Ultimately, this system can be designed to include a camera which can be configured to have a night vision camera, and an infrared sensor. FIG. 38 is a schematic block diagram of the embodiment of either FIG. 1A, 2A, 3, or 4. In this view there are cameras 22, 24, and 26 which are coupled to aggregator 400. Aggregator 400 is coupled to video compression device 410. Video compression device 410 has an output to at least one screen 62, 64, or 40, or screens 72, 74, or screens 220, or 249. In addition coupled to aggregator 400 is a video recorder 420 which is configured to selectively record video signals taken in from aggregator 400. Thus the device can serve as a black box video recorder as well. The cameras and screens for the embodiment of FIG. 5 can also be included in this block diagram as well. As shown in this view there is a first device 401 which acts as a recorder for the information such as speed, orientation, GPS provided by GPS system 618A, and other coordinates to serve for additional black box recording. In addition there is another device 402, which allows for the device to be coupled to or at least in communication with an outside cloud storage device. Thus, this device includes a wireless communication element such as a SIM card such as SIM card 616 or other wireless communication device. Another optional feature is a communication device 403 which is configured to communicate with an automobile to automatically stop an automobile. This device 403 can be preset with certain instances such as when it views a pedestrian in a cross walk or other obstruction. Device 403 can be wired into the auto's onboard computer to automatically brake the auto to stop the auto from hitting a person or object. This viewing device could then automatically either shut the auto down or disable the accelerator to prevent a party in a crosswalk from being hit. Essentially this device 403 reads the visual information from aggregator 400 and then processes the images from this information. Once it reads the information from this aggregator 400 and recognizes this information it then sends this information onto the automobile computer to either disable the auto or to disable the accelerator.

In addition, another camera control device 404 is configured to control the cameras such as cameras 22, 24, and 26 or cameras 32, 34, and 36, 52, 54, 56 or cameras 100, 120, 250 or 580. Each of these cameras can have in their body devices to control focus, pan, tilt, zoom, etc. Device 404 is thus configured to control the pan, tilt, zoom, a focus of each of these cameras and is configured to communicate through aggregator 400 so that each of these individual cameras is controlled. The controls of these cameras can be located in the dashboard of the auto, or on the steering wheel of the auto or on any one of the screens described above.

In addition, coupled to aggregator 400, is the onboard auto computer which communicates with this aggregator all of the information from the auto including the state of the auto. In addition, any controls located on the auto can be fed through the auto's onboard computer 405 through to the video aggregator 400, and then onto any one of the devices 401, 402, 403, or 404.

The aggregator 400 and also the components coupled either directly or indirectly to the aggregator 400 are coupled to the auto's onboard computer 405, in a communicative manner as well as in an electrically powered manner so that information and electrical power is passed between these components.

Each of these cameras can also be controlled by camera control device or lens 404 so that these cameras can render infrared, thermal, night vision or any other type of view known in the art and requested by the user.

Each of these components can communicate with each other via a wired connection. Alternatively, each of these components such as the cameras 22, 24, 26, 32, 34, 36, 52, 54, 56, 100, 120, 250, 580 can include an associated wireless transceiver also communicate in a wireless manner with any one of the suitable screens such as screens 249, 220, 72, 74, 62, 64, 40 or 511 also selectively having a wireless transceiver. The communication can be via wireless internet protocols such as WIFI, bluetooth or any other suitable wireless communication protocol.

Thus, the system is designed to allow for communication and control from multiple different cameras to multiple different screens either in a wired or wireless manner to allow the user to see in different blind spots. In addition, the system allows for the mounting and positioning of multiple different screens or cameras wherein these screens and cameras can be positioned around a moving vehicle.

Figure 39A:
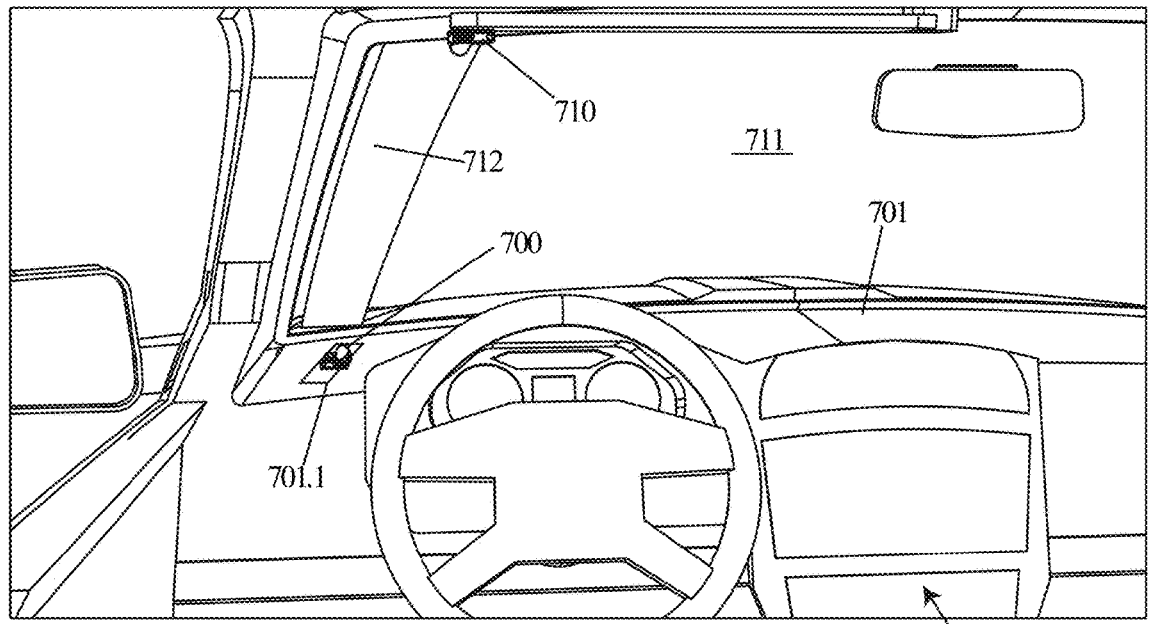
FIG. 39A is a view of another embodiment from an inside of a vehicle.

FIG. 39A shows a view of an auto 10 which includes a dashboard surface 701 which has at least one projector 700 positioned on it. There is also another projector 710 coupled to the auto, in this case to the visor of the auto. In addition, there is a reflective and/or translucent film 712 which can be made of any suitable material such as a substantially translucent and/or transparent polymer which is adhered to the windshield 711 of the auto. The adhesive can be in the form of a static adhesive or an actual chemical based adhesive. In addition, on the dashboard surface can be an induction plate 701.1 which is used to selectively charge or at least provide energy to the projector. The induction plate is configured to be powered by the auto while extending a charge to the device through electrical transfer of energy.

Figure 39B:
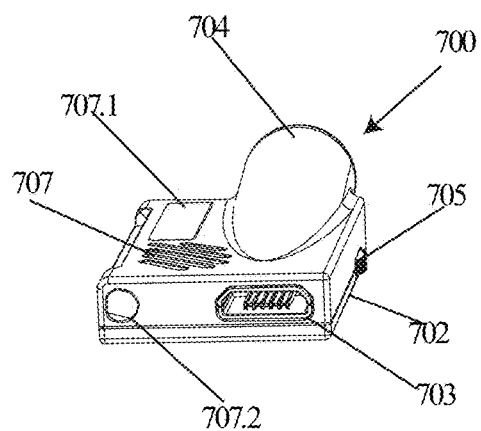
FIG. 39B is a view of a projector of FIG. 39A.
Figure 39C:
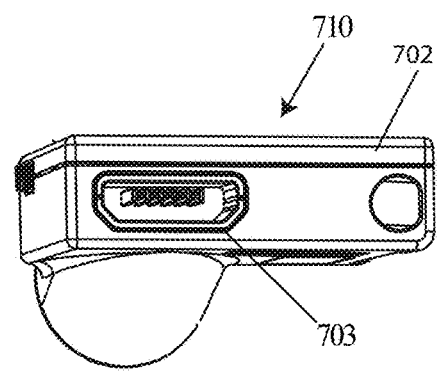
FIG. 39C is a view of another projector of FIG. 39A.

FIG. 39B shows a back perspective view of a projector 700. The projector 700 includes a body section 701, a connector 703 disposed in the body section. The connector can be any suitable connector such as a HDMI connector. The HDMI connector can serve as both a power connector as well as a media connector. Extending out from the body is a projector lens 704. There is also a vent 707 which allows the heat from the projector to escape. A card reader connection 705 is also disposed inside of body section 702. FIG. 39B shows the view of the projector 710 which is essentially the same as projector 700. There is also shown a security hole 108.1 which allows the device to be clamped down on the dashboard of a vehicle.

Figure 40A:
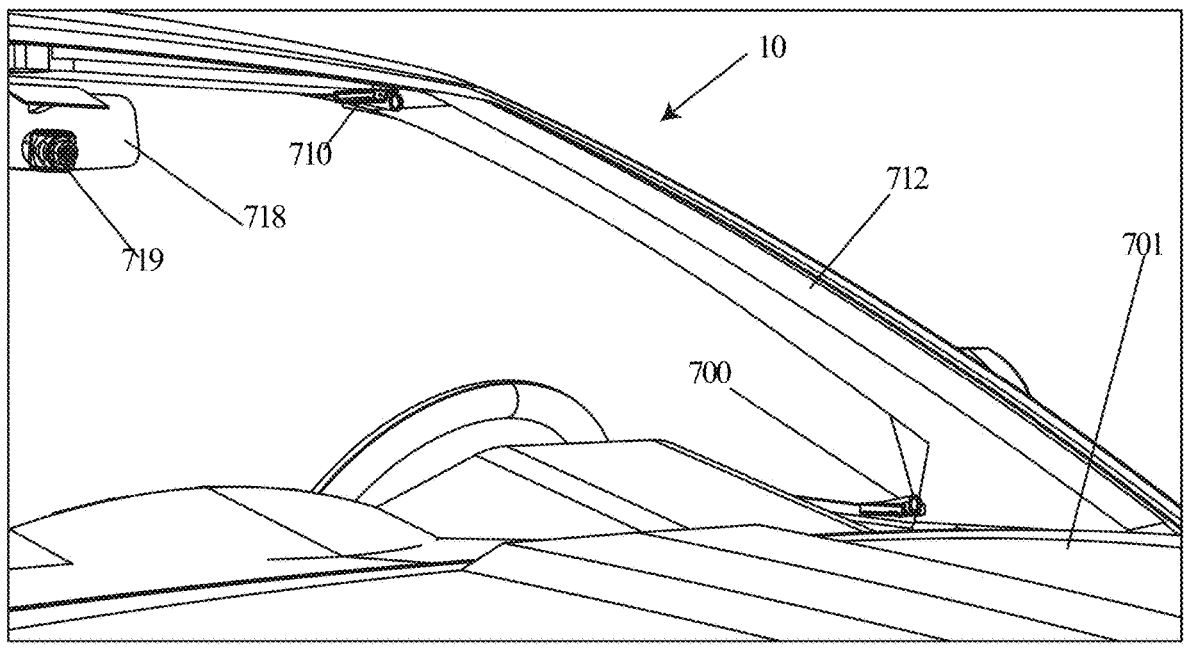
FIG. 40A is a front view of a vehicle with the embodiment of FIG. 39A.

FIG. 40A shows the view of projector 710 positioned on a visor of an auto 10. Reflective film 712 is positioned on the windshield 711. In addition, there is also a rear view mirror 718 which also includes a camera 719 positioned on the rear view mirror. The camera is configured to feed images to the projector 700 or to the projector 710. Both projectors 700 and 710 can operate independently to display images on film 712 or they can be synchronized to display a single composite image on film 712. The film 712 can have a strip around it, wherein the strip forms a guide for the projector to provide its images on the film. This strip can be in the form of an electromagnetic strip which provides feedback for the projector to guide the direction and focus of the projector onto the film.

Figure 40B:
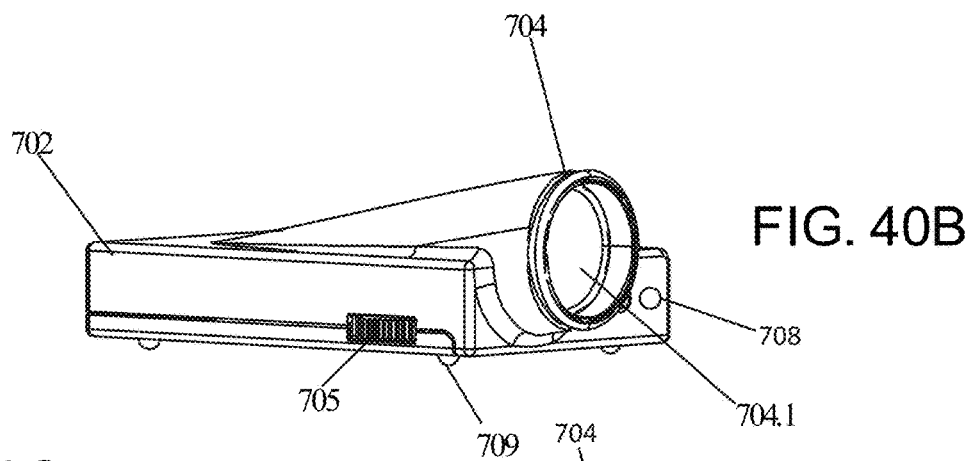
FIG. 40B is a front view of the projector of FIG. 39A.

FIG. 40B shows another perspective view of the projector 700 which shows lens 704 positioned in body 702. In addition, extending out from a side of body 702 are feet 709 configured to seat the body onto a dashboard such as dashboard 701. In addition, this projector can also include a laser range finder 708 which is configured to send a beam out to the film to provide a distance or range for the beam to focus the projector.

Figure 40C:
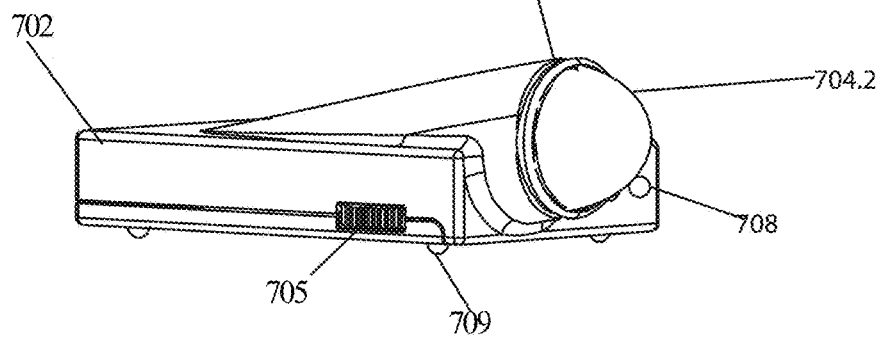
FIG. 40C is another embodiment of a projector.

FIG. 40C shows another embodiment, which shows a bulbous short-throw projector lens 704.2 which is used to provide a wide angle projection of the image onto the film. This fish-eye lens is bulbous and allows the image to extend in a wide angle direction, particularly both above and below the projector.

Figure 41A:
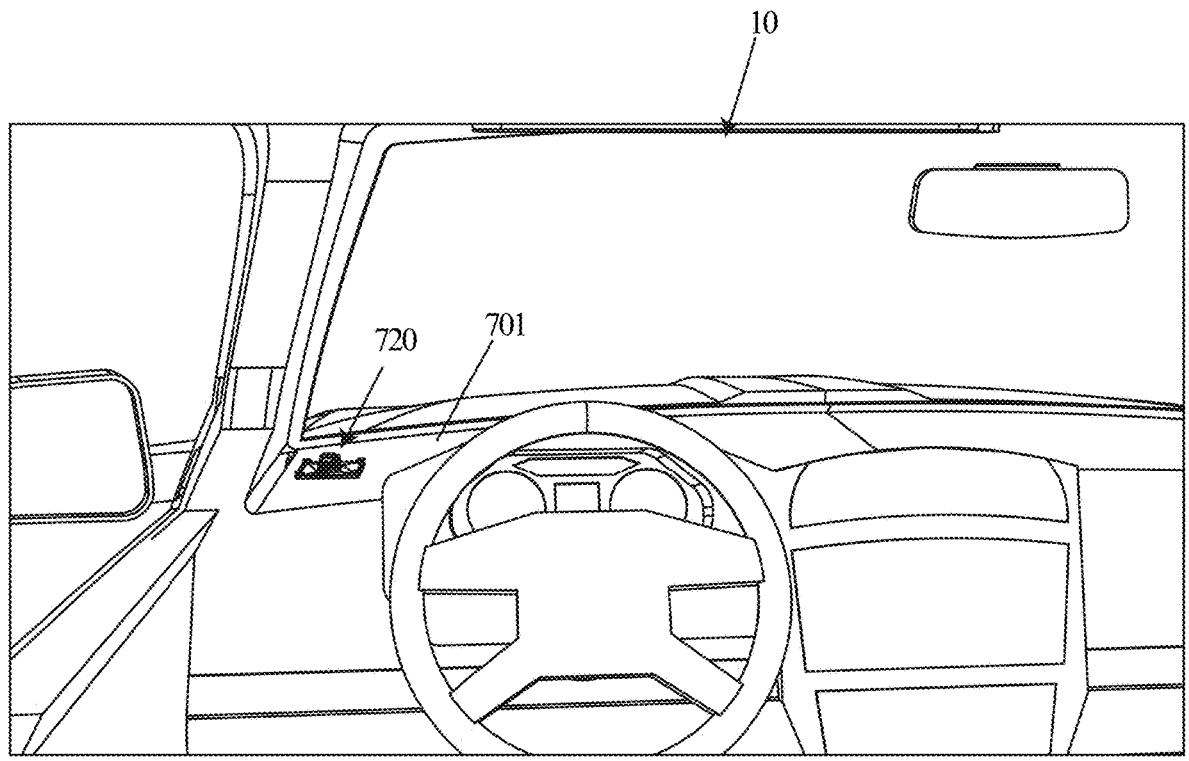
FIG. 41A is a view of an inside of a vehicle with another embodiment.
Figure 41B:
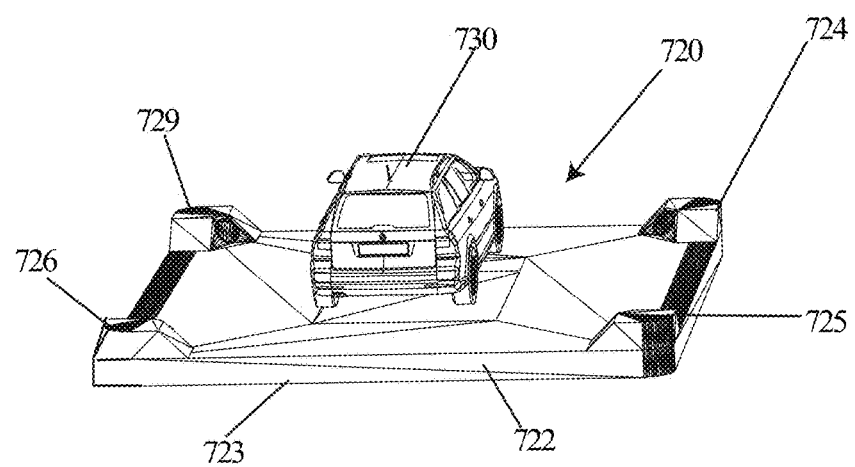
FIG. 41B is a view of the display system associated with FIG. 41A.

FIG. 41A shows a view of another three dimensional projection plane 720 positioned on dashboard 701. Three dimensional projection plane 720 includes a base section 722 which forms a mounting surface for different projectors 724, 725, 726, and 727. These projectors can project onto a reflective surface on base section 722 which is essentially a planar base surface which is configured to create a reflective surface along with the surface of the car body. The intersecting images of the projectors 724, 725, 726 and 727 are configured to create three dimensional 3-D images positioned around the car 730. Thus, in this way this design allows for a user to have a full three dimensional image of all of the bodies (autos as well as people and animals) around a vehicle. In at least one embodiment of the invention, the surface 723 of the base section 722 can be flat. In at least one additional embodiment, the surface of the base section can be formed from multiple differently angled reflective surfaces.

In another embodiment the car body projected would simply be a three dimensional holographic image.

Figure 42A:
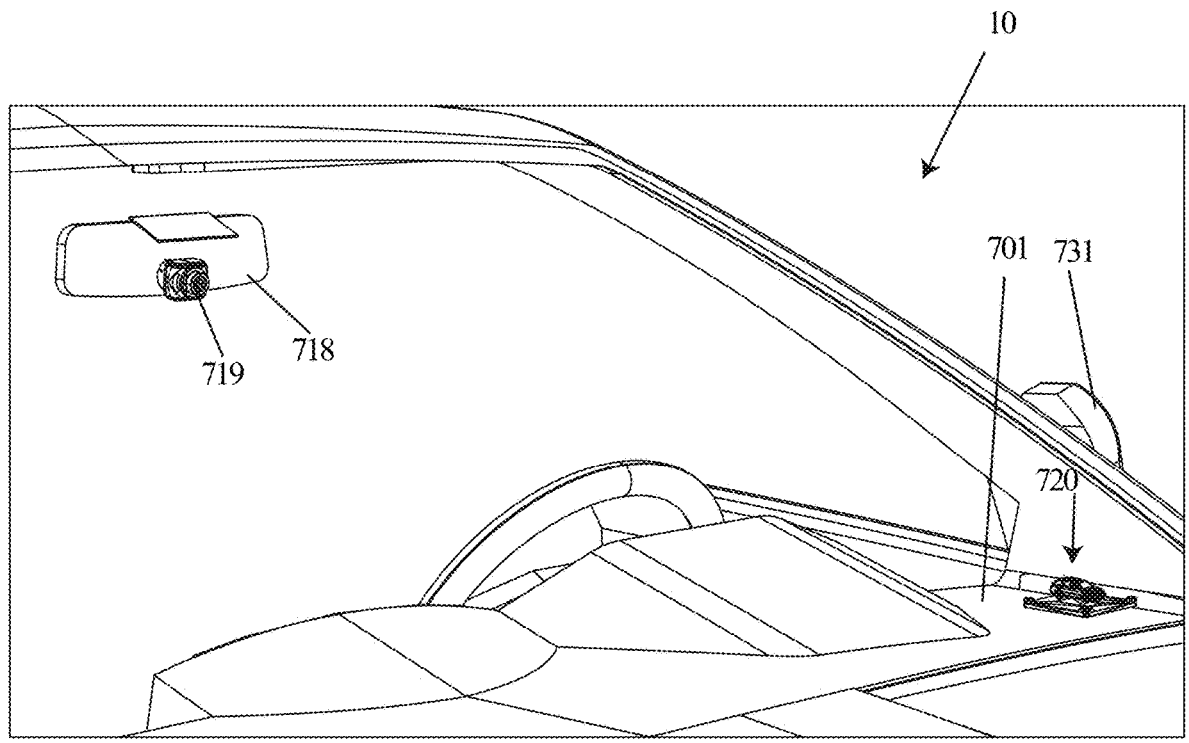
FIG. 42A is a view of the vehicle having the system of FIG. 41A.

FIG. 42A shows the projection plane 720 positioned on the dashboard of an auto. This view also shows camera 719 positioned on rear view mirror 718. In addition, an additional camera can be positioned on side view mirror 731 as well. This additional camera can either work in conjunction with camera 719 or in the alternative to camera 719.

Figure 42B:
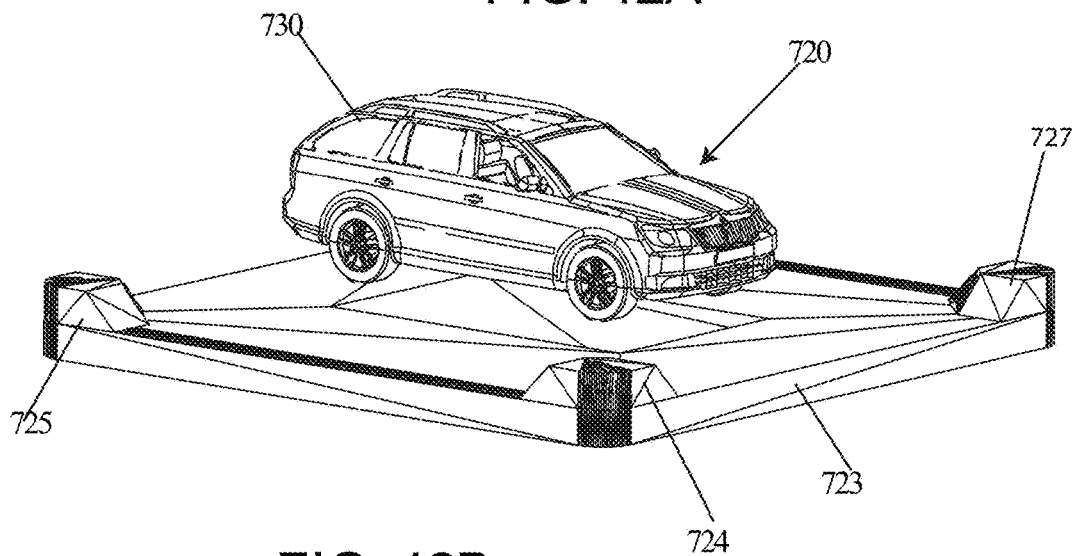
FIG. 42B is a view of the display system of FIG. 41B.
Figure 42C:
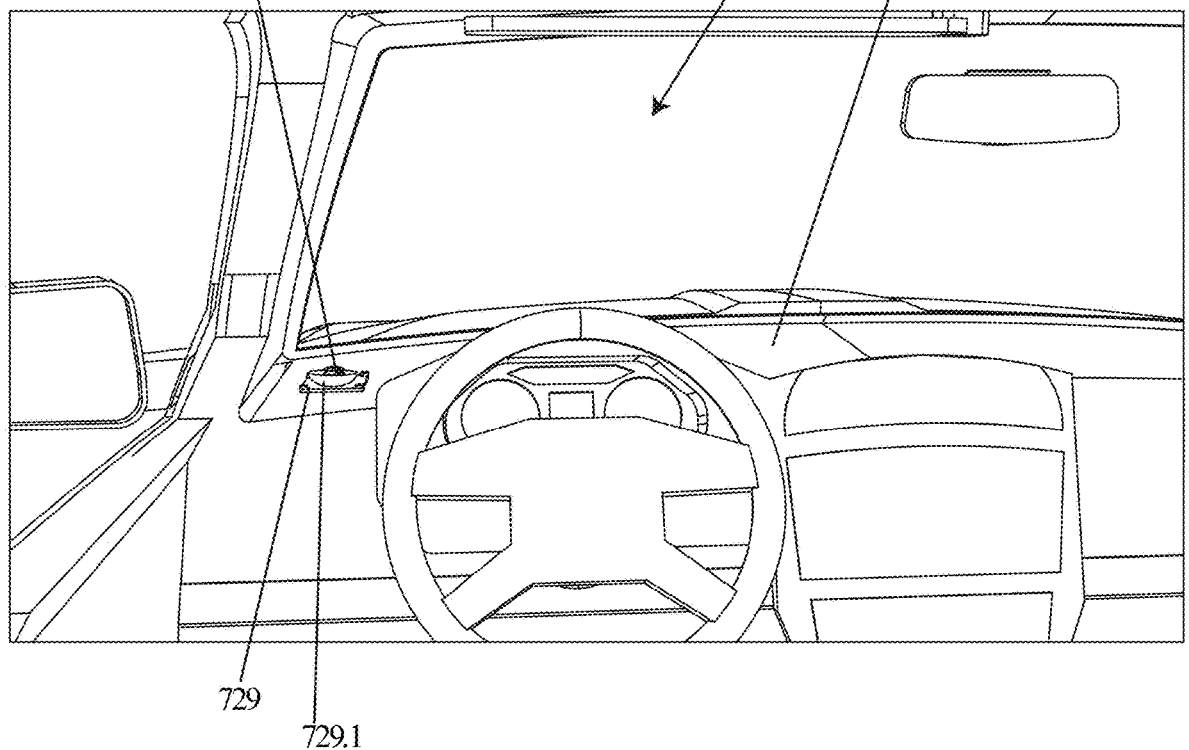
FIG. 42C is a view of the inside of a vehicle having another embodiment.

FIG. 42B shows a front perspective side view of the three dimensional projector plane 720. For example, this view shows the reflective surface 723 on base section 722 This reflective surface can have different angles of extension such that base section is not entirely planar. Thus the different projectors 724, 725, 726 and 727 can be used to project on these different angled surfaces to create images and reflections of images to create the appearance of a three dimensional image.

Figure 43A:
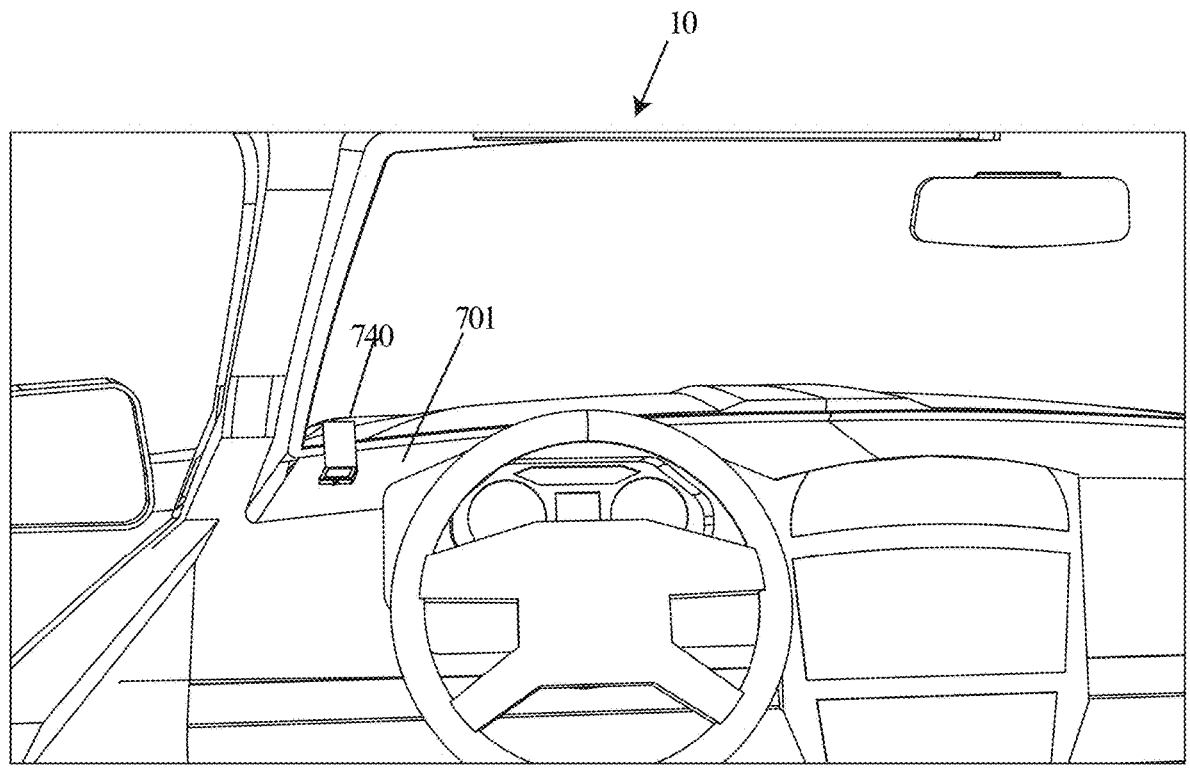
FIG. 43A is a view of an inside of a vehicle having another embodiment.

FIG. 43A shows a view of an auto which has another embodiment 740 positioned on a dashboard surface 701. This embodiment is shown in greater detail in FIG. 43B.

Figure 43B:
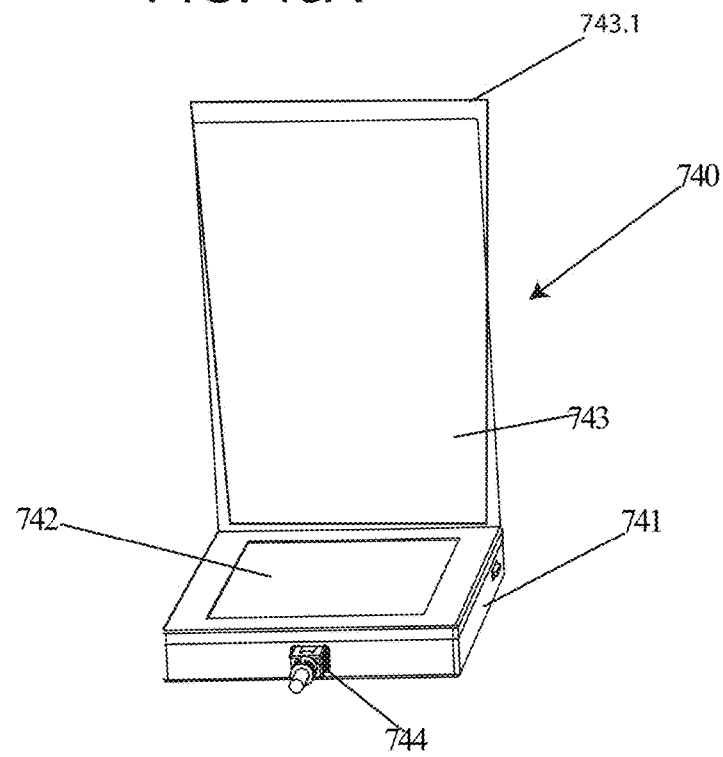
FIG. 43B is a view of the display system of FIG. 43A.

Thus FIG. 43B shows an image of an embodiment which is a screen 742 which is housed inside of a housing 741. There is a reflective screen 743 which extends up at an angle from screen 742. This reflective screen 743 is configured to reflect the image shown in screen 742. This screen acts as a projector displaying the image from the screen up to the reflective screen 743. Because screen 742 is configured to create a reflective image the image presented on the screen is modified to be readable by the user on screen 743. In addition, this device is connected to a cable 744 via a suitable cable connection, such as an Ethernet connection which is configured to provide both power and communication to the device. In at least one embodiment, the surface of the reflective screen 743 is made from a substantially transparent or semi-reflective surface. In another embodiment it could be a reflective screen. Thus, as shown by the dash-dotted lines there is another backup screen which can be used as well. This back up screen 743.1 is a solid backed screen which folds down separately from screen 743. This back up screen 743.1 is on a separate hinge 746.2 shown in FIG. 44B.

Figure 44A:
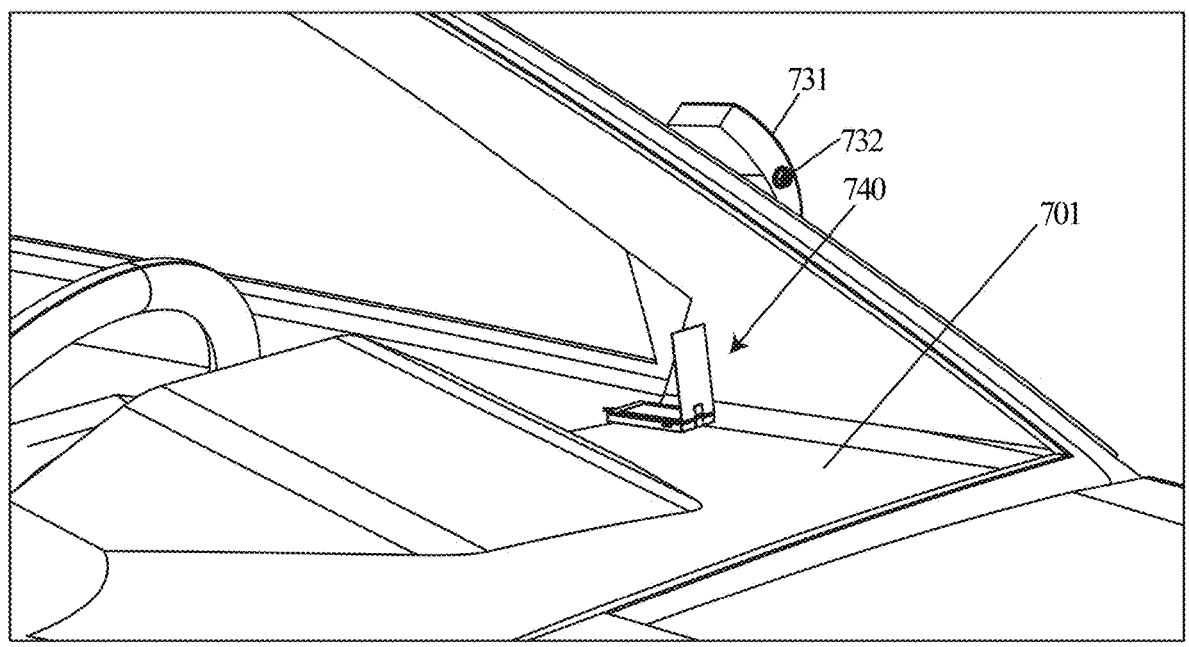
FIG. 44A is a view from outside the vehicle of the embodiment of FIG. 43A.

FIG. 44A shows the device 740 positioned on a user's dashboard. This view also shows side mirror 731 having a camera 732 positioned thereon. This camera as indicated above can work along with camera 719 or any other camera in the auto or this camera can work independent of this camera.

Figure 44B:
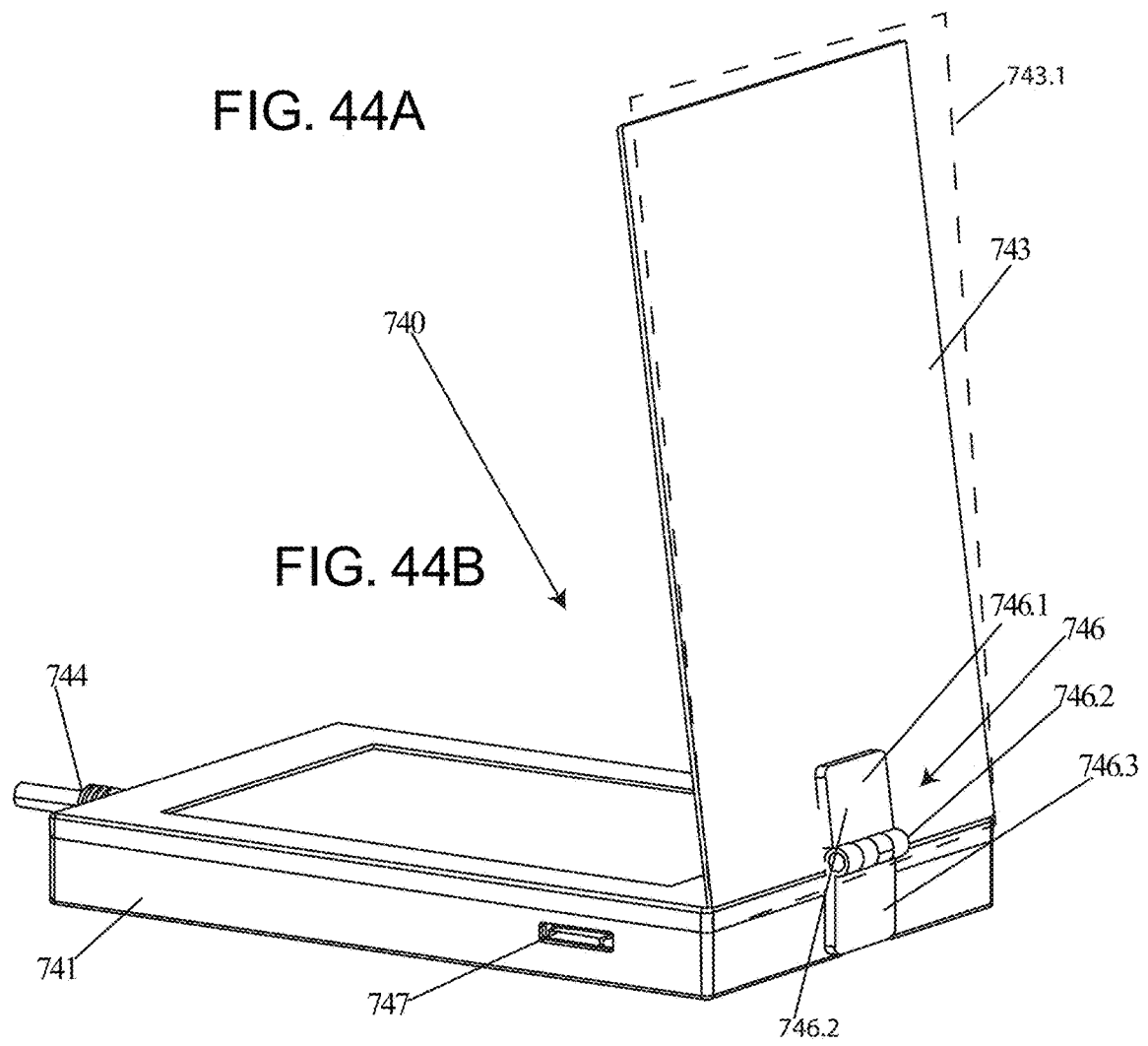
FIG. 44B is a back view of the display system of FIG. 43B.

FIG. 44B shows a back view of the device 740 which includes a body section 741, screen 743, a hinge 746 which has three main parts. First there is a first plate 746.1 a hinge section 746.2, and a third plate 746.3. There is also a card reader 747 positioned inside of the body section which allows for recording of the images and storage of the images. Thus, this card can form a "black box" recording for the automobile.

Figure 45:
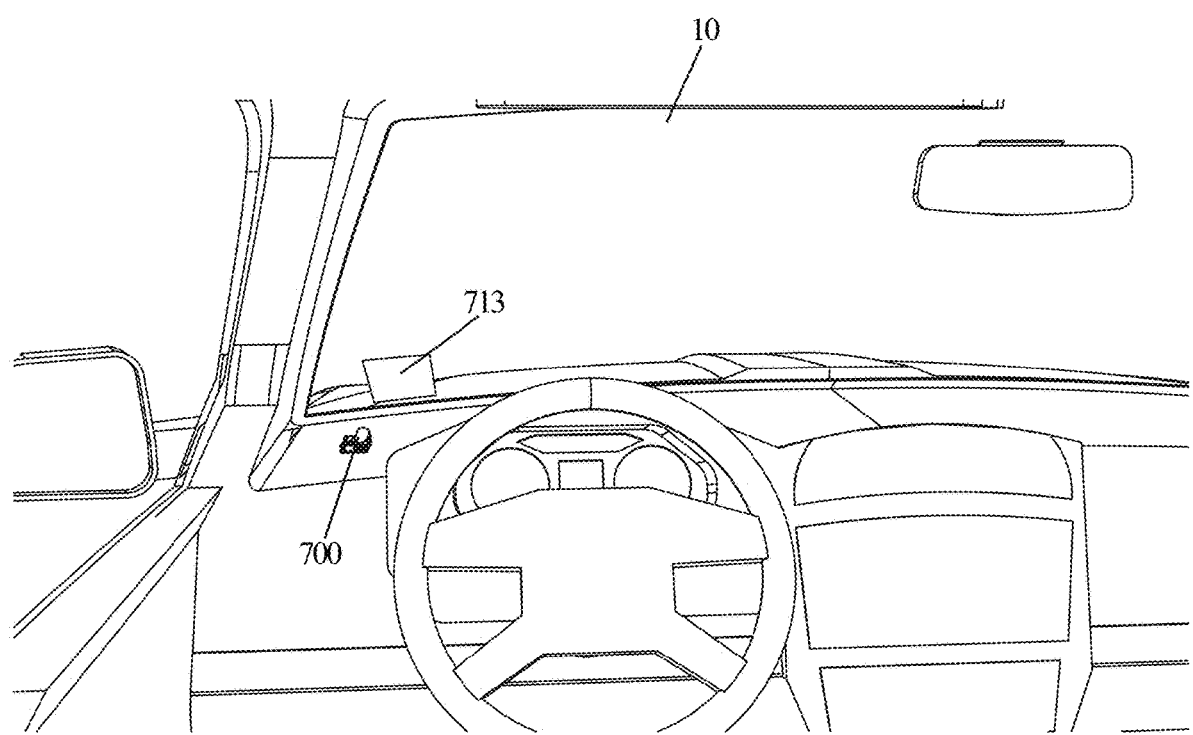
FIG. 45 is a view from an inside of a vehicle with another embodiment.

FIG. 45 shows another embodiment which shows a projector 700 which is configured to project onto a screen of reflective film 713 on a windshield 711 of an auto 10.

Figure 46:
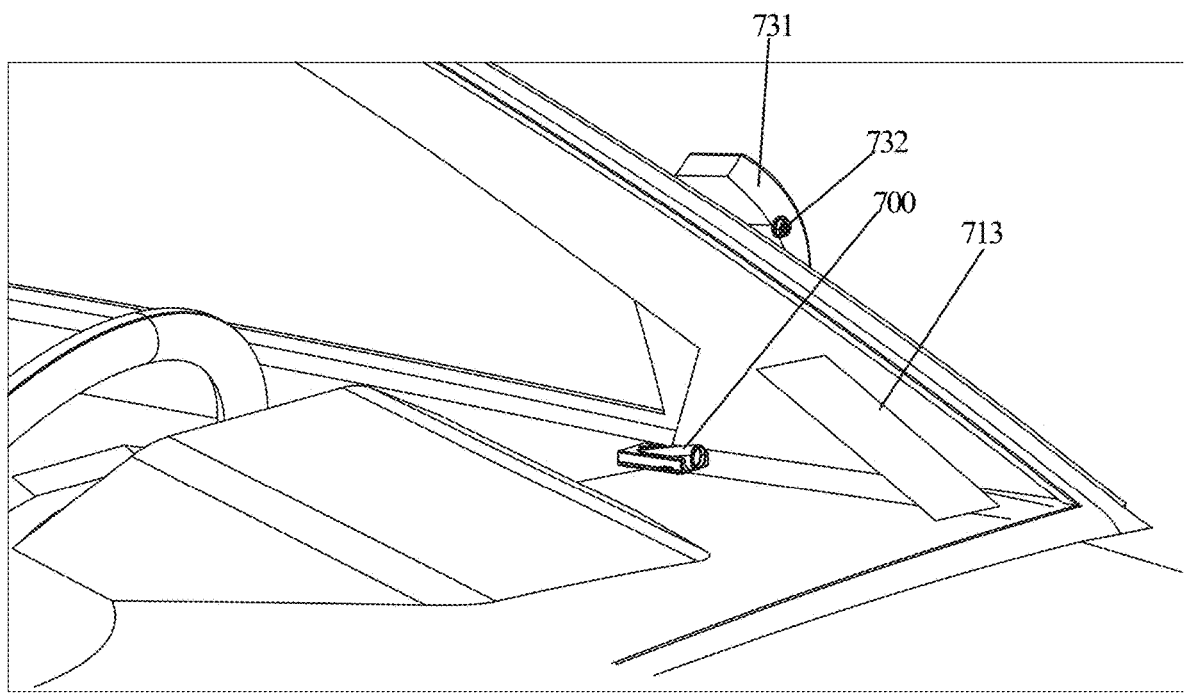
FIG. 46 is a view from outside the vehicle of the embodiment of FIG. 45.

FIG. 46 shows the reverse view of the projector 700 with the reflective film 713. This view also shows side view mirror 731 with camera 732. The film 713 is shown as smaller than film 712 such that the image required to show the necessary information may not need to be as large as shown with film 712. Thus, the film or 712 or 713 can be of any suitable size.

Figure 47:
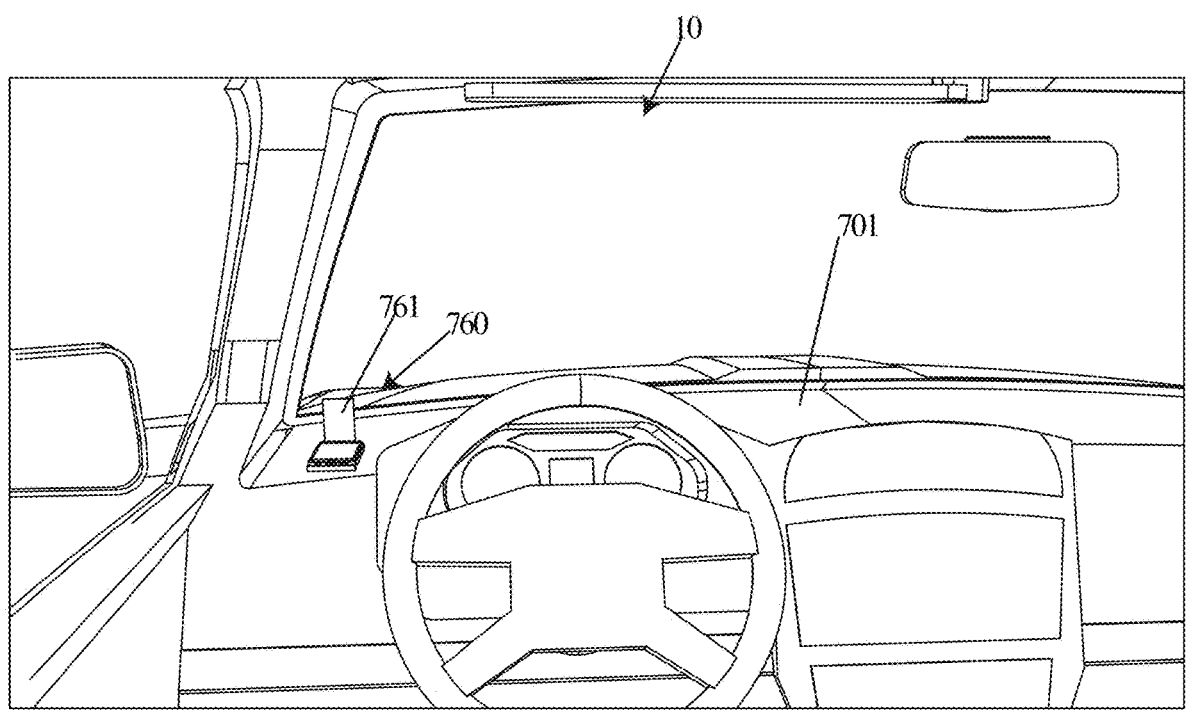
FIG. 47 is a view from an inside of the vehicle of another embodiment.

FIG. 47 shows an auto 10 having another embodiment 760 having a smaller screen 761. This device is positioned on the dashboard 701.

Figure 48:
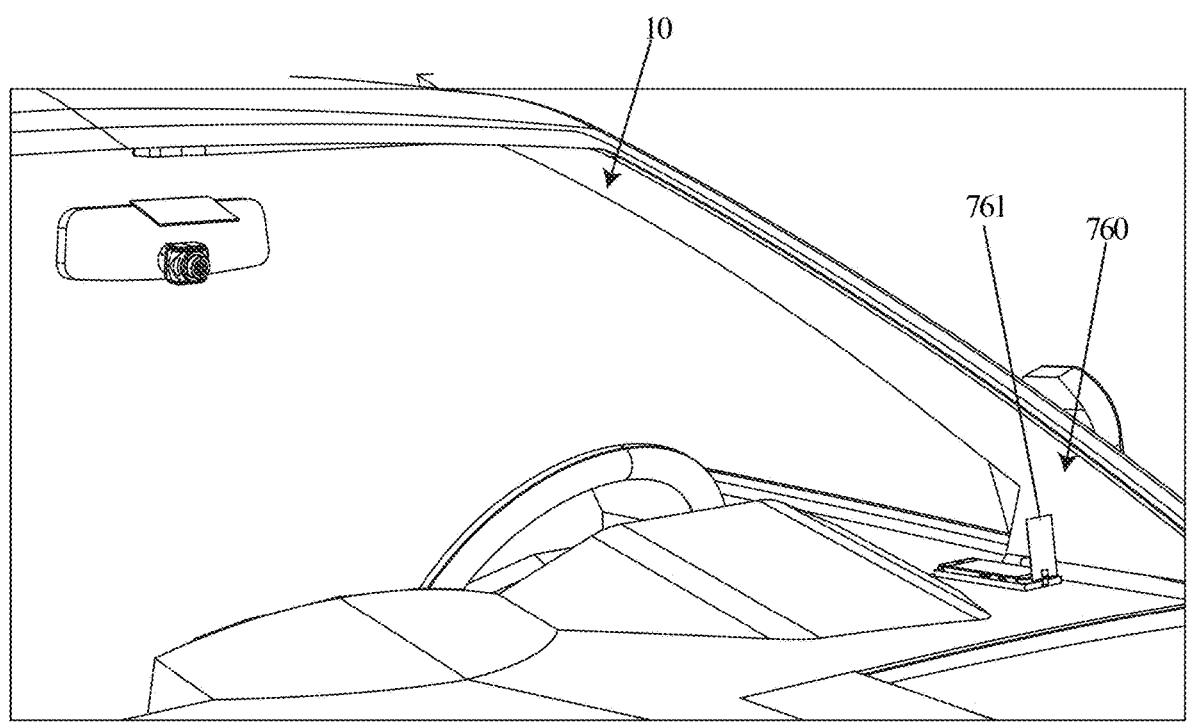
FIG. 48 is a view from outside of the vehicle of the embodiment of FIG. 47.

FIG. 48 shows an opposite view of the device having smaller screen 761. This device can be in the form of a portable phone such as a smart phone.

Figure 49:
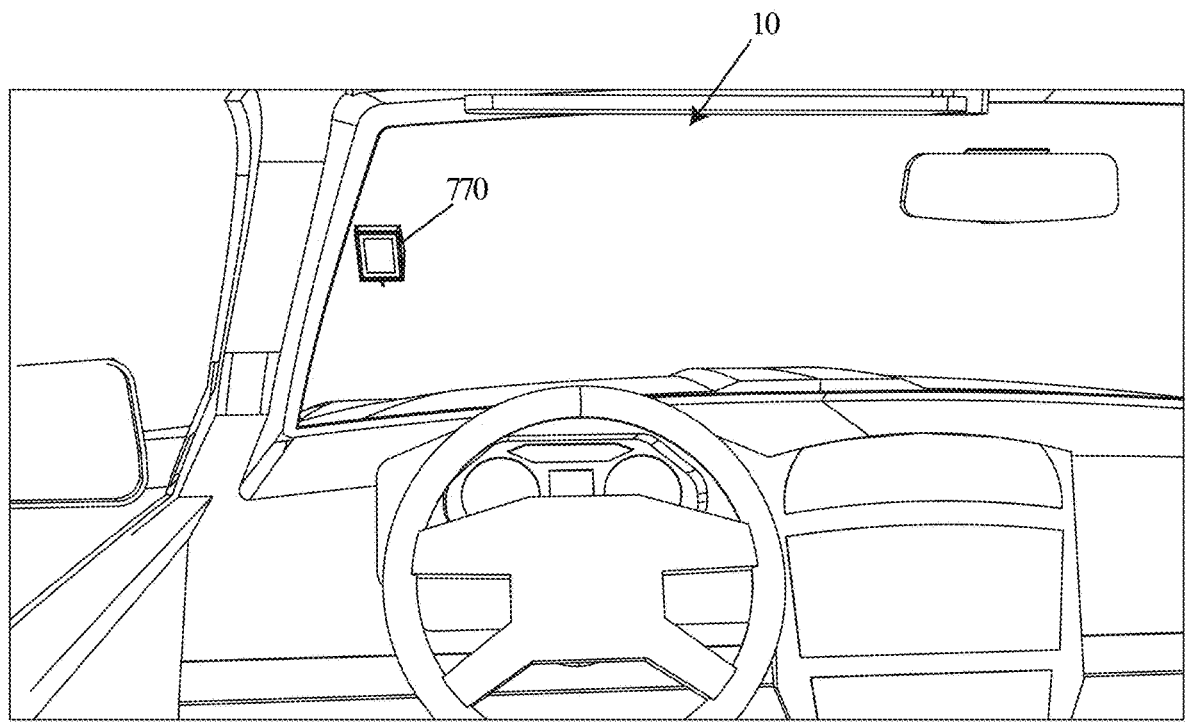
FIG. 49 is a view from inside the vehicle of another embodiment.
Figure 50:
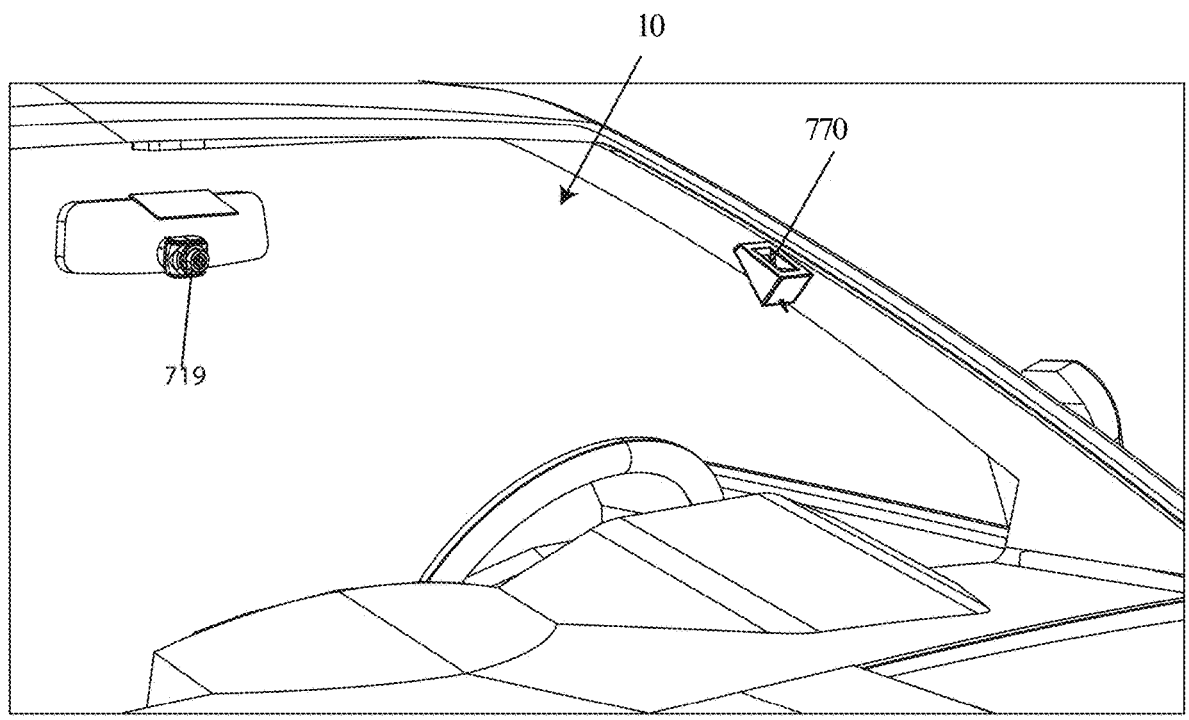
FIG. 50 is a view from outside the vehicle of the embodiment of FIG. 49.
Figure 51:
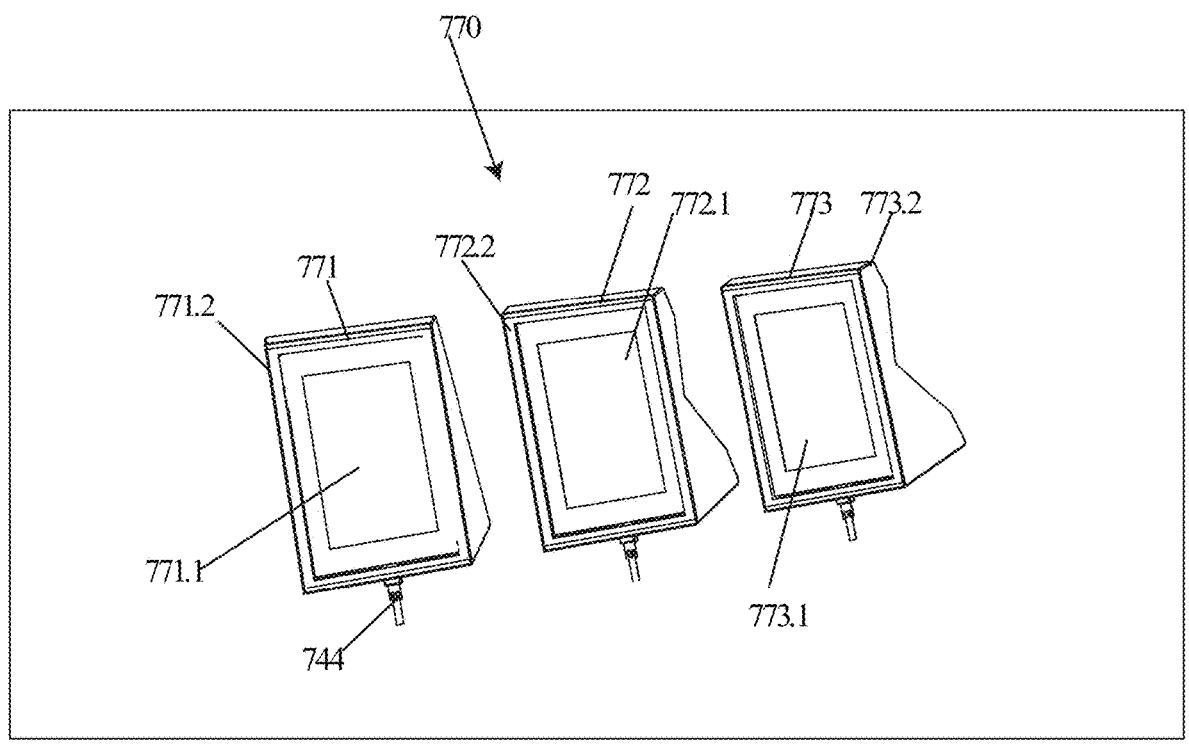
FIG. 51 is a view of an embodiment that can be used with the embodiment of FIG. 50.

FIG. 49 shows another device 770 which is positioned on a windshield of auto 10. This device 770 is shown in greater detail in FIGS. 50-52. For example, as shown in FIG. 50 there is a device 770 which has a recess. FIG. 51 shows different versions of screens 770. These different screens have a screen surface 771.1, 772.1, and 773.1. These screens also have respectively different screen bodies 771.2, 772.2, and 773.2.

Figure 52:
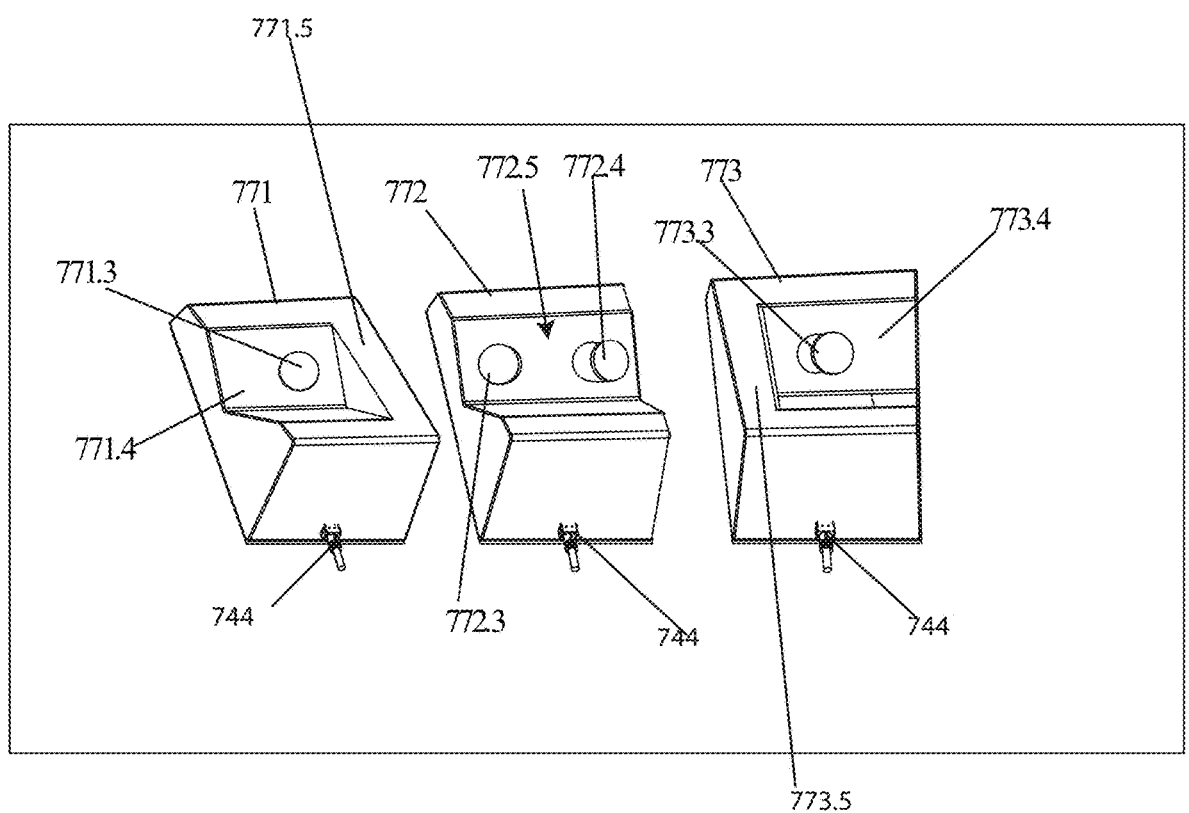
FIG. 52 is a backside view of the displays shown in FIG. 51.

FIG. 52 shows the opposite sides of these bodies. For example, screen 771 includes a first camera 771.3 and a recessed section 771.4. This recessed section includes a side shielding panel 771.5. Screen 772 includes two different cameras 772.3, and 772.4 and a recessed section 772.5. Screen 773 includes camera 773.3. This design includes a recessed portion 773.4 and a side wall 773.5. These different designs are configured to allow these screens and systems to record activities at different angles when positioned on a windshield of an auto. Each of these cameras are pivotable or rotatable in different directions to allow for different views by the user. In one embodiment, the cameras are movable by hand. In another embodiment the cameras are movable by remote control using a touch screen such as the touch display screen or by other remote control devices such as a joystick.

Figure 53A:
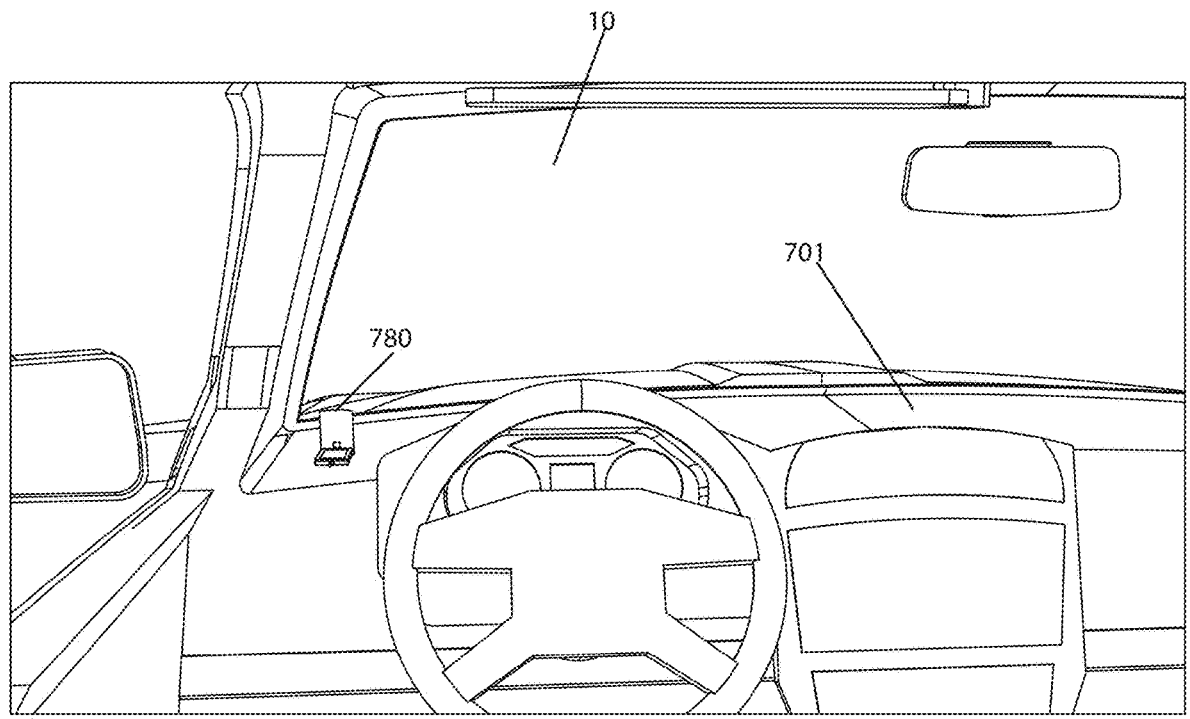
FIG. 53A is a view of the inside of a vehicle having another embodiment.
Figure 53B:
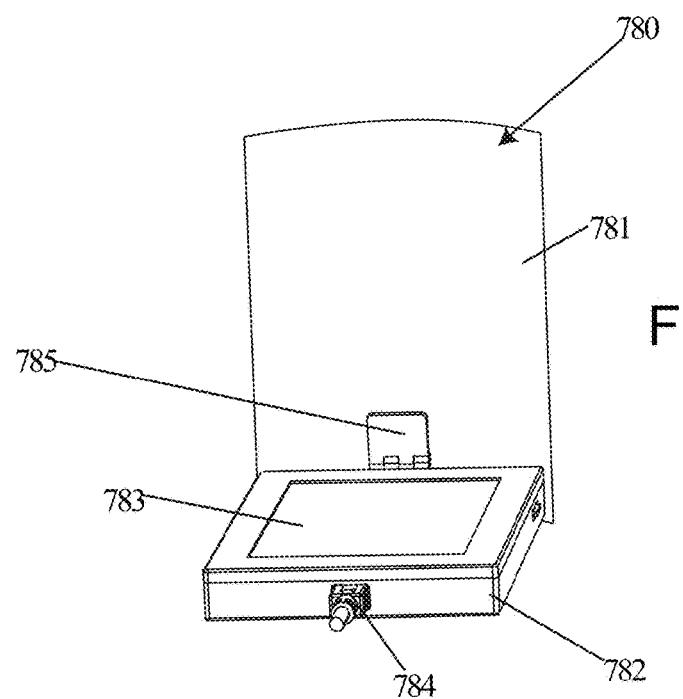
FIG. 53B is a view of the display component of FIG. 53A.

FIG. 53A shows a view of another embodiment 780 which includes a curved screen 781 which is attached to a body 782 of a screen 783. There is also a cable connection 784 coupled to the body section 782.

FIG. 54A shows a back view of the device 780 while FIG. 54B shows a view of the screen 781 which is curved. This screen is curved to help create a three dimensional (3-D) image on the screen due to the concavity of the reflective screen. In addition, this view also shows a card connection 786 disposed inside of body 782.

Figure 55:
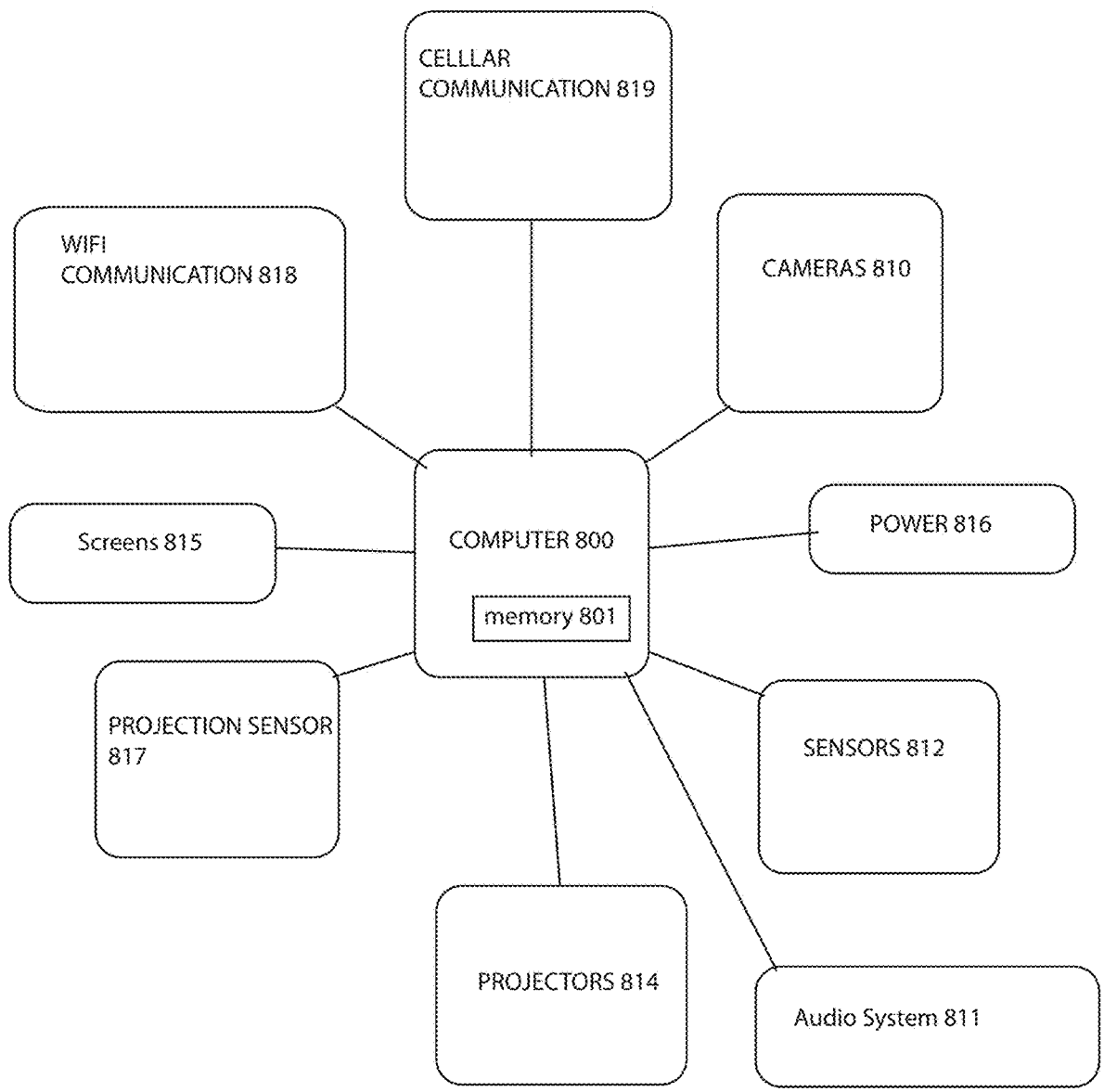
FIG. 55 is a view of the electronic network of components that can be used with any one of the above embodiments.

FIG. 55 shows an alternative embodiment for a computerized network of components which is designed to fit any one of the above identified embodiments. For example, in this embodiment, there is a computer 800 which is configured to coordinate the information taken in by any one of cameras 810. In at least one embodiment this computer includes a memory 801*a* which is configured to store both images and moving images taken by at least one camera such as cameras 810. Computer 800 also includes a microprocessor 801*b*. Cameras 810 can be any one of the above identified cameras such as for example camera 719 or camera 732 shown in FIG. 42A or FIG. 44A respectively. There are optional sensors 812 which can be placed around the vehicle and which can be used to determine the presence of an object along with the cameras 810. These sensors can send an infrared beam, a wifi signal or any other type of suitable signal which determines the presence of objects around the vehicle. In addition, there are optional projectors 814 which can be any form of suitable projector listed above such as but not limited to the projector device 700 or 710. Furthermore, there are optional screens 815 which can take the form of any suitable screen mentioned above in any one of the above embodiments. In addition, coupled to computer 800 is a power supply 816 which is configured to power computer 800.

If the projectors 814 are present, then there can be a projection sensor 817 which can represent projection sensor 708 which is used to allow the projector to properly focus the image based upon a distance from the screen.

There are also optional communication modules which can include any one of a wifi or bluetooth communication module 818 or a cellular communication module 819. These communication modules allow the information from computer 800 to be communicated to other components such as to a smart phone or to a server.

Figure 56A:
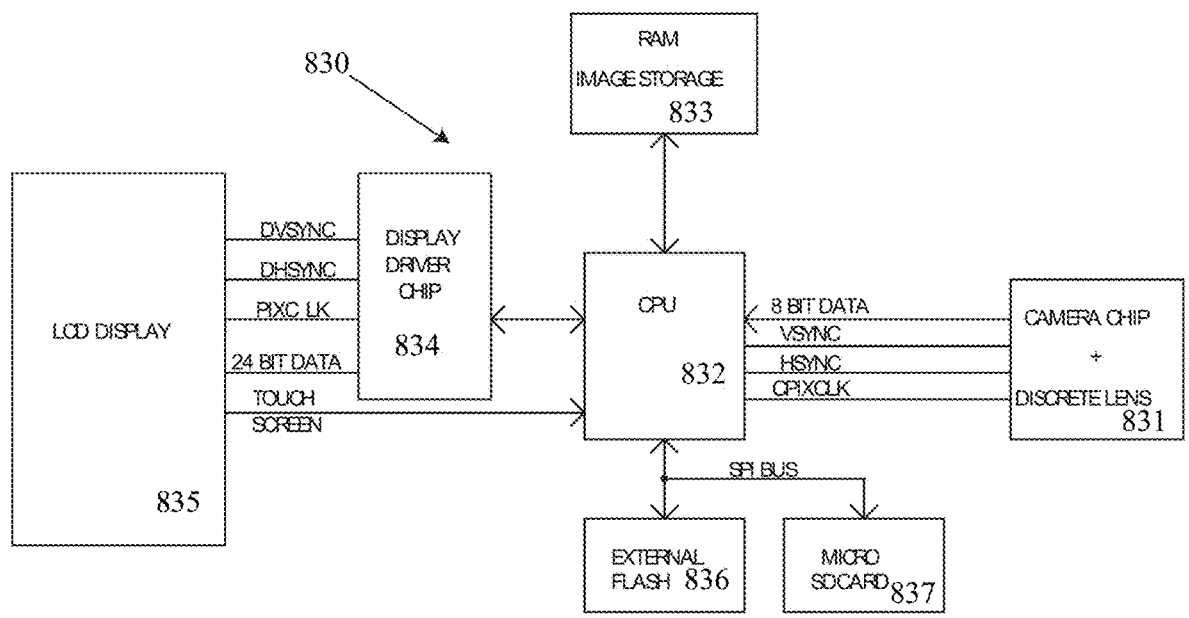
FIG. 56A is a block diagram of a camera system.

FIG. 56A shows a block diagram for a design for a camera which can be an example of a camera that can be used as any of the above mentioned cameras such as cameras 100, 120 and substituted for the corresponding components in FIG. 37. For example, there is an embodiment 830 which has a camera chip and discrete lens 831 which is coupled to and in communication with a central processing unit (CPU) 832. This CPU 832 is coupled to a ram storage 833, and also to external or removable storage in the form of an external flash 836, and an optional micro SDCard 837. In addition, coupled to the CPU and in communication with this CPU is a display driver chip 834 which is also in communication with an LCD display 835. LCD display is also in communication with CPU as well. The pictures as well as motion video can be recorded either in memory on the memory 801 of computer 800 or it can be recorded on the SD Card 837 or on the external flash 836.

The camera can be a CMOS e2v camera with any suitable resolution such as HD resolution of 1280×1024, an 8 bit resolution depth and 1.3 megapixel in memory. The Sensor model can be a EV&6560BB or EV76560B. The lens can have a focal length of 4.2 mm and a relative aperture of F3.0 to create a relative sensor size of 1/2.5 "with a total length of approximately 21.50 mm with an angle of view of 69 degrees×51 degrees.

Figure 56B:
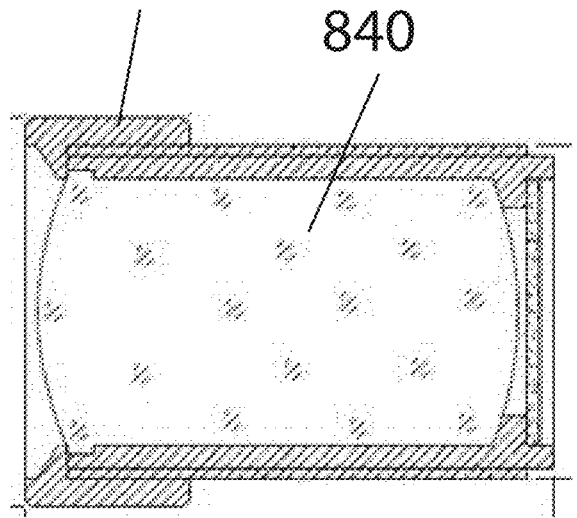
FIG. 56B is a view of a lens system.

An example of the lens is shown in FIG. 56B which shows a lens 840 with its holder or mount 841 having a mount size of M12×0.5 mm. It is noted that this camera and lens system is simply one embodiment which is a preferred embodiment but the claims are not to be limited to any of the specifications cited herein.

Figure 57:
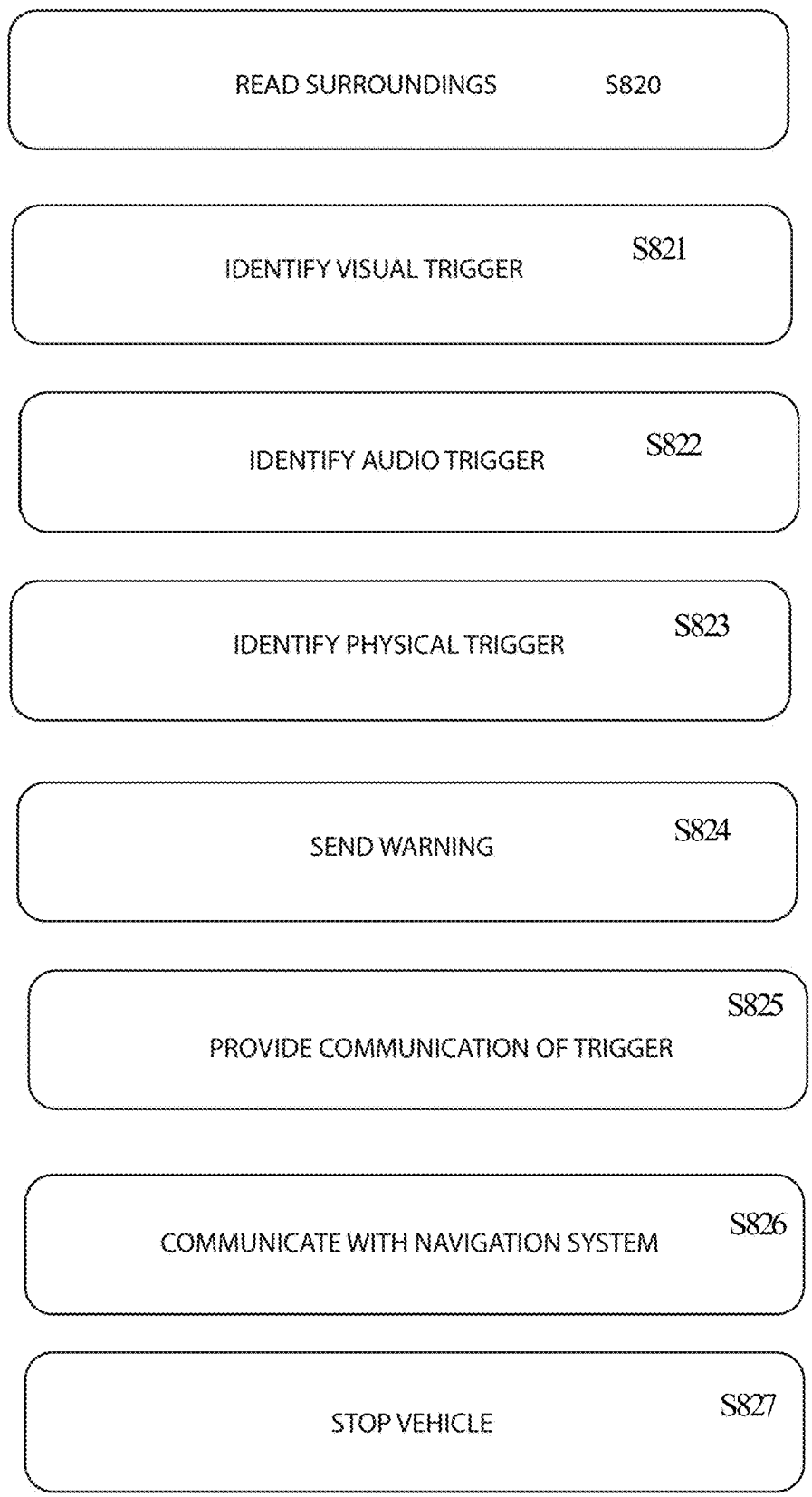
FIG. 57 is a flow chart for identifying objects.

FIG. 57 is a flow chart showing the steps for controlling an automobile or vehicle using for example the components listed above including but not limited to the components listed or referenced in FIG. 55 or even FIG. 56.

For example, FIG. 56 starts with step S820 which includes reading the surroundings of the environment using any one of the cameras 810 or sensors 812 for example. In addition, other components such as the wifi communication module 818 or the cellular communication module 819 can be used to track location or distance to other objects in the surrounding area. Furthermore, any one of the cameras 810 can also be used to identify the objects in the surrounding area. All of these components can feed information into computer 800 which is then configured to read these visual images and sensory clues to identify the objects surrounding the vehicle.

Next, in step S821 the system, in particular the computer can identify visual triggers in step S821 to identify whether the objects are of concern for the driver and to identify the distance that the vehicle is from these proposed objects.

Next, in step S822 the system can also identify audio triggers as well to determine from this information the operations around the vehicle. Thus the sensors 812 can be audio sensors as well.

Next in strep S823 the system can identify the physical trigger via sensors as well. This physical trigger can be for example physical contact by an object on the vehicle which causes the sensors such as sensors 812 to react. Thus, these sensors can be in the form of tactile sensors as well.

Next, in step S824, the system comprising computer 800 can send a warning which can be an indication sent from a projector 814 or information sent to a screen 815 as well. In addition, this warning can also be in the form of an audio warning as well either through a voice warning or through a beep generated through the vehicles audio system 811.

Next, in step S825 the system can provide a communication of the trigger such as an image of a body on a screen, or a voice indication of the location of the body or shape of the body or type of the body.

Next, in step S826, the system can communicate with the vehicle's navigation system to identify on the navigation system the location of any of the potential triggers as well.

Next, in step S827, the system including computer 800 can stop the vehicle from moving to prevent any accidents by the user.

Thus, above there is disclosed many different embodiments which are designed to provide a self-contained vehicle warning system which is configured to warn users of impending collisions or interactions with other bodies around them such as other autos or pedestrians. It should be noted that any one of the above cameras in any one of the above embodiments can be used in any one of the other embodiments. In addition, any one of the above screens in any one of the above embodiments can be used with the other embodiments. Furthermore, any one of the above components with any one of the above embodiments should be construed as optional unless stated as being required within the system.

Another embodiment includes a design having another screen which is a curved screen 2002 which is configured to fit around a post 2001 of an automobile 1000. In this case the screen 2002 covers substantially all of the post or the entire post. To power the screen 2002, there is a cable 2006 which extends down into the automobile 1000 and which is connected to the internal computer system of the automobile. The screen 2002 is therefore connected to the automobile for power as well as for communication with an associated camera such as camera system 250 or any other camera system disclosed herein.

FIG. 58B shows a top view of a curved screen 2012 which shows connection points having connectors 2004, and 2010 which are configured to secure the screen 2002 to a post. These connectors can be an array of any suitable kind of connectors known in the art such as male based connectors, female based connectors, a hook and loop fastener, a post, an adhesive, a rivet, a screw, a nut and bolt a nail or any other type of suitable connector or fastener. Connected to the back face of the screen is at least one motherboard 2008 which is connected to cable 2006. Motherboard 2008 receives power from cable 2006 as well as communication from cable 2006 to receive signals from a camera such as any one of the cameras disclosed herein. The screen is positioned on post 2001 so as to provide an image of the field behind this post.

As shown in FIG. 58C, this field of vision shown by the field of vision 2020 is shown in dashed dotted lines. This field of vision for the cameras then compensates for the loss of vision for the driver because the post such as post 2001 is blocking the field of view for the driver. This field of vision is at least substantially bound by the latitudinal line bisecting the auto 1000*i* and the longitudinal line 1000*ii* of the auto forming a front left quadrant of view off of the automobile. Other quadrants can also be covered such as a front right quadrant in field of vision 2021 as well. Different arrays of cameras can be used such as cameras 2100, 2102 and 2014 which are positioned in the front right post, to provide the field of vision of the front right field of vision 2021. Alternatively, cameras 2016, 2108 and 2110 embedded in a front left post are configured to provide the field of vision in the field 2020.

Figure 59:
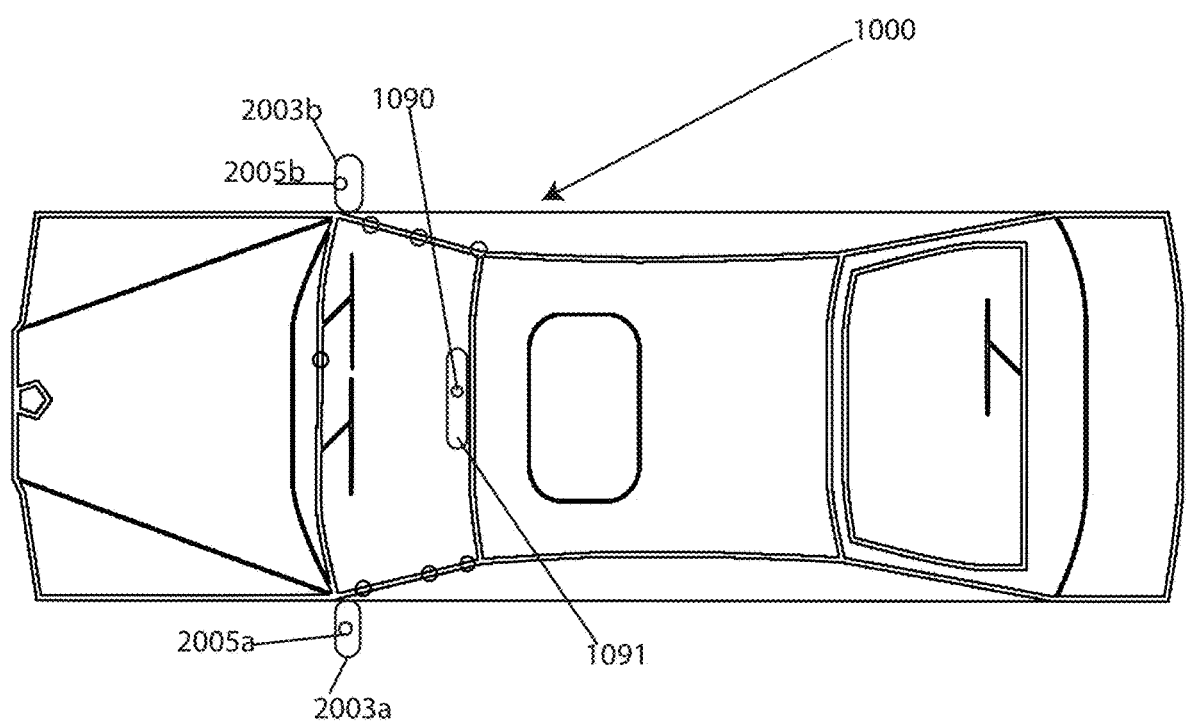
FIG. 59 is a top view of another embodiment of the automobile.

FIG. 59 shows side view mirrors 2003*a* and 2003*b* which have embedded cameras 2005*a* and 2005*b* which are also configured to provide for the respective viewing fields 2020 and 2021 for automobile 1000 shown in FIG. 58C. In addition, this view also shows an additional camera 1090 which is angled to point upward so that a driver can have a view of a light above him. The camera is angled off of the rear view mirror 1091 so that a driver who is sitting behind the wheel of an automobile who has pulled up to a stop light but whose view is blocked by an auto's roof can still have access to the state of the light by viewing in a screen, such as the rear view mirror, the field of vision of the camera 1090. This field of vision can be such that it is the field of vision directly above the automobile, such as automobile 1000.

Figure 60:
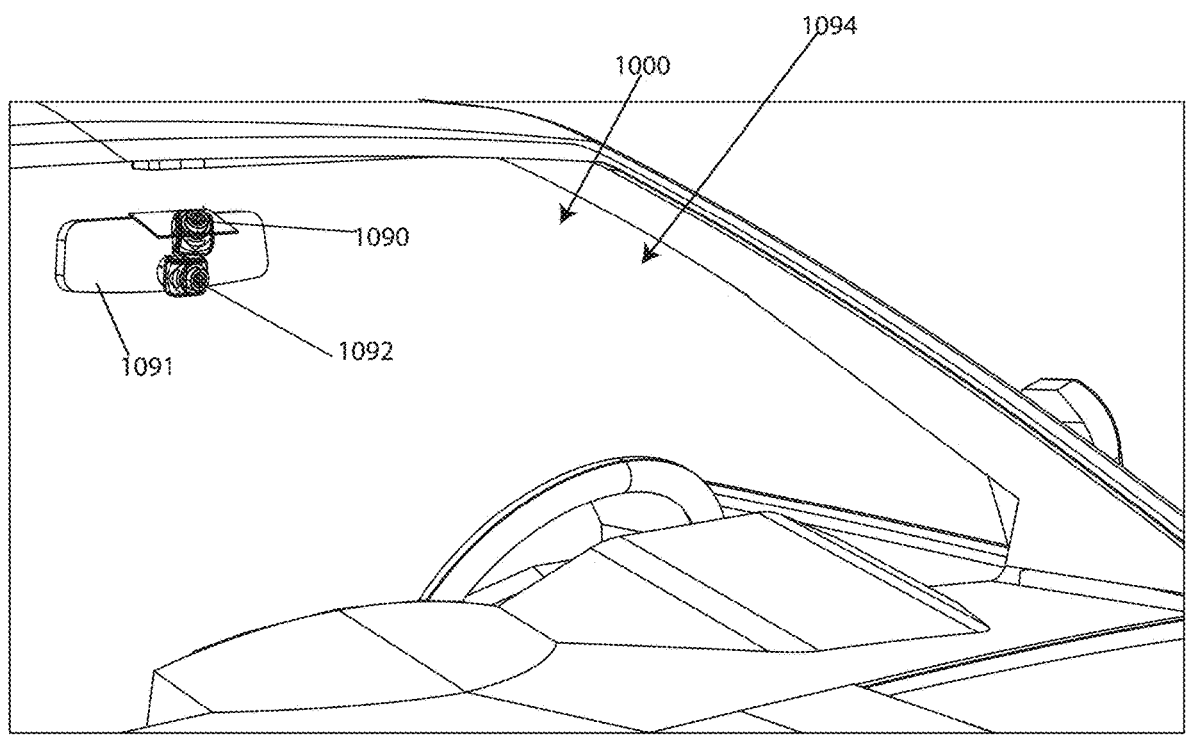
FIG. 60 is another view of the auto of FIG. 59.

FIG. 60 discloses a view of an auto 1000 which has a camera 1090 which is positioned to point up from a rearview mirror 1091 and which is positioned to point through windshield 1094 and towards a position above the field of vision of camera 1092 which is also positioned on rear view mirror 1091 as well. With this design, camera 1090 forms a part of a base for mounting rear view mirror 1091 to windshield 1094. Thus, with this design the camera is configured to provide the driver with a full view of a traffic light when the driver is positioned under the traffic light thereby allowing the driver to relax and not strain to look when the light turns green when stopped at a stop light.

Figure 61:
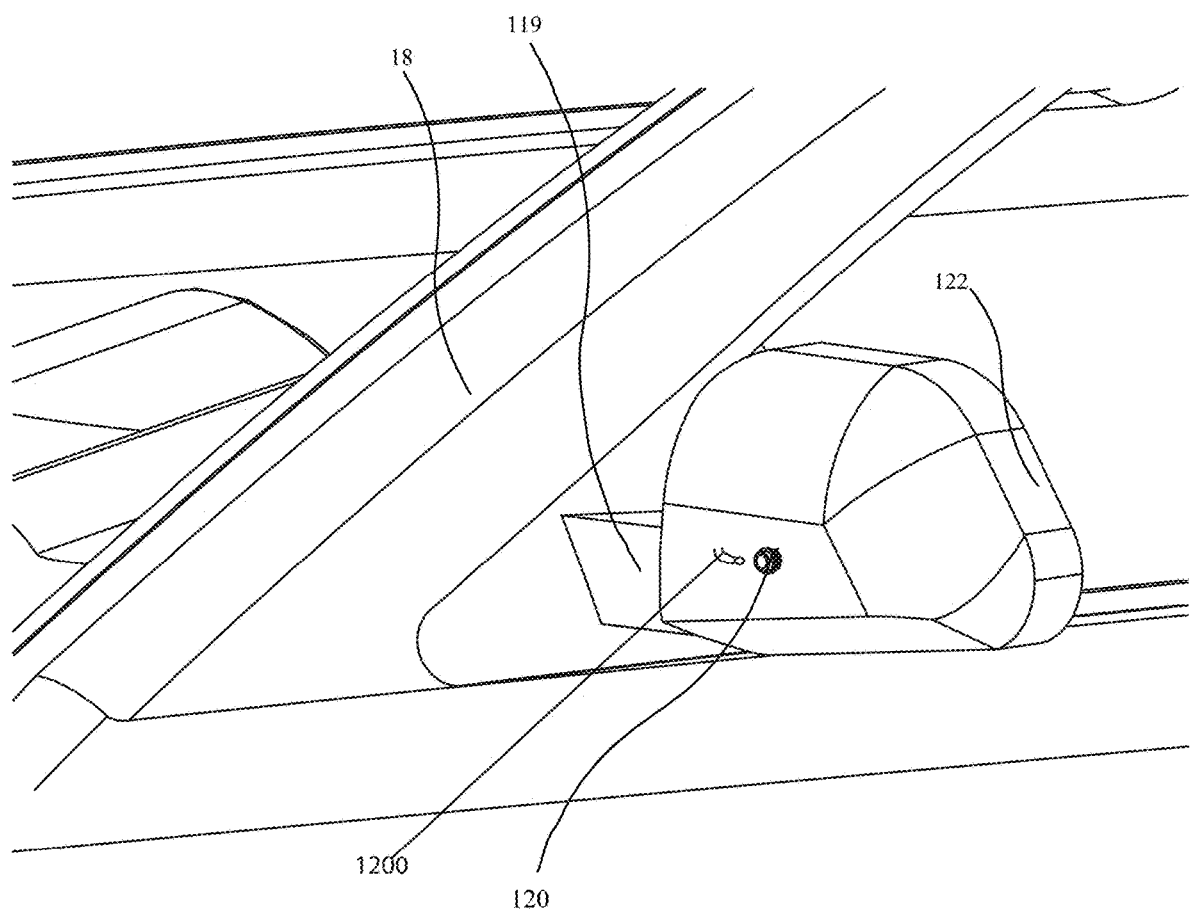
FIG. 61 is a side view of a cleaning system for a camera on a side view mirror.

FIG. 61 shows a new embodiment which discloses a blower system 1200 positioned adjacent to a camera 120 on a side view mirror 122. There is a camera cleaning system for cleaning a cover of the camera. The camera cleaning system can comprise any suitable cleaning system such as a blower or a wiper. For example, side view mirror 122 is shown connected to a post or column 18 via arm 119. The blower system 1200 can be used to clear any debris, condensation, water or other impingement from a front screen of the camera 120. The blower system 1200 can be in the form of a bent arm extending out from the side view mirror housing such as housing 122 shown in FIG. 62. The blower system can be configured to blow down on a screen or front cover for camera 120. Alternatively, camera 120 can have a wiper 1210 which is configured to wipe any impingement or any other type of debris, or condensation from the front of this screen. Wiper 1210 extends out from housing 122 and is driven by a drive arm which is disposed inside of housing 122.

Figure 62:
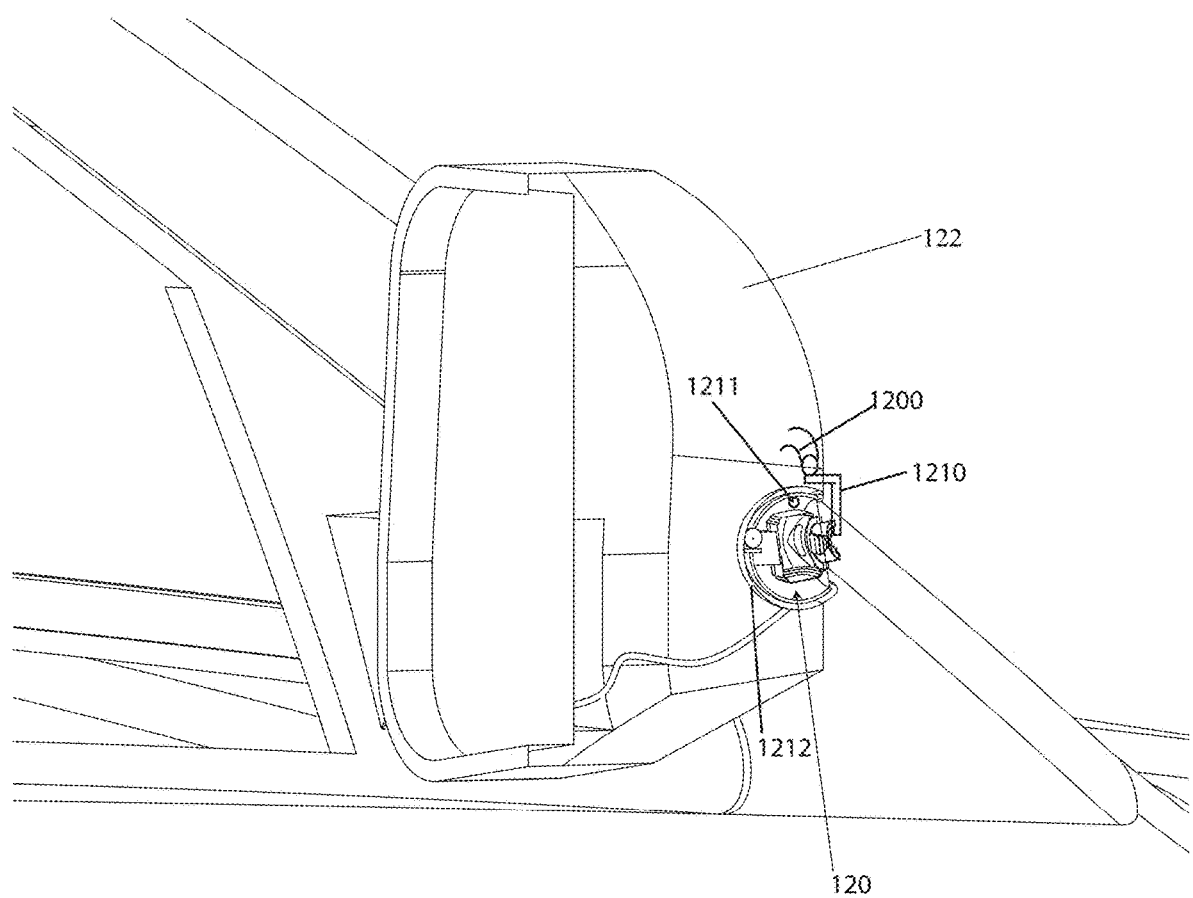
FIG. 62 is a side cross-sectional view of the cleaning system for a camera lens or cover.

In addition, as shown in FIG. 62 there is an additional camera cleaning system configured to clean a cover of a camera such as a glass or transparent cover. The cleaning system comprises a blower system comprising a blower 1211 which is configured to clean the inside of the camera housing and the inside surface of a camera cover (see for example cover 580*d* in FIG. 64) by blowing on the inside surface of the cover. With this configuration the blower blows on the inside of a glass surface to clear away any debris or moisture inside of the camera cover.

Figure 63:
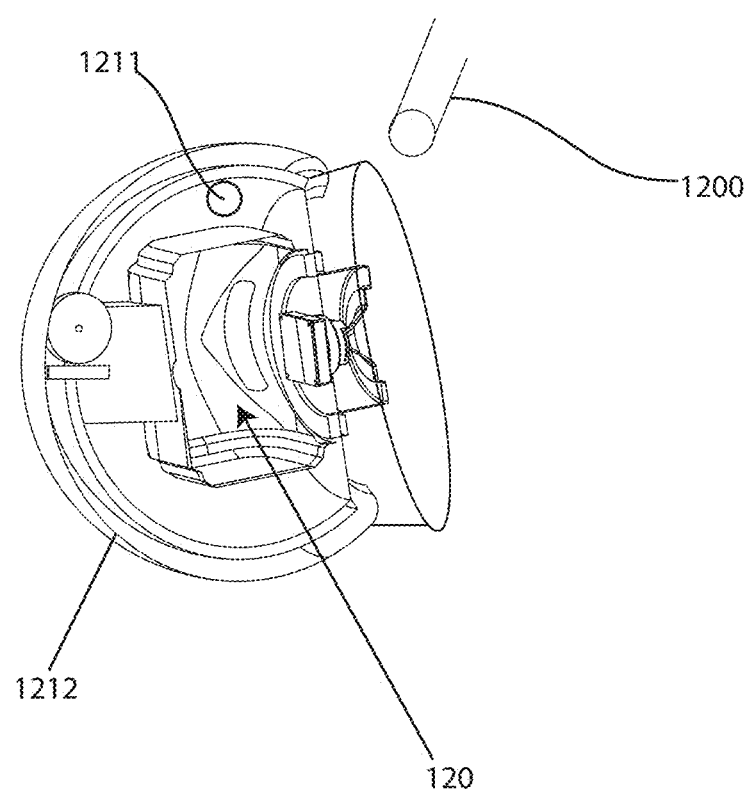
FIG. 63 is a close-up view of a cleaning system for a camera

FIG. 63 shows a more close up view of the blower system and the housing wherein there is shown exterior blower 1200 and interior blower 1211. Interior blower 1211 is positioned inside of camera housing 1212 while blower 1200 is coupled to an exterior body such as a mirror housing and is configured to blow on the outside of a camera cover such as cover 580*d*.

Figure 64:
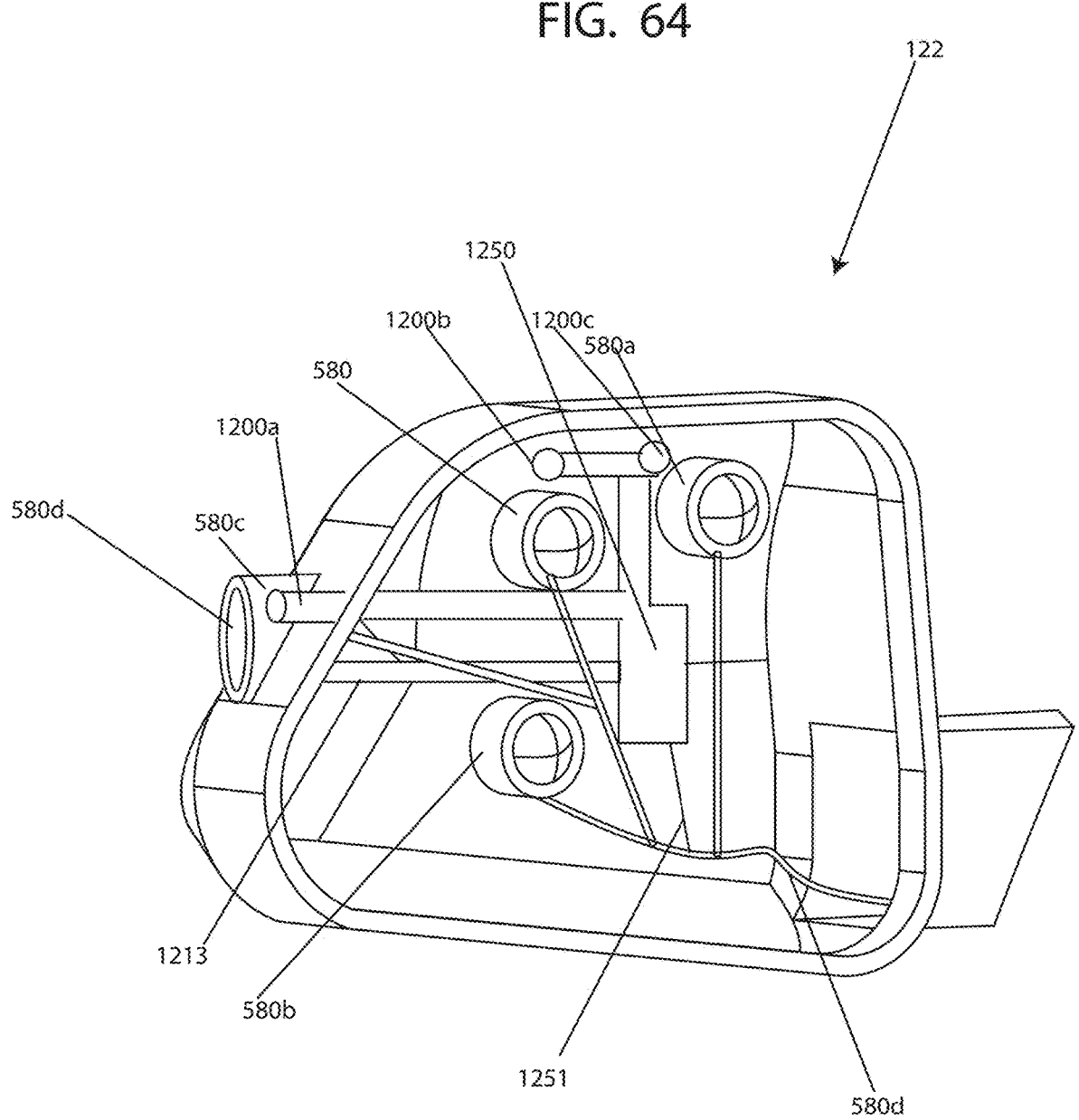
FIG. 64 is an inside view of a side mirror with a cleaning system.

FIG. 64 shows another embodiment of the blower system which is disposed inside of a housing 122. For example, there is shown blower vents 1200*a*, 1200*b*, 1200*c* disposed adjacent to camera housings 580*a*, 580, and 580*c*. Each of these blower vents 1200*a*, 1200*b*, and 1200*c* is fed by a main blower system 1250 which is powered by a power line 1251. The main blower is configured to provide air blown through these vents to clear any debris or other obstruction for any one of cameras 580, 580*a*, 580*c* or even camera 580*b* as well. The main blower system can blow air or other gas or even cleaning fluid onto the outside cover 580*d* of a camera via blower vent 1200*a* or the inside surface of the outside cover 580*d*—by blowing inside of the housing of a camera (See FIG. 62) and onto the inside surface of the cover to clear any debris or condensation.

Figure 65:
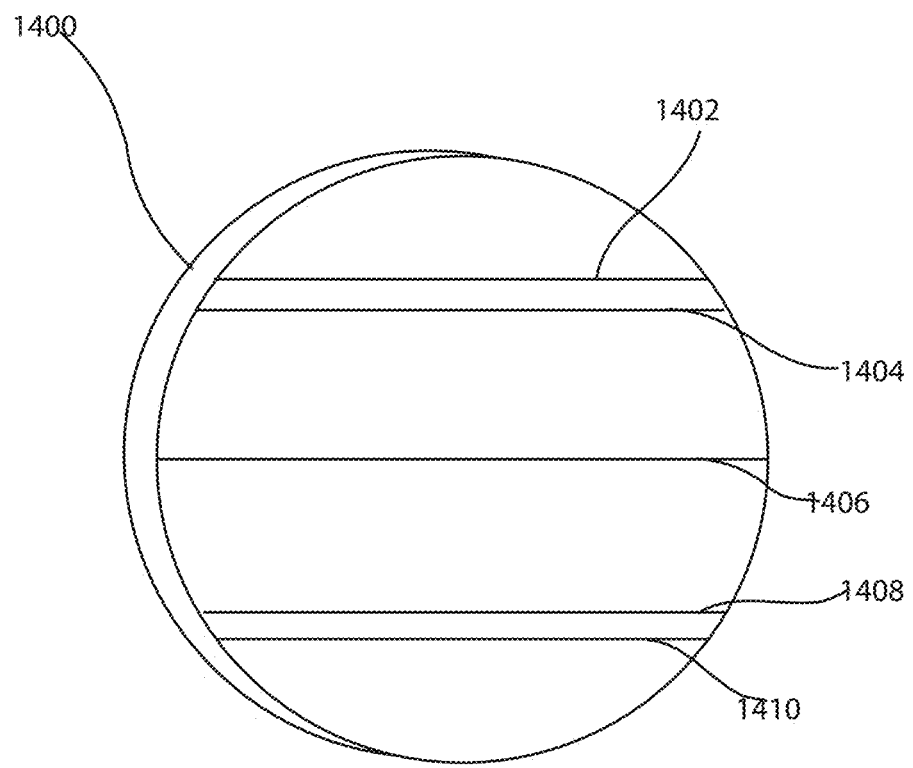
FIG. 65 is a view of a cover having heating fields disposed therein.

FIG. 65 shows a view of-another camera cover which is similar to camera cover 580*d* but this camera cover has a plurality of heating fields embedded in the cover. The heating fields are in the form of resistance wires which are heated by power generated by the automobile. The heating wires such as wires 1402, 1404, 1406, 1408 and 1410 are configured to receive power from the automobile electrical system. The wires are heated by electrical power flowing through the lines, the resistance in the lines resulting in causing them to heat up. Once these lines are heated they can be used to clear any condensation or moisture or frozen material from either the front or outside of the cover, or the inside of the cover. In this way the cover on the camera does not remain fogged if any condensation forms on it.

Figure 66:
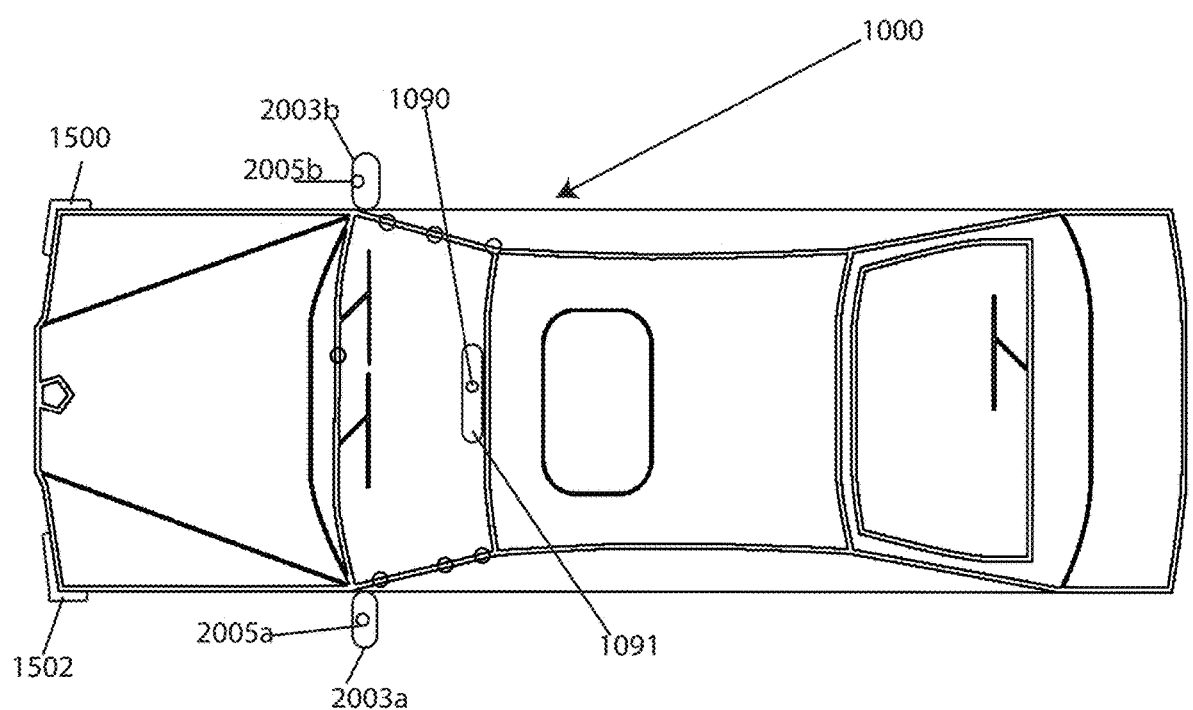
FIG. 66 is top view of an automobile having a particular headlight and side light combination.
Figure 67:
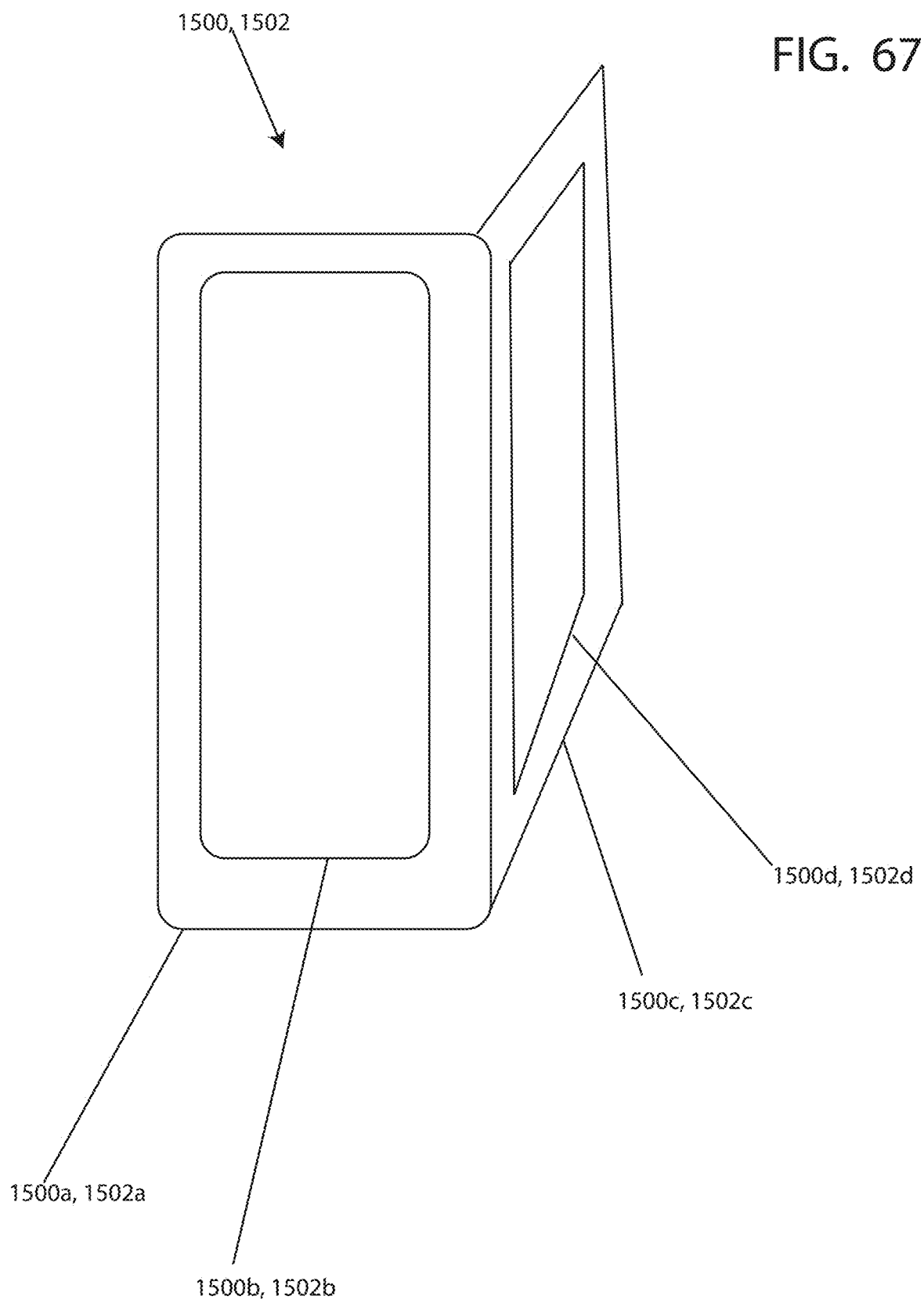
FIG. 67 is a close-up view of a headlight and sidelight combination.
Figure 68:
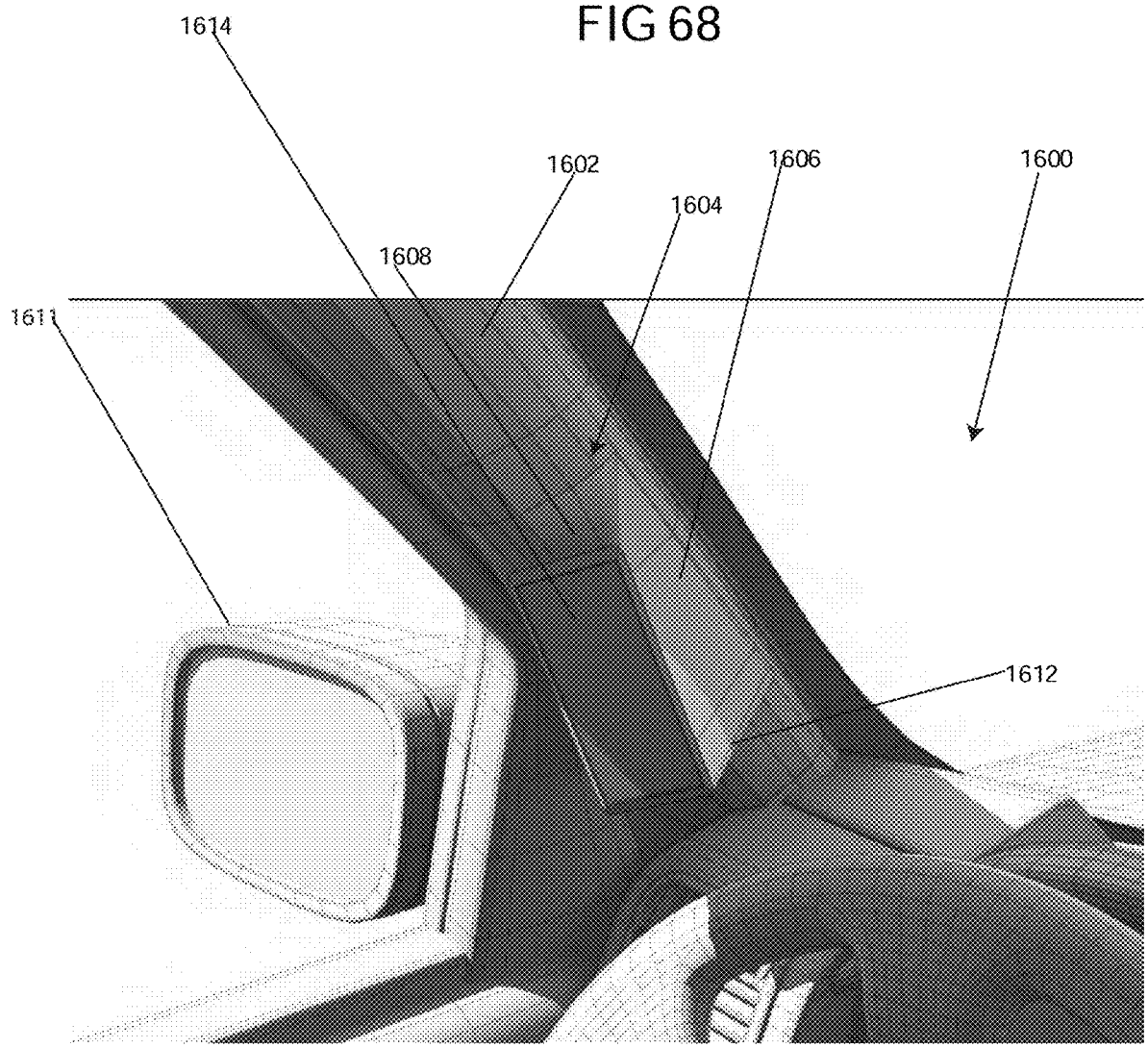
FIG. 68 is another view of another embodiment.

FIG. 66 shows a top view of an automobile which has new lights 1500 and 1502 installed on it. These lights are shown for example in FIG. 67 and can be selectively turned on or off by a user in the auto. For example, a first light fixture 1500—has two sides, that are substantially perpendicular to each other a first side 1500*a* and a second side 1500*c*. Inside of first side 1500*a* is a first light 1500*b*. Inside of second side is a second light 1500*d*. With light 1500, second light 1500*d* is a front light fixture which is primarily to light the road and surrounding area in front of the auto. The side light fixture 1500*b* is primarily to light a region to a side of the auto.

Similarly, with light 1502, it has two sides, a first side 1502*a*, and a second side 1502*c*. First side 1502*a* has a first light 1502*b*, second side 1502*c* has a light 1502*d*. With this design, first side 1502*a* houses a front light 1502*b*, while second side 1502*c* houses side light 1502*d*.

With both lights, the side light can be activated in at least one of the following ways. First the side light can be switched on by the user with a selective switch disposed inside of the auto. Alternatively, when the user pushed or activates his or her turn signal the side lights would provide a consistent stream of white light (non turn signal light) to light up a side of the automobile. Alternatively, if the user starts to turn his or her wheel, the side light could be activated once the steering wheel is rotated past a pre-set point. Another way that the light could be activated is by the camera such as camera 120 recognizing either a party (person) in a crosswalk adjacent to an automobile or another car adjacent to the automobile. This light could then be used to notify a person in the cross-walk that the car was about to turn. The bright light provided by the automobile directed towards the side of the automobile could then serve to let the driver know of the position of a person in a cross walk. This bright light would also serve as a warning signal to any party in a cross walk that an automobile was initiating a turn.

Figure 69:
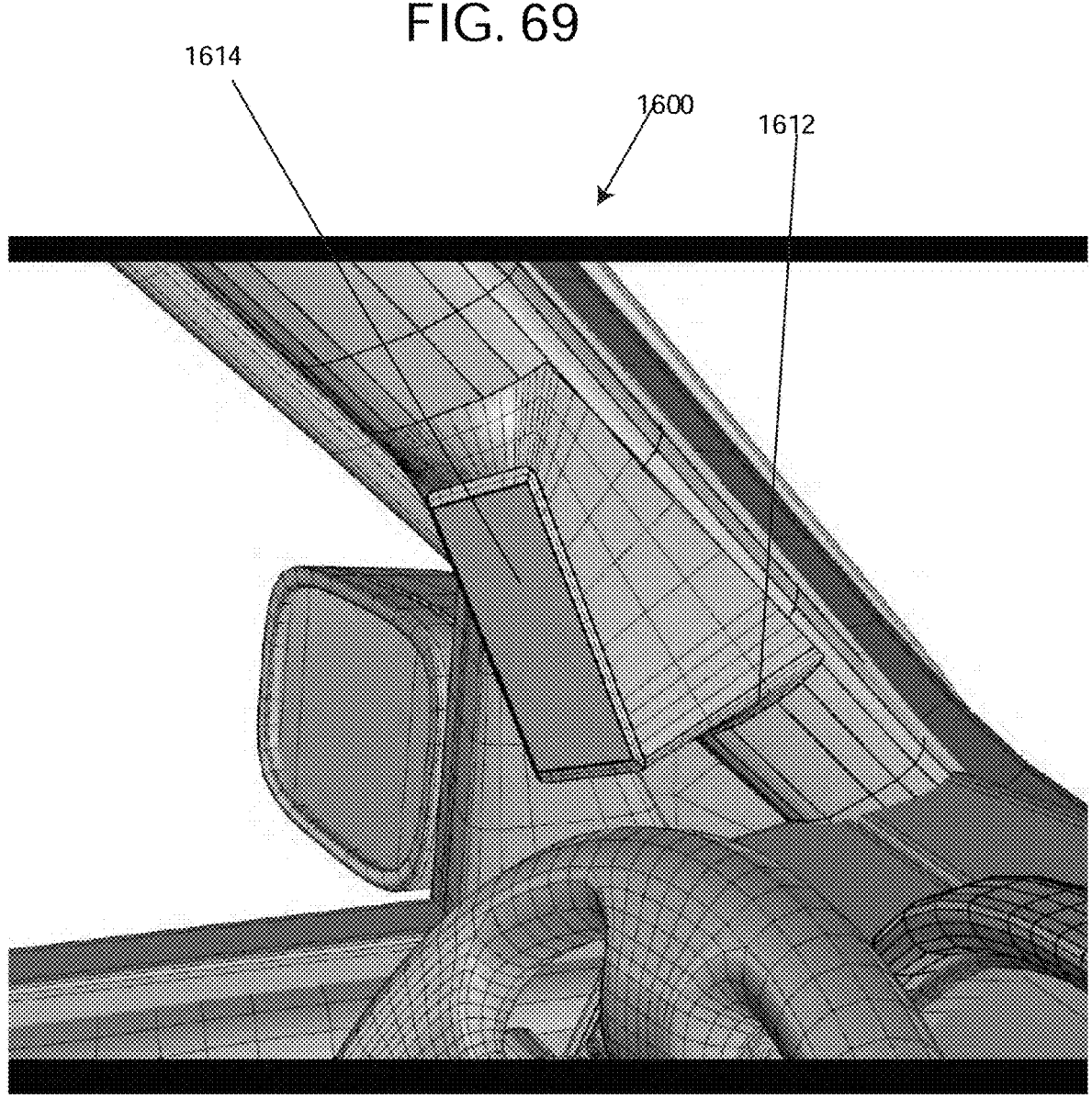
FIG. 69 is another view of the embodiment of FIG. 68.

Each of these side lights could be selectively activated individually so that a person positioned on a first side of a car would receive the bright light, but the oppositely positioned side light would then not be activated so as to not disturb other drivers. Similarly the turning of a wheel or the initiation of a turn signal in a particular direction would only activate the side light on one side of the car and not the other, Another embodiment of the invention relates to a embedded screen system 1600 that is formed are embedded in a post such as post 1602. For example, there is an electronic device 1604 that extends out from the post with are a plurality of different faces such as faces 1606, 1608, and 1612. There is also a front screen 1614 which is configured to display the view on the screen at an angle that is easier for the driver to see. The viewing on the screen 1614 can be associated with a camera that is embedded into a post such as post 1602 or a camera that is embedded into a side mirror such as side mirror 1611. FIG. 69 is a side view of the device 1600 which shows bottom face 1612 which extends out a sufficient distance from the post so that the video screen 1614 can have a substantially vertical orientation.

Figure 70:
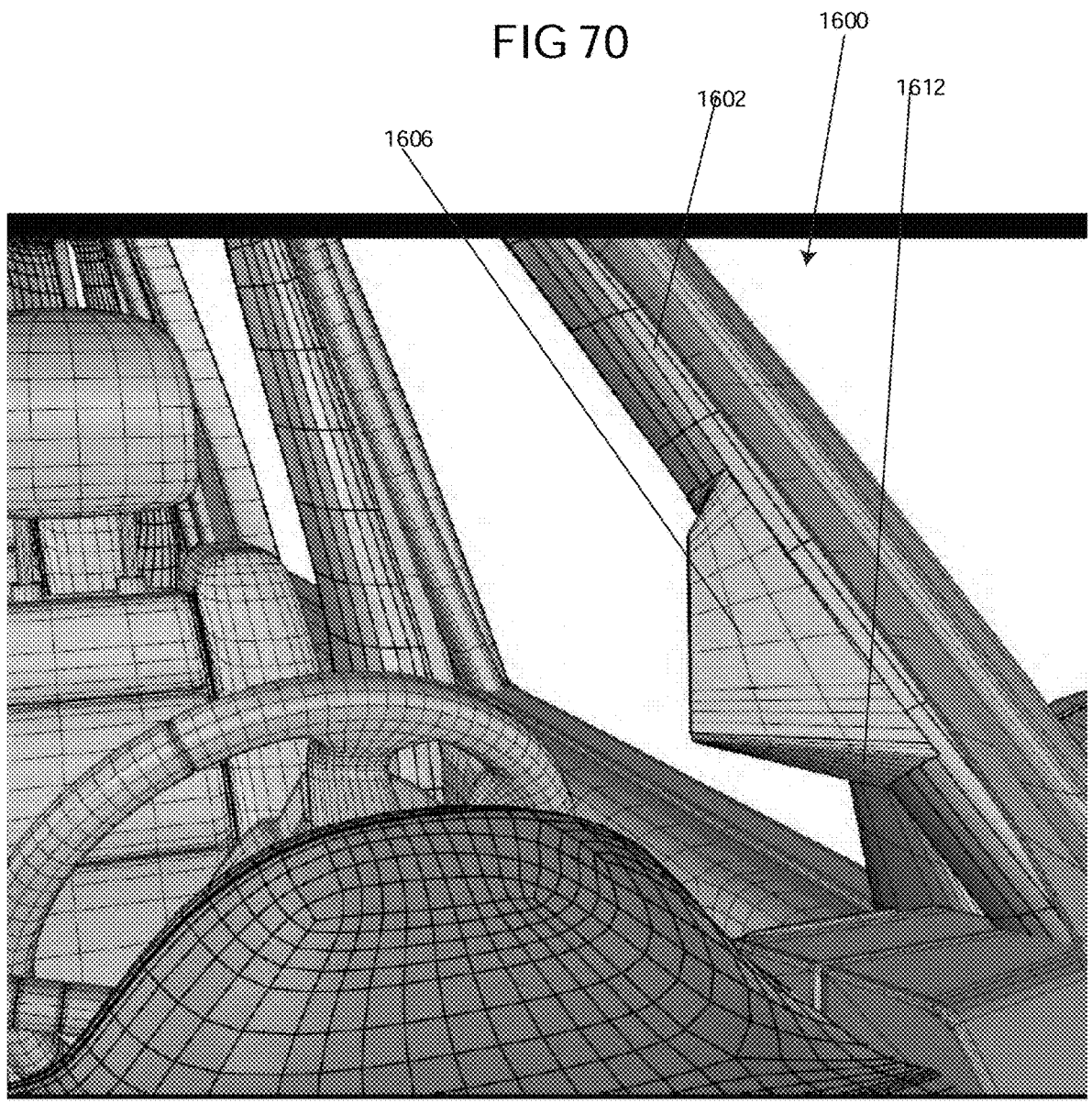
FIG. 70 is another view of the embodiment of FIG. 68.

FIG. 70 also shows this view wherein there are shown sides 1606 and 1612 which extend out from post 1602 in such a manner that screen 1614 is substantially vertical.

Figure 71:
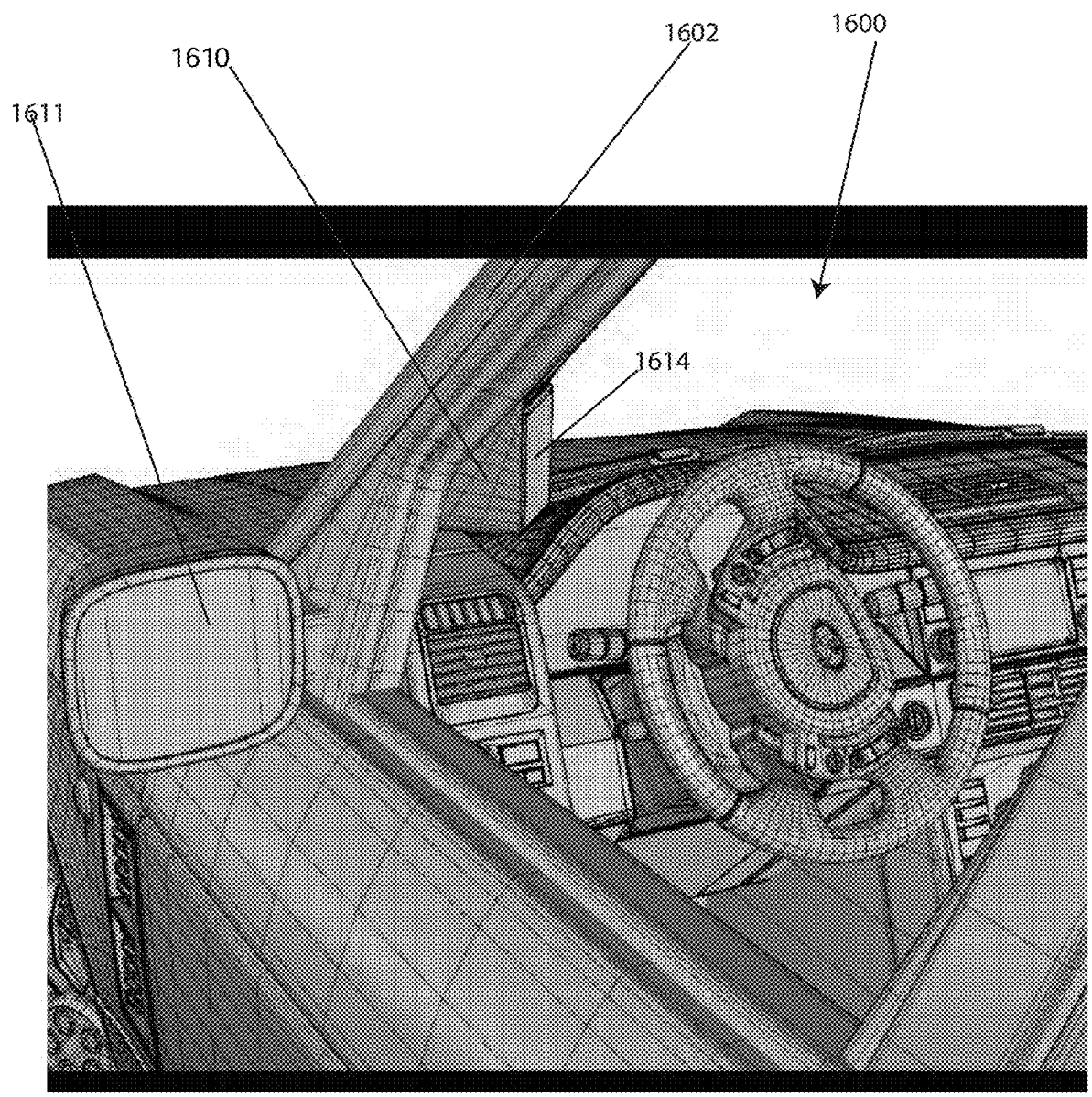
FIG. 71 is another view of the embodiment of FIG. 68.

FIG. 71 is a side view of the embodiment which shows side face 1610 extending out from post 1602. There is also shown side view mirror 1611 which is positioned adjacent to screen 1614. This view also shows that screen 1614 is substantially vertical in orientation so that it is easily viewable by a driver.

Figure 72:
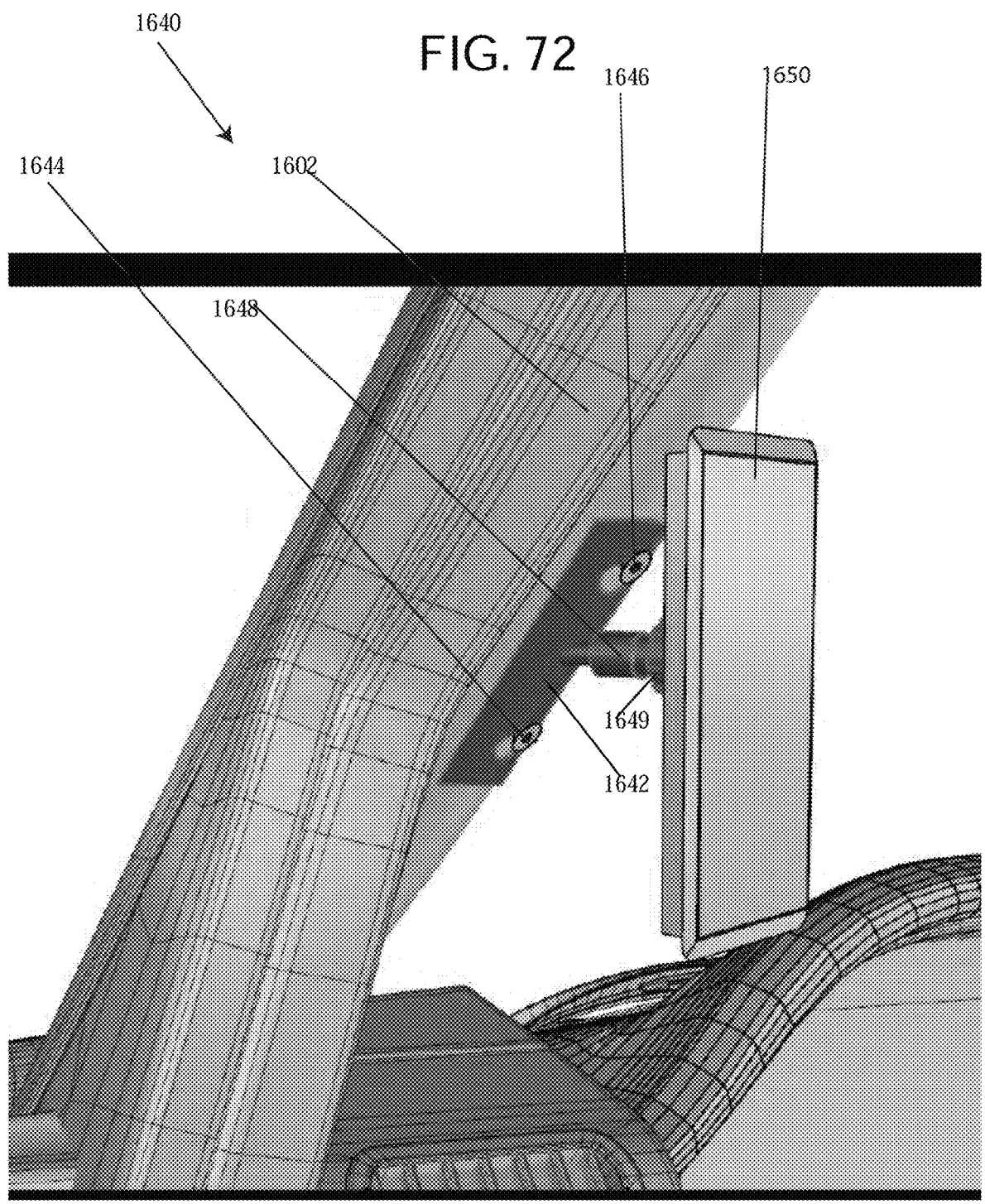
FIG. 72 is another view of another embodiment.

FIG. 72 shows another embodiment 1640 which shows a back plate 1642 secured to post 1602 via screws 1644 and 1646. There is also a support post 1648 and an adjuster 1649 which is coupled between post 1648 and screen 1650.

Figure 73:
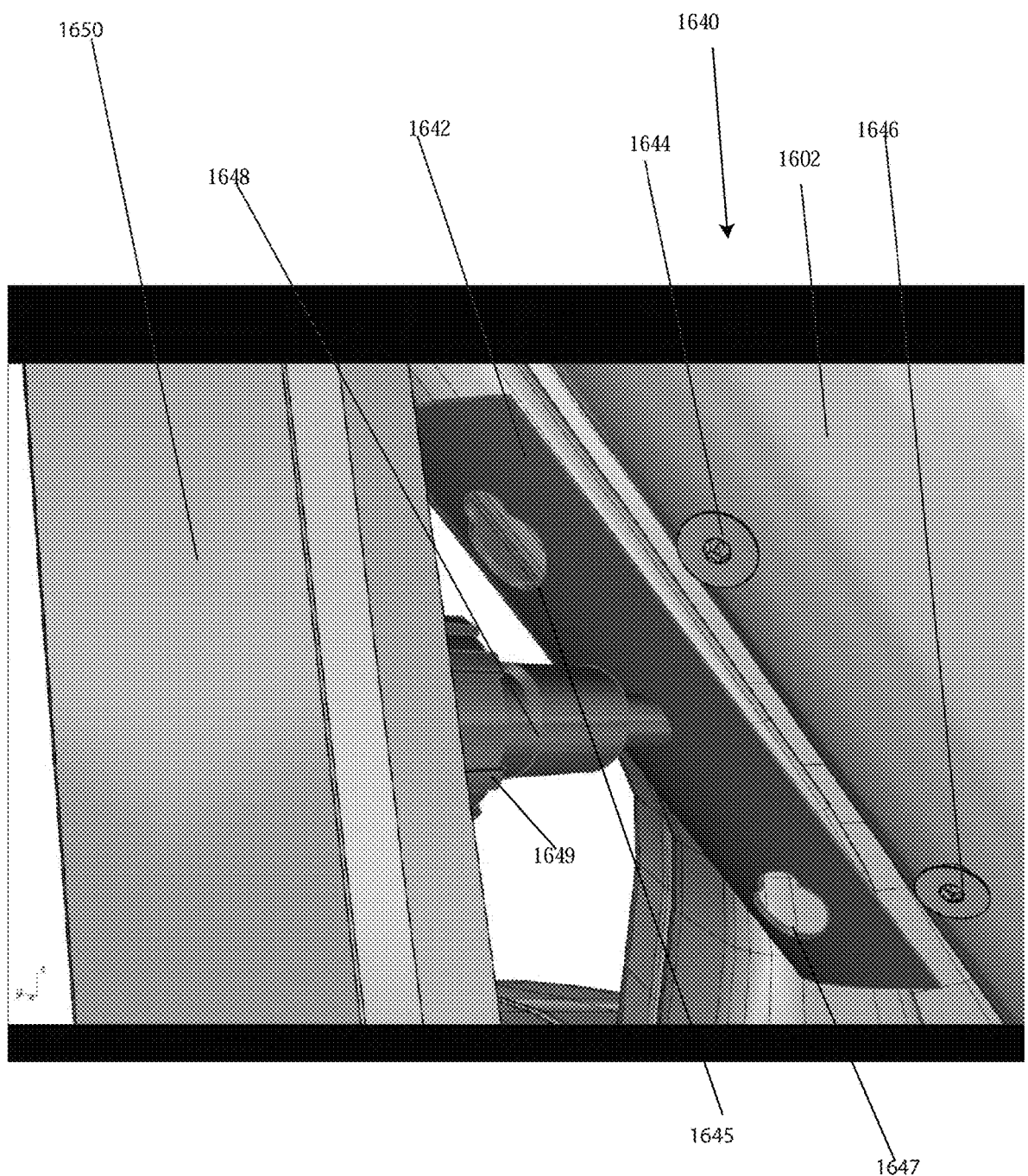
FIG. 73 is another view of the embodiment of FIG. 72.

FIG. 73 is a side view of the embodiment 1640 which shows back plate 1642 which has a plurality of openings 1645 and 1647. Openings 1645 and 1647 are configured to connect to screws 1644 and 1646. In addition, this view also shows post 1648 as well as adjuster 1649. Adjuster 1649 is configured to rotate to allow for the adjustment of the device either in an omnidirectional manner. The adjuster 1649 is configured to selectively secure a ball in a ball and socket joint.

Figure 74:
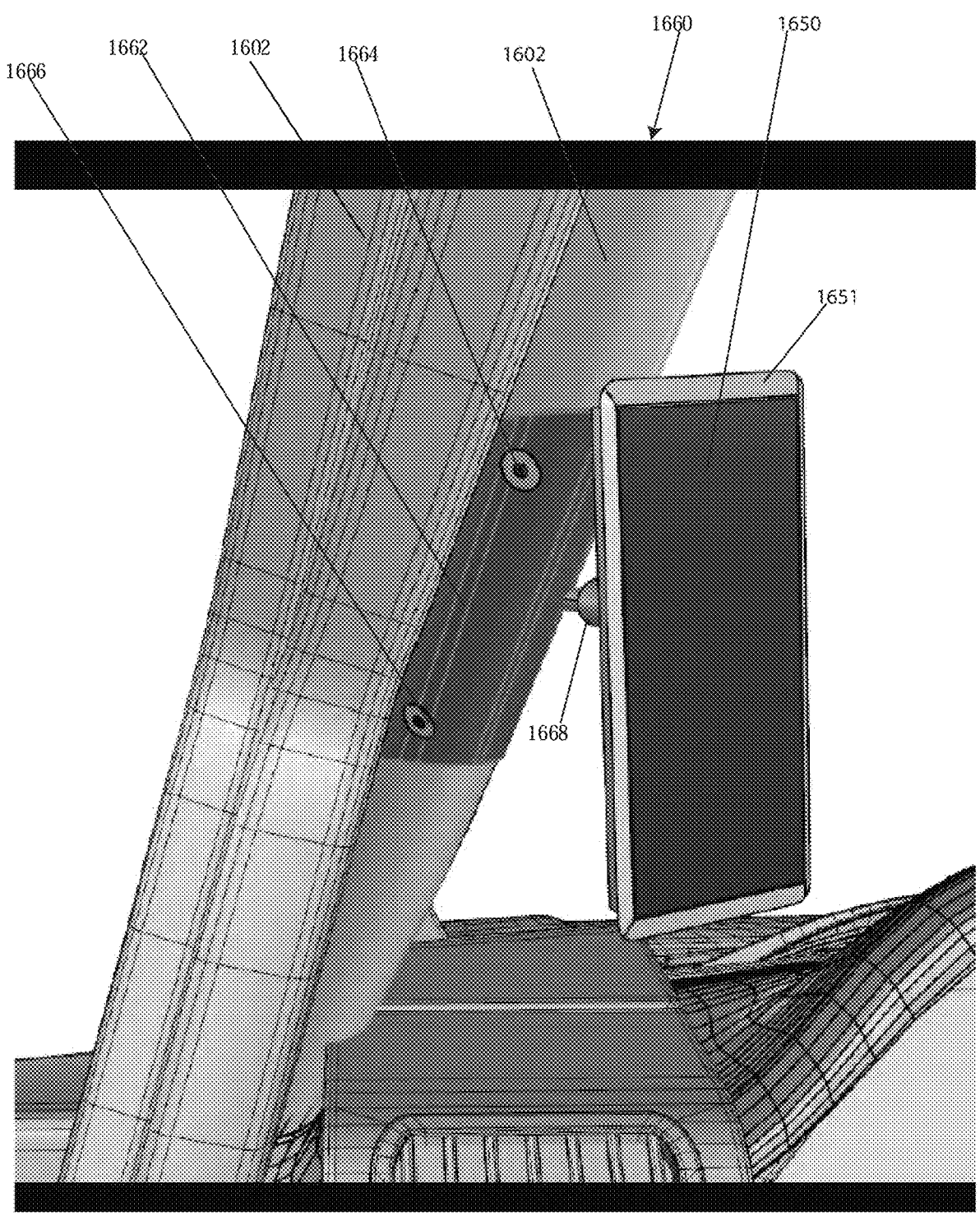
FIG. 74 is another embodiment.
Figure 75:
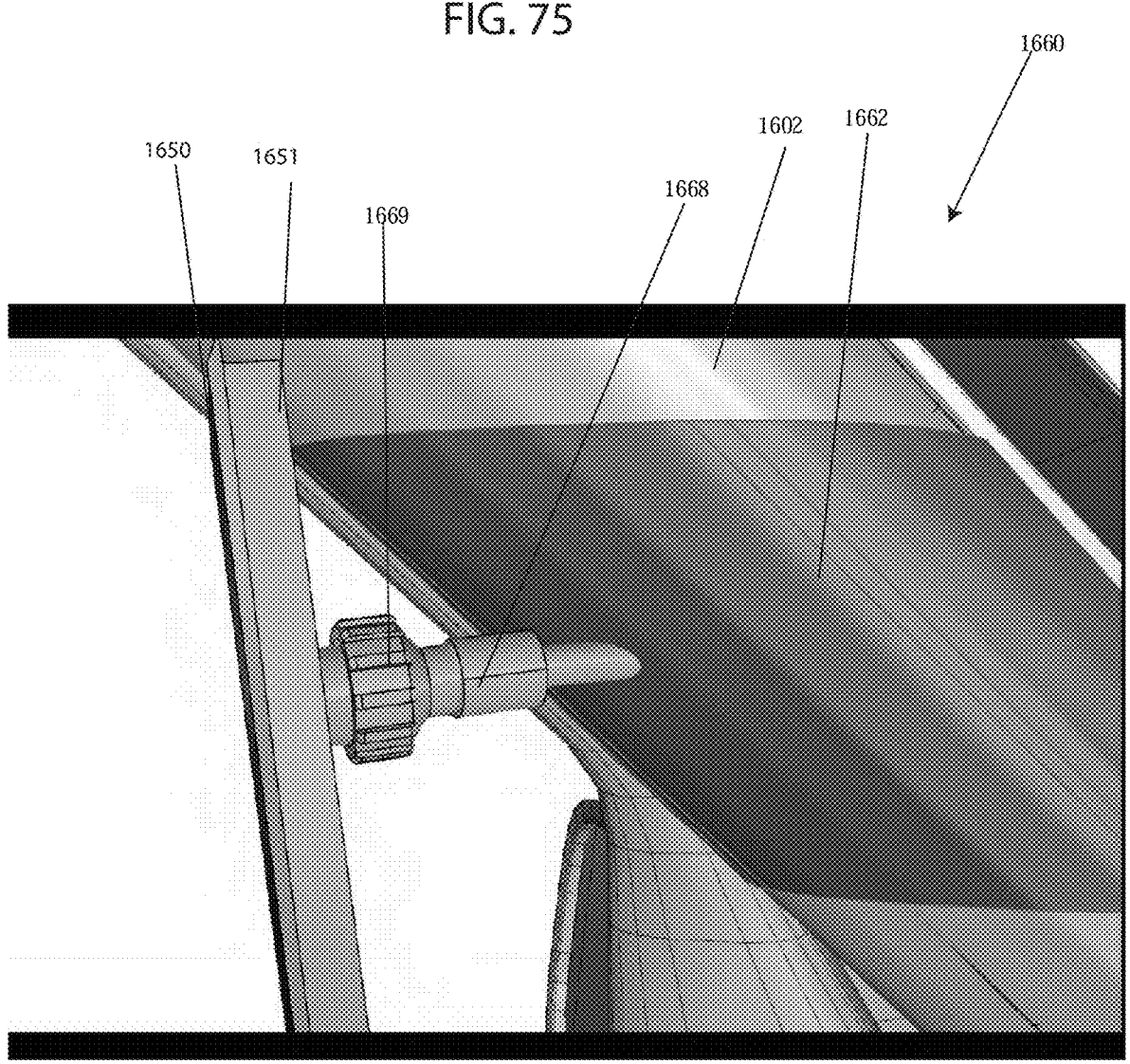
FIG. 75 is another view of the embodiment of FIG. 74

FIG. 74 is another embodiment 1660 which has a curved section 1662 and a plurality of different screws 1664 and 1666. There is also a post 1668 which extends from this curved back screen. Coupled to this post is an adjuster 1669 (see FIG. 75) which is similar to adjuster 1649. Adjuster allows for rotation around a ball joint that is configured to selectively secure the screen in a particular orientation. Coupled to the adjuster 1669 is a screen body 1651 as well as a screen 1650. The screen 1650 is configured to be in communication with another camera such as a camera mounted on a side view mirror such as camera 120 in FIG. 61 or in the post as well such as cameras 22, 24, 26 or cameras 32, 34, 36. The curved back plate 1662 is configured to curve around a post and secure on one side of the post by inserting into a wedge opening in the post between the post and a windshield. At another end the curved back piece is also configured to secure via screws 1664 and 1666. These screws insert into the post 1602 and lock the screen therein.

Figure 76:
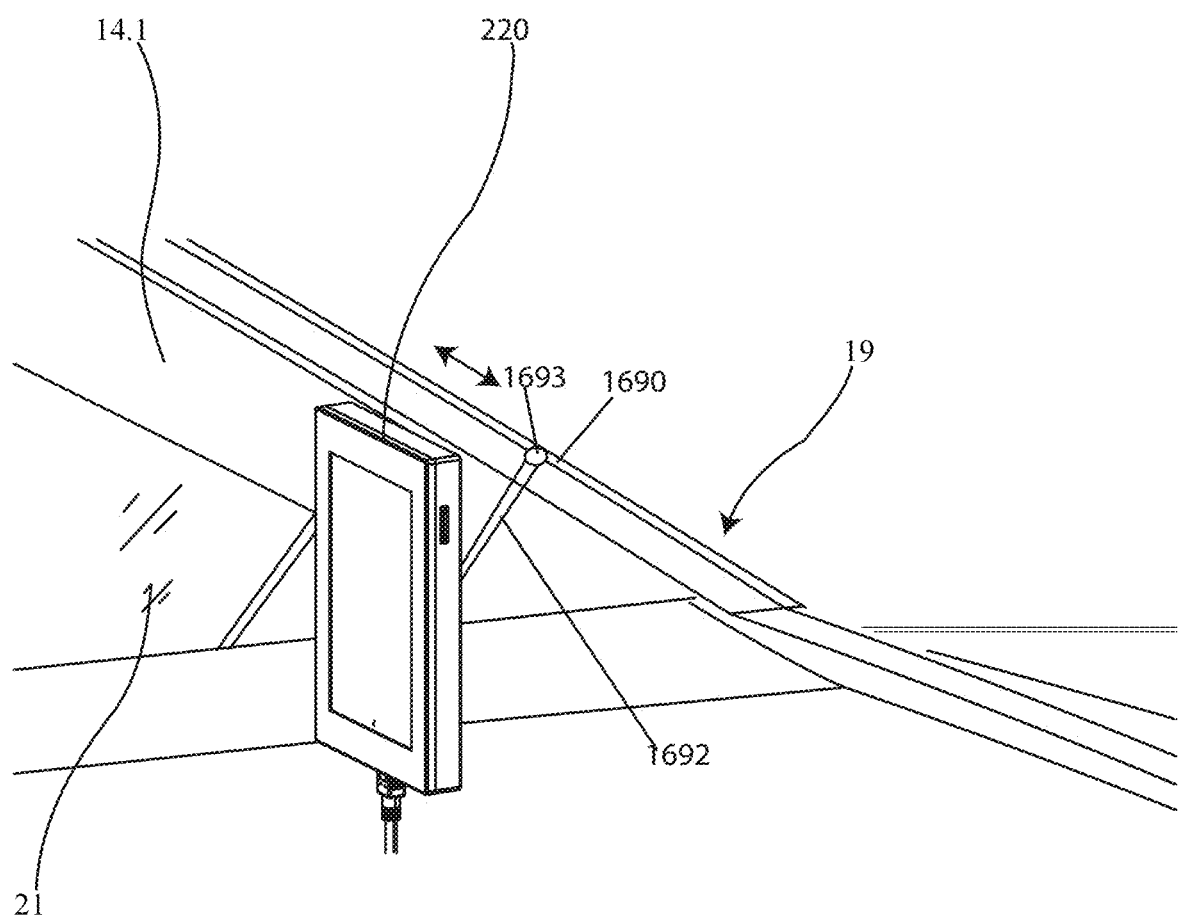
FIG. 76 is a side view of a screen mounted in a car.

FIG. 76 is a perspective view of another embodiment of a slidable track system for mounting the screen 220 on or adjacent to a support or column 14.1 For example, there is disclosed a track 1690 which is mounted between the support or column 14.1 and the windshield 19. This track 1690 allows for a lockable base 1693 to be slid up and down track 1690 to thereby move screen 220 up and down track 1690. Lockable base 1693 can be clamped down on track 1690 so as to lock this base 1693 in place along this track. Lockable base 1693 comprises a rotatable ball which when screwed down on a threaded bolt allows for a compression lock on track 1690. Coupled to lockable base 1693 is an arm 1692 which is coupled to a back of screen 220 in any of the manners described above. In addition, in this view a side window 21 is also shown.

Figure 77A:
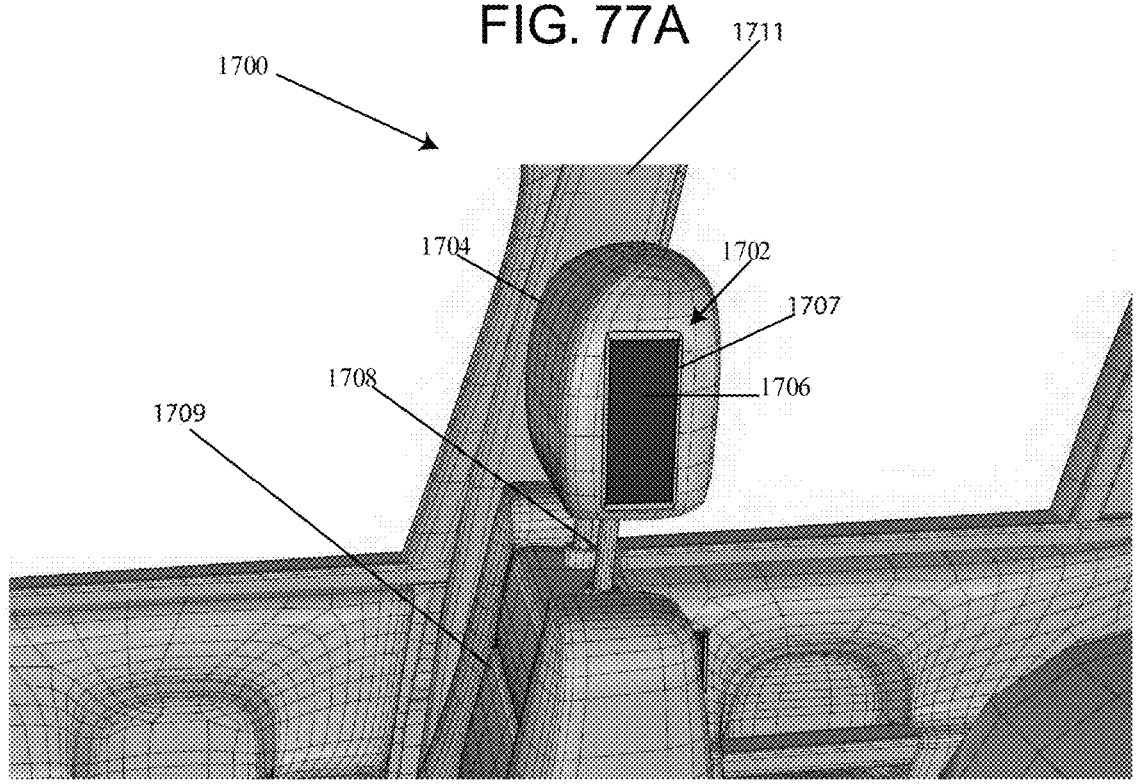
FIG. 77A is a side view of another embodiment which shows a head rest mounted monitor.

FIG. 77A is a side view of another embodiment which shows a head rest mounted monitor, wherein in this embodiment 1700 there is a head rest 1704 and a column 1711 shown as standard parts of an automobile. The head rest 1704 is coupled to a car seat 1709 via a post 1708. Coupled to the head rest is a monitor or screen assembly 1702 which includes a frame 1707 as well as a monitor screen 1706. The monitor screen is configured to display the video display of any one of the cameras listed above including but not limited to camera 120 and or cameras 52, 54, 56 (See FIG. 2B). With this design, the frame 1707 is coupled therein with the head rest 1704 such that the screen is either embedded inside of the head rest or positioned on top of an exterior surface of the head rest. Power for the monitor assembly 1702 can be provided through the car seat 1709 and up through post 1708 and into the head rest as a low voltage power source. Alternatively, the monitor or screen can be powered by a rechargeable battery. The associated cameras can be orientated such that they reveal the position of an object located behind column 1711.

Figure 77B:
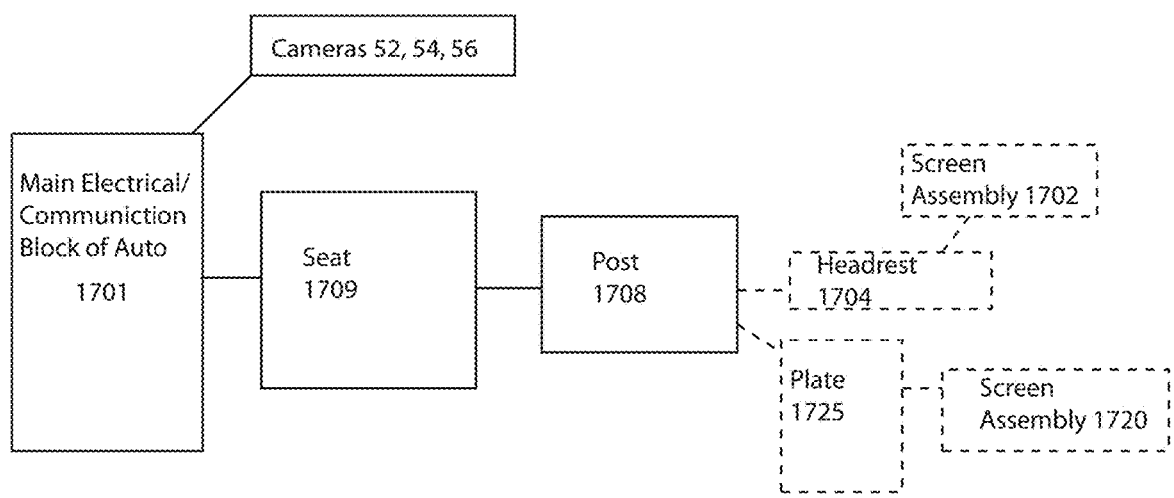
FIG. 77B is a schematic block diagram of the electronic components used in FIG. 77A.
Figure 79A:
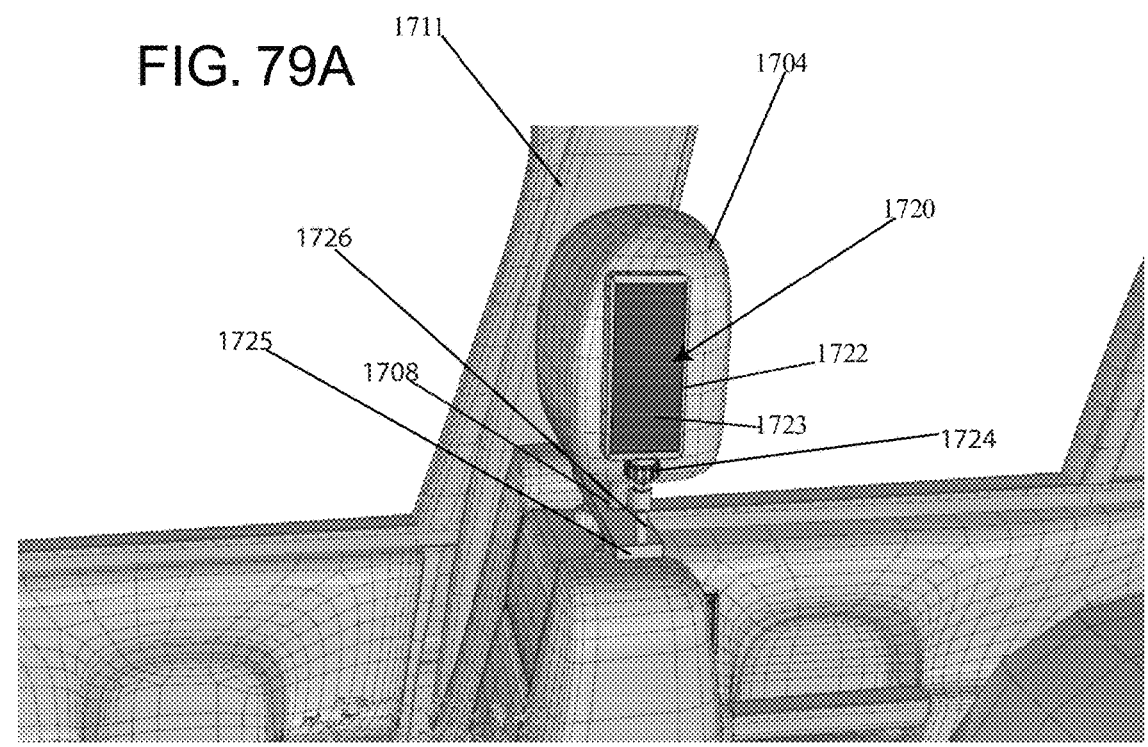
FIG. 79A is a side view of another embodiment showing an adaptable headrest mounted monitor.
Figure 79B:
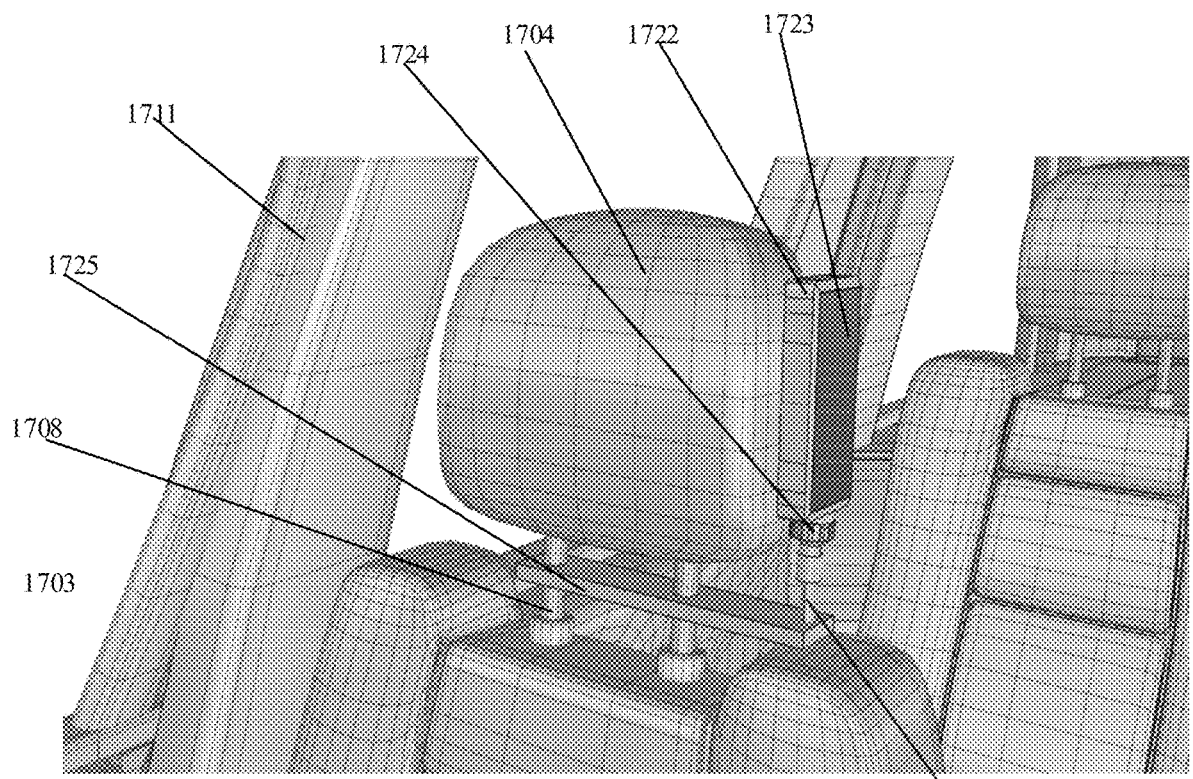
FIG. 79B is a front perspective view of the embodiment of FIG. 79A.
Figure 79C:
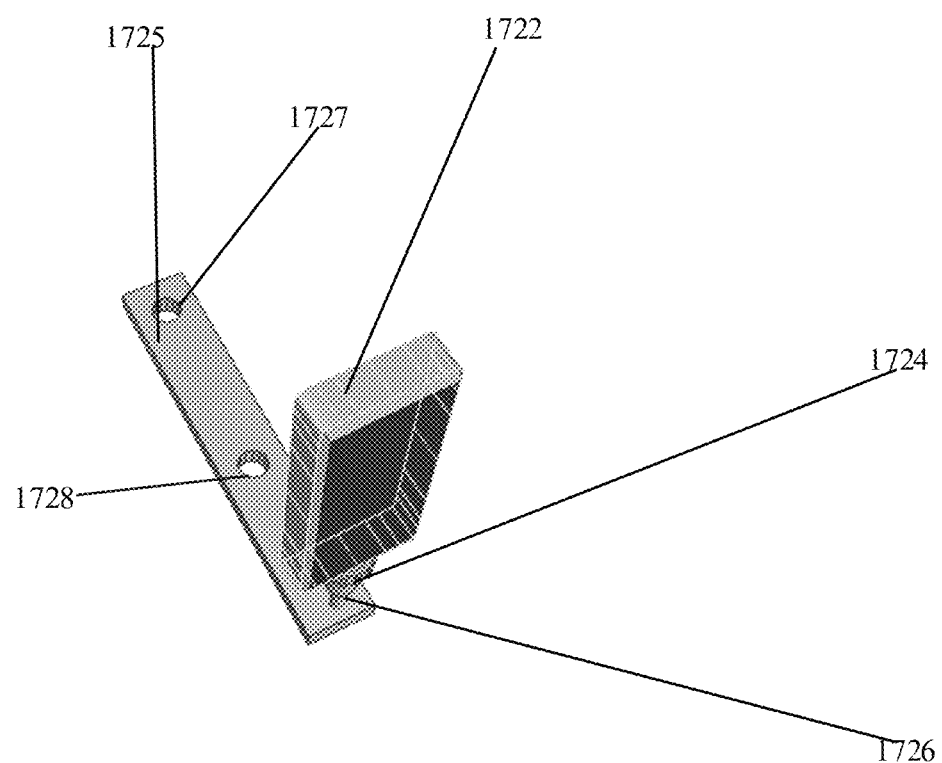
FIG. 79C is a top perspective view of the embodiment shown in FIG. 79A.
Figure 80:
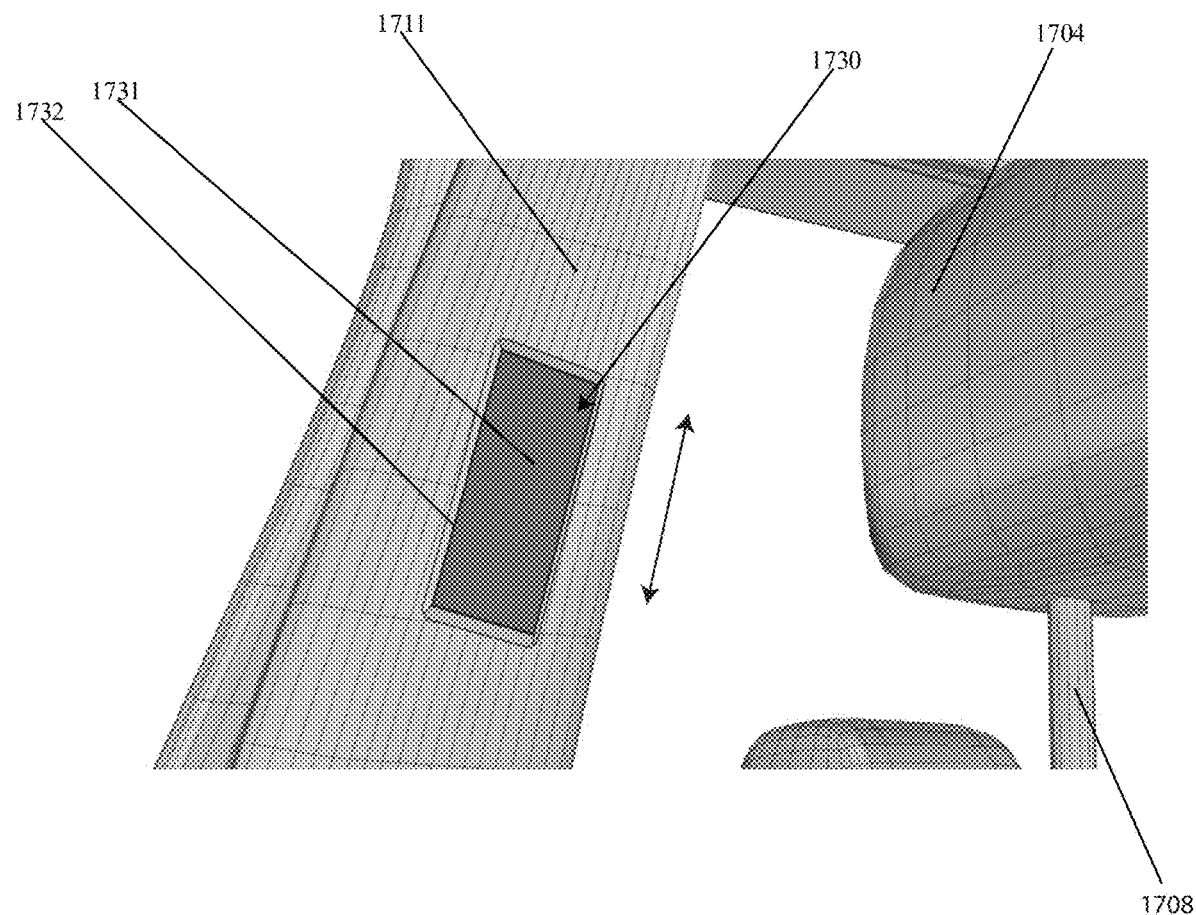
FIG. 80 is a side view of another embodiment.
Figure 81:
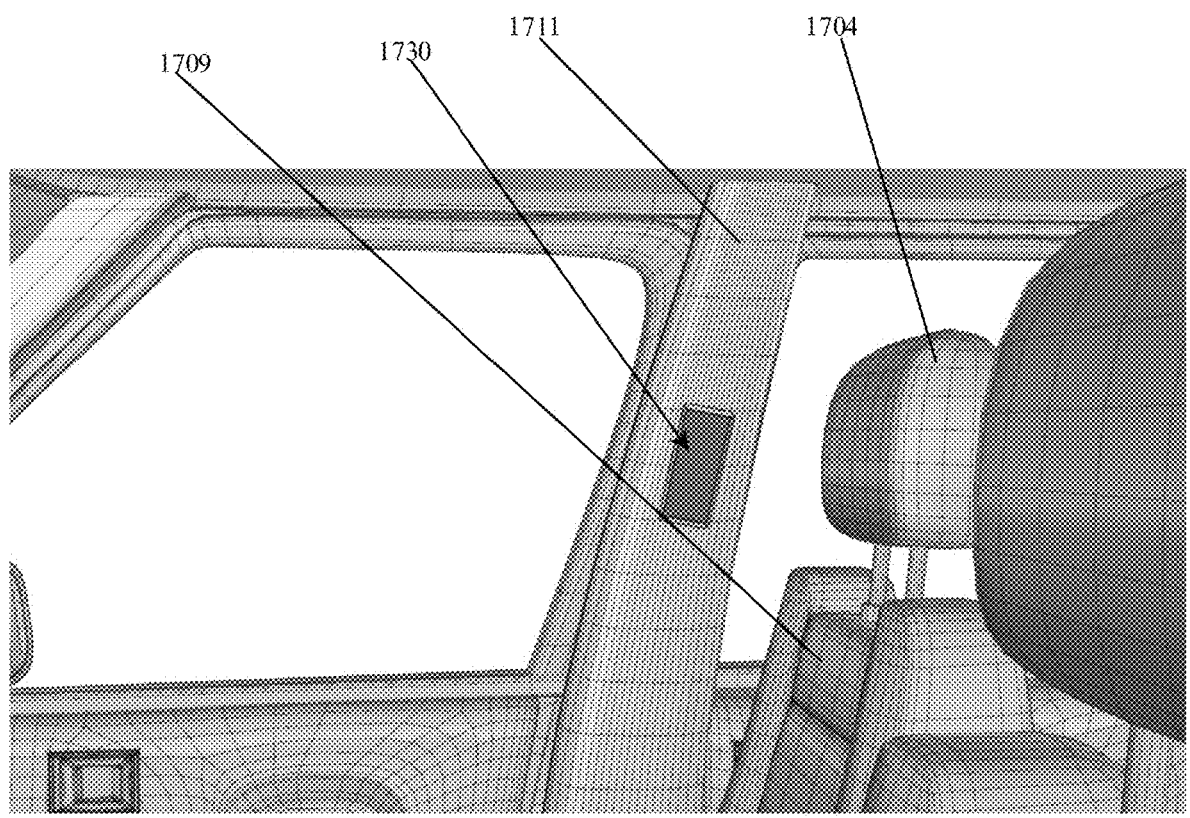
FIG. 81 is a perspective view of the embodiment of FIG. 80.
Figure 82:
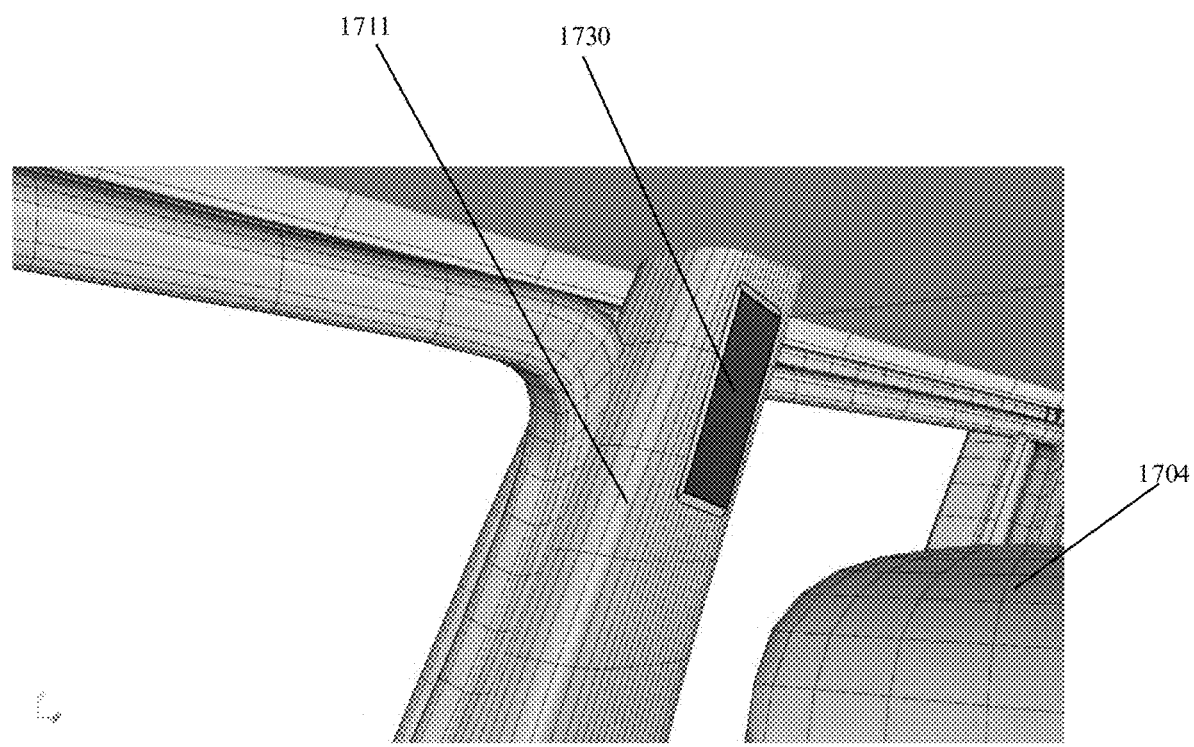
FIG. 82 is a perspective view of the embodiment of FIG. 80 but mounted higher on a column.
Figure 83:
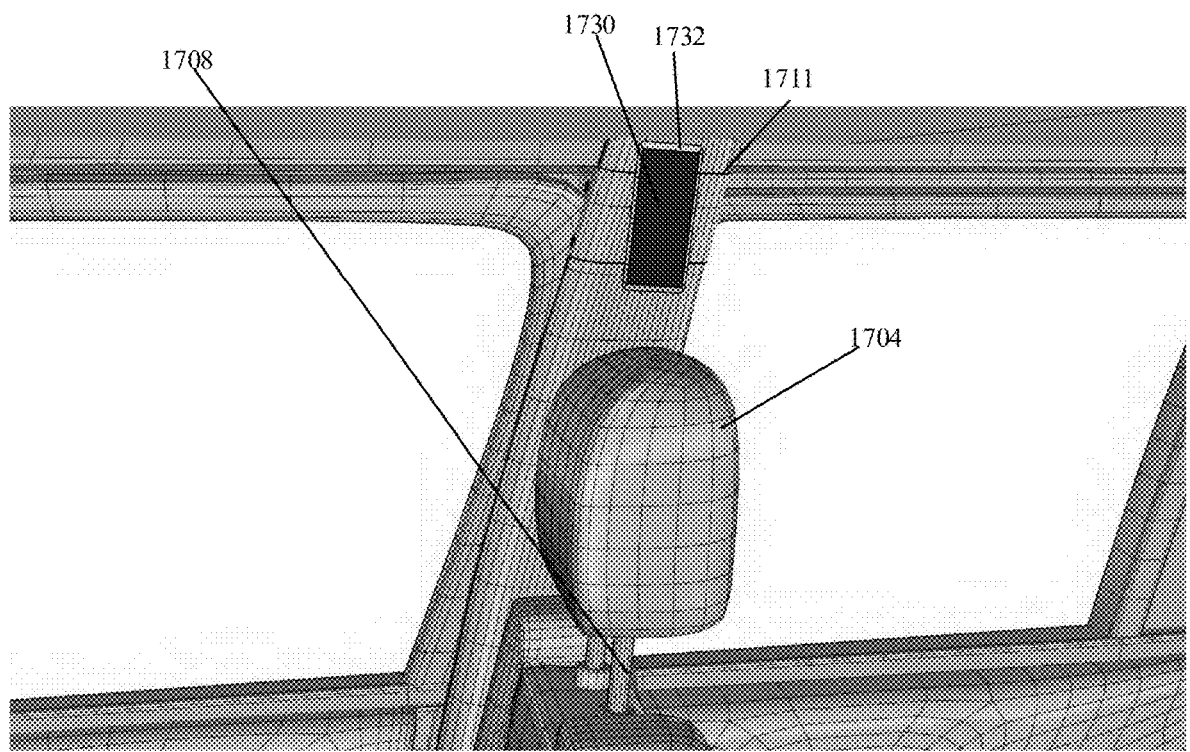
FIG. 83 is a side view of the embodiment of FIG. 80 and mounted higher on a column.
Figure 84:
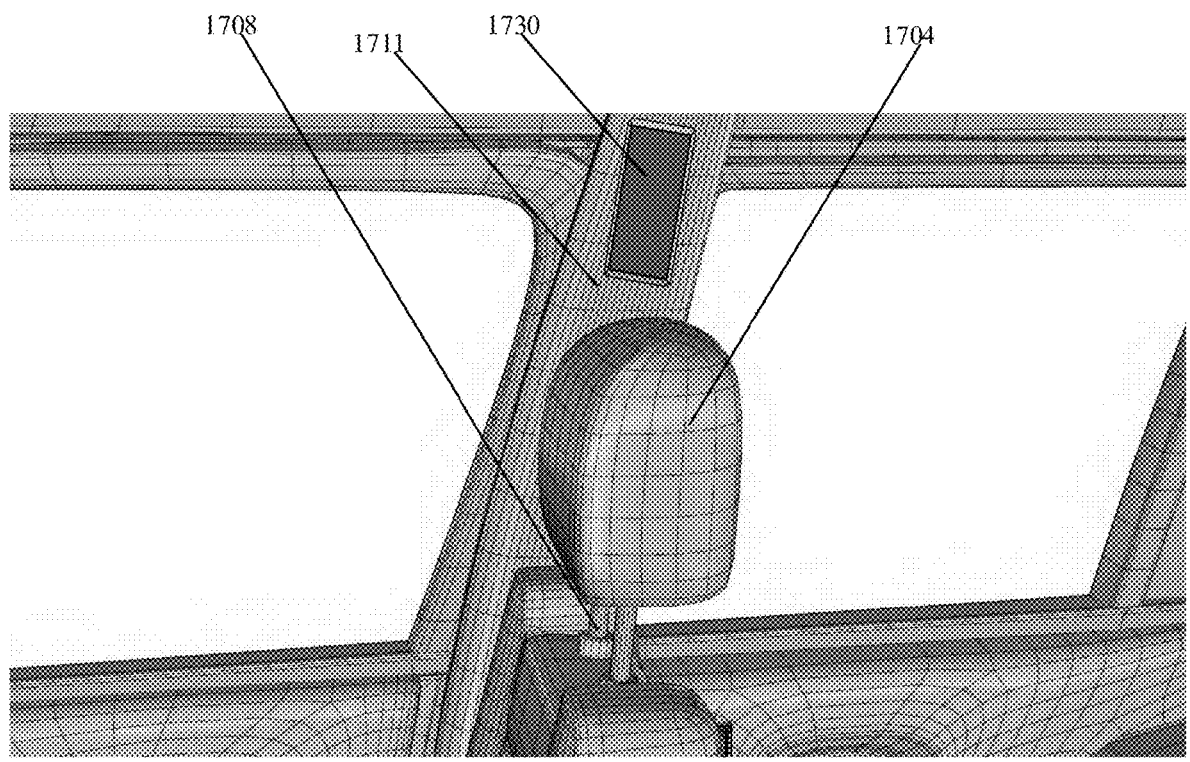
FIG. 84 is another side view of the embodiment of FIG. 80 mounted higher on a column.

FIG. 77B is a schematic block diagram of the electronics of the example shown in FIG. 77A as well as the example shown in FIGS. 79A-79C. For example, the screen assembly 1702 is configured to be coupled at least in one embodiment to a main electrical and communication block via electrical and/or communication lines extending from block 1701 through seat 1709, through post 1708, through headrest 1704 and into screen assembly 1702. Alternatively, with at least one of the embodiments of FIGS. 79A-79C power and communications lines can extend from a main electronic block of the auto 1701, through seat 1709, through post 1708, through plate 1725 and on to screen assembly 1720. Furthermore, coupled to the main electrical/communication block for both embodiments are cameras 52, 54, and 56. Thus, power and communications extend from block 1701 into cameras 52, 54, and 56, thereby powering these cameras. In addition, communication from these cameras 52, 54, and/or 56 passes from these cameras, though block 1701, through seat 1709, through post 1708, and on to either headrest 1704 and then screen assembly 1702 or onto bracket 1725, and then screen assembly 1720.

Figure 78:
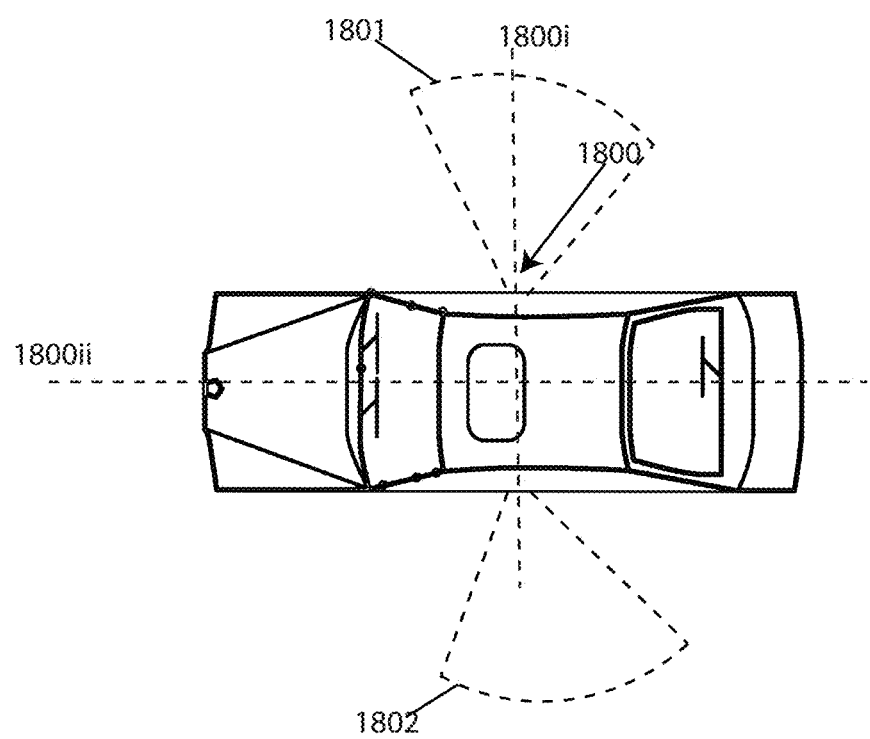
FIG. 78 is a view of the visual range of the cameras for an auto.

FIG. 78 shows the viewing field of the associated cameras from these screens. This viewing field is along axis 1800*i* which is transverse to the longitudinal axis 1800*ii* of the auto. The different viewing fields 1801 and 1802 show the view that may be blocked by column 1711. Thus, a driver of an auto would have a view of a side of the auto in an otherwise blindspot of the auto.

FIG. 79A is a side view of another embodiment showing an adaptable headrest mounted monitor. With this view there is shown a column 1711 as well as a headrest 1704. The head rest 1704 is resting on a post 1708. The new embodiment is a screen assembly 1720 which includes a frame 1722 and a screen section 1723. This embodiment 1720 rests on, or is attached to a post 1726 which is coupled to an adapter plate 1725. In addition, there is a rotatable adjustment lock 1724 which is coupled to post 1726 and which when tightened, it locks the screen assembly 1720 in place against rotation. However, when the lock 1724 is loosened, it allows the screen assembly 1720 to rotate. With this embodiment, the cameras such as cameras 120 and/or cameras 22, 24, 26 or cameras 32, 34, 36 can feed wirelessly or in a wired manner a feed from these cameras into the screen 1723. In addition, power for this embodiment is fed through seat 1709 and up through plate 1725 and then through post 1726 and into monitor or screen assembly 1720. Alternatively, power for the screen assembly can be through a battery which is rechargeable.

FIG. 79B is a front perspective view of the embodiment of FIG. 77. This view shows column 1711 as well as seat 1709 wherein supported on seat 1709 is headrest 1704. Plate 1725 is shown coupled to posts 1708. An additional side section 1703 of seat 1709 is also shown. Frame 1722 is shown wrapping around screen section 1723. As shown both frame 1722 and the associated screen section are not directly attached to the headrest but are attached to post 1726 and then adjustable by lock 1724. Frame 1722 is shown spaced from headrest 1704 at a distance to allow frame 1722 and screen 1723 to be rotated such that screen assembly can be positioned at any suitable angle that would aid a driver in seeing that screen 1723 of screen assembly 1723.

FIG. 79C is a top perspective view of the embodiment shown in FIG. 79A. In this view there is shown frame 1722, which is coupled to post 1726 and is disposed adjacent to lock 1724. Lock 1724 is coupled to post 1726 and is configured to selectively lock frame 1722 against rotation or movement. In addition, plate 1725 is shown which has a plurality of holes 1727 and 1728 which are configured to receive associated posts 1708.

FIGS. 80-84 show side views of another embodiment 1730. In this embodiment there is a screen 1731 and an associated frame 1732 which is coupled to a column 1711. With this design, the embodiment 1730 which is a screen assembly is coupled into column 1711. Screen assembly 1730 is configured to be in communication with cameras 120 and/or cameras 52, 54, and 56 which provide a visual feed to that screen assembly as shown in FIG. 77. These different views show that the screen 1730 can be mounted at any suitable height along column 1711.

Figure 85:
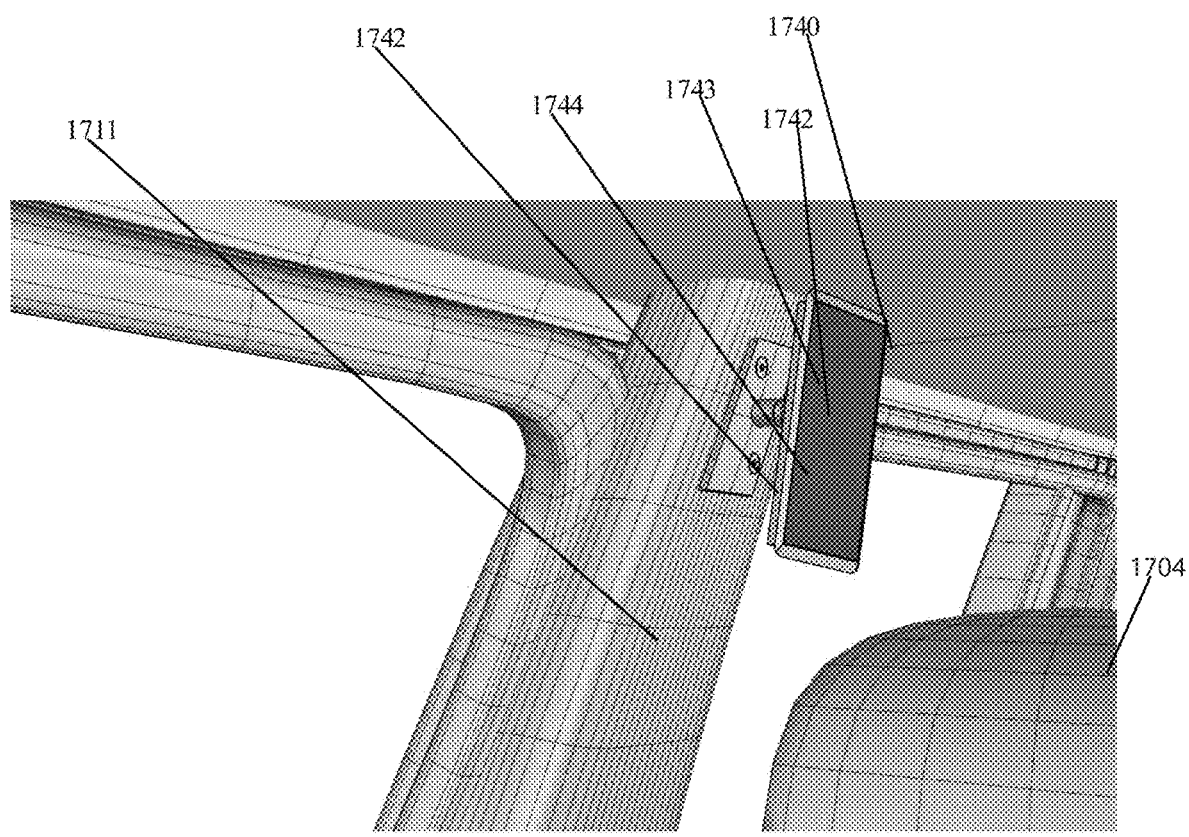
FIG. 85 is a side perspective view of another embodiment.

FIG. 85 is a side perspective view of another embodiment. In this view there is shown column 1711 which has another embodiment of a screen assembly 1740 coupled thereto. This screen assembly has a post 1742 coupled to a plate 1745. Plate 1745 has screws 1743, and 1744 coupling the plate to the column 1711. This screen 1740 receives a feed from cameras 52, 54, and 56 and provides a viewing angle such as viewing range 1801 and 1802 shown in FIG. 77.

These types of screens can also be mounted on a side post positioned between a front side window and a rear side window as shown in FIG. 2A.

Figure 86A:
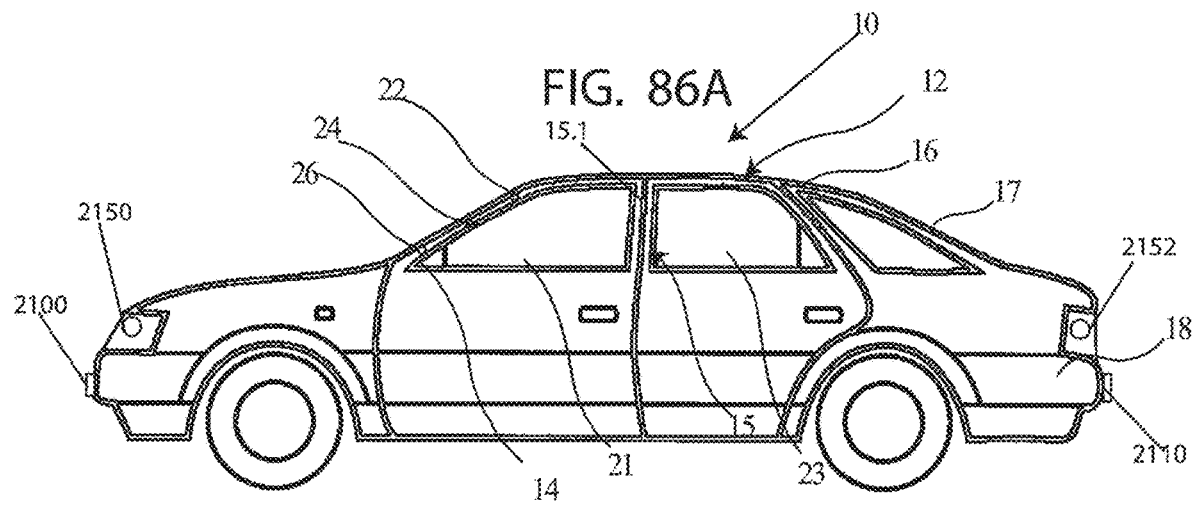
FIG. 86A is a side view of one embodiment.

FIG. 86A is a side view of one embodiment. This embodiment of the auto viewing system 10 shows an automobile 12 having a frame comprising a body 18, a roof 16, and supports 14 and 15. Supports 14 and 15 support the roof over the body. Windows such as front windshield 19 (See FIG. 86B) are positioned between supports 14.1 and 14.2. Support 14 comprises both supports 14.1 and 14.2. Support 15 comprises both supports 15.1 See FIG. 86A and 15.2 see FIG. 86C. There is also a rear support 17 which is also useful in supporting roof 16 over body 18. Side windows 21 and 23 are interspersed between roof 16 and body 18 as well. There are also camera systems 2100 and 2110 positioned at the front and at the rear of the car or auto viewing system 10 which are configured to record and view in substantially lateral directions to the car. In addition there is also another additional camera 2150 which is positioned in the headlight of the automobile. In this embodiment, the camera1 can be placed in each of the headlights or any one of the headlights. In addition, there is also another additional camera 2152 which is positioned in each of the tail lights as well or any one of the tail lights.

Figure 86B:
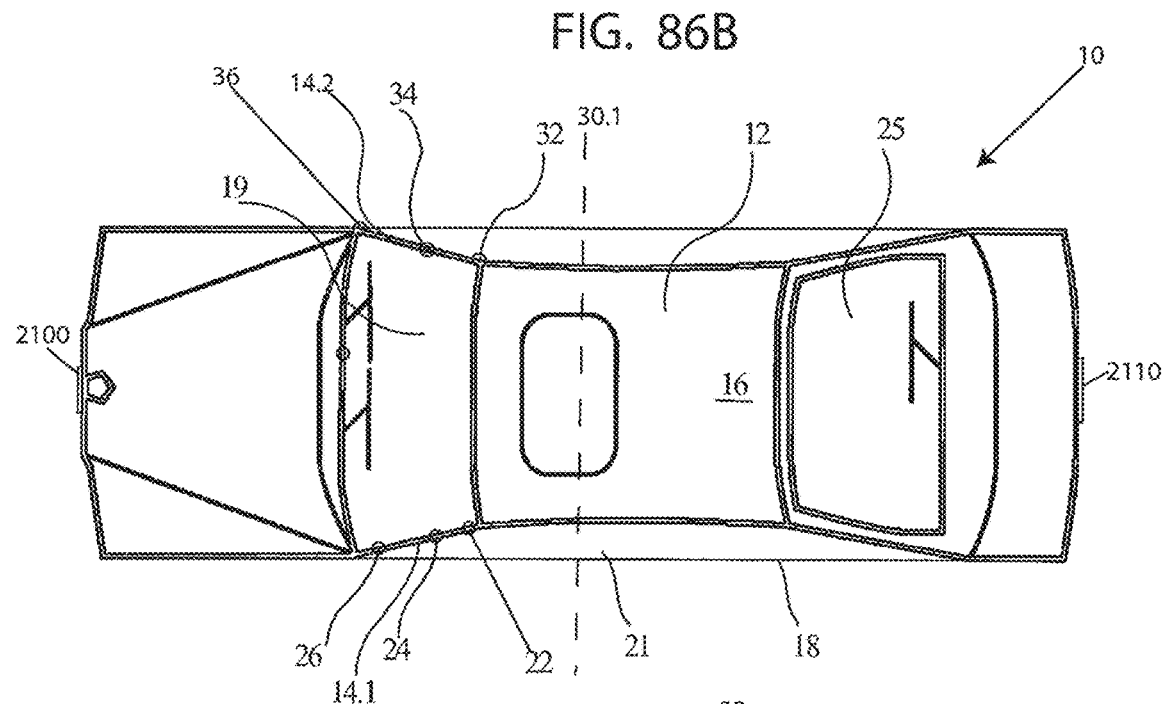
FIG. 86B is a top view of the embodiment shown in FIG. 86A.

FIG. 86B is a top view of the embodiment shown in FIG. 86A. In this view, there is front windshield 19 as well as back windshield 25. The top of roof 16 is also shown. In addition, there is shown the two sides of the auto with supports 14.1 and 14.2 each having at least one camera. In one embodiment this can include at least one camera. There are for example, three cameras 22, 24, and 26 in the first side support 14.1. In addition, there is an additional support 14.2 which has additional cameras 32, 34, and 36 as well. There is also a dashed dotted line 30.1 which bisects the auto wherein in this view a front end of the auto is to the left side of the line and back end of the auto is to the right side of the line. Supports 14.1 and 14.2 sit at the front end of the auto. This view also shows cameras 2100 and 2110 which are configured to view in the lateral directions of the auto. These cameras are configured to allow the driver to have a lateral view of traffic when pulling out of a space in a parking lot. This lateral view can be at substantially a 90 degree angle offset from a front view to substantially 30 degrees off from the lateral 90 degree angle (See FIG. 10).

Figure 86C:
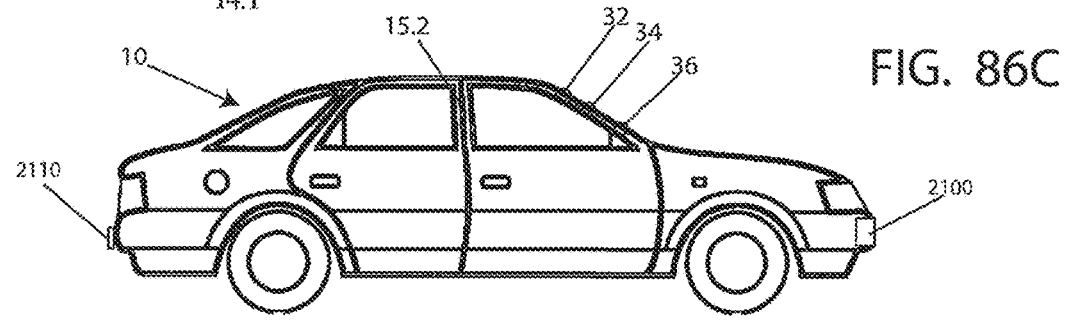
FIG. 86C is an opposite side view of the embodiment shown in FIG. 86A.

FIG. 86C shows the opposite side from FIG. 86A showing cameras 32, 34, 36 and support 15.2 as well. Thus, there could be at least one, but in this embodiment, there are at least three cameras on each side of the supports 14.1 and 14.2 respectively. Because there are a plurality of cameras, on each side, each of these cameras provide additional depth perceptions because these cameras are positioned at different heights and different depths from the front of an automobile. These cameras 22, 24, 26, and 32, 34 and 36 are positioned between a front windshield of the auto 12. This view shows camera system 2100 and 2110 positioned at the front and back of the vehicle respectively. These camera systems are configured to view in lateral directions of the vehicle so that when the vehicle is pulling out of a parking spot (See FIG. 10) the user behind the wheel of an auto can see in these lateral directions even though the user may be blocked due to the obstruction of adjacent cars.

Figure 87A:
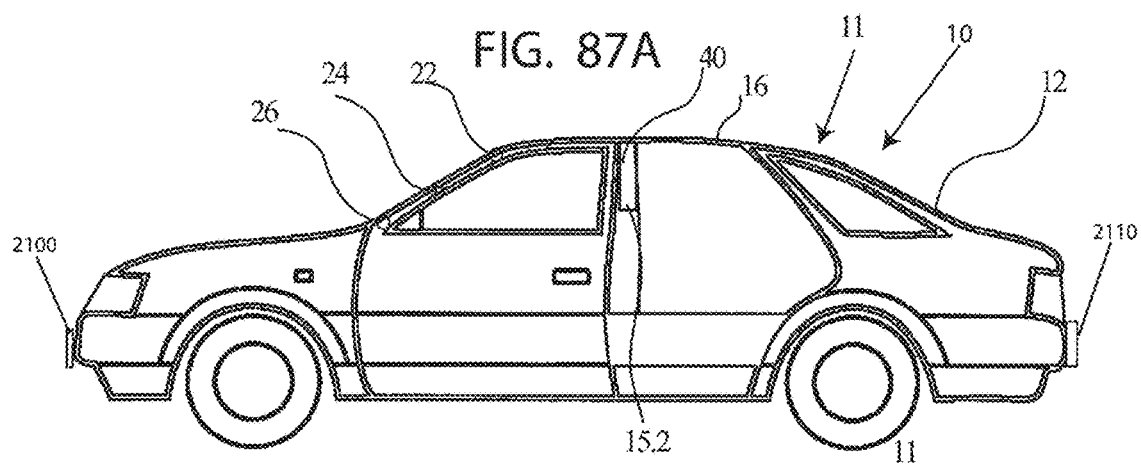
FIG. 87A is a side cut away view of another embodiment.

FIG. 87A shows a side view of an automobile wherein this design shows another embodiment 11 which shows a screen 40 which shows the images or view inside of an automobile. This view also shows cameras 22, 24, and 26 coupled to supports 14. This view is a cut-away side view showing the interior of the vehicle. The positioning of this screen is in a middle section of the automobile on the support frame between the front seat of the auto and the back seat. The screen or display 40 is coupled to the frame section using a support structure such as that shown in FIG. 87A. This view also shows the positioning of camera systems 2100 and 2110.

Figure 87B:
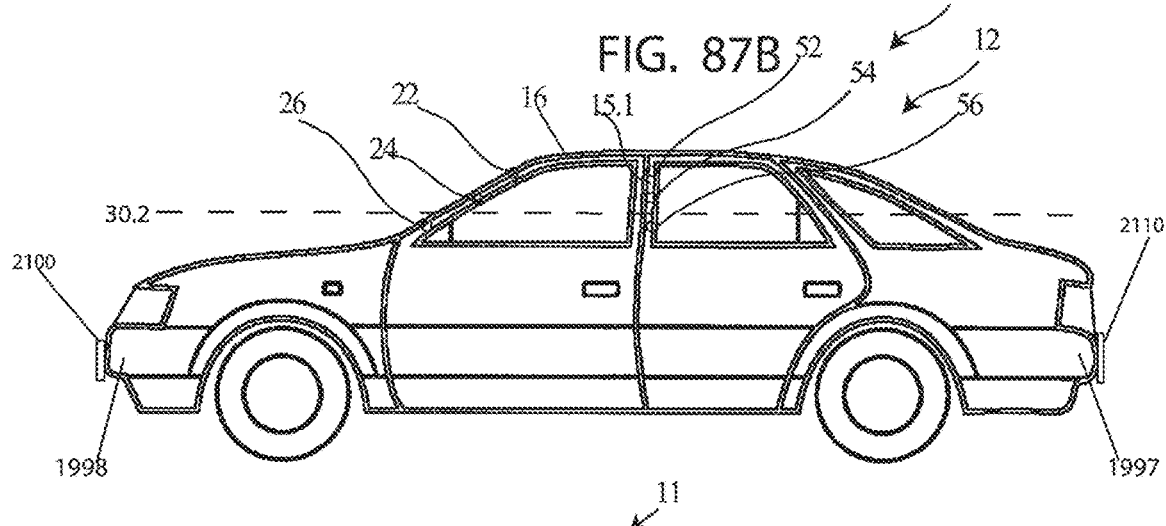
FIG. 87B is a side view of the embodiment shown in FIG. 87A.

FIG. 87B is a side view of the embodiment shown in FIG. 87A. This view shows the exterior view. This exterior view shows additional cameras 52, 54, and 56 which are coupled to support 15.1 while as shown screen or display 40 is coupled to support 15.2. Cameras 52, 54, and 56 are in communication with an associated screen such as screen 40 shown on an associated support such as support 15.1. Thus, the screen is located just inside of the cameras. This view also shows a bisecting line 30.2 on FIG. 87B which extends substantially horizontally and which forms a bisecting line bisecting the auto so that a bottom half is shown below the bisecting line and a top half is shown above the bisecting line. Thus, the cameras and associated displays are shown in a top half of the auto. For example, cameras 22, 24, and 26 and the associated display are shown in the top front section of the auto to cover blind spots in the top front viewing region of the auto. This view shows the positioning of camera systems 2100 and 2110 including cameras 2102 and 2104 (See FIG. 87C.)

Figure 87C:
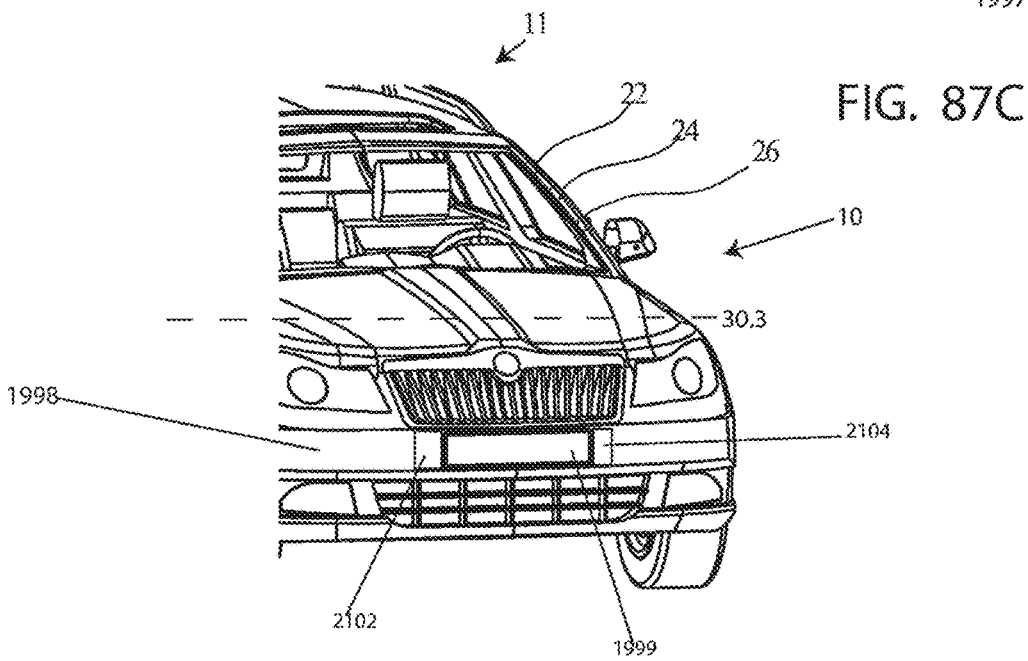
FIG. 87C is a front view of the embodiment shown in FIG. 87A.

FIG. 87C shows a front view of the auto of the embodiment 11 which shows cameras 22, 24, and 26 on support 14.1 while cameras 32, 34, and 36 are positioned on support 14.2. This view shows a bisecting line 30.3 which bisects the auto and extends in a substantially horizontal plane. Thus, above this line 30.3 is a top half of the auto and below this line is a bottom half of the auto.

FIG. 88 is an inside view of an auto of the embodiment of either FIG. 86A or FIG. 87A. In this view, it shows a video screen 62, or screen 220 (See FIG. 88) positioned on the inside surface of support 14.1 (See FIG. 86B). This screen is in communication with associated cameras 22, 24, and 26 as well as camera 120 positioned on the side view mirror on that side of the car. Screen 64 or 220 is coupled to support 14.2. Screen 64 is associated with cameras 32, 34, and 36 as well as camera 120 on the side view mirror of that side of the car. In this view there is shown dashed dotted lines 65.1 and 65.2. Dashed line 65.1 bisects the auto in the middle with a vertical line and divides the auto into a right half and a left half from this perspective. Thus, the screens 62 and 64 are positioned on both the right half and the left half of the n auto respectively. and generally or substantially on the top half of the auto along the supports 14.1 and 14.2 and adjacent to the windshield 19. There is also shown in this view license plate 1999 with side cameras 2102 and 2104 (see FIG. 89) positioned adjacent to this license plate.

Figure 89:
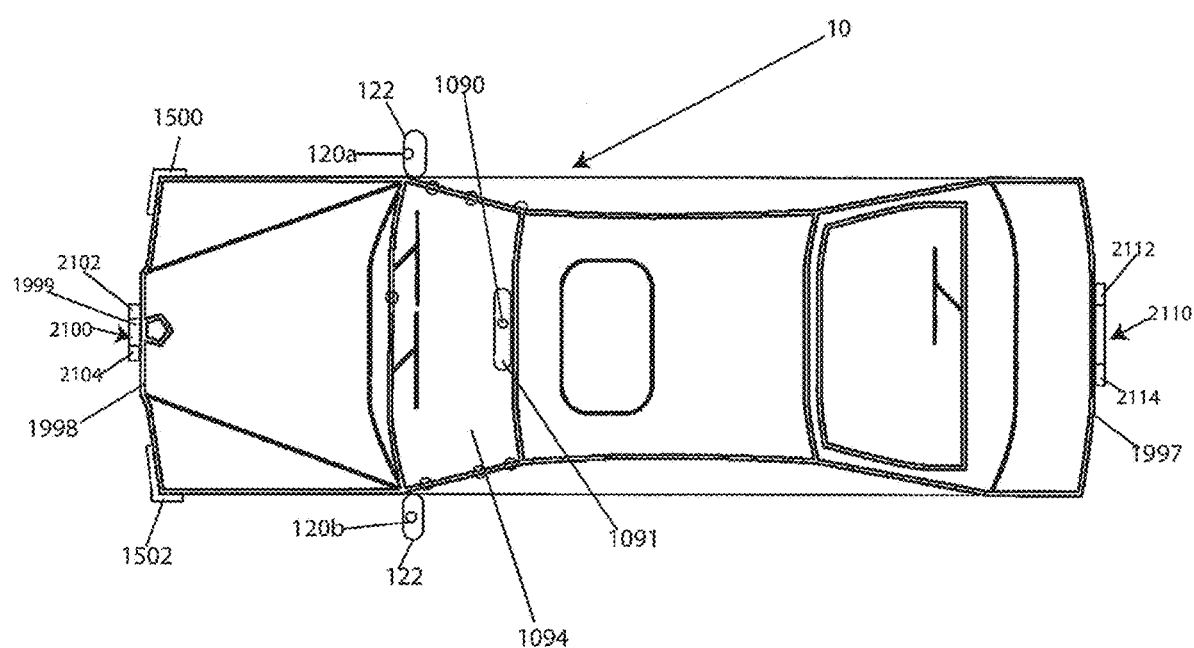
FIG. 89 is a top view of another embodiment.

FIG. 89 shows side view mirrors 122 which have embedded cameras 120*a* and 120*b* which are also configured to provide for the respective viewing fields for automobile viewing system 10 shown in FIG. 89. In addition, this view also shows an additional camera 1090 which is angled to point upward so that a driver can have a view of a light above him. The camera is angled off of the rear view mirror 1091 so that a driver who is sitting behind the wheel of an automobile who has pulled up to a stop light but whose view is blocked by an auto's roof can still have access to the state of the light by viewing in a screen, such as the rear view mirror, the field of vision of the camera 1090. This field of vision can be such that it is the field of vision directly above the automobile, such as automobile viewing system 10.

As shown in FIG. 89, camera 1090 which is positioned to point up from a rear-view mirror 1091 and which is positioned to point through windshield 1094 and towards a position above the field of vision of camera 1090 which is also positioned on rear view mirror 1091 as well. With this design, camera 1090 forms a part of a base for mounting rear view mirror 1091 to windshield 1094. Thus, with this design the camera is configured to provide the driver with a full view of a traffic light when the driver is positioned under the traffic light thereby allowing the driver to relax and not strain to look when the light turns green when stopped at a stop light. There is also shown a camera system 2100 which has cameras 2102, and 2104 which are positioned on either side of a license plate such as license plate 1999. There is also shown an additional camera system 2010 which includes cameras 2012 and 2014. These cameras shown lateral views of the automobile.

With this embodiment and as shown in previous FIG. 55 there is a computer 800 which is configured to coordinate the information taken in by any one of cameras 810. In at least one embodiment this computer includes a memory 801 which is configured to store both images and moving images taken by at least one camera such as cameras 810. Cameras 810 can be any one of the above identified cameras such as for example cameras 22, 24, 26, 32, 34, 36, 120, 2102, 2104, 2112, 2114 There are optional sensors 812 which can be placed around the vehicle and which can be used to determine the presence of an object along with the cameras 810. These sensors can send an infrared beam, a WiFi signal or any other type of suitable signal which determines the presence of objects around the vehicle. Furthermore, there are optional screens 815 which can take the form of any suitable screen mentioned above in any one of the above embodiments. In addition, coupled to computer 800 is a power supply 816 which is configured to power computer 800.

There are also optional communication modules which can include any one of a Wi-Fi or Bluetooth communication module 818 or a cellular communication module 819. These communication modules allow the information from computer 800 to be communicated to other components such as to a smart phone or to a server.

Figure 90:
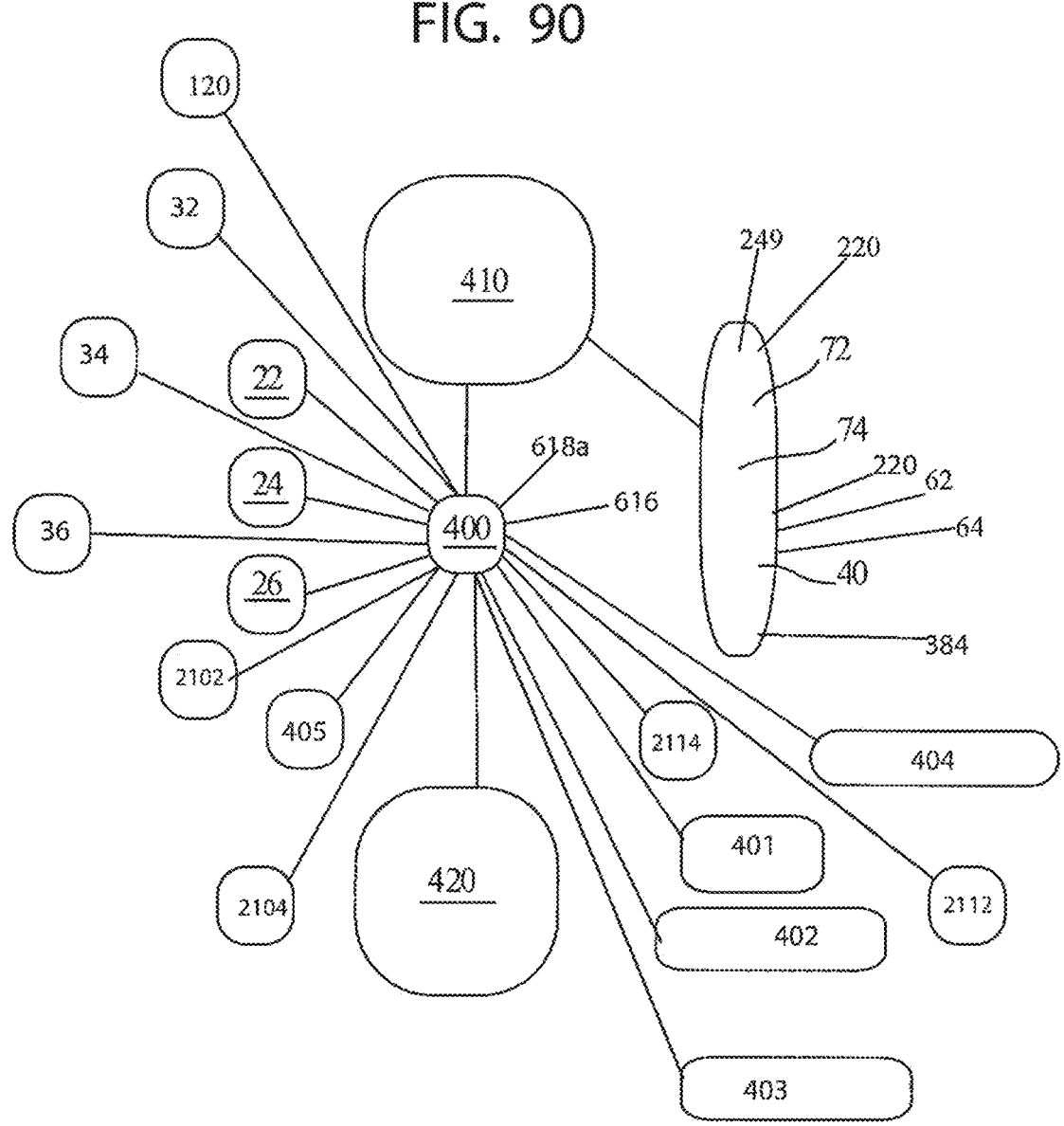
FIG. 90 is a block diagram of the electronics associated with the automobile network.

Ultimately, this system can be designed to include a camera which can be configured to have a night vision camera, and an infrared sensor. FIG. 90 is a schematic block diagram of the embodiment of either FIG. 86A, 87A, 88 or 89. In this view there are cameras 22, 24, and 26 which are coupled to aggregator 400. Aggregator 400 is coupled to video compression device 410. Video compression device 410 has an output to at least one screen 62, 64, or 40, or screens 72, 74, or screens 220, or 249. In addition, coupled to aggregator 400 is a video recorder 420 which is configured to selectively record video signals taken in from aggregator 400. Thus, the device can serve as a black box video recorder as well. The cameras and screens for the embodiments of FIGS. 1-5 can also be included in this block diagram as well. As shown in this view there is a first device 401 which acts as a recorder for the information such as speed, orientation, GPS provided by GPS system 618A, and other coordinates to serve for additional black box recording. In addition, there is another device 402, which allows for the device to be coupled to or at least in communication with an outside cloud storage device. Thus, this device includes a wireless communication element such as a SIM card 616 or other wireless communication device. Another optional feature is a communication device 403 which is configured to communicate with an automobile to automatically stop an automobile. This device 403 can be preset with certain instances such as when it views a pedestrian in a cross walk or other obstruction. Device 403 can be wired into the auto's onboard computer to automatically brake the auto to stop the auto from hitting a person or object. This viewing device could then automatically either shut the auto down or disable the accelerator to prevent a party in a crosswalk from being hit. Essentially this device 403 reads the visual information from aggregator 400 and then processes the images from this information. Once it reads the information from this aggregator 400 and recognizes this information it then sends this information onto the automobile computer to either disable the auto or to disable the accelerator.

In addition, another camera control device 404 is configured to control the cameras such as cameras 22, 24, and 26 or cameras 32, 34, and 36, 52, 54, 56 or cameras 120, 1090, 2102, 2104, 2112, or 2114. Each of these cameras can have in their body devices to control focus, pan, tilt, zoom, etc. Device 404 is thus configured to control the pan, tilt, zoom, a focus of each of these cameras and is configured to communicate through aggregator 400 so that each of these individual cameras is controlled. The controls of these cameras can be located in the dashboard of the auto, or on the steering wheel of the auto or on any one of the screens described above.

In addition, coupled to aggregator 400, is the onboard auto computer which communicates with this aggregator all of the information from the auto including the state of the auto. In addition, any controls located on the auto can be fed through the auto's onboard computer 405 through to the video aggregator 400, and then onto any one of the devices 401, 402, 403, or 404.

The aggregator 400 and also the components coupled either directly or indirectly to the aggregator 400 are coupled to the auto's onboard computer 405, in a communicative manner as well as in an electrically powered manner so that information and electrical power is passed between these components.

Each of these cameras can also be controlled by camera control device or lens 404 so that these cameras can render infrared, thermal, night vision or any other type of view known in the art and requested by the user.

Each of these components can communicate with each other via a wired connection. Alternatively, each of these components such as the cameras 22, 24, 26, 32, 34, 36, 120, 1090, 2102, 2104, 2112, and 2114 can include an associated wireless transceiver also communicate in a wireless manner with any one of the suitable screens such as screens 40, 62, 64, 72, 74, 220 selectively having a wireless transceiver. The communication can be via wireless internet protocols such as WIFI, Bluetooth or any other suitable wireless communication protocol. Thus, the system is designed to allow for communication and control from multiple different cameras to multiple different screens either in a wired or wireless manner to allow the user to see in different blind spots. In addition, the system allows for the mounting and positioning of multiple different screens or cameras wherein these screens and cameras can be positioned around a moving vehicle.

Different cameras can also be positioned around the vehicle. For example, FIG. 9 shows a side cross-sectional view of a camera system for a side view mirror 122. This view shows an inner shell 120.2 disposed inside of an outer shell 120.1. Inner shell 120.2 rotates within outer shell 120.1. There is a camera body 120.4 coupled to a lens section 120.3. A drive motor 120.5 is coupled to the camera body 120.4. Wheels 120.7 and 120.8 are coupled to drive motor 120.5 and are used to selectively drive the angle of vision or attack, i.e. the direction of the camera lens 120.3 to a particular direction. Drive motor 120.5 is driven by cable 120.6. Cable 120.6 is powered by a battery or electrical system within the automobile.

FIG. 91 shows another view of another embodiment. In this view there is a first auto 11a positioned adjacent to an auto 12. There is also an additional auto 13a positioned adjacent to auto 12. In this embodiment auto 12 includes cameras 2102 and 2104 which are each positioned on a bumper 1997. Positioned on or coupled to bumper 1997 are cameras 2102 and 2104 which are configured to project in a substantially lateral fashion in direction or viewing regions 2101 and 2103 respectively. In addition, camera 2150 which is positioned on either side of the respective headlights 1500 create viewing regions 2160, and 2162 as well as viewing angles 2170 and 2172. These viewing angles are substantially lateral viewing angles. These viewing angles can be substantially backed up or made further viewable through cameras 1500 and 1502 which are embedded inside of associated headlights. In addition, cameras 120a and 120b are embedded in associated side view mirrors 122a and 122b which allow for further front or side viewing of the automobile. An additional camera 1090 which is embedded in a rear-view mirror 1091 is also present. This camera 1090 is configured to view through windshield 1094. Thus, the automobile is configured to view around other adjacent automobiles such as automobiles 11a and 13a through viewing regions 2101 and 2103 for each of respective cameras 2102 and 2104. Thus, when a user is pulling out of a spot, the user can then see the oncoming traffic and other obstructions that may be blocked by adjacent autos or cars. Each of the viewing angles 2101 and 2103 are essentially viewing regions that are lateral viewing regions ranging from 90 degrees offset from a front viewing angle 2120 to a first side boundary 2101a of the viewing region 2101. The other boundary of the viewing region 2101 is 2101b which is approximately 30 degrees offset from boundary 2101a. Similarly, with viewing region 2103, there is a first side boundary 2103a which is approximately 90 degrees offset from front viewing angle 2120. Second side boundary 2103b is approximately 30 degrees offset from side boundary 2103a.

On the back bumper of the auto 12 are cameras 2112 and 2114. These cameras respectively generate viewing areas 2111 and 2113. Thus, a back side viewing region 2111 is bound by a back viewing boundary 2111a which is substantially 90 degrees offset from back viewing angle 2121. Both back viewing angle 2121 and front viewing angle 2120 extend along a central longitudinal axis of the auto 12. The other back viewing boundary 2111b is approximately 30 degrees offset from back viewing boundary 2111a. Opposite viewing region 2113 is also bound by back viewing boundary 2113a, which is approximately 90 degrees offset from back viewing angle 2121. Similarly, back viewing boundary 2113b is approximately 30 degrees offset from boundary 2113a. Thus, cameras 2112 provides a viewing area of 2111, and camera 2114 provides a viewing area of 2113. These viewing areas can then be shown on respective screens such as screens 40, 62, 64, 72, 74 or any other screens such as screens 815 or the screens shown in FIG. 90. These cameras can be configured to be engaged and to view these areas when a person puts the automobile into gear such as in reverse or forward. For example, when a person puts the automobile in reverse, cameras 2112 and 2114 can be engaged and be shown on respective screens such as 62, 64, 72 and/or 74. Alternatively, if the car is put in a forward gear, cameras 2102 and 2104 can be engaged so that the viewing regions 2101 and 2103 can be shown on respective screens such as screens 62, 64, 72, 74 and/or 40. This can be done via computer 800 having a processor such as a microprocessor 801b (See FIG. 6) selectively showing on screens 815, the images found by respective cameras 810 (cameras 810 being any one of the above cameras 22, 24, 26, 32, 34, 36, 120a, 120b, 1090, 2102, 2104, 2112, 2114.) With screens 815 being any one of screens 40, 62, 64, 72, 74.

Thus, a user pulling in and out of a parking spot would never be blinded by the blockage of adjacent cars or other impediments on this viewing angle.

Accordingly, while at least one embodiment of the present invention has been shown and described, it is obvious that many changes and modifications may be made thereunto without departing from the spirit and scope of the invention.

What is claimed is:

1. A viewing system coupled to a vehicle, the motor vehicle having a front bumper and a back bumper, and at least one front headlight, the system comprising:

at least one camera coupled to at least one of the front bumper and directed towards a front side portion of the vehicle in a direction substantially perpendicular to a longitudinal extension of the vehicle;

at least one additional camera coupled to the front headlight and directed substantially towards a side of the vehicle in a direction substantially perpendicular to a longitudinal extension of the vehicle;

at least one screen;

wherein said at least one screen is in communication with said at least one camera, and said at least one additional camera wherein said at least one screen displays images presented by said at least one camera and said at least one additional camera.

2. The viewing system as in claim 1, wherein said at least one camera comprises at least two cameras.

3. The viewing system as in claim 1, further comprising at least one additional set of cameras, comprising a second set of cameras which are coupled to the back bumper.

4. The viewing system as in claim 1, further comprising at least one aggregator coupled to said first set of cameras and wherein said at least one aggregator has an output coupled to said at least one screen.

5. The viewing system as in claim 4, further comprising at least one video compression device which is configured to compress the incoming video, wherein said video compression device has an output to said screen.

6. The viewing system as in claim 4, further comprising at least one video recorder.

7. A viewing system coupled to a motor vehicle having a frame having a roof, at least one support, and a body, the motor vehicle having a front bumper and a back bumper, and front headlights, with the at least one support supporting the roof over the body, the system comprising:

a first set of cameras coupled to the front bumper the first set of cameras comprising a first camera and a second camera, said first camera positioned to view a front left portion of a motor vehicle and directed in a direction substantially perpendicular to a longitudinal extension of the vehicle, and wherein said second camera is positioned to view a front right portion of the motor vehicle and directed in a direction substantially perpendicular to a longitudinal extension of the vehicle;

at least one additional set of cameras coupled to at least one of the front headlights;

at least one screen in communication with said first set of cameras, and said at least one additional set of cameras, said screen configured to display an image from said first set of cameras and said at least one additional set of cameras.

8. The viewing system as in claim 7, further comprising at least one projector in communication with said at least one camera, wherein said at least one projector is configured to project an image onto a windshield.

9. A viewing system for a motor vehicle having a front bumper and a back bumper the viewing system comprising:

a) at least one camera coupled to at least one bumper of the motor vehicle and directed in a direction substantially perpendicular to a longitudinal extension of the motor vehicle;

b) at least one camera cleaning system comprising at least one of a blower or a wiper configured to clean a camera cover;

c) at least one sensor;

d) at least one computing device configured to identify objects spaced apart from the motor vehicle;

e) at least one display;

wherein said at least one display is configured to display an image captured by said at least one camera, and wherein said display is configured to change when said at least one sensor detects a potential collision.

10. The viewing system as in claim 9, further comprising at least one communication module which comprises at least one of a cellular communication module and a wifi communication module.

11. The viewing system as in claim 10, wherein said at least one display comprises a projector and a screen which is a substantially translucent adhesive screen configured to be coupled to a windshield of a vehicle.

12. The viewing system as in claim 10, wherein said at least one display comprises a projector, and a curved screen coupled to said projector.

13. The viewing system as in claim 10, wherein said at least one computing device comprises a memory configured to record images and moving images in said computing device.

14. The viewing system as in claim 10, wherein said at least one camera comprises at least two cameras coupled to the front bumper.

15. The viewing system as in claim 14, wherein at least one camera of said at least two cameras is directed towards a front left portion of the motor vehicle and at least a second camera is directed towards a front right portion of the auto.

16. The viewing system as in claim 10, wherein said at least one camera comprises at least two cameras coupled to the back bumper.

* * * * *